(12) United States Patent
Migliori

(10) Patent No.: US 10,223,412 B2
(45) Date of Patent: *Mar. 5, 2019

(54) SYSTEMS AND METHODS FOR METADATA-DRIVEN COMMAND PROCESSOR AND STRUCTURED PROGRAM TRANSFER PROTOCOL

(71) Applicant: Douglas T. Migliori, Newport Beach, CA (US)

(72) Inventor: Douglas T. Migliori, Newport Coast, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/091,488

(22) Filed: Apr. 5, 2016

(65) Prior Publication Data

US 2016/0314167 A1 Oct. 27, 2016

Related U.S. Application Data

(63) Continuation of application No. 13/830,249, filed on Mar. 14, 2013, now Pat. No. 9,336,013.
(Continued)

(51) Int. Cl.
*G06F 7/00* (2006.01)
*G06F 17/30* (2006.01)
*G06F 9/4401* (2018.01)

(52) U.S. Cl.
CPC ...... *G06F 17/30424* (2013.01); *G06F 9/4401* (2013.01); *G06F 9/4416* (2013.01);
(Continued)

(58) Field of Classification Search
CPC .. G06F 17/30; G06F 9/4401; G06F 17/30324; G06F 17/30333
See application file for complete search history.

(56) References Cited

U.S. PATENT DOCUMENTS 6,085,333 A 7/2000 DeKoning et al.
6,393,605 B1 5/2002 Loomans
(Continued)

FOREIGN PATENT DOCUMENTS

WO 2014124243 A2 8/2014

OTHER PUBLICATIONS

International Search Report and Written Opinion for related application No. PCT/US2014/015284, dated Nov. 27, 2014, 9 pages (of-record in parent application).
(Continued)

*Primary Examiner* — Terrell S Johnson
(74) *Attorney, Agent, or Firm* — Entralta P.C.; Justin G. Sanders; Peter D. Weinstein

(57) ABSTRACT

Systems and methods for facilitating on-demand delivery and processing of program(s) and program-compatible application(s) on a plurality of different machines. In an embodiment, a metadata-driven command processor on a machine sends a request for a booting program and application to an agent. In response to the request, the agent invokes a resource to generate a booting program dataset that defines the booting program and an application dataset that defines the application, generates a response dataset comprising two or more nested datasets, wherein the two or more nested datasets comprise at least the booting program dataset and the application dataset, and sends the response dataset to the metadata-driven command processor. The metadata-driven command processor copies the booting program dataset and the application dataset into a process dataset comprising two or more nested datasets, and processes the first process dataset to execute the booting program and application on the machine.

3 Claims, 8 Drawing Sheets

Related U.S. Application Data

(60) Provisional application No. 61/783,362, filed on Mar. 14, 2013, provisional application No. 61/762,779, filed on Feb. 8, 2013.

(52) U.S. Cl.
CPC .. *G06F 17/30324* (2013.01); *G06F 17/30333* (2013.01); *G06F 7/00* (2013.01); *G06F 17/30* (2013.01)

(56) References Cited

U.S. PATENT DOCUMENTS

| | | |
|---|---|---|
| 6,981,097 B2 | 12/2005 | Martin et al. |
| 7,321,849 B2 | 1/2008 | Degtyar et al. |
| 8,572,057 B2 | 10/2013 | Jasik et al. |
| 2005/0160060 A1 | 7/2005 | Swartz et al. |
| 2006/0143193 A1 | 6/2006 | Thakkar et al. |
| 2006/0143238 A1 | 6/2006 | Tamatsu |
| 2007/0143379 A1 | 6/2007 | I Dalfo et al. |
| 2007/0198656 A1 | 8/2007 | Mazzaferri et al. |
| 2007/0283317 A1 | 12/2007 | Sadler et al. |
| 2008/0183726 A1 | 7/2008 | Bruckner et al. |
| 2009/0204629 A1 | 8/2009 | Barrow |
| 2010/0057485 A1 | 3/2010 | Luft |
| 2011/0258461 A1 | 10/2011 | Bates |
| 2011/0302573 A1 | 12/2011 | Bubolz et al. |
| 2012/0079221 A1* | 3/2012 | Sivasubramanian ........................ G06F 11/1456 711/162 |
| 2012/0209762 A1 | 8/2012 | Metaireau et al. |
| 2012/0323848 A1* | 12/2012 | Hildebrand ....... G06F 17/30578 707/613 |
| 2013/0094444 A1 | 4/2013 | Lai et al. |
| 2013/0179557 A1 | 7/2013 | Bian et al. |
| 2013/0188515 A1 | 7/2013 | Pinheiro et al. |
| 2013/0265937 A1 | 10/2013 | Jain et al. |
| 2014/0036728 A1 | 2/2014 | An et al. |
| 2014/0181085 A1 | 6/2014 | Gokhale et al. |
| 2014/0258363 A1 | 9/2014 | Peco et al. |

OTHER PUBLICATIONS

Notice of Allowance for U.S. Appl. No. 14/160,403, dated Feb. 27, 2015, 6 pgs (of-record in parent application).

Final Office Action for U.S Appl. No. 14/160,403, dated Oct. 1, 2014, 9 pgs (of-record in parent application).

Non-Final Office Action for U.S Appl. No. 14/160,403, dated Mar. 13, 2014, 11 pgs (of-record in parent application).

International Search Report and Written Opinion for related application No. PCT/US2015/025622 dated Jul. 16, 2015, 14 pages (of-record in parent application).

\* cited by examiner

| X10DATA.COM | | | | | Platform Manager |
|---|---|---|---|---|---|
| File | Edit | Cards | Daily | Windows | Help |
| | | | | | |
| | | | | | |

FIG. 4A

| X10DATA.COM | | | | | Platform Manager |
|---|---|---|---|---|---|
| File | Edit | Cards | Daily | Windows | Help |
| Applications | | | | | |
| Commands | | | | | |
| Datasets | | | | | |
| Domains | | | | | |
| Entities | | | | | |
| Keys | | | | | |
| Menus | | | | | |
| Messages | | | | | |
| Methods | | | | | |
| Modes | | | | | |
| Phrases | | | | | |
| Stored Procedures | | | | | |
| Tables | | | | | |
| Transfers | | | | | |
| Close | | | | | |

FIG. 4B

| X10DATA.COM | | | | | Platform Manager |
|---|---|---|---|---|---|
| File | Edit | Cards | Daily | Windows | Help |
| Entities | | | | | Summary |
| All | | | | | |
| App Entity | | | Relations | | |
| Application | | | Applications | | |
| Attribute | | | Attributes | | |
| Attribute Value | | | ListValues | | |
| Command | | | Commands | | |
| Dataset | | | Tables | | |
| Dataset Column | | | Fields | | |
| Dataset Column Value | | | ListValues | | |
| Domain | | | Domains | | |
| Entity | | | Entities | | |
| Field | | | Fields | | |
| Filter | | | Views | | |
| Filter Condition | | | Conditions | | |
| Key | | | Keys | | |
| Menu | | | Menus | | |
| Message | | | Messages | | |
| Method | | | Procedures | | |
| Method Step | | | ProcedureSteps | | |
| Mode | | | Modes | | |
| Owner | | | Owners | | |
| Phrase | | | Phrases | | |
| Relation | | | Relations | | |
| Relation Field | | | Relations | | |
| Stored Procedure | | | Procedures | | |
| Table | | | Tables | | |
| Transfer | | | Views | | |
| Transfer Column | | | Columns | | |
| Transfer Condition | | | Conditions | | |
| Transfer Formula | | | Conditions | | |
| View | | | Views | | |
| View Column | | | Columns | | |
| View Condition | | | Conditions | | |
| New | | Close | | | |

| X10DATA.COM | | | | | Platform Manager |
|---|---|---|---|---|---|
| File | Edit | Cards | Daily | Windows | Help |
| New Entity | | | | | Detail |
| Name | | | | | |
| Type | | | | | |
| Table | | | | | |
| Save | Close | | | | |

FIG. 4E

| X10DATA.COM | | | | | Platform Manager |
|---|---|---|---|---|---|
| File | Edit | Cards | Daily | Window | Help |
| New Entity | | | | | Detail |
| Name | | | | Function | |
| Type | | | | | |
| Table | | | | | |
| Save | Close | | | | |

FIG. 4F

| X10DATA.COM | | | | | Platform Manager |
|---|---|---|---|---|---|
| File | Edit | Cards | Daily | Windows | Help |
| Select Type | | | | | |
| Bound | | | | | |
| Unbound | | | | | |
| Close | | | | | |

FIG. 4G

| X10DATA.COM | | | | | Platform Manager |
|---|---|---|---|---|---|
| File | Edit | Cards | Daily | Windows | Help |
| New Entity | | | | | Detail |
| Entity Name | | | | Function | |
| Type | | | | Bound | |
| Table | | | | | |
| Save | Close | | | | |

FIG. 4H

| X10DATA.COM | | | | | Platform Manager |
|---|---|---|---|---|---|
| File | Edit | Cards | Daily | Windows | Help |
| Select Table | | | | | |
| All | | | | | |
| Applications | | | | | |
| Attributes | | | | | |
| Columns | | | | | |
| Commands | | | | | |
| Conditions | | | | | |
| Domains | | | | | |
| Entities | | | | | |
| Fields | | | | | |
| Keys | | | | | |
| ListValues | | | | | |
| Menus | | | | | |
| Messages | | | | | |
| Modes | | | | | |
| Owners | | | | | |
| Phrases | | | | | |
| Procedures | | | | | |
| Views | | | | | |
| New | Close | | | | |

FIG. 4I

| X10DATA.COM | | | | | Platform Manager |
|---|---|---|---|---|---|
| File | Edit | Cards | Daily | Windows | Help |
| New Entity | | | | | Detail |
| Name | | | | Function | |
| Type | | | | Bound | |
| Table | | | | Views | |
| Save | Close | | | | |

FIG. 4J

| X10DATA.COM | | | | Platform Manager | |
|---|---|---|---|---|---|
| File | Edit | Cards | Daily | Windows | Help |
| Entities | | | Relations | | |
| All | | | Applications | | |
| App Entities | | | Commands | | |
| Applications | | | Domains | | |
| Commands | | | ListValues | | |
| Domains | | | Attributes | | |
| Attribute Values | | | Entities | | |
| Attributes | | | Fields | | |
| Entities | | | Views | | |
| Fields | | | Keys | | |
| Function | | | Menus | | |
| Keys | | | Procedures | | |
| Menus | | | Modes | | |
| Methods | | | Columns | | |
| Modes | | | Views | | |
| Page Columns | | | Phrases | | |
| Pages | | | Procedures | | |
| Phrases | | | Tables | | |
| Stored Procedures | | | Columns | | |
| Tables | | | Conditions | | |
| View Columns | | | Views | | |
| View Conditions | | | | | |
| Views | | | | | |
| New | Close | | | | |

FIG. 4K

| X10DATA.COM | | | | Platform Manager | |
|---|---|---|---|---|---|
| File | Edit | Cards | Daily | Windows | Help |
| Entity Function | | | | | Detail |
| Entity Name | | Function | | | |
| Type | | Bound | | | |
| Table | | Views | | | |
| New | Delete | Save | Close | | |

FIG. 4L

| X10DATA.COM | | | | Platform Manager | |
|---|---|---|---|---|---|
| File | Edit | Cards | Daily | Windows | Help |
| Table Views | | | | | Detail |
| Name | | Views | | | |
| Type | | User Interface | | | |
| New | Delete | Save | Close | | |

FIG. 4M

| X10DATA.COM | | | | Platform Manager | |
|---|---|---|---|---|---|
| File | Edit | Cards | Daily | Windows | Help |
| Table Views | | | | | Detail |
| Summary | | | | | |
| Detail | | | | | |
| Fields | | | | | |
| Entities | | | | | |
| Close | | | | | |

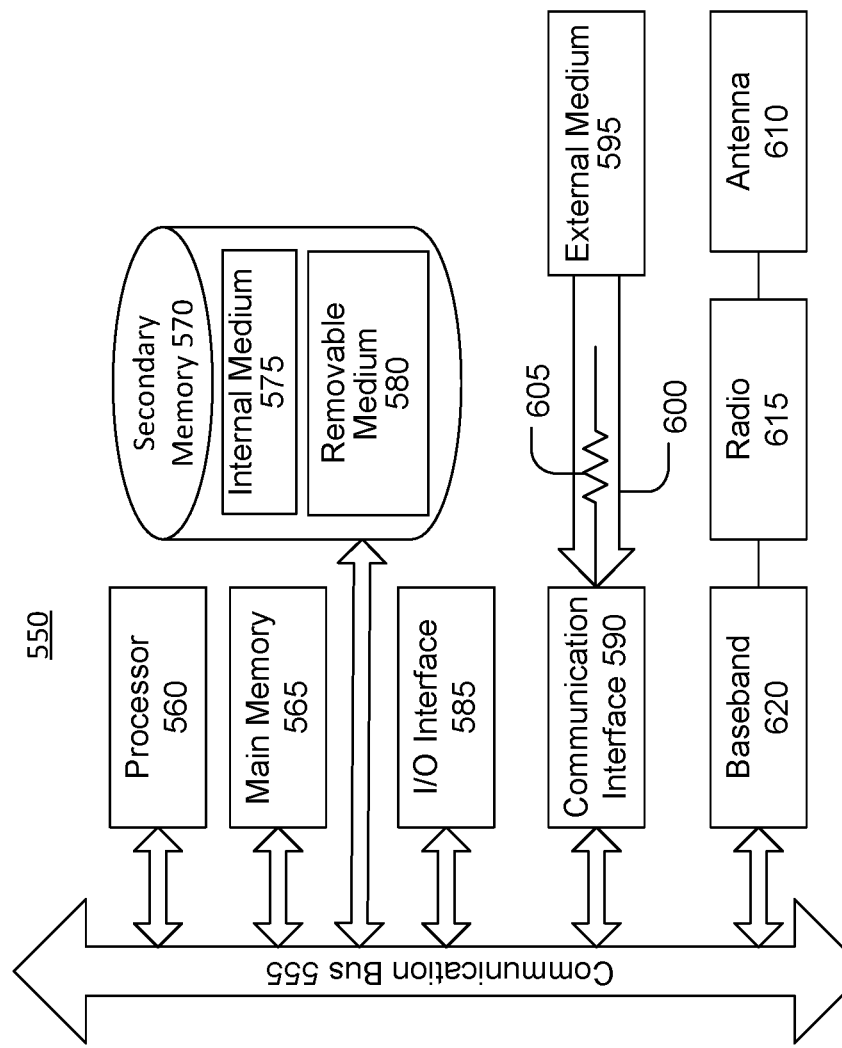

SYSTEMS AND METHODS FOR METADATA-DRIVEN COMMAND PROCESSOR AND STRUCTURED PROGRAM TRANSFER PROTOCOL

CROSS-REFERENCE TO RELATED APPLICATIONS

This application is a continuation of U.S. patent application Ser. No. 13/830,249, filed on Mar. 14, 2013, which claims priority to U.S. Provisional Patent App. No. 61/762,779, filed on Feb. 8, 2013, and U.S. Provisional Patent App. No. 61/783,362, filed on Mar. 14, 2013, the entireties of all of which are hereby incorporated herein by reference, as if set forth in full.

BACKGROUND

Field of the Invention

The invention is generally directed to the on-demand delivery and processing of codeless programs and program-compatible applications on any machine.

Description of the Related Art

Conventionally, in order to execute an application on a machine, it must be specifically designed and implemented for that particular machine. For example, different versions of a software application must be created to work on both the Microsoft Windows™ operating system and Mac OS™. Virtual machines have mitigated this issue to an extent. Specifically, a virtual machine is a software simulation of an abstract or real machine that is generally different from the machine on which it is being executed. A virtual machine allows a software application designed for the virtual machine to be run on each machine on which the virtual machine is installed and executed, regardless of the machine's particular architecture. However, currently, there is no way to allow programs and applications to be transferred, on-demand, from machine to machine while preserving their processing or execution states across those different machines. In addition, there is currently no way to execute a program and application on any machine, e.g., from an appliance controller (e.g., home thermostat) to a mobile device (e.g., smart phone). For instance, conventional home thermostats cannot act as a virtual machine running a Windows™ application.

SUMMARY

Accordingly, systems and methods are disclosed for on-demand transfer and delivery and processing of programs and program-compatible applications on any machine and across different machines.

In an embodiment, a method for facilitating on-demand delivery and processing of one or more programs and program-compatible applications is disclosed. The method comprises, using at least one hardware processor: by a first metadata-driven command processor on a first machine, sending a first request for a booting program and application to an agent, wherein the first request comprises an identification of a resource; in response to the first request, by the agent, invoking the identified resource to generate a booting program dataset that defines the booting program and an application dataset that defines the application, generating a first response dataset, wherein the first response dataset comprises two or more nested datasets, wherein the two or more nested datasets comprise at least the booting program dataset and the application dataset, and sending the first response dataset to the first metdata-driven command processor; and, by the first metadata-driven command processor, copying the booting program dataset and the application dataset into a first process dataset comprising two or more nested datasets, and processing the first process dataset to execute the booting program and the application on the first machine.

In an additional embodiment, a system for facilitating on-demand delivery and processing of one or more programs and program-compatible applications is disclosed. The system comprises: a first machine comprising at least one hardware processor and a first metadata-driven command processor; and an agent; wherein the first metadata-driven command processor sends a first request for a booting program and application to the agent, wherein the first request comprises an identification of a resource; wherein, in response to the first request, the agent invokes the identified resource to generate a booting program dataset that defines the booting program and an application dataset that defines the application, generates a first response dataset, wherein the first response dataset comprises two or more nested datasets, wherein the two or more nested datasets comprise at least the booting program dataset and the application dataset, and sends the first response dataset to the first metdata-driven command processor; and wherein the first metadata-driven command processor copies the booting program dataset and the application dataset into a first process dataset comprising two or more nested datasets, and processes the first process dataset to execute the booting program and the application on the first machine.

In an additional embodiment, a non-transitory computer-readable medium is disclosed. The medium has stored thereon: a first metadata-driven command processor comprising a first set of instructions; and an agent comprising a second set of instructions; wherein the first metadata-driven command processor sends a first request for a booting program and application to the agent, wherein the first request comprises an identification of a resource; wherein, in response to the first request, the agent invokes the identified resource to generate a booting program dataset that defines the booting program and an application dataset that defines the application, generates a first response dataset, wherein the first response dataset comprises two or more nested datasets, wherein the two or more nested datasets comprise at least the booting program dataset and the application dataset, and sends the first response dataset to the first metdata-driven command processor; and wherein the first metadata-driven command processor copies the booting program dataset and the application dataset into a first process dataset comprising two or more nested datasets, and processes the first process dataset to execute the booting program and the application on the first machine.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 illustrates a processing system on which one or more of the processes described herein may be executed, according to an embodiment.

DESCRIPTION

Figure 1:
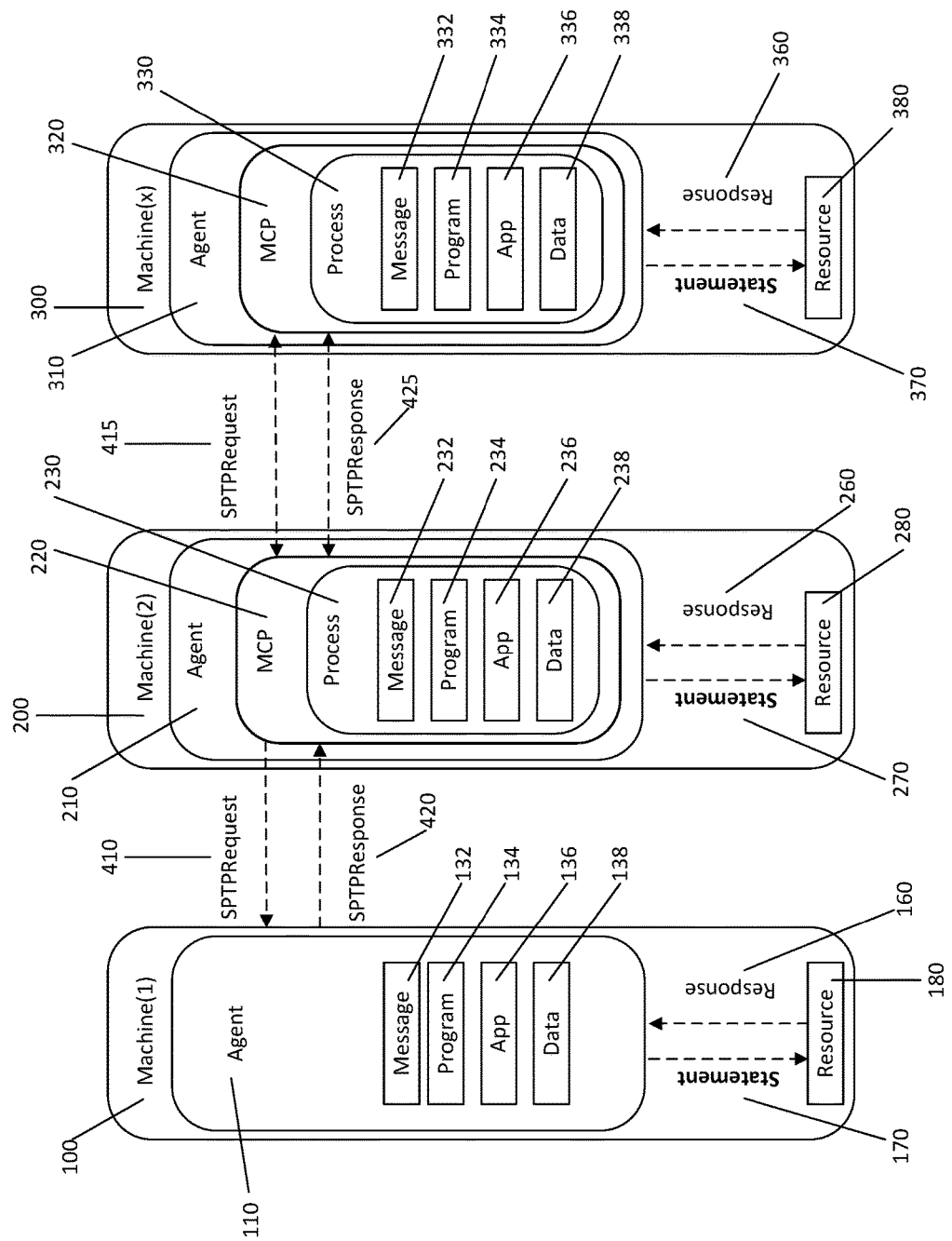
FIG. 1 illustrates a plurality of machines utilizing a metadata-driven command processor and/or a structured program transfer protocol, according to an embodiment.

A metadata-driven command processor (MCP) and structured program transfer protocol (SPTP) are disclosed in various embodiments.

1. Glossary

For purposes of understanding the present disclosure, the following terms should be defined as indicated below:

"Machine": An electronic device capable of performing one or more computing processes, receiving data from one or more other electronic devices (e.g., other machines), and/or sending data to one or more other electronic devices (e.g., other machines). Examples of machines include, without limitation, a server, personal computer (PC), laptop computer, tablet, in-vehicle media, entertainment, and/or control system, smart phone, feature phone, appliance, mechanical controller, sensor, thermostat, etc.

"Agent": A hardware or software component or module that acts for a user or program in an agency relationship. Examples of agents include, without limitation, a central processing unit (CPU), microprocessor, operating system (OS), native Hypertext Markup Language (HTML) container, web browser window, web service, database server, etc.

"Statement": A string of characters that are constructed in the syntax of a scripting language, and which can be executed, in their entirety, by a compatible resource to perform a computing process. Examples of computing processes which may be performed by executing a statement include, without limitation, rendering a display, manipulating and/or retrieving data, printing a document, invoking an application programming interface (API), controlling a mechanism, etc.

"Resource": A computer program that transforms statements written in a high-level scripting language to a lower-level language that can be executed on a machine to manipulate and/or retrieve data, render display content, etc. Examples of resources include, without limitation, a data engine, layout and/or rendering engine, machine control and/or printing engine, etc.

"Remote Resource": A resource on a remote machine that can be invoked directly by an agent on another machine. For example, two or more machines may be separated by one or more networks, such as the Internet, rendering each of the machines remote from the other. An example of a remote resource includes, without limitation, a web service.

"Request": A message sent to a resource or remote resource via a communication protocol that is intended to elicit a responding message. An example of a request includes, without limitation, a Hypertext Transfer Protocol (HTTP) request.

"Response": A message returned from a resource or remote resource via a communication protocol in response to a request (e.g., after executing the request). Examples of responses include, without limitation, an error message, user event, SQL result set, etc.

"Metadata-based Method": A metadata-based subroutine that is associated with a program and includes one or more single line commands ("method steps") which are interpreted by the disclosed metadata-driven command processor to manipulate datasets loaded in a memory on a machine and invoke machine resources.

"Program": A static set of instructions that are executed by a command processor to control the behavior of a machine. The execution of a program is a series of actions following the set of instructions that it contains. Each instruction may produce an effect that alters the state of a machine according to the instruction's predefined meaning. A program manages and integrates a machine's capabilities, but typically does not directly apply in the performance of tasks that benefit the user or machine. An example of a program includes, without limitation, the Microsoft Windows™ operating system.

"Application": Computer software that applies the power of a particular program to a particular purpose. A command processor serves the program which serves the application which serves a specific purpose. Examples of applications include, without limitation, enterprise software, accounting software, office suites, graphics software, media players, etc.

"Dataset": A collection of data presented in tabular form. Each column in a dataset may represent a particular variable. Each row in a dataset may correspond to a given member of the dataset in question. A dataset may comprise data for one or more members, corresponding to the number of rows.

"Dataset Element": Any value in a dataset. A dataset element can be referenced by a combination of its column position ("column index") and row position ("row index") within the dataset.

"Nested Dataset": A dataset stored as a dataset element within another dataset. Nested datasets are one-to-many relationships embodied in a single parent dataset memory store.

"Metadata": There are two types of metadata. "Structural metadata" is data about the design and specification of data structures. Structural metadata cannot be data about data, since at design time, the application contains no data. Rather, structural metadata is data about the containers of data. "Descriptive metadata" is data about data content. This data content is the individual instances of application data.

"Communication Protocol": A system of digital message formats and rules for exchanging messages in or between computing systems (e.g., in telecommunications). Protocols may include signaling, authentication, and error detection and correction capabilities. Each message has an exact meaning intended to provoke a defined response by the receiver. The nature of the communication, the actual data exchanged, and any state-dependent behaviors are defined by a technical specification or communication protocol standard. Examples of conventional communication protocols include, without limitation, HTTP, HTTP Secure (HTTPS), File Transfer Protocol (FTP), etc.

"Command Processor": A software shell with the primary purposes of (1) loading or booting another program, and (2) processing commands from the launched program. Processing of these commands can include, without limitation, data transfers, event handling, display renderings, and machine-to-machine communications. Examples of conventional command processors include, without limitation, the Microsoft Disk Operating System™ (MS-DOS), command line tools (e.g., "command.exe" or "cmd.exe"), Unix or Linux "shells," etc.

"Command": A subroutine within a command processor that can be invoked by an agent or by another command, and which executes an instruction set. Certain commands can be referenced by a command code.

"Scripting Language": A programming language that supports the writing of scripts. Scripts are programs written for a software environment that automate the execution of tasks which, alternatively, could be executed one-by-one by a human operator. Environments that can be automated through scripting include, without limitation, software applications, web pages within a web browser, shells of operating systems, and several general purpose and domain-specific languages, such as those for embedded systems. Examples of scripting languages include, without limitation, Structured Query Language (SQL), HTML, Printer Control Language (PCL), eXtensible Markup Language (XML), Computer Numeric Control (CNC), etc.

"Booting": The process of loading and executing bootstrap software by a computer during the start-up process. Booting is a chain of events that start with execution of hardware-based procedures that may then hand-off to firmware and software which is loaded into memory. Booting often involves processes such as performing self-tests, and loading configuration settings, Basic Input/Output System (BIOS), resident monitors, a hypervisor, an operating system, and/or utility software.

"Event": An action that is initiated outside the scope of a command processor, and that is handled by the command processor. Typical sources of events include users (e.g., via keystroke(s), i.e., pressing one or more keys on a keyboard) and software or hardware devices (e.g., a timer). A computer program that changes its behavior in response to events is said to be event-driven, often with the goal of being interactive.

"Instruction Set": A collection of computer instructions, including native data types, instructions, registers, addressing modes, memory architecture, interrupt and exception handling, and external Input/Output (I/O). Instructions are in the form of a programming language (i.e., source code) or machine language (i.e., machine code) that is compatible with a machine resource. Source code is written using some human-readable computer language, usually as text. The source code of a program is specially designed to facilitate the work of computer programmers, who specify the actions to be performed by a computer, primarily by writing source code. The source code is automatically translated at some point to machine code that the computer can directly read and execute.

2. Overview

The disclosed metadata-driven command processor and structured program transfer protocol facilitate on-demand delivery and processing of codeless programs and program-compatible applications on virtually any machine, from an appliance controller (e.g., home thermostat) to a smart device (e.g., smart phone). The disclosed embodiments also facilitate the transfer and delivery of programs and applications on one machine (e.g., tablet PC) to another machine (e.g., in-vehicle navigation system) via a communications interface, while maintaining the process state of the programs and/or applications. The request, delivery, and transfer of program and application metadata between machines are facilitated by a novel structured program transfer protocol for communications. The applications can be as simple as an on/off switch or as complex as client-server business solutions (e.g., enterprise resource planning (ERP), customer relationship management (CRM), etc.).

For example, the disclosed metadata-driven command processor and structured program transfer protocol can facilitate codeless, rapid development and on-demand delivery of database applications on end user devices, such as smart phones, tablets, PCs, and in-vehicle navigation systems. The database application may be a spreadsheet, web site, client-server business solution, etc. From the database application's metadata, the metadata-driven command processor can dynamically generate statements in various scripting languages (e.g., HTML, SQL, XML, PCL), executed on the end-user device (EUD) or on a remote resource (e.g., web service) to render a user interface, retrieve and manipulate database content, and invoke EUD-specific functionality (e.g., print documents, capture signatures, scan barcodes, read credit cards, etc.).

The metadata-driven command processor may have functionality and purpose similar to that of MS-DOS, whereas the programs may have functionality and purpose similar to Microsoft Windows™, and the applications may have functionality and purpose similar to Windows-based applications. However, the disclosed systems and methods are metadata-driven to provide nearly universal applicability across all machines. The instruction set within the metadata-driven command processor is minimal and can be embedded within a machine's operating system, chipset, or other machine component. Alternatively or additionally, the instruction set can be embedded within a container software application (e.g., web browser) that is installed on the machines.

A structured program transfer protocol is also disclosed. The structured program transfer protocol is a type of communication protocol that defines the dataset schema for sending a type of request ("SPTPRequest") and receiving programs, applications, data, and execution state collectively as a type of response ("SPTPResponse") from one machine to another.

Figure 2:
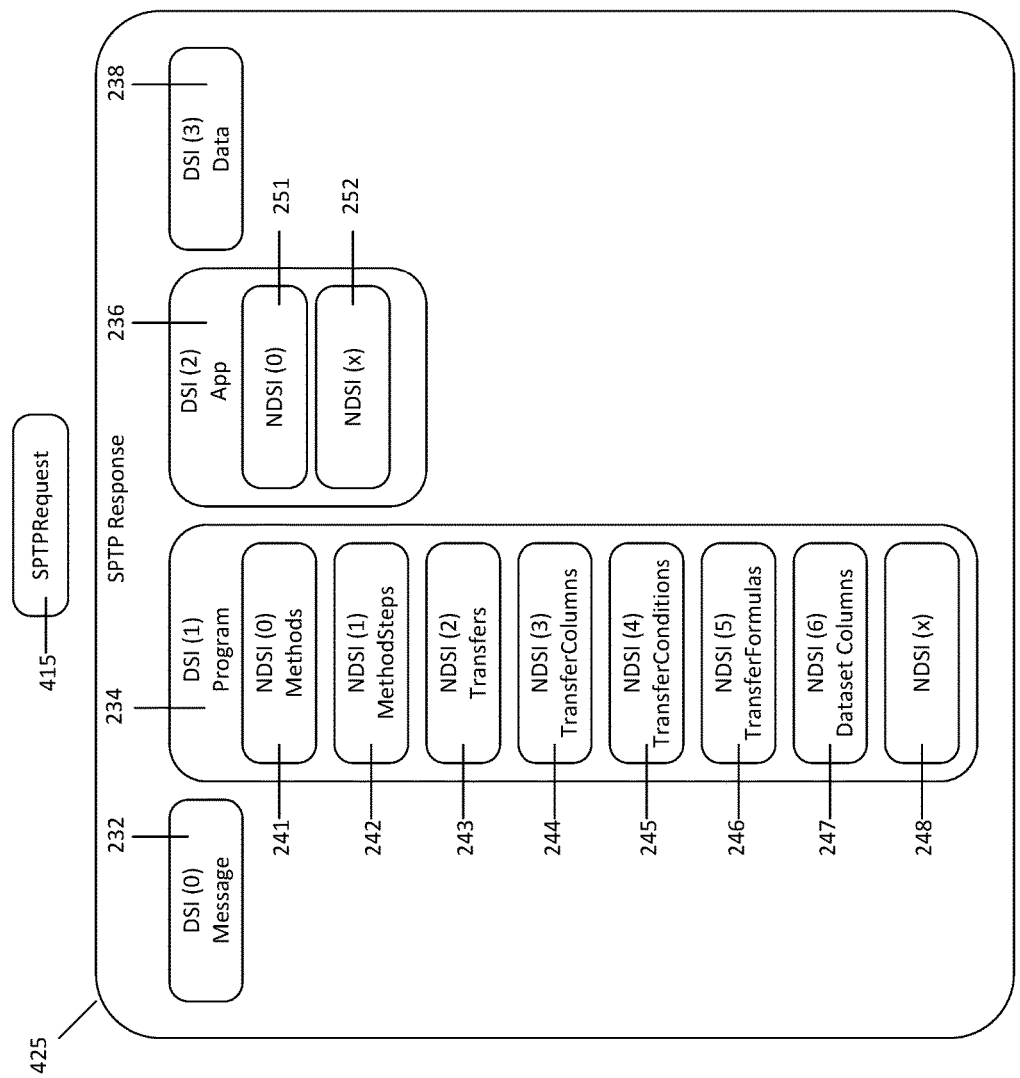
FIG. 2 illustrates examples of the nested datasets of a structured program transfer protocol, according to an embodiment.

FIGS. 1 and 2 illustrate the architectures of a metadata-driven command processor and structured program transfer protocol, according to an embodiment. The metadata-driven command processor (e.g., MCP 220) is a type of command processor that processes program methods in conjunction with applications that are defined entirely as metadata datasets. The current execution state of a program and application is also defined entirely as one or more datasets in the memory of a machine. This allows programs and their states to be exchanged between machines using the disclosed structured program transfer protocol. The metadata-driven command processor can reside on multiple machines (e.g., MCP 220 on machine 200 and MCP 320 on machine 300) and interact with an agent specific to each machine (e.g., agent 210 on machine 200 and agent 310 on machine 300).

Agent 210 may launch metadata-driven command processor 220 on machine 200, passing it a booting SPTPRequest that specifies the source of the booting program and application to be processed. Metadata-driven command processor 220 may send a SPTPRequest to agent 210 and receive a SPTPResponse from that agent.

The SPTPRequest may identify the resource needed to execute the SPTPRequest. If the resource identified in the SPTPRequest is on a remote machine (e.g., machine 100), then the SPTPRequest also identifies the agent (e.g., agent 110) on the remote machine that can communicate with the resource (e.g., resource 180) on the remote machine. In this case, agent 210 forwards the SPTPRequest (e.g., SPTPRequest 410) to the remote agent (e.g., agent 110).

If the SPTPRequest specifies a request to send a booting program and application, then agent 210 or the identified remote agent (e.g., agent 110) invokes the identified resource 280 or remote resource (e.g., resource 180) to generate the booting Program and Application datasets. The invoking agent generates a SPTPResponse that includes a structured version of the booting Program and Application datasets (e.g., Program dataset 134 and Application dataset 136). If the SPTPResponse is generated by a remote agent (e.g., agent 110), then the remote agent returns the SPTPResponse (e.g., SPTPResponse 420) to agent 210. Agent 210 returns the SPTPResponse to metadata-driven command processor 220 for processing. Metadata-driven command processor 220 copies the contents of the Program and Application datasets included in the SPTPResponse to Program dataset 234 and Application dataset 236 nested in Process dataset 230 and continues processing.

If the SPTPRequest specifies a request to send an additional program-compatible application, then agent 210 or the identified remote agent (e.g., agent 110) invokes the identified resource 280 or remote resource (e.g., 180) to generate the additional program-compatible application datasets. The invoking agent generates a SPTPResponse that includes a structured version of the additional program-compatible application datasets (e.g., Application dataset 136). If the SPTPResponse is generated by a remote agent (e.g., agent 110), then the remote agent returns the SPTPResponse (e.g., SPTPResponse 420) to agent 210. Agent 210 returns the SPTP to metadata-driven command processor 220 for processing. Metadata-driven command processor 220 copies the contents of the Application dataset included in the SPTPResponse to Application dataset 236 nested in Process dataset 230 and continues processing.

If the SPTPRequest specifies a request to execute a statement included in the SPTPRequest, then agent 210 or the identified remote agent (e.g., agent 110) sends the statement (e.g., statement 270 or statement 170) to identified resource 280 or a remote resource (e.g., 180) for execution. The executing resource may return a response (e.g., response 260 or response 160) to the invoking agent. The invoking agent generates a SPTPResponse that includes a structured version of the resource response (e.g., Data dataset 138). If the SPTPResponse is generated by a remote agent (e.g., agent 110), then the remote agent returns the SPTPResponse (e.g., SPTPResponse 420) to agent 210. Agent 210 returns the SPTPResponse to metadata-driven command processor 220 for processing. Metadata-driven command processor 220 copies the contents of the Data dataset included in the SPTPResponse to Data dataset 238 nested in Process dataset 230 and continues processing.

If the SPTPRequest specifies a request to send a program, loaded application(s), and current execution state from a remote machine (e.g., machine 300), then agent 210 forwards the SPTPRequest (e.g., SPTPRequest 415) to the identified remote agent (e.g., agent 310). The identified remote agent (e.g., agent 310) invokes the remote metadata-driven command processor (e.g., metadata-driven command processor 320) to return its Process dataset (e.g., Process dataset 330) which includes its program, loaded application(s), and current execution state (e.g., Message dataset 332, Program dataset 334, Application dataset 336, and Data dataset 338). The remote agent generates a SPTPResponse that includes the Process dataset and returns the SPTPResponse (e.g., SPTPResponse 425) to agent 210. Agent 210 returns the SPTPResponse to metadata-driven command processor 220 for processing. Metadata-driven command processor 220 copies the contents of the Process dataset included in the SPTPResponse to its Process dataset 230, which includes the program, loaded application(s), and current execution state within its nested Message dataset 232, Program dataset 234, Application dataset 236, and Data dataset 238. Metadata-driven command processor 220 continues program processing from the execution state that existed on the remote machine.

In an embodiment, metadata-driven command processor 220 generates or updates Process dataset 230 from SPTPResponse 420 or receives Process dataset 230 through SPTPResponse 425 (transferred from Process dataset 330). FIG. 2 illustrates SPTPResponse 425 in more detail, according to an embodiment. Process dataset 230 generated by metadata-driven command processor 220 may contain the same defined schema as SPTPResponse 420 or SPTPResponse 425. Thus, the elements of Process dataset 230 are simply populated from the elements of the dataset in SPTPResponse 420 or SPTPResponse 425.

SPTPResponse dataset 420, SPTPResponse dataset 425, and Process dataset 230 may each comprise a single row having four nested datasets: Message dataset 232, Program dataset 234, Application dataset 236, and Data dataset 238. In turn, Program dataset 234 may comprise a single row containing seven nested datasets: Methods dataset 241, MethodSteps dataset 242, Transfers dataset 243, TransferColumns dataset 244, TransferConditions dataset 245, TransferFormulas dataset 246, and DatasetColumns dataset 247.

If the SPTPResponse includes a booting program and application, metadata-driven command processor 220 generates Process dataset 230 from SPTPResponse, and then identifies a MethodID dataset element in a row of Methods dataset 241 which is associated with booting. Next, metadata-driven command processor 220 identifies one or more rows in the MethodSteps dataset 242 that are associated with the identified MethodID dataset element. Metadata-driven command processor 220 processes these one or more rows by invoking a command that is associated to a CommandCode dataset element in each row. After completion of all the commands associated with applicable rows identified from the MethodSteps dataset 242, metadata-driven command processor 220 maintains its state, and waits for one of its commands to be invoked by agent 210 based on a user event, machine event, or request from a remote agent.

In an embodiment, commands may perform one or more of the following:

(1) Conditionally invoke another method based on the current value of a dataset element.

(2) Conditionally append, update, or delete a dataset row based on the current value(s) of element(s) in one or more other datasets.

(3) Build a statement from the current values of dataset elements that is specific to a scripting language.

(4) Invoke an agent or remote agent to execute a statement via a compatible resource on the machine of the invoked agent. The response from the resource may be converted by the agent into a SPTPResponse that is processed by the metadata-driven command processor.

(5) Transfer the Process dataset within the metadata-driven command processor to a remote agent. This allows the remote agent's metadata-driven command processor to continue program processing from its current state.

As mentioned above, a dataset structure for an embodiment of a structured program transfer protocol is illustrated in FIG. 2. In this case, the dataset structure includes nested relationships. SPTPRequest 415 and SPTPResponse 425 are both single-row datasets. In an embodiment, Message dataset 232, Program dataset 234, and Application dataset 236 are each single-row nested datasets within SPTPResponse 425, and Data dataset 238 is a multi-row nested dataset within SPTPResponse 425.

In the illustrated embodiment, Methods dataset 241, MethodSteps dataset 242, Transfers dataset 243, TransferColumns dataset 244, TransferConditions dataset 245, TransferFormulas dataset 246, and DatasetColumns dataset 247 are all multi-row nested datasets within Program nested dataset 234. Program dataset 234 may also include one or more program-specific nested datasets 248. The schema of Application dataset 236 and its nested one or more datasets is program-specific and may vary. Similarly, the schema of Data dataset 238 is statement-specific and may vary.

In the illustrated embodiment of FIG. 2, the column index ("CI") of SPTPResponse 425 is referred to as "DSI" (dataset index). The column index of Program dataset 234 and Application dataset 236 is referred to as "NDSI" (nested dataset index). The row index ("RI") is zero for all single-row datasets. Datasets may be created as two-dimensional arrays. Elements within the datasets may be referenced using [x][y] notation, where [x] is the row index and [y] is the column index. For example, the dataset element "RequestType" of an SPTPRequest, in the illustrated embodiment of Table 1, may be referenced in an instruction set as SPTPRequest[0][0]. While row and column indexing are illustrated herein as zero-based, other index bases (e.g., one-based indexing) are possible.

3. Example Embodiments of a SPTP

3.1. Example SPTP Request

The following description illustrates a non-limiting embodiment of a structured program transfer protocol request. The structured program transfer protocol request may comprise a single-row SPTPRequest dataset, which may be sent from an agent (e.g., agent 210) to a metadata-driven command processor (e.g., MCP 220), from a metadata-driven command processor (e.g., MCP 220) to an agent (e.g., agent 210), or from an agent (e.g., agent 210) to a remote agent (e.g., agent 110 or agent 310). The SPTPRequest dataset includes structured dataset elements that any metadata-driven command processor, agent, or remote agent can interpret and process. In this embodiment, the dataset comprises the columns illustrated in Table 1:

TABLE 1

| CI | Description | Type | Default Value |
|---|---|---|---|
| 0 | RequestType | Number | 0 |
| 1 | RemoteConnectType | Number | 0 |
| 2 | RemoteConnection | Text | |
| 3 | ResourceConnectType | Number | 0 |
| 4 | ResourceConnection | Text | |
| 5 | StatementType | Number | 0 |
| 6 | Statement | Text | |
| 7 | DomainType | Number | 0 |
| 8 | DomainIdentifier | Text | |
| 9 | ObjectID | Number | 0 |
| 10 | RecordID | Text | |
| 11 | RecordIDs | Text | |
| 12 | Value | Text | |
| 13 | ScreenWidth | Number | 0 |
| 14 | ScreenHeight | Number | 0 |

Illustrative defined values for specific SPTPRequest dataset columns are illustrated in Table 2:

TABLE 2

| CI | Value | Description |
|---|---|---|
| 0 | 0 | Load Booting Program and Application |
| 0 | 1 | Send Booting Program and Application |
| 0 | 2 | Send Loaded Program and Applications |
| 0 | 3 | Execute Statement |
| 0 | 4 | Send Statements |
| 0 | 5 | Validate Domain |
| 0 | 6 | Send Additional Application |
| 1 | 0 | None |
| 1/3 | 1 | SPTP |
| 1/3 | 2 | Simple Object Access Protocol (SOAP) |
| 1/3 | 3 | Layout Engine |
| 1/3 | 4 | SQL Server |
| 1/3 | 5 | APD |
| 1/3 | 6 | ActiveX |
| 1/3 | 7 | Transmission Control Protocol (TCP) |
| 1/3 | 8 | OLE for Retail POS (OPOS)/UnifiedPOS (UPOS) |
| 1/3 | 9 | Hypertext Transfer Protocol (HTTP) |
| 1/3 | 10 | Hypertext Transfer Protocol Secure (HTTPS) |
| 1/3 | 11 | File Transfer Protocol (FTP) |
| 1/3 | 12 | Secure Sockets Layer (SSL) |
| 1/3 | 13 | Simple Mail Transfer Protocol (SMTP) |
| 1/3 | 14 | Multipurpose Internet Mail Extensions (MIME) |
| 1/3 | 15 | Internet Message Access Protocol (IMAP) |
| 1/3 | 16 | Post Office Protocol (POP) |
| 1/3 | 17 | Bluetooth |
| 1/3 | 18 | NFC |
| 1/3 | 19 | Configuration File Manager |
| 5 | 1 | Transact-SQL (TSQL) |
| 5 | 2 | Hypertext Markup Language (HTML) |
| 5 | 3 | Printer Command Language (PCL) |
| 5 | 4 | Visual Basic for Applications (VBA) |
| 5 | 5 | Extensible Markup Language (XML) |
| 5 | 6 | VoiceXML (VXML) |
| 7 | 1 | Website |
| 7 | 2 | Location |
| 7 | 3 | Network |
| 7 | 4 | Machine |
| 7 | 5 | Session |
| 7 | 6 | Shortcut |

3.2. Example SPTP Response

The following description illustrates a non-limiting embodiment of a structured program transfer protocol response. The structured program transfer protocol response may comprise a single-row SPTPResponse dataset, which may be returned to a metadata-driven command processor (e.g., MCP 220) from an agent (e.g., agent 210) or to an agent (e.g., agent 210) from a remote agent (e.g., agent 110 or agent 310) in response to a SPTPRequest. In an embodiment, this dataset contains four columns. Each dataset element may contain a specific nested dataset as shown in Table 3:

TABLE 3

| DSI | Nested Dataset |
|---|---|
| 0 | Message |
| 1 | Program |
| 2 | Application |
| 3 | Data |

In an embodiment, the Message dataset is a single-row dataset with the columns illustrated in Table 4:

TABLE 4

| CI | Name | Type |
|---|---|---|
| 0 | MessageCode | Number |
| 1 | TypeCode | Number |
| 2 | Description | Text |
| 3 | SourceCode | Number |

Illustrative defined values for specific Message dataset columns are listed in Table 5:

TABLE 5

| CI | Value | Description |
|---|---|---|
| 1 | 0 | None |
| 1 | 1 | Error |
| 1 | X | As defined by Program or Application |
| 3 | 1 | MCP |
| 3 | 2 | Agent |
| 3 | 3 | Remote Agent |
| 3 | 4 | Program |
| 3 | 5 | Application |

In an embodiment, the Program dataset is a single-row dataset with the seven defined columns illustrated in Table 6. It may also include one or a plurality of program-specific columns beginning at NDSI 7. Each dataset element may contain a specific nested dataset as shown below:

TABLE 6

| NDSI | Nested Dataset |
|---|---|
| 0 | Methods |
| 1 | MethodSteps |
| 2 | Transfers |
| 3 | TransferColumns |
| 4 | TransferConditions |
| 5 | TransferFormulas |
| 6 | DatasetColumns |
| x | [Program-specific] |

In an embodiment, the Methods dataset nested within the Program dataset contains one or more rows with the columns illustrated in Table 7:

TABLE 7

| CI | Name | Type |
|---|---|---|
| 0 | MethodID | Number |
| 1 | Name | Text |
| 2 | EventType | Number |

Illustrative defined values for specific Methods dataset columns are listed in Table 8:

TABLE 8

| CI | Value | Description |
|---|---|---|
| 2 | 0 | None |
| 2 | 1 | Booting |
| 2 | 2 | Screen Size Change |
| 2 | 3 | Message |
| 2 | X | As defined by Program or Application |

In an embodiment, the MethodSteps dataset nested within the Program dataset contains one or more rows with the columns illustrated in Table 9:

TABLE 9

| CI | Name | Type |
|---|---|---|
| 0 | MethodID | Number |
| 1 | CommandCode | Number |
| 2 | CommandObjectID | Number |
| 3 | ElseCondition | Number |
| 4 | ConditionDSI | Number |
| 5 | ConditionNDSI | Number |
| 6 | ConditionCI | Number |
| 7 | ConditionOperator | Number |
| 8 | ConditionValue | Text |

Illustrative defined values for specific MethodSteps dataset columns are listed in Table 10:

TABLE 10

| CI | Value | Description |
|---|---|---|
| 1 | 1 | CallMethod |
| 1 | 2 | TransferData |
| 1 | 3 | ClearData |
| 1 | 4 | Send/Receive |
| 3 | 0 | No |
| 3 | 1 | Yes |
| 7 | 0 | None |
| 7 | 1 | = (i.e., equals) |
| 7 | 2 | <> (i.e., does not equal) |
| 7 | 3 | Contains |

In an embodiment, the Transfers dataset nested within the Program dataset contains one or more rows with the columns illustrated in Table 11:

TABLE 11

| CI | Name | Type |
|---|---|---|
| 0 | TransferID | Number |
| 1 | TypeCode | Number |
| 2 | FromDSI | Number |
| 3 | FromNDSI | Number |
| 4 | ToDSI | Number |
| 5 | ToNDSI | Number |
| 6 | ToCI | Number |
| 7 | ParentID | Number |

Illustrative defined values for specific Transfers dataset columns are listed in Table 12:

TABLE 12

| CI | Value | Description |
|---|---|---|
| 1 | 1 | Append |
| 1 | 2 | Update |
| 1 | 3 | Delete |
| 1 | 4 | Copy |
| 1 | 5 | Nest |
| 1 | 6 | Cross Update |
| 1 | 7 | Restore |

In an embodiment, the TransferColumns dataset nested within the Program dataset contains one or more rows with the columns illustrated in Table 13:

TABLE 13

| CI | Name | Type |
|---|---|---|
| 0 | TransferID | Number |
| 1 | SourceCode | Number |

TABLE 13-continued

| CI | Name | Type |
|---|---|---|
| 2 | SourceValue | Text |
| 3 | ToCI | Number |

Illustrative defined values for specific TransferColumns dataset columns are listed in Table 14:

TABLE 14

| CI | Value | Description |
|---|---|---|
| 1 | 1 | Column |
| 1 | 2 | Constant |
| 1 | 3 | Formula |
| 1 | 4 | Parent ToRI |
| 1 | 5 | Row Index |

In an embodiment, the TransferConditions dataset nested within the Program dataset contains one or more rows with the columns illustrated in Table 15:

TABLE 15

| CI | Name | Type |
|---|---|---|
| 0 | TransferID | Number |
| 1 | FromCI | Number |
| 2 | OperatorCode | Number |
| 3 | SourceCode | Number |
| 4 | ConditionValue | Text |
| 5 | ConditionDSI | Number |
| 6 | ConditionNDSI | Number |
| 7 | ConditionCI | Number |

Illustrative defined values for specific TransferConditions dataset columns are listed in Table 16:

TABLE 16

| CI | Value | Description |
|---|---|---|
| 2 | 1 | = |
| 2 | 2 | <> |
| 2 | 3 | Contains |
| 3 | 1 | Column |
| 3 | 2 | Constant |
| 3 | 3 | ToRI |
| 3 | 4 | Parent FromRI |
| 3 | 5 | Parent FromRI Column |
| 3 | 6 | Parent ToRI Column |

In an embodiment, the TransferFormulas dataset nested within the Program dataset contains one or more rows with the columns illustrated in Table 17:

TABLE 17

| CI | Name | Type |
|---|---|---|
| 0 | ColumnID | Number |
| 1 | OperatorCode | Number |
| 2 | SourceCode | Number |
| 3 | Value | Text |

Illustrative defined values for specific TransferFormulas dataset columns are listed in Table 18:

TABLE 18

| CI | Value | Description |
|---|---|---|
| 1 | 1 | Append |
| 1 | 2 | Trim |
| 1 | 3 | + |
| 1 | 4 | Parse |
| 1 | 5 | Insert Prefix |
| 2 | 1 | Column |
| 2 | 2 | Constant |
| 2 | 3 | Row Index |

In an embodiment, the DatasetColumns dataset nested within the Program dataset contains one or more rows with the columns illustrated in Table 19:

TABLE 19

| CI | Name | Type |
|---|---|---|
| 0 | DSI | Number |
| 1 | NDSI | Number |
| 2 | CI | Number |
| 3 | DefaultValue | Text |

In an embodiment, the Application dataset nested within the SPTPResponse dataset contains a single row with a variable number of columns that are program-specific, as shown in Table 20. Each dataset element may contain a nested dataset that is program-specific.

TABLE 20

| NDSI | Nested Dataset |
|---|---|
| 0 | [Program-specific] |
| x | [Program-specific] |

In an embodiment, the Data dataset nested within the SPTPResponse dataset comprises one or more rows that are generated from the response of a resource to a statement. The Data dataset may include a variable number of columns that is statement-specific. Each Data dataset element may contain a value that is statement-specific and resource-specific.

4. Example Embodiment of a Metadata-Driven Command Processor

As mentioned above, the metadata-driven command processor generates a Process dataset which may contain the same defined schema as the SPTPResponse. Process dataset elements are populated from the SPTPResponse dataset elements. All of the processing within the metadata-command processor then references elements within the Process dataset. For instance, in the disclosed exemplary schema, the nested datasets can be referenced within the Process dataset using the indices shown in Table 21:

TABLE 21

| Nested Dataset | Specification Reference | Instruction Set Reference |
|---|---|---|
| Message | DSI(0) | Process[0][0] |
| Program | DSI(1) | Process[0][1] |
| Application | DSI(2) | Process[0][2] |
| Data | DSI(3) | Process[0][3] |
| Methods | DSI(1) NDSI(0) | Process[0][1][0][0] |
| MethodSteps | DSI(1) NDSI(1) | Process[0][1][0][1] |
| Transfers | DSI(1) NDSI(2) | Process[0][1][0][2] |

TABLE 21-continued

| Nested Dataset | Specification Reference | Instruction Set Reference |
| --- | --- | --- |
| TransferColumns | DSI(1) NDSI(3) | Process[0][1][0][3] |
| TransferConditions | DSI(1) NDSI(4) | Process[0][1][0][4] |
| TransferFormulas | DSI(1) NDSI(5) | Process[0][1][0][5] |
| DatasetColumns | DSI(1) NDSI(6) | Process[0][1][0][6] |

In an embodiment, the metadata-driven command processor contains six commands that each include instruction sets: ProcessRequest, ProcessEvent, TransferData, ClearData, Send/Receive, and CallMethod. The ProcessRequest command is invoked by components of an agent. The TransferData, ClearData, and Send/Receive commands are invoked within instruction sets of commands of the metadata-driven command processor. The ProcessEvent and CallMethod commands may be invoked by agent components and within command instruction sets of the metadata-driven command processor. The CallMethod, TransferData, ClearData, and Send/Receive commands may be assigned command codes 1, 2, 3, and 4, respectively.

Figure 3:
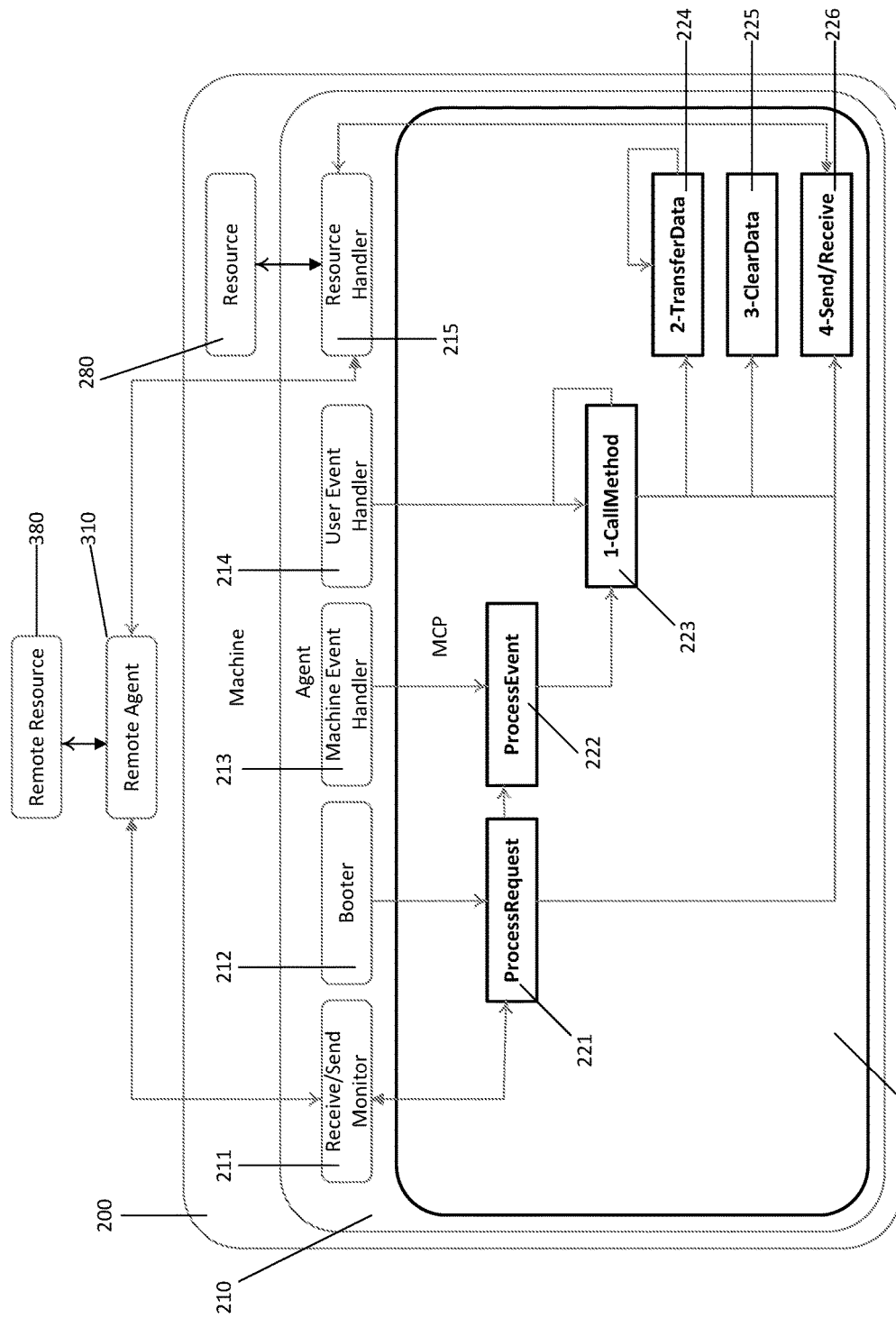
FIG. 3 illustrates a machine utilizing an agent and metadata-driven command processor, according to an embodiment.

FIG. 3 illustrates the relationships between MCP commands, agent components, a resource, a remote agent, and a remote resource, according to an embodiment. Solid arrow heads in FIG. 3 indicate a return result. As shown, agent 210 comprises a receive/send monitor 211, a booter 212, a machine event handler 213, a user event handler 214, and a resource handler 215. In addition, metadata-driven command processor 220 comprises ProcessRequest command 221, ProcessEvent command 222, CallMethod command 223, TransferData command 224, ClearData command 225, and Send/Receive command 226.

Receive/send monitor 211 of agent 210 is configured to receive requests from remote agent 310, send results to remote agent 310, and invoke ProcessRequest command 221 of metadata-driven command processor 220 and resource handler 215 of agent 210. Booter 212 of agent 210 is configured to invoke ProcessRequest command 221 of metadata-driven command processor 220. Machine event handler 213 of agent 210 is configured to receive machine events and invoke ProcessEvent command 222 of metadata-driven command processor 220. User event handler 214 of agent 210 is configured to receive user events and invoke CallMethod command 223 of metadata-driven command processor 220. Resource handler 215 of agent 210 is configured to send requests to remote agent 310, receive results from remote agent 310, receive requests from Send/Receive command 226, send statements to resource 280, receive results from resource 280, and return results to Send/Receive command 226.

ProcessRequest command 221 may be invoked by receive/send monitor 211 and booter 212 of agent 210, and may invoke ProcessEvent command 222 and Send/Receive command 226. ProcessEvent command 222 may be invoked by a ProcessRequest command 221 and machine event handler 213, and may invoke CallMethod command 223. CallMethod command 223 may be invoked by a ProcessEvent command 222, user event handler 214, and CallMethod command 223, and may invoke CallMethod command 223, TransferData command 224, ClearData command 225, and Send/Receive command 226. TransferData command 224 may be invoked by CallMethod command 223 and TransferData command 224, and may invoke TransferData command 224. ClearData command 225 may be invoked by CallMethod command 223. Send/Receive command 226 may be invoked by ProcessRequest command 221 and CallMethod command 223, and may send requests to resource handler 215 of agent 210.

In an embodiment, metadata-driven command processor 220 contains instruction sets in a programming language or machine language that is compatible with machine 200. The example instruction sets below illustrate non-limiting examples of instruction sets using the JavaScript programming language. However, it should be understood that any suitable alternative programming language or machine language may be utilized.

4.1. ProcessRequest Command

ProcessRequest command 221 facilitates: (1) loading of a booting program and application; and (2) transferring a loaded program, application(s), and their processing states to a metadata-driven command processor on another machine. Instruction Set 1 of the example instruction sets below illustrates an example of how the functionality of ProcessRequest command 221 may be implemented in JavaScript. ProcessRequest command 221 may be invoked by the receive/send monitor 211 and booter 212 components of an agent when a SPTPRequest is to be processed by metadata-driven command processor 220. Based on the value of a RequestType element in the SPTPRequest dataset, one of the following instruction sets may be executed:

(1) If RequestType is 0 (a defined value representing a "Load Booting Program and Application" request type), then ProcessRequest command 221 resets the RequestType to 1 (a defined value representing a "Send Booting Program and Application" request type), invokes Send/Receive command 226 with the updated SPTPRequest to retrieve a booting program and application, and creates an initial Process dataset from the returned SPTPResponse. ProcessRequest command 221 then invokes ProcessEvent command 222 to execute the booting method by setting command parameters as follows: EventType=1, RecordID=0, and Value=" ".

(2) If RequestType is 2 (a defined value representing a "Send Loaded Program and Applications" request type), then ProcessRequest command 221 sets SPTPResponse to the Process dataset. Agent 210 returns the SPTPResponse, comprising the Process dataset, to remote agent 310 to allow the metadata-driven command processor of remote agent 310 to continue program processing from its current state.

4.2. ProcessEvent Command

ProcessEvent command 222 identifies the method associated with a machine event, and invokes CallMethod command 223 to execute the identified method. Instruction Set 2 of the example instruction sets below illustrates an example of how the functionality of ProcessEvent command 222 may be implemented in JavaScript. ProcessEvent command 222 may be invoked by machine event handler 213 of agent 210 whenever a machine event is to be processed by metadata-driven command processor 220. ProcessEvent command 222 may also be conditionally invoked by ProcessRequest command 221 and Send/Receive command 226. ProcessEvent command 222 may include the parameters shown in Table 22:

TABLE 22

| Parameter | Description |
| --- | --- |
| EventType | A defined value representing the event that occurred. The value must match an EventType element value within the Methods dataset. |
| RecordID | An optional identifier associated with the event that can be referenced by the associated method. |
| Value | An optional value associated with the event that can be referenced by the associated method. |

If the EventType parameter value is 3 (a defined value for a "Message" event type) before the Program dataset has been generated, then ProcessEvent command 222 generates a system-level error message. Regardless of the value of the EventType parameter, if the Program dataset has not been generated, ProcessEvent command 222 terminates its processing.

Otherwise, the MethodID variable is set to the MethodID element value in the Methods dataset for the row in which the EventType element value matches the EventType parameter value. Then CallMethod command 223 is invoked with the MethodID variable, RecordID parameter, and Value parameter values passed as the MethodID, RecordID, and Value parameters, respectively, for CallMethod command 223.

If the EventType parameter is set to 3 (a defined value for a "Message" event type), then the values for the MessageCode, TypeCode, Description, and SourceCode elements in the Message dataset are cleared.

4.3. CallMethod Command

CallMethod command 223 (CommandCode 1) executes the rows within the MethodSteps dataset that are associated with a specific method. The MethodStep row execution invokes the command associated with a row when the row's condition, if any, is met. Instruction Set 3 of the example instructions sets below illustrates an example of how the functionality of CallMethod command 223 may be implemented in JavaScript. CallMethod command 223 may be invoked by user event handler 214 of agent 210 whenever a user event is to be processed by metadata-driven command processor 220. CallMethod command 223 may also be invoked by ProcessEvent command 222, and conditionally invoked within the instruction set of CallMethod command 223. CallMethod command 223 may include the parameters shown in Table 23:

TABLE 23

| Parameter | Description |
| --- | --- |
| MethodID | An identifier representing the row in the Methods dataset to execute. The value must match a MethodID element value within the Methods dataset. |
| RecordID | An optional identifier that can be referenced by an associated MethodStep. |
| Value | An optional value that can be referenced by an associated MethodStep. |

CallMethod command 223 updates the SPTPRequest dataset elements RecordID and Value from its RecordID and Value parameters, respectively. CallMethod command 223 then executes the rows within the MethodSteps dataset that are associated with the MethodID parameter. For each MethodStep row, an instruction set represented by the following pseudocode may be performed:

The SkipCommand variable is set to false.
If the MethodStep row's ConditionOperator element value is not 0 (a defined value representing "none"), then the following instruction set is executed:
    If the MethodStep row's ElseCondition element value is 0 (a defined value representing "No"), then the ConditionMet variable is reset to false.
    Otherwise, if ConditionMet is true, then the SkipCommand variable is set to true because a superseding block condition was met.
    If the MethodStep row's ElseCondition element value is 0 or ConditionMet is false, then the following instruction set is executed:
    The MethodStep row's Condition Value element value is compared to the value of the element within the single-row dataset denoted by the MethodStep row's ConditionDSI and ConditionNDSI element values, and the column index denoted by the MethodStep row's ConditionCI element value.
    If the MethodStep row's ConditionOperator value is 1 (a defined value representing "=") and the SourceValue variable and ConditionValue element values do not match, then the SkipCommand variable is set to true.
If the SkipCommand variable is set to false, then ConditionMet is set to true and one of the following instruction sets is executed based on the MethodStep row's CommandCode element value:
    (1) If CommandCode is 1, then CallMethod command 223 is invoked.
    (2) If CommandCode is 2, then TransferData command 224 is invoked.
    (3) If CommandCode is 3, then ClearData command 225 is invoked.
    (4) If CommandCode is 4, then Send/Receive command 226 is invoked.
The MethodStep row's CommandObjectID element value is passed as the single parameter when the invoked command is CallMethod command 223, TransferData command 224, or ClearData command 225. If the CommandObjectID element value is 0, then the ObjectID element value in the SPTP dataset is passed as the parameter.

4.4. TransferData Command

TransferData command 224 (CommandCode 2) appends, updates, or deletes a dataset row based on the current values of another dataset row's elements. Instruction Set 4 of the example instruction sets below illustrates an example of how the functionality of TransferData command 224 may be implemented in JavaScript. TransferData command 224 may be conditionally invoked by CallMethod command 223 and within the instruction set of TransferData command 224. TransferData command 224 may include the parameter shown in Table 24:

TABLE 24

| Parameter | Description |
| --- | --- |
| TransferID | An identifier representing the row in the Transfers dataset to process. The value must match a TransferID element value within the Transfers dataset. |
| ParentFromDSI | The DSI of the FromDataset of the parent Transfer that invoked the TransferData command. If the TransferCommand was not invoked within another TransferCommand, this parameter is set to −1. |
| ParentFromNDSI | The NDSI of the FromDataset of the parent Transfer that invoked the TransferData command. If the TransferCommand was not invoked within another TransferCommand, this parameter is set to −1. |
| ParentFromRI | The RI of the FromDataset currently being processed by a parent Transfer when the TransferData command was invoked. If the TransferCommand was not invoked within another TransferCommand, this parameter is set to −1. |

TABLE 24-continued

| Parameter | Description |
| --- | --- |
| ParentToDSI | The DSI of the ToDataset of the parent Transfer that invoked the TransferData command. If the TransferCommand was not invoked within another TransferCommand, this parameter is set to −1. |
| ParentToNDSI | The NDSI of the ToDataset of the parent Transfer that invoked the TransferData command. If the TransferCommand was not invoked within another TransferCommand, this parameter is set to −1. |
| ParentToRI | The RI of the ToDataset currently being processed by a parent Transfer when the TransferData command was invoked. If the TransferCommand was not invoked within another TransferCommand, this parameter is set to −1. |

TransferData command 224 executes the row in the Transfers dataset that is associated with the TransferID parameter. The FromDataset variable is set to the Dataset identified from the FromDSI and FromNDSI elements values within the Transfers dataset. If the FromDSI value is −1, then the FromDataset is set to the SPTPRequest dataset. The ToDataset variable is set to the dataset identified from the ToDSI and ToNDSI elements values within the Transfers dataset. If to ToDSI value is −1, then the ToDataset is identified as the SPTPRequest dataset.

If the FromDataset is a single row, then the FromRI variable is set to 0. Otherwise, the FromRI variable is set to the row index within the FromDataset whose element values meet the criteria defined within the TransferConditions dataset rows that are associated with the TransferID parameter. For each matching row in the TransferConditions dataset, an instruction set represented by the following pseudocode may be performed:

The FromCI variable is set to the FromCI element value of the TransferConditions row. The FromElement variable is set to the value of the element at column index FromCI within the current FromDataset row. Based on the OperatorCode element value of the TransferConditions row, one of the following instruction sets is executed:
(1) If OperatorCode is 1 (a defined value representing "="), the FromElement variable must match the Value element value of the TransferConditions' row.

Based on the value of TransferType element of the Transfer dataset, one of the following instruction sets is executed:
(1) If TransferType is 1 (a defined value representing "Append"), a new row is appended to the ToDataset, and element values are set from the DefaultValue element value of each matching row in the DatasetColumns dataset, associated by ToDSI and ToNDSI values. The ToRI variable is set to the new row index.
(2) If TransferType is 2 (a defined value representing "Update"), the ToRI variable is set to 0.
(3) If TransferType is 3 (a defined value representing "Delete"), the FromRI row is deleted from the FromDataset, and the ToDSI, ToNDSI, and ToDataset variables are set to the FromDSI, FromNDSI, and modified FromDataset variables, respectively.
(4) If TransferType is 4 (a defined value representing "Copy"), the ToDataset variable is set to the FromDataset variable.
(5) If TransferType is 5 (a defined value representing "Nest"), the element value in column ToCI of the single-row ToDataset is set to the FromDataset variable.

If TransferType is 1 or 2 (defined values representing "Append" and "Update," respectively), then, for each row in the TransferColumns dataset that is associated with the TransferID parameter, an instruction set represented by the following pseudocode may be performed:
(1) The ToCI variable is set to the TransferColumns row's ToCI element value. The value of the element at index location [ToRI] [ToCI] within the ToDataset ("ToElement") is set based on the row's SourceCode element value as follows:
(a) If SourceCode is 1 (a defined value representing "Column"), the FromCI variable is set to the row's SourceValue element value. The ToElement value is set to the value of the element at index location [FromRI][FromCI] within the FromDataset ("FromElement").
(b) If SourceCode is 2 (a defined value representing "Constant"), the ToElement value is set to the row's SourceValue element value.
(c) If SourceCode is 3 (a defined value representing "Formula"), the ToElement value is set to the value (FromValue variable) resulting from execution of the following instructions for each row in TransferFormulas where the ColumnID element value matches the TransferColumns row's SourceValue element value:
(i) Based on the TransferFormulas' SourceCode element value, one of the following instruction sets is executed:
(aa) If SourceCode is 1 (a defined value representing "Column"), the FromCI variable is set to TransferFormulas' SourceValue element value. The SourceValue variable is set to the value of the element at index location [FromRI][FromCI] within the FromDataset.
(bb) If SourceCode is 2 (a defined value representing "Constant"), the SourceValue variable is set to TransferFormulas' Value element value.
(ii) Based on the value of the TransferFormulas' OperatorCode element, one of the following instructions set is executed:
(aa) If OperatorCode is 1 (a defined value representing "Append"), the SourceValue is appended to the current FromValue.
(bb) If OperatorCode is 2 (a defined value representing "Trim"), the number of characters in the SourceValue is removed from the end of the FromValue.
(cc) If OperatorCode is 3 (a defined value representing "+"), the FromValue is set to the sum of the current FromValue and the SourceValue.

TransferData command 224 may invoke itself for each row in the Transfers dataset in which its ParentID element value matches the TransferID parameter. The matching row's TransferID element value is passed as the TransferID parameter.

4.5. ClearData Command

ClearData command 225 (CommandCode 3) clears the data in a nested dataset contained within the Application dataset. Instruction Set 5 of the example instructions sets below illustrates an example of how the functionality of ClearData command 225 may be implemented in JavaScript. ClearData command 225 may be invoked by CallMethod command 223. ClearData command 225 may include the parameter shown in Table 25:

TABLE 25

| Parameter | Description |
|---|---|
| NDSI | The Application dataset column index for the nested dataset to be cleared. |

4.6. Send/Receive Command

Send/Receive command 226 (CommandCode 4) may invoke resource handler 215 of agent 210 to (1) execute a statement using resource 280, or (2) forward a SPTPRequest to remote agent 310 for processing. Instruction Set 6 of the example instruction sets below illustrates an example of how the functionality of Send/Receive command 226 may be implemented in JavaScript. Send/Receive command 226 may conditionally update the Process dataset from the SPTPResponse. Send/Receive command 226 may be conditionally invoked by ProcessRequest command 221 and CallMethod command 223.

In an embodiment, based on the value of the RemoteConnectType element of the SPTPRequest dataset, one of the following instructions sets is executed:

(1) If RemoteConnectType is 0 (a defined value representing "none"), then Send/Receive command 226 invokes resource handler 215 to execute a statement using resource 280. To do this, Send/Receive command 226 sets the parameters of resource handler 215 as follows: ConnectType=SPTPRequest dataset element ResourceConnectType, ConnectString=SPTPRequest dataset element ResourceConnection, and SendString=SPTPRequest dataset element Statement.

(2) If RemoteConnectType is 1 (a defined value representing "SPTP"), then Send/Receive command 226 invokes resource handler 215 to send the SPTPRequest to remote agent 310. To do this, Send/Receive command 226 sets the parameters of resource handler 215 as follows: ConnectType=SPTPRequest dataset element RemoteConnectType, ConnectString=SPTPRequest dataset element RemoteConnection, and SendString=SPTPRequest.

(3) If RemoteConnectType is greater than 1, then Send/Receive command 226 invokes resource handler 215 to send a statement to remote resource 380. To do this, Send/Receive command 226 sets the parameters of resource handler 215 as follows: ConnectType=SPTPRequest dataset element RemoteConnectType, ConnectString=SPTPRequest dataset element RemoteConnection, and SendString=SPTPRequest dataset element Statement.

Resource handler 215 creates a SPTPResponse dataset within metadata-driven command processor 220 based on the response from resource 280, remote agent 310, or remote resource 380. Send/Receive command 226 updates the Process dataset by setting the Message element of the Process dataset to the Message element of the SPTPRequest dataset.

If the MessageType element within the Message nested dataset is 1 (a defined value representing "Error"), then Send/Receive command 226 invokes ProcessEvent command 222, passing the value 3 as the EventType parameter (a defined value representing "Message") and terminates its processing. Otherwise, Send/Receive command 226 updates the Process dataset by setting the Data element of the Process dataset to the Data element of the SPTPRequest dataset.

In an embodiment, based on the value of the RequestType element of the SPTPRequest dataset, one of the following instructions is executed:

(1) If RequestType is 1 (a defined value representing "Send Program"), then Send/Receive command 226 also updates the Process dataset as follows: Process dataset element Program=SPTPRequest dataset element Program, and Process dataset element Application=SPTPRequest dataset element Application.

(2) If RequestType is 2 (a defined value representing "Send Application"), then Send/Receive command 226 also updates the Process dataset as follows: Process dataset element Application=SPTPRequest dataset element Application.

If the MessageType element within the Message nested dataset is greater than 1, then Send/Receive command 226 invokes ProcessEvent command 222, passing the value 3 as the EventType parameter (a defined value representing "Message").

5. Example Embodiment of an Agent

As discussed above, agent 210 may comprise receive/send monitor 211, booter 212, machine event handler 213, user event handler 214, and resource handler 215. In an embodiment, receive/send monitor 211 monitors incoming requests from remote agents (e.g., remote agent 310). When a SPTPRequest is received, receive/send monitor 211 invokes a resource manager component of agent 210 or the ProcessRequest command 221 of metadata-driven command processor 220, based on the RequestType element. Receive/send monitor 211 creates a SPTPResponse based on the process results from resource handler 215 or metadata-driven command processor 220, and returns the result to the requesting remote agent.

In an embodiment, booter 212 creates a booting SPTPRequest within metadata-driven command processor 220, and invokes ProcessRequest command 221 of metadata-driven command processor 220 to load the booting program and application.

In an embodiment, machine event handler 213 invokes ProcessEvent command 222 of metadata-driven command processor 220 when a machine event is to be processed by metadata-driven command processor 220. For instance, when a machine display size change event occurs, machine event handler 213 updates Width and Height elements within the SPTPRequest dataset of metadata-driven command processor 220 based on the new machine display size, and sets the EventType parameter of ProcessEvent command 222 to the value 2 (a defined value for "Screen Size Change").

In an embodiment, user event handler 214 invokes CallMethod command 223 of metadata-driven command processor 220 when a user event occurs that is associated with a dynamic display rendering generated from a statement. Examples of user events include, without limitation, an OnClick event, OnLostFocus event, OnChange event, etc.

In an embodiment, resource handler 215 is invoked by Send/Receive command 226 of metadata-driven command processor 220 to (1) execute a statement using resource 280, or (2) forward a SPTPRequest to remote agent 310. Resource handler 215 converts a response from resource 280 or remote agent 310 into a SPTPResponse that is processed by metadata-driven command processor 220. The Message-Code, MessageType, Description, and SourceCode elements in the Message nested dataset are set based on a system message (e.g., error or alert) in the response.

6. Example Utility

An implementation of a sample utility which utilizes an embodiment of the disclosed metadata-driven command processor and structured program transfer protocol will now be described. The utility is a metadata-driven database application whose booting program and application enable an end user of an end-user device (e.g., a type of a machine 200) to add, update, delete, view, and navigate the same program and application metadata stored in a SQL relational database on a remote machine by rendering dynamic HTML content on the end-user device based on user-invoked events.

An agent contains an instruction set in a programming language or machine language that is compatible with a resource on an end-user device or other machine. A sample agent instruction set is illustrated in Instruction Set 7 of the example instruction sets below. In this example, the agent and MCP instruction sets are in the form of JavaScript. The MCP instruction set exists in a JS file (in this example, "x10Data_MCP.js") that is referenced within the agent instruction set. The agent instruction set includes booter and resource handler components.

The booter creates a SPTPRequest, within the metadata-driven command processor, that contains the dataset element values illustrated in Table 26A:

TABLE 26A

SPTPRequest dataset element values

| RI | CI | Dataset Element | Value |
|---|---|---|---|
| 0 | 0 | RequestType | 0 |
| 0 | 1 | RemoteConnectType | 1 |
| 0 | 2 | RemoteConnection | appCase.mobi |
| 0 | 3 | ResourceConnectType | 0 |
| 0 | 4 | ResourceConnection | |
| 0 | 5 | StatementType | 0 |
| 0 | 6 | Statement | |
| 0 | 7 | DomainType | 1 |
| 0 | 8 | DomainIdentifier | X10DATA.COM |
| 0 | 9 | ObjectID | 0 |
| 0 | 10 | RecordID | |
| 0 | 11 | RecordIDs | |
| 0 | 12 | Value | |
| 0 | 13 | ScreenWidth | 480 |
| 0 | 14 | ScreenHeight | 800 |

It should be understood that these values may alternatively be illustrated in a row-column format, as shown in Table 26B:

TABLE 26B

SPTPRequest dataset element values

| RI/CI | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | 0 | 1 | appCase.mobi | 0 | | 0 | | 1 | X10DATA.COM | 0 | | | | 480 | 800 |

The booter invokes the ProcessRequest command of the metadata-driven command processor. The ProcessRequest command updates the dataset element values in the SPTPRequest shown in Table 26C:

TABLE 26C

Updated SPTPRequest dataset element values

| RI | CI | Dataset Element | Value |
|---|---|---|---|
| 0 | 0 | RequestType | 1 |

The booter invokes the Send/Receive command. Then the Send/Receive command invokes the agent's resource handler component. The resource handler forwards the SPTPRequest to the remote agent identified as SOAP-based web service "appCase.mobi". The remote agent creates a SPTPResponse that includes the booting program and application retrieved from a remote resource in the form of a SQL relational database. In this example, the SPTPResponse has the nested Program dataset element values shown in Tables 27A-35B:

TABLE 27A

Methods (e.g., Process[0][1][0][0]) dataset columns

| CI | Dataset Element |
|---|---|
| 0 | MethodID |
| 1 | Name |
| 2 | EventType |

TABLE 27B

Methods (e.g., Process[0][1][0][0]) dataset element values

| RI/CI | 0 | 1 | 2 |
|---|---|---|---|
| 0 | 1 | Initialize | 1 |
| 1 | 2 | DisplayHome | 0 |
| 2 | 3 | DisplayList | 0 |
| 3 | 4 | DisplayDetail | 0 |
| 4 | 5 | ProcessEvent | 0 |
| 5 | 6 | SelectRecord | 0 |
| 6 | 7 | BuildRendering | 0 |
| 7 | 8 | BuildAppBar | 0 |
| 8 | 9 | BuildMenuBar | 0 |
| 9 | 10 | BuildWindowBar | 0 |
| 10 | 11 | BuildList | 0 |
| 11 | 12 | BuildDetail | 0 |
| 12 | 13 | BuildCommandBar | 0 |
| 13 | 14 | BuildHTMLStatement | 0 |
| 14 | 15 | ValidateInput | 0 |
| 15 | 16 | BuildSQLStatement-Select | 0 |
| 16 | 17 | CloseWindow | 0 |
| 17 | 18 | SaveRecord | 0 |
| 18 | 19 | DeleteRecord | 0 |
| 19 | 20 | CloseClient | 0 |
| 20 | 21 | EditValue | 0 |
| 21 | 22 | ChangeRenderingSize | 2 |

TABLE 27B-continued

Methods (e.g., Process[0][1][0][0]) dataset element values

| RI/CI | 0 | 1 | 2 |
|---|---|---|---|
| 22 | 23 | AddWindow | 0 |
| 23 | 24 | UpdateWindow | 0 |
| 24 | 45 | DisplayMessage | 3 |
| 25 | 46 | DisplayContent | 0 |
| 26 | 47 | RetrieveData | 0 |
| 27 | 48 | BuildSQLStatement-Insert | 0 |
| 28 | 49 | BuildSQLStatement-Update | 0 |
| 29 | 50 | BuildSQLStatement-Delete | 0 |
| 30 | 51 | SelectListValue | 0 |
| 31 | 52 | SelectWindow | 0 |
| 32 | 53 | SelectView | 0 |
| 33 | 54 | SelectEntityValue | 0 |
| 34 | 55 | BuildSQL Statement for Select Parent | 0 |
| 35 | 56 | SetActiveAttribute | 0 |
| 36 | 57 | BuildRelatedViews | 0 |
| 37 | 58 | SelectRelatedView | 0 |
| 38 | 59 | RefreshData | 0 |
| 39 | 60 | SelectHomeWindow | 0 |
| 40 | 61 | SelectFilter | 0 |
| 41 | 62 | SetNewDefaultValues | 0 |
| 42 | 63 | SetExistingRecordValues | 0 |

TABLE 28A

MethodSteps (e.g., Process[0][1][0][1]) dataset columns

| CI | Dataset Element |
|---|---|
| 0 | MethodID |
| 1 | CommandCode |
| 2 | CommandObjectID |
| 3 | ElseCondition |
| 4 | ConditionDSI |
| 5 | ConditionNDSI |
| 6 | ConditionCI |
| 7 | ConditionOperatorCode |
| 8 | ConditionValue |

TABLE 28B

MethodSteps (e.g., Process[0][1][0][1]) dataset element values

| RI/CI | 0 | 1 | 2 | 3 | 4 | 5 | 6 | 7 | 8 |
|---|---|---|---|---|---|---|---|---|---|
| 0 | 1 | 2 | 6 | 0 | 0 | 0 | 0 | 0 | |
| 1 | 1 | 1 | 46 | 0 | 0 | 0 | 0 | 0 | |
| 2 | 2 | 2 | 11 | 0 | 0 | 0 | 0 | 0 | |
| 3 | 2 | 1 | 23 | 0 | 2 | 10 | 2 | 1 | 1 |
| 4 | 3 | 2 | 213 | 0 | 2 | 10 | 2 | 1 | 1 |
| 5 | 3 | 2 | 243 | 0 | 2 | 10 | 1 | 3 | '13', '14' |
| 6 | 3 | 2 | 121 | 0 | 2 | 10 | 2 | 1 | 1 |
| 7 | 3 | 2 | 8 | 0 | 2 | 10 | 2 | 2 | 1 |
| 8 | 3 | 2 | 9 | 0 | 2 | 10 | 2 | 1 | 1 |
| 9 | 3 | 2 | 260 | 0 | 2 | 10 | 2 | 1 | 1 |
| 10 | 3 | 2 | 10 | 0 | 2 | 10 | 1 | 1 | 2 |
| 11 | 3 | 2 | 33 | 0 | 2 | 10 | 1 | 1 | 1 |
| 12 | 3 | 2 | 34 | 0 | 2 | 10 | 1 | 1 | 14 |
| 13 | 3 | 2 | 35 | 0 | 2 | 10 | 1 | 1 | 15 |
| 14 | 3 | 2 | 262 | 0 | 2 | 10 | 1 | 1 | 16 |
| 15 | 3 | 2 | 261 | 0 | 2 | 10 | 1 | 1 | 16 |
| 16 | 3 | 1 | 57 | 0 | 2 | 10 | 1 | 1 | 4 |
| 17 | 3 | 1 | 47 | 0 | 2 | 10 | 1 | 3 | '3', '13' |
| 18 | 3 | 2 | 146 | 0 | 2 | 10 | 1 | 1 | 12 |
| 19 | 3 | 2 | 11 | 0 | 0 | 0 | 0 | 0 | |
| 20 | 3 | 1 | 23 | 0 | 2 | 10 | 2 | 1 | 1 |
| 21 | 4 | 2 | 240 | 0 | 0 | 0 | 0 | 0 | 7 |
| 22 | 4 | 2 | 212 | 0 | 2 | 10 | 3 | 1 | 0 |
| 23 | 4 | 2 | 125 | 0 | 0 | 0 | 0 | 0 | |
| 24 | 4 | 2 | 127 | 0 | 0 | 0 | 0 | 0 | |
| 25 | 4 | 2 | 122 | 0 | 0 | 0 | 0 | 0 | |
| 26 | 4 | 1 | 63 | 0 | 2 | 10 | 1 | 3 | '5', '6' |
| 27 | 4 | 1 | 62 | 0 | 2 | 10 | 1 | 1 | 7 |
| 28 | 4 | 2 | 11 | 0 | 0 | 0 | 0 | 0 | |
| 29 | 4 | 1 | 23 | 0 | 2 | 10 | 2 | 1 | 1 |
| 30 | 5 | 2 | 7 | 0 | 0 | 0 | 0 | 0 | |
| 31 | 5 | 1 | 46 | 0 | 0 | 0 | 0 | 0 | |
| 32 | 6 | 2 | 38 | 0 | 2 | 10 | 1 | 1 | 2 |
| 33 | 6 | 2 | 39 | 1 | 2 | 10 | 1 | 1 | 1 |
| 34 | 6 | 1 | 53 | 1 | 2 | 10 | 1 | 1 | 15 |
| 35 | 6 | 1 | 58 | 1 | 2 | 10 | 1 | 1 | 4 |
| 36 | 6 | 2 | 80 | 1 | 2 | 10 | 1 | 1 | 3 |
| 37 | 6 | 1 | 51 | 0 | 2 | 10 | 1 | 1 | 14 |
| 38 | 6 | 1 | 54 | 1 | 2 | 10 | 1 | 1 | 13 |
| 39 | 6 | 1 | 52 | 1 | 2 | 10 | 1 | 1 | 12 |
| 40 | 6 | 1 | 61 | 1 | 2 | 10 | 1 | 1 | 16 |
| 41 | 6 | 1 | 46 | 1 | 0 | 0 | 0 | 0 | |
| 42 | 7 | 3 | 17 | 0 | 0 | 0 | 0 | 0 | |
| 43 | 7 | 3 | 18 | 0 | 0 | 0 | 0 | 0 | |
| 44 | 7 | 3 | 19 | 0 | 0 | 0 | 0 | 0 | |
| 45 | 7 | 1 | 8 | 0 | 0 | 0 | 0 | 0 | |
| 46 | 7 | 1 | 9 | 0 | 0 | 0 | 0 | 0 | |
| 47 | 7 | 1 | 10 | 0 | 2 | 10 | 2 | 2 | 3 |
| 48 | 7 | 1 | 11 | 0 | 2 | 10 | 0 | 1 | 3 |
| 49 | 7 | 1 | 12 | 0 | 2 | 10 | 0 | 1 | 4 |
| 50 | 7 | 1 | 13 | 0 | 0 | 0 | 0 | 0 | |
| 51 | 7 | 1 | 14 | 0 | 0 | 0 | 0 | 0 | |
| 52 | 8 | 2 | 20 | 0 | 0 | 0 | 0 | 0 | |
| 53 | 9 | 2 | 24 | 0 | 0 | 0 | 0 | 0 | |
| 54 | 10 | 2 | 26 | 0 | 0 | 0 | 0 | 0 | |
| 55 | 11 | 2 | 28 | 0 | 2 | 10 | 2 | 2 | 1 |
| 56 | 11 | 2 | 256 | 0 | 2 | 10 | 2 | 1 | 1 |
| 57 | 11 | 2 | 255 | 0 | 2 | 10 | 2 | 1 | 1 |
| 58 | 11 | 2 | 248 | 0 | 2 | 10 | 2 | 1 | 1 |
| 59 | 12 | 2 | 51 | 0 | 0 | 0 | 0 | 0 | |
| 60 | 13 | 2 | 30 | 0 | 0 | 0 | 0 | 0 | |
| 61 | 14 | 2 | 60 | 0 | 0 | 0 | 0 | 0 | |
| 62 | 14 | 2 | 61 | 0 | 0 | 0 | 0 | 0 | |
| 63 | 14 | 2 | 69 | 0 | 0 | 0 | 0 | 0 | |
| 64 | 14 | 2 | 53 | 0 | 0 | 0 | 0 | 0 | |
| 65 | 14 | 4 | 0 | 0 | 0 | 0 | 0 | 0 | |
| 66 | 15 | 2 | 223 | 0 | 0 | 0 | 0 | 0 | |
| 67 | 15 | 2 | 163 | 0 | 0 | 0 | 0 | 0 | |
| 68 | 16 | 3 | 20 | 0 | 0 | 0 | 0 | 0 | |
| 69 | 16 | 2 | 81 | 0 | 0 | 0 | 0 | 0 | |
| 70 | 16 | 2 | 152 | 0 | 2 | 10 | 0 | 1 | 4 |
| 71 | 16 | 2 | 54 | 0 | 2 | 10 | 0 | 1 | 3 |
| 72 | 16 | 2 | 76 | 0 | 0 | 0 | 0 | 0 | |
| 73 | 16 | 2 | 55 | 0 | 0 | 0 | 0 | 0 | |
| 74 | 16 | 2 | 77 | 0 | 0 | 0 | 0 | 0 | |
| 75 | 16 | 2 | 78 | 0 | 0 | 0 | 0 | 0 | |
| 76 | 16 | 2 | 129 | 0 | 0 | 0 | 0 | 0 | |
| 77 | 16 | 2 | 57 | 0 | 0 | 0 | 0 | 0 | |
| 78 | 16 | 2 | 58 | 0 | 0 | 0 | 0 | 0 | |
| 79 | 16 | 2 | 70 | 0 | 0 | 0 | 0 | 0 | |
| 80 | 16 | 2 | 59 | 0 | 0 | 0 | 0 | 0 | |
| 81 | 16 | 4 | 0 | 0 | 0 | 0 | 0 | 0 | |
| 82 | 17 | 2 | 31 | 0 | 2 | 10 | 2 | 1 | 1 |
| 83 | 17 | 2 | 145 | 0 | 2 | 10 | 2 | 1 | 1 |
| 84 | 17 | 2 | 140 | 0 | 0 | 0 | 0 | 0 | |
| 85 | 17 | 2 | 141 | 0 | 0 | 0 | 0 | 0 | |
| 86 | 17 | 2 | 142 | 0 | 0 | 0 | 0 | 0 | |
| 87 | 17 | 2 | 143 | 0 | 0 | 0 | 0 | 0 | |
| 88 | 17 | 2 | 144 | 0 | 0 | 0 | 0 | 0 | |
| 89 | 17 | 2 | 246 | 0 | 0 | 0 | 0 | 0 | |
| 90 | 17 | 2 | 247 | 0 | 0 | 0 | 0 | 0 | |
| 91 | 18 | 1 | 49 | 0 | 2 | 10 | 1 | 1 | 5 |
| 92 | 18 | 1 | 48 | 0 | 2 | 10 | 1 | 1 | 7 |
| 93 | 18 | 1 | 17 | 0 | 0 | 0 | 0 | 0 | |
| 94 | 18 | 1 | 59 | 0 | 2 | 10 | 1 | 3 | '3', '13' |
| 95 | 19 | 1 | 50 | 0 | 0 | 0 | 0 | 0 | |
| 96 | 19 | 1 | 17 | 0 | 0 | 0 | 0 | 0 | |
| 97 | 19 | 1 | 59 | 0 | 2 | 10 | 1 | 3 | '3', '13' |
| 98 | 23 | 2 | 12 | 0 | 0 | 0 | 0 | 0 | |
| 99 | 23 | 2 | 14 | 0 | 0 | 0 | 0 | 0 | |
| 100 | 46 | 3 | 11 | 0 | 2 | 10 | 0 | 2 | 18 |
| 101 | 46 | 3 | 12 | 0 | 0 | 0 | 0 | 0 | |
| 102 | 46 | 3 | 13 | 0 | 0 | 0 | 0 | 0 | |

TABLE 28B-continued

MethodSteps (e.g., Process[0][1][0][1]) dataset element values

| RI/CI | 0 | 1 | 2 | 3 | 4 | 5 | 6 | 7 | 8 |
|---|---|---|---|---|---|---|---|---|---|
| 103 | 46 | 3 | 14 | 0 | 0 | 0 | 0 | 0 | |
| 104 | 46 | 3 | 15 | 0 | 0 | 0 | 0 | 0 | |
| 105 | 46 | 3 | 16 | 0 | 0 | 0 | 0 | 0 | |
| 106 | 46 | 2 | 68 | 0 | 0 | 0 | 0 | 0 | |
| 107 | 46 | 1 | 0 | 0 | 0 | 0 | 0 | 0 | |
| 108 | 46 | 1 | 7 | 0 | 0 | 0 | 0 | 0 | |
| 109 | 47 | 2 | 89 | 0 | 0 | 0 | 0 | 0 | |
| 110 | 47 | 2 | 8 | 0 | 0 | 0 | 0 | 0 | |
| 111 | 47 | 2 | 257 | 0 | 2 | 10 | 0 | 1 | 3 |
| 112 | 47 | 2 | 233 | 0 | 2 | 10 | 8 | 2 | 0 |
| 113 | 47 | 2 | 207 | 0 | 2 | 10 | 0 | 1 | 3 |
| 114 | 47 | 2 | 208 | 0 | 2 | 10 | 0 | 1 | 3 |
| 115 | 47 | 2 | 201 | 0 | 2 | 10 | 0 | 1 | 4 |
| 116 | 47 | 2 | 202 | 0 | 2 | 10 | 0 | 1 | 4 |
| 117 | 47 | 1 | 16 | 0 | 0 | 0 | 0 | 0 | |
| 118 | 47 | 2 | 37 | 0 | 0 | 0 | 0 | 0 | |
| 119 | 48 | 3 | 20 | 0 | 0 | 0 | 0 | 0 | |
| 120 | 48 | 2 | 134 | 0 | 0 | 0 | 0 | 0 | |
| 121 | 48 | 2 | 138 | 0 | 0 | 0 | 0 | 0 | |
| 122 | 48 | 2 | 139 | 0 | 0 | 0 | 0 | 0 | |
| 123 | 48 | 2 | 70 | 0 | 0 | 0 | 0 | 0 | |
| 124 | 48 | 2 | 59 | 0 | 0 | 0 | 0 | 0 | |
| 125 | 48 | 4 | 0 | 0 | 0 | 0 | 0 | 0 | |
| 126 | 49 | 3 | 20 | 0 | 0 | 0 | 0 | 0 | |
| 127 | 49 | 2 | 132 | 0 | 0 | 0 | 0 | 0 | |
| 128 | 49 | 2 | 135 | 0 | 0 | 0 | 0 | 0 | |
| 129 | 49 | 2 | 76 | 0 | 0 | 0 | 0 | 0 | |
| 130 | 49 | 2 | 55 | 0 | 0 | 0 | 0 | 0 | |
| 131 | 49 | 2 | 77 | 0 | 0 | 0 | 0 | 0 | |
| 132 | 49 | 2 | 78 | 0 | 0 | 0 | 0 | 0 | |
| 133 | 49 | 2 | 129 | 0 | 0 | 0 | 0 | 0 | |
| 134 | 49 | 2 | 57 | 0 | 0 | 0 | 0 | 0 | |
| 135 | 49 | 2 | 70 | 0 | 0 | 0 | 0 | 0 | |
| 136 | 49 | 2 | 59 | 0 | 0 | 0 | 0 | 0 | |
| 137 | 49 | 4 | 0 | 0 | 0 | 0 | 0 | 0 | |
| 138 | 50 | 3 | 20 | 0 | 0 | 0 | 0 | 0 | |
| 139 | 50 | 2 | 133 | 0 | 0 | 0 | 0 | 0 | |
| 140 | 50 | 2 | 76 | 0 | 0 | 0 | 0 | 0 | |
| 141 | 50 | 2 | 55 | 0 | 0 | 0 | 0 | 0 | |
| 142 | 50 | 2 | 77 | 0 | 0 | 0 | 0 | 0 | |
| 143 | 50 | 2 | 78 | 0 | 0 | 0 | 0 | 0 | |
| 144 | 50 | 2 | 129 | 0 | 0 | 0 | 0 | 0 | |
| 145 | 50 | 2 | 57 | 0 | 0 | 0 | 0 | 0 | |
| 146 | 50 | 2 | 70 | 0 | 0 | 0 | 0 | 0 | |
| 147 | 50 | 2 | 59 | 0 | 0 | 0 | 0 | 0 | |
| 148 | 50 | 4 | 0 | 0 | 0 | 0 | 0 | 0 | |
| 149 | 51 | 2 | 149 | 0 | 0 | 0 | 0 | 0 | |
| 150 | 51 | 1 | 17 | 0 | 0 | 0 | 0 | 0 | |
| 151 | 51 | 2 | 150 | 0 | 0 | 0 | 0 | 0 | |
| 152 | 51 | 2 | 163 | 0 | 0 | 0 | 0 | 0 | |
| 153 | 51 | 1 | 7 | 0 | 0 | 0 | 0 | 0 | |
| 154 | 52 | 2 | 151 | 0 | 0 | 0 | 0 | 0 | |
| 155 | 52 | 1 | 17 | 0 | 0 | 0 | 0 | 0 | |
| 156 | 52 | 1 | 7 | 0 | 0 | 0 | 0 | 0 | |
| 157 | 53 | 2 | 144 | 0 | 0 | 0 | 0 | 0 | |
| 158 | 53 | 2 | 42 | 0 | 0 | 0 | 0 | 0 | |
| 159 | 53 | 2 | 31 | 0 | 0 | 0 | 0 | 0 | |
| 160 | 53 | 2 | 145 | 0 | 0 | 0 | 0 | 0 | |
| 161 | 54 | 2 | 216 | 0 | 0 | 0 | 0 | 0 | |
| 162 | 54 | 1 | 55 | 0 | 0 | 0 | 0 | 0 | |
| 163 | 54 | 2 | 37 | 0 | 0 | 0 | 0 | 0 | |
| 164 | 54 | 2 | 217 | 0 | 0 | 0 | 0 | 0 | |
| 165 | 54 | 1 | 17 | 0 | 0 | 0 | 0 | 0 | |
| 166 | 54 | 2 | 150 | 0 | 0 | 0 | 0 | 0 | |
| 167 | 54 | 2 | 163 | 0 | 0 | 0 | 0 | 0 | |
| 168 | 54 | 1 | 7 | 0 | 0 | 0 | 0 | 0 | |
| 169 | 55 | 3 | 20 | 0 | 0 | 0 | 0 | 0 | |
| 170 | 55 | 2 | 215 | 0 | 0 | 0 | 0 | 0 | |
| 171 | 55 | 2 | 70 | 0 | 0 | 0 | 0 | 0 | |
| 172 | 55 | 2 | 59 | 0 | 0 | 0 | 0 | 0 | |
| 173 | 55 | 4 | 0 | 0 | 0 | 0 | 0 | 0 | |
| 174 | 56 | 2 | 218 | 0 | 0 | 0 | 0 | 0 | |
| 175 | 56 | 2 | 163 | 0 | 0 | 0 | 0 | 0 | |
| 176 | 57 | 3 | 21 | 0 | 0 | 0 | 0 | 0 | |
| 177 | 57 | 2 | 227 | 0 | 0 | 0 | 0 | 0 | |
| 178 | 57 | 2 | 228 | 0 | 0 | 0 | 0 | 0 | |
| 179 | 57 | 2 | 226 | 0 | 0 | 0 | 0 | 0 | |
| 180 | 58 | 2 | 144 | 0 | 0 | 0 | 0 | 0 | |
| 181 | 58 | 2 | 234 | 0 | 0 | 0 | 0 | 0 | |
| 182 | 58 | 2 | 224 | 0 | 0 | 0 | 0 | 0 | |
| 183 | 58 | 2 | 225 | 0 | 2 | 10 | 0 | 1 | 4 |
| 184 | 58 | 1 | 53 | 0 | 2 | 10 | 0 | 1 | 4 |
| 185 | 59 | 1 | 16 | 0 | 0 | 0 | 0 | 0 | |
| 186 | 59 | 2 | 37 | 0 | 0 | 0 | 0 | 0 | |
| 187 | 59 | 2 | 163 | 0 | 0 | 0 | 0 | 0 | |
| 188 | 60 | 2 | 258 | 0 | 0 | 0 | 0 | 0 | |
| 189 | 60 | 1 | 17 | 0 | 0 | 0 | 0 | 0 | |
| 190 | 60 | 1 | 7 | 0 | 0 | 0 | 0 | 0 | |
| 191 | 61 | 1 | 17 | 0 | 0 | 0 | 0 | 0 | |
| 192 | 61 | 2 | 263 | 0 | 0 | 0 | 0 | 0 | |
| 193 | 61 | 1 | 59 | 0 | 0 | 0 | 0 | 0 | |
| 194 | 61 | 1 | 7 | 0 | 0 | 0 | 0 | 0 | |
| 195 | 62 | 2 | 8 | 0 | 0 | 0 | 0 | 0 | |
| 196 | 62 | 2 | 142 | 0 | 0 | 0 | 0 | 0 | |
| 197 | 62 | 2 | 265 | 0 | 0 | 0 | 0 | 0 | |
| 198 | 62 | 2 | 259 | 0 | 0 | 0 | 0 | 0 | |
| 199 | 63 | 1 | 47 | 0 | 0 | 0 | 0 | 0 | |
| 200 | 63 | 2 | 126 | 0 | 0 | 0 | 0 | 0 | |
| 201 | 63 | 2 | 157 | 0 | 0 | 0 | 0 | 0 | |
| 202 | 63 | 2 | 219 | 0 | 0 | 0 | 0 | 0 | |
| 203 | 63 | 2 | 238 | 0 | 0 | 0 | 0 | 0 | |
| 204 | 63 | 2 | 239 | 0 | 0 | 0 | 0 | 0 | |

TABLE 29A

Transfers (e.g., Process[0][1][0][2]) dataset columns

| CI | Dataset Element |
|---|---|
| 0 | TransferID |
| 1 | TypeCode |
| 2 | FromDSI |
| 3 | FromNDSI |
| 4 | ToDSI |
| 5 | ToNDSI |
| 6 | ToCI |
| 7 | ParentID |

TABLE 29B

Transfers (e.g., Process[0][1][0][2]) dataset element values

| RI/CI | 0 | 1 | 2 | 3 | 4 | 5 | 6 | 7 |
|---|---|---|---|---|---|---|---|---|
| 0 | 6 | 1 | −1 | −1 | 2 | 10 | 0 | 0 |
| 1 | 7 | 2 | 2 | 19 | 2 | 10 | 0 | 0 |
| 2 | 8 | 1 | 2 | 5 | 2 | 11 | 0 | 0 |
| 3 | 9 | 1 | 2 | 6 | 2 | 12 | 0 | 0 |
| 4 | 10 | 1 | 2 | 1 | 2 | 15 | 0 | 0 |
| 5 | 11 | 1 | 1 | 8 | 2 | 16 | 0 | 0 |
| 6 | 12 | 1 | 2 | 0 | 2 | 9 | 0 | 0 |
| 7 | 13 | 2 | 2 | 0 | 2 | 10 | 0 | 0 |
| 8 | 14 | 2 | 2 | 0 | 2 | 0 | 0 | 0 |
| 9 | 20 | 1 | 2 | 10 | 2 | 17 | 0 | 0 |
| 10 | 24 | 1 | 2 | 10 | 2 | 17 | 0 | 0 |
| 11 | 26 | 1 | 2 | 10 | 2 | 17 | 0 | 0 |
| 12 | 28 | 1 | 2 | 10 | 2 | 17 | 0 | 0 |
| 13 | 30 | 1 | 2 | 10 | 2 | 17 | 0 | 0 |
| 14 | 31 | 3 | 2 | 9 | −1 | −1 | 0 | 0 |
| 15 | 33 | 1 | 1 | 7 | 2 | 15 | 0 | 0 |
| 16 | 34 | 1 | 2 | 3 | 2 | 15 | 0 | 0 |
| 17 | 35 | 1 | 2 | 4 | 2 | 15 | 0 | 0 |
| 18 | 37 | 4 | −1 | 3 | 2 | 15 | 0 | 0 |
| 19 | 38 | 2 | 2 | 1 | 2 | 10 | 0 | 0 |
| 20 | 39 | 2 | 1 | 7 | 2 | 10 | 0 | 0 |
| 21 | 42 | 2 | 2 | 4 | 2 | 10 | 0 | 0 |
| 22 | 44 | 2 | 2 | 15 | 2 | 11 | 0 | 0 |

TABLE 29B-continued

Transfers (e.g., Process[0][1][0][2]) dataset element values

| RI/CI | 0 | 1 | 2 | 3 | 4 | 5 | 6 | 7 |
|---|---|---|---|---|---|---|---|---|
| 23 | 45 | 2 | 2 | 16 | 2 | 10 | 0 | 0 |
| 24 | 51 | 1 | 2 | 10 | 2 | 17 | 0 | 0 |
| 25 | 53 | 2 | 2 | 17 | -1 | -1 | 0 | 0 |
| 26 | 54 | 2 | 2 | 11 | 2 | 20 | 0 | 0 |
| 27 | 55 | 2 | 2 | 13 | 2 | 20 | 0 | 0 |
| 28 | 57 | 2 | 2 | 12 | 2 | 20 | 0 | 0 |
| 29 | 58 | 2 | 2 | 11 | 2 | 20 | 0 | 0 |
| 30 | 59 | 2 | 2 | 20 | -1 | -1 | 0 | 0 |
| 31 | 60 | 2 | 2 | 19 | 2 | 18 | 0 | 0 |
| 32 | 61 | 2 | 2 | 18 | 2 | 17 | 0 | 0 |
| 22 | 68 | 2 | 2 | 10 | -1 | -1 | 0 | 0 |
| 34 | 69 | 2 | -1 | -1 | -1 | -1 | 0 | 0 |
| 35 | 70 | 2 | -1 | -1 | -1 | -1 | 0 | 0 |
| 36 | 76 | 2 | 2 | 10 | 2 | 20 | 0 | 0 |
| 37 | 77 | 2 | 2 | 10 | 2 | 20 | 0 | 0 |
| 38 | 78 | 2 | 2 | 0 | 2 | 20 | 0 | 0 |
| 39 | 80 | 2 | -1 | -1 | 2 | 10 | 0 | 0 |
| 40 | 81 | 1 | -1 | -1 | 2 | 20 | 0 | 0 |
| 41 | 89 | 1 | 2 | 2 | 2 | 11 | 0 | 0 |
| 42 | 125 | 2 | 2 | 1 | 2 | 10 | 0 | 0 |
| 43 | 126 | 6 | 2 | 15 | 2 | 11 | 10 | 0 |
| 44 | 127 | 2 | 1 | 8 | 2 | 10 | 0 | 0 |
| 45 | 129 | 2 | 2 | 10 | 2 | 20 | 0 | 0 |
| 46 | 132 | 1 | -1 | -1 | 2 | 20 | 0 | 0 |
| 47 | 133 | 1 | -1 | -1 | 2 | 20 | 0 | 0 |
| 48 | 134 | 1 | 2 | 10 | 2 | 20 | 0 | 0 |
| 49 | 135 | 2 | 2 | 11 | 2 | 20 | 0 | 0 |
| 50 | 138 | 2 | 2 | 11 | 2 | 20 | 0 | 0 |
| 51 | 139 | 2 | 2 | 11 | 2 | 20 | 0 | 0 |
| 52 | 140 | 7 | 2 | 9 | 2 | 11 | 4 | 0 |
| 53 | 141 | 7 | 2 | 9 | 2 | 16 | 7 | 0 |
| 54 | 142 | 7 | 2 | 9 | 2 | 12 | 5 | 0 |
| 55 | 143 | 7 | 2 | 9 | 2 | 15 | 6 | 0 |
| 56 | 144 | 7 | 2 | 9 | 2 | 10 | 3 | 0 |
| 57 | 145 | 2 | 2 | 9 | 2 | 0 | 0 | 0 |
| 58 | 146 | 1 | 2 | 9 | 2 | 15 | 0 | 0 |
| 59 | 149 | 2 | 2 | 3 | -1 | -1 | 0 | 0 |
| 60 | 150 | 2 | 2 | 11 | 2 | 11 | 0 | 0 |
| 61 | 151 | 2 | 2 | 9 | 2 | 0 | 0 | 0 |
| 62 | 152 | 2 | 2 | 11 | 2 | 20 | 0 | 0 |
| 63 | 163 | 2 | 2 | 9 | 2 | 9 | 0 | 0 |
| 64 | 201 | 1 | 2 | 11 | 2 | 13 | 0 | 0 |
| 65 | 207 | 1 | 2 | 7 | 2 | 13 | 0 | 0 |
| 66 | 208 | 1 | 2 | 8 | 2 | 14 | 0 | 0 |
| 67 | 212 | 2 | 2 | 1 | 2 | 10 | 0 | 0 |
| 68 | 213 | 2 | 1 | 1 | 2 | 10 | 0 | 0 |
| 69 | 215 | 1 | 2 | 10 | 2 | 20 | 0 | 0 |
| 70 | 216 | 2 | -1 | -1 | 2 | 10 | 0 | 0 |
| 71 | 217 | 2 | 2 | 15 | -1 | -1 | 0 | 0 |
| 72 | 218 | 2 | -1 | -1 | 2 | 10 | 0 | 0 |
| 73 | 219 | 2 | 2 | 11 | 2 | 11 | 0 | 0 |
| 74 | 223 | 2 | 2 | 11 | 2 | 11 | 0 | 0 |
| 75 | 224 | 2 | 2 | 21 | 2 | 10 | 0 | 0 |
| 76 | 225 | 2 | 2 | 10 | -1 | -1 | 0 | 0 |
| 77 | 226 | 1 | 2 | 21 | 2 | 15 | 0 | 0 |
| 78 | 227 | 1 | 2 | 4 | 2 | 21 | 0 | 0 |
| 79 | 228 | 1 | 2 | 1 | 2 | 21 | 0 | 0 |
| 80 | 233 | 1 | 2 | 10 | 2 | 12 | 0 | 0 |
| 81 | 234 | 2 | 2 | 10 | 2 | 10 | 0 | 0 |
| 82 | 238 | 2 | 2 | 11 | 2 | 11 | 0 | 0 |
| 83 | 239 | 2 | 2 | 11 | 2 | 10 | 0 | 0 |
| 84 | 240 | 2 | 2 | 10 | 2 | 10 | 0 | 0 |
| 85 | 243 | 2 | 2 | 10 | 2 | 10 | 0 | 0 |
| 86 | 246 | 7 | 2 | 9 | 2 | 13 | 8 | 0 |
| 87 | 247 | 7 | 2 | 9 | 2 | 14 | 9 | 0 |
| 88 | 248 | 1 | -1 | -1 | 2 | 17 | 0 | 0 |
| 89 | 256 | 2 | -1 | -1 | -1 | -1 | 0 | 0 |
| 90 | 257 | 3 | 2 | 11 | 2 | 11 | 0 | 0 |
| 91 | 258 | 2 | 2 | 0 | 2 | 0 | 0 | 0 |
| 92 | 259 | 1 | 2 | 12 | 2 | 11 | 0 | 0 |
| 93 | 260 | 1 | 2 | 6 | 2 | 12 | 0 | 0 |
| 94 | 261 | 1 | 2 | 4 | 2 | 15 | 0 | 0 |
| 95 | 262 | 1 | 2 | 4 | 2 | 15 | 0 | 0 |
| 96 | 263 | 2 | 2 | 4 | 2 | 10 | 0 | 0 |
| 97 | 265 | 2 | 2 | 12 | 2 | 12 | 0 | 0 |
| 98 | 122 | 2 | 2 | 4 | 2 | 10 | 0 | 0 |
| 99 | 202 | 1 | 2 | 11 | 2 | 14 | 0 | 0 |
| 100 | 121 | 2 | 2 | 4 | 2 | 10 | 0 | 0 |
| 101 | 255 | 2 | 2 | 15 | -1 | -1 | 0 | 0 |
| 102 | 15 | 5 | 2 | 10 | 2 | 9 | 3 | 12 |
| 103 | 16 | 5 | 2 | 11 | 2 | 9 | 4 | 12 |
| 104 | 17 | 5 | 2 | 12 | 2 | 9 | 5 | 12 |
| 105 | 18 | 5 | 2 | 15 | 2 | 9 | 6 | 12 |
| 106 | 19 | 5 | 2 | 16 | 2 | 9 | 7 | 12 |
| 107 | 32 | 2 | 2 | 10 | 2 | 9 | 0 | 12 |
| 108 | 244 | 5 | 2 | 13 | 2 | 9 | 8 | 12 |
| 109 | 245 | 5 | 2 | 14 | 2 | 9 | 9 | 12 |
| 110 | 71 | 1 | 2 | 10 | 2 | 18 | 0 | 20 |
| 111 | 73 | 1 | 2 | 10 | 2 | 18 | 0 | 24 |
| 112 | 74 | 1 | 2 | 10 | 2 | 18 | 0 | 26 |
| 113 | 86 | 1 | 2 | 10 | 2 | 18 | 0 | 26 |
| 114 | 79 | 2 | 2 | 15 | 2 | 17 | 0 | 28 |
| 115 | 75 | 1 | 2 | 10 | 2 | 18 | 0 | 30 |
| 116 | 85 | 2 | 2 | 4 | 2 | 10 | 0 | 38 |
| 117 | 136 | 2 | 2 | 10 | 2 | 19 | 0 | 50 |
| 118 | 222 | 2 | 2 | 10 | 2 | 19 | 0 | 50 |
| 119 | 72 | 1 | 2 | 11 | 2 | 18 | 0 | 51 |
| 120 | 214 | 2 | 2 | 11 | 2 | 19 | 0 | 52 |
| 121 | 56 | 2 | 2 | 14 | 2 | 20 | 0 | 55 |
| 122 | 120 | 2 | 2 | 20 | 2 | 20 | 0 | 55 |
| 123 | 198 | 2 | 2 | 11 | 2 | 20 | 0 | 58 |
| 124 | 199 | 2 | 2 | 11 | 2 | 20 | 0 | 58 |
| 125 | 220 | 2 | 2 | 19 | 2 | 18 | 0 | 60 |
| 126 | 130 | 2 | 2 | 19 | 2 | 18 | 0 | 60 |
| 127 | 131 | 2 | 2 | 19 | 2 | 18 | 0 | 60 |
| 128 | 22 | 1 | 2 | 0 | 2 | 19 | 0 | 71 |
| 129 | 83 | 1 | 2 | 0 | 2 | 19 | 0 | 71 |
| 130 | 52 | 1 | 2 | 11 | 2 | 19 | 0 | 72 |
| 131 | 123 | 1 | 2 | 11 | 2 | 19 | 0 | 72 |
| 132 | 48 | 1 | 1 | 7 | 2 | 19 | 0 | 73 |
| 133 | 49 | 1 | 2 | 10 | 2 | 19 | 0 | 74 |
| 134 | 84 | 1 | 2 | 10 | 2 | 19 | 0 | 74 |
| 135 | 50 | 1 | 2 | 16 | 2 | 19 | 0 | 75 |
| 136 | 229 | 2 | 2 | 10 | 2 | 19 | 0 | 84 |
| 137 | 87 | 1 | 2 | 10 | 2 | 19 | 0 | 86 |
| 138 | 88 | 1 | 2 | 10 | 2 | 19 | 0 | 86 |
| 139 | 235 | 2 | 2 | 10 | 2 | 19 | 0 | 87 |
| 140 | 236 | 2 | 2 | 10 | 2 | 19 | 0 | 88 |
| 141 | 147 | 2 | 2 | 11 | 2 | 19 | 0 | 123 |
| 142 | 148 | 2 | 2 | 11 | 2 | 19 | 0 | 123 |
| 143 | 160 | 2 | 2 | 11 | 2 | 20 | 0 | 135 |
| 144 | 159 | 2 | 2 | 11 | 2 | 20 | 0 | 135 |
| 145 | 203 | 2 | 2 | 11 | 2 | 20 | 0 | 135 |
| 146 | 206 | 2 | 2 | 11 | 2 | 20 | 0 | 135 |
| 147 | 161 | 2 | 2 | 11 | 2 | 20 | 0 | 139 |
| 148 | 162 | 2 | 2 | 11 | 2 | 20 | 0 | 139 |
| 149 | 204 | 2 | 2 | 11 | 2 | 20 | 0 | 139 |
| 150 | 205 | 2 | 2 | 11 | 2 | 20 | 0 | 139 |
| 151 | 211 | 2 | 2 | 1 | 2 | 19 | 0 | 148 |
| 152 | 40 | 2 | -1 | -1 | 2 | 11 | 0 | 150 |
| 153 | 157 | 2 | 2 | 11 | 2 | 11 | 0 | 150 |
| 154 | 153 | 2 | 2 | 11 | 2 | 20 | 0 | 152 |
| 155 | 156 | 2 | 2 | 11 | 2 | 20 | 0 | 152 |
| 156 | 200 | 2 | 2 | 11 | 2 | 20 | 0 | 152 |
| 157 | 237 | 2 | 2 | 11 | 2 | 20 | 0 | 152 |
| 158 | 155 | 2 | 2 | 3 | 2 | 20 | 0 | 156 |
| 159 | 154 | 2 | 2 | 11 | 2 | 20 | 0 | 156 |
| 160 | 164 | 5 | 2 | 11 | 2 | 9 | 4 | 163 |
| 161 | 221 | 5 | 2 | 10 | 2 | 9 | 3 | 163 |
| 162 | 267 | 5 | 2 | 15 | 2 | 9 | 6 | 163 |
| 163 | 209 | 2 | 2 | 1 | 2 | 13 | 0 | 201 |
| 164 | 210 | 2 | 2 | 2 | 2 | 14 | 0 | 202 |
| 165 | 47 | 2 | -1 | -1 | 2 | 11 | 0 | 223 |
| 166 | 266 | 2 | 2 | 2 | 2 | 12 | 0 | 233 |
| 167 | 241 | 2 | 1 | 8 | 2 | 10 | 0 | 243 |
| 168 | 242 | 2 | 2 | 5 | 2 | 10 | 0 | 243 |
| 169 | 251 | 2 | -1 | -1 | -1 | -1 | 0 | 253 |
| 170 | 252 | 2 | 2 | 11 | -1 | -1 | 0 | 253 |
| 171 | 249 | 2 | 2 | 15 | -1 | -1 | 0 | 255 |

TABLE 29B-continued

Transfers (e.g., Process[0][1][0][2]) dataset element values

| RI/CI | 0 | 1 | 2 | 3 | 4 | 5 | 6 | 7 |
|---|---|---|---|---|---|---|---|---|
| 172 | 250 | 6 | 2 | 15 | 2 | 11 | 10 | 255 |
| 173 | 253 | 2 | 2 | 11 | -1 | -1 | 0 | 255 |
| 174 | 254 | 2 | 2 | 15 | -1 | -1 | 0 | 255 |
| 175 | 264 | 3 | 2 | 11 | 2 | 11 | 0 | 265 |

TABLE 30A

TransferColumns (e.g., Process[0][1][0][3]) dataset columns

| CI | Dataset Element |
|---|---|
| 0 | TransferID |
| 1 | SourceCode |
| 2 | SourceValue |
| 3 | ToCI |

TABLE 30B

TransferColumns (e.g., Process[0][1][0][3]) dataset element values

| RI/CI | 0 | 1 | 2 | 3 |
|---|---|---|---|---|
| 0 | 6 | 2 | 2 | 0 |
| 1 | 6 | 2 | 1 | 2 |
| 2 | 7 | 1 | 6 | 0 |
| 3 | 7 | 1 | 7 | 1 |
| 4 | 7 | 1 | 8 | 2 |
| 5 | 7 | 1 | 10 | 6 |
| 6 | 7 | 1 | 11 | 7 |
| 7 | 7 | 1 | 12 | 8 |
| 8 | 7 | 1 | 9 | 3 |
| 9 | 7 | 1 | 15 | 10 |
| 10 | 7 | 1 | 16 | 5 |
| 11 | 7 | 1 | 14 | 17 |
| 12 | 8 | 1 | 1 | 1 |
| 13 | 8 | 1 | 4 | 2 |
| 14 | 8 | 1 | 5 | 3 |
| 15 | 8 | 1 | 6 | 4 |
| 16 | 8 | 1 | 7 | 5 |
| 17 | 8 | 1 | 8 | 6 |
| 18 | 8 | 1 | 9 | 7 |
| 19 | 8 | 1 | 10 | 8 |
| 20 | 8 | 1 | 0 | 0 |
| 21 | 8 | 1 | 11 | 9 |
| 22 | 8 | 1 | 12 | 14 |
| 23 | 8 | 1 | 14 | 15 |
| 24 | 8 | 1 | 13 | 17 |
| 25 | 9 | 1 | 0 | 0 |
| 26 | 9 | 1 | 1 | 1 |
| 27 | 9 | 1 | 4 | 2 |
| 28 | 10 | 1 | 0 | 0 |
| 29 | 10 | 1 | 1 | 1 |
| 30 | 11 | 1 | 1 | 1 |
| 31 | 11 | 1 | 4 | 2 |
| 32 | 11 | 1 | 5 | 3 |
| 33 | 11 | 1 | 6 | 4 |
| 34 | 11 | 1 | 7 | 5 |
| 35 | 11 | 1 | 0 | 0 |
| 36 | 12 | 1 | 6 | 1 |
| 37 | 12 | 1 | 7 | 0 |
| 38 | 13 | 1 | 7 | 9 |
| 39 | 14 | 1 | 6 | 8 |
| 40 | 14 | 1 | 7 | 6 |
| 41 | 14 | 3 | 38 | 7 |
| 42 | 20 | 2 | Application Bar | 0 |
| 43 | 22 | 4 | | 0 |
| 44 | 22 | 2 | 1 | 1 |
| 45 | 22 | 1 | 1 | 2 |
| 46 | 22 | 2 | 240 | 3 |
| 47 | 22 | 2 | 20 | 4 |
| 48 | 22 | 2 | left | 5 |
| 49 | 22 | 2 | 60 | 6 |
| 50 | 22 | 5 | | 13 |
| 51 | 24 | 2 | Menu Bar | 0 |
| 52 | 26 | 2 | Window Bar | 0 |
| 53 | 28 | 2 | List | 0 |
| 54 | 30 | 2 | Command Bar | 0 |
| 55 | 32 | 3 | 318 | 2 |
| 56 | 33 | 1 | 0 | 0 |
| 57 | 33 | 1 | 1 | 1 |
| 58 | 34 | 1 | 0 | 0 |
| 59 | 34 | 1 | 1 | 1 |
| 60 | 35 | 1 | 0 | 0 |
| 61 | 35 | 1 | 1 | 1 |
| 62 | 38 | 2 | 3 | 0 |
| 63 | 38 | 2 | 3 | 1 |
| 64 | 38 | 2 | 1 | 2 |
| 65 | 38 | 1 | 0 | 10 |
| 66 | 38 | 1 | 1 | 11 |
| 67 | 38 | 1 | 7 | 4 |
| 68 | 38 | 1 | 4 | 15 |
| 69 | 38 | 1 | 5 | 3 |
| 70 | 39 | 1 | 4 | 0 |
| 71 | 39 | 1 | 5 | 1 |
| 72 | 39 | 1 | 6 | 2 |
| 73 | 40 | 1 | 10 | 11 |
| 74 | 40 | 1 | 12 | 10 |
| 75 | 40 | 2 | 0 | 16 |
| 76 | 42 | 1 | 0 | 3 |
| 77 | 42 | 1 | 3 | 10 |
| 78 | 42 | 1 | 1 | 13 |
| 79 | 44 | 1 | 0 | 11 |
| 80 | 44 | 1 | 1 | 10 |
| 81 | 45 | 1 | 3 | 0 |
| 82 | 45 | 1 | 4 | 1 |
| 83 | 47 | 1 | 12 | 10 |
| 84 | 48 | 1 | 1 | 2 |
| 85 | 48 | 4 | | 0 |
| 86 | 48 | 2 | 76 | 3 |
| 87 | 48 | 2 | 20 | 4 |
| 88 | 48 | 2 | center | 5 |
| 89 | 48 | 1 | 4 | 6 |
| 90 | 48 | 1 | 5 | 7 |
| 91 | 48 | 1 | 6 | 8 |
| 92 | 48 | 1 | 0 | 11 |
| 93 | 48 | 5 | | 13 |
| 94 | 49 | 4 | | 0 |
| 95 | 49 | 2 | 1 | 1 |
| 96 | 49 | 1 | 11 | 2 |
| 97 | 49 | 2 | 240 | 3 |
| 98 | 49 | 2 | 20 | 4 |
| 99 | 49 | 2 | left | 5 |
| 100 | 49 | 2 | 3 | 6 |
| 101 | 49 | 2 | 12 | 7 |
| 102 | 49 | 2 | 2 | 8 |
| 103 | 49 | 5 | | 13 |
| 104 | 50 | 1 | 1 | 2 |
| 105 | 50 | 4 | | 0 |
| 106 | 50 | 2 | 76 | 3 |
| 107 | 50 | 2 | 20 | 4 |
| 108 | 50 | 2 | center | 5 |
| 109 | 50 | 1 | 3 | 6 |
| 110 | 50 | 1 | 4 | 7 |
| 111 | 50 | 1 | 5 | 8 |
| 112 | 50 | 1 | 0 | 16 |
| 113 | 50 | 5 | | 13 |
| 114 | 51 | 2 | Detail | 0 |
| 115 | 52 | 1 | 1 | 2 |
| 116 | 52 | 4 | | 0 |
| 117 | 52 | 2 | 240 | 3 |
| 118 | 52 | 2 | 20 | 4 |
| 119 | 52 | 2 | left | 5 |
| 120 | 52 | 2 | 1 | 1 |
| 121 | 52 | 5 | | 13 |
| 122 | 53 | 3 | 108 | 6 |

TABLE 30B-continued

TransferColumns (e.g., Process[0][1][0][3]) dataset element values

| RI/CI | 0 | 1 | 2 | 3 |
|---|---|---|---|---|
| 123 | 54 | 3 | 100 | 0 |
| 124 | 55 | 3 | 101 | 1 |
| 125 | 56 | 3 | 102 | 1 |
| 126 | 57 | 3 | 103 | 2 |
| 127 | 58 | 3 | 104 | 3 |
| 128 | 59 | 3 | 105 | 6 |
| 129 | 60 | 3 | 106 | 1 |
| 130 | 61 | 3 | 107 | 1 |
| 131 | 68 | 1 | 0 | 9 |
| 132 | 69 | 2 | 3 | 0 |
| 133 | 69 | 2 | 0 | 1 |
| 134 | 69 | 2 | 3 | 3 |
| 135 | 69 | 2 | DynamicHTML | 4 |
| 136 | 69 | 2 | 2 | 5 |
| 137 | 69 | 2 |  | 6 |
| 138 | 70 | 2 | 3 | 0 |
| 139 | 70 | 2 | 1 | 1 |
| 140 | 70 | 2 | http://www.appcase.mobi/x10DATAMWS/Service1.svc/basic | 2 |
| 141 | 70 | 2 | 4 | 3 |
| 142 | 70 | 2 | Data Source=ADCMAIN\SQL2005;Initial Catalog=x10DATA-MDB;Persist Security Info=True;User ID=sa;Password=adcx10data | 4 |
| 143 | 70 | 2 | 1 | 5 |
| 144 | 70 | 2 |  | 6 |
| 145 | 71 | 4 |  | 0 |
| 146 | 72 | 4 |  | 0 |
| 147 | 73 | 4 |  | 0 |
| 148 | 74 | 4 |  | 0 |
| 149 | 75 | 4 |  | 0 |
| 150 | 76 | 3 | 144 | 1 |
| 151 | 77 | 3 | 146 | 2 |
| 152 | 78 | 3 | 145 | 2 |
| 153 | 79 | 3 | 170 | 1 |
| 154 | 80 | 2 | 4 | 0 |
| 155 | 80 | 2 | 6 | 1 |
| 156 | 80 | 2 | 1 | 2 |
| 157 | 80 | 1 | 10 | 6 |
| 158 | 80 | 2 | 0 | 3 |
| 159 | 81 | 2 | SELECT | 0 |
| 160 | 81 | 2 | FROM | 1 |
| 161 | 81 | 2 | WHERE | 2 |
| 162 | 81 | 2 | ORDER BY | 3 |
| 163 | 83 | 4 |  | 0 |
| 164 | 83 | 2 | 1 | 1 |
| 165 | 83 | 1 | 3 | 2 |
| 166 | 83 | 2 | 240 | 3 |
| 167 | 83 | 2 | 20 | 4 |
| 168 | 83 | 2 | right | 5 |
| 169 | 83 | 5 |  | 13 |
| 170 | 84 | 4 |  | 0 |
| 171 | 84 | 2 | 1 | 1 |
| 172 | 84 | 1 | 13 | 2 |
| 173 | 84 | 2 | 240 | 3 |
| 174 | 84 | 2 | 20 | 4 |
| 175 | 84 | 2 | right | 5 |
| 176 | 84 | 2 | 3 | 6 |
| 177 | 84 | 2 | 15 | 7 |
| 178 | 84 | 2 | 2 | 8 |
| 179 | 84 | 5 |  | 13 |
| 180 | 84 | 1 | 10 | 15 |
| 181 | 85 | 1 | 1 | 13 |
| 182 | 86 | 4 |  | 0 |
| 183 | 87 | 4 |  | 0 |
| 184 | 87 | 2 | 1 | 1 |
| 185 | 87 | 1 | 12 | 2 |
| 186 | 87 | 2 | 240 | 3 |
| 187 | 87 | 2 | 20 | 4 |
| 188 | 87 | 2 | left | 5 |
| 189 | 87 | 2 | 3 | 6 |
| 190 | 87 | 2 | 12 | 7 |
| 191 | 87 | 2 | 2 | 8 |
| 192 | 87 | 5 |  | 13 |
| 193 | 87 | 1 | 10 | 15 |
| 194 | 88 | 4 |  | 0 |
| 195 | 88 | 2 | 1 | 1 |
| 196 | 88 | 1 | 14 | 2 |
| 197 | 88 | 2 | 240 | 3 |
| 198 | 88 | 2 | 20 | 4 |
| 199 | 88 | 2 | right | 5 |
| 200 | 88 | 2 | 3 | 6 |
| 201 | 88 | 2 | 4 | 7 |
| 202 | 88 | 2 | 2 | 8 |
| 203 | 88 | 5 |  | 13 |
| 204 | 88 | 1 | 10 | 15 |
| 205 | 89 | 1 | 2 | 3 |
| 206 | 89 | 2 | 3 | 8 |
| 207 | 120 | 3 | 270 | 1 |
| 208 | 121 | 1 | 1 | 12 |
| 209 | 122 | 1 | 1 | 13 |
| 210 | 123 | 1 | 10 | 2 |
| 211 | 123 | 4 |  | 0 |
| 212 | 123 | 2 | 240 | 3 |
| 213 | 123 | 2 | 20 | 4 |
| 214 | 123 | 2 | left | 5 |
| 215 | 123 | 2 | 3 | 1 |
| 216 | 123 | 1 | 0 | 14 |
| 217 | 123 | 5 |  | 13 |
| 218 | 125 | 1 | 2 | 11 |
| 219 | 125 | 1 | 4 | 15 |
| 220 | 127 | 3 | 285 | 11 |
| 221 | 129 | 3 | 287 | 2 |
| 222 | 130 | 3 | 291 | 1 |
| 223 | 131 | 3 | 292 | 1 |
| 224 | 132 | 2 | UPDATE [0] SET [UpdateDate] = GETDATE( ) | 5 |
| 225 | 132 | 2 | FROM | 1 |
| 226 | 132 | 2 | WHERE | 2 |
| 227 | 132 | 2 |  | 3 |
| 228 | 133 | 2 | UPDATE [0] SET [DeleteDate] = GETDATE( ), [Deleted] =1 | 5 |
| 229 | 133 | 2 | FROM | 1 |
| 230 | 133 | 2 | WHERE | 2 |
| 231 | 133 | 2 |  | 3 |
| 232 | 134 | 3 | 297 | 4 |
| 233 | 134 | 3 | 298 | 0 |
| 234 | 135 | 3 | 305 | 5 |
| 235 | 136 | 1 | 6 | 10 |
| 236 | 138 | 3 | 310 | 4 |
| 237 | 139 | 3 | 311 | 0 |
| 238 | 145 | 1 | 0 | 6 |
| 239 | 145 | 1 | 1 | 8 |
| 240 | 146 | 1 | 0 | 0 |
| 241 | 146 | 1 | 2 | 1 |
| 242 | 147 | 2 | 1 | 1 |
| 243 | 147 | 2 | 3 | 6 |
| 244 | 147 | 2 | 14 | 7 |
| 245 | 147 | 2 | 2 | 8 |
| 246 | 147 | 1 | 6 | 11 |
| 247 | 148 | 2 | 1 | 1 |
| 248 | 148 | 2 | 3 | 6 |
| 249 | 148 | 2 | 13 | 7 |
| 250 | 148 | 2 | 1 | 8 |
| 251 | 148 | 1 | 14 | 15 |
| 252 | 148 | 1 | 15 | 9 |
| 253 | 148 | 1 | 0 | 14 |
| 254 | 149 | 1 | 1 | 12 |
| 255 | 151 | 1 | 0 | 6 |
| 256 | 151 | 1 | 1 | 8 |
| 257 | 152 | 3 | 357 | 0 |
| 258 | 153 | 3 | 360 | 0 |
| 259 | 154 | 3 | 358 | 0 |
| 260 | 155 | 3 | 359 | 0 |

TABLE 30B-continued

TransferColumns (e.g., Process[0][1][0][3]) dataset element values

| RI/CI | 0 | 1 | 2 | 3 |
|---|---|---|---|---|
| 261 | 156 | 3 | 361 | 0 |
| 262 | 157 | 1 | 10 | 11 |
| 263 | 157 | 3 | 362 | 11 |
| 264 | 157 | 1 | 10 | 16 |
| 265 | 157 | 3 | 1004 | 16 |
| 266 | 157 | 3 | 363 | 10 |
| 267 | 159 | 3 | 367 | 5 |
| 268 | 160 | 3 | 368 | 5 |
| 269 | 161 | 3 | 365 | 0 |
| 270 | 162 | 3 | 366 | 0 |
| 271 | 198 | 3 | 26 | 3 |
| 272 | 199 | 3 | 965 | 3 |
| 273 | 200 | 3 | 967 | 0 |
| 274 | 201 | 1 | 6 | 0 |
| 275 | 201 | 1 | 14 | 3 |
| 276 | 202 | 1 | 3 | 3 |
| 277 | 202 | 1 | 6 | 0 |
| 278 | 202 | 1 | 14 | 4 |
| 279 | 203 | 3 | 970 | 5 |
| 280 | 204 | 3 | 969 | 0 |
| 281 | 205 | 3 | 971 | 0 |
| 282 | 206 | 3 | 972 | 5 |
| 283 | 207 | 1 | 0 | 0 |
| 284 | 207 | 1 | 1 | 1 |
| 285 | 207 | 1 | 2 | 2 |
| 286 | 208 | 1 | 0 | 0 |
| 287 | 208 | 1 | 1 | 1 |
| 288 | 208 | 1 | 2 | 2 |
| 289 | 208 | 1 | 3 | 3 |
| 290 | 209 | 1 | 4 | 2 |
| 291 | 210 | 1 | 2 | 2 |
| 292 | 211 | 1 | 5 | 9 |
| 293 | 212 | 1 | 6 | 3 |
| 294 | 213 | 1 | 1 | 11 |
| 295 | 213 | 1 | 7 | 4 |
| 296 | 213 | 1 | 4 | 15 |
| 297 | 214 | 2 | 1 | 1 |
| 298 | 214 | 2 | 4 | 6 |
| 299 | 214 | 2 | 6 | 7 |
| 300 | 214 | 2 | 1 | 8 |
| 301 | 214 | 1 | 14 | 15 |
| 302 | 214 | 1 | 16 | 10 |
| 303 | 215 | 3 | 1006 | 0 |
| 304 | 215 | 3 | 1007 | 1 |
| 305 | 215 | 3 | 1008 | 2 |
| 306 | 216 | 1 | 10 | 6 |
| 307 | 217 | 1 | 0 | 12 |
| 308 | 218 | 1 | 10 | 17 |
| 309 | 219 | 1 | 10 | 11 |
| 310 | 219 | 3 | 1011 | 11 |
| 311 | 219 | 3 | 1012 | 10 |
| 312 | 220 | 3 | 1016 | 1 |
| 313 | 222 | 1 | 3 | 9 |
| 314 | 222 | 1 | 10 | 15 |
| 315 | 224 | 1 | 2 | 0 |
| 316 | 224 | 1 | 5 | 3 |
| 317 | 224 | 1 | 4 | 10 |
| 318 | 224 | 1 | 3 | 1 |
| 319 | 224 | 1 | 6 | 4 |
| 320 | 224 | 2 | 1 | 2 |
| 321 | 225 | 1 | 3 | 10 |
| 322 | 226 | 1 | 0 | 0 |
| 323 | 226 | 1 | 1 | 1 |
| 324 | 227 | 5 | | 0 |
| 325 | 227 | 1 | 1 | 1 |
| 326 | 227 | 1 | 0 | 5 |
| 327 | 227 | 1 | 3 | 4 |
| 328 | 227 | 2 | 4 | 2 |
| 329 | 228 | 5 | | 0 |
| 330 | 228 | 1 | 1 | 1 |
| 331 | 228 | 1 | 5 | 5 |
| 332 | 228 | 1 | 0 | 4 |
| 333 | 228 | 2 | 3 | 2 |
| 334 | 228 | 2 | 3 | 3 |
| 335 | 228 | 1 | 7 | 6 |
| 336 | 229 | 2 | 4 | 7 |
| 337 | 233 | 5 | | 0 |
| 338 | 233 | 2 | 1 | 1 |
| 339 | 233 | 1 | 18 | 2 |
| 340 | 233 | 2 | 0 | 3 |
| 341 | 233 | 2 | 3 | 6 |
| 342 | 233 | 1 | 10 | 9 |
| 343 | 233 | 2 | 3 | 8 |
| 344 | 234 | 1 | 6 | 7 |
| 345 | 234 | 1 | 10 | 8 |
| 346 | 234 | 2 | | 6 |
| 347 | 235 | 2 | 16 | 7 |
| 348 | 236 | 2 | 15 | 7 |
| 349 | 237 | 3 | 1070 | 0 |
| 350 | 238 | 1 | 10 | 11 |
| 351 | 238 | 3 | 1071 | 11 |
| 352 | 238 | 1 | 10 | 16 |
| 353 | 238 | 3 | 1074 | 16 |
| 354 | 238 | 3 | 1072 | 10 |
| 355 | 239 | 1 | 11 | 18 |
| 356 | 239 | 1 | 10 | 12 |
| 357 | 240 | 2 | | 12 |
| 358 | 240 | 2 | 0 | 3 |
| 359 | 241 | 1 | 1 | 11 |
| 360 | 242 | 3 | 1123 | 11 |
| 361 | 243 | 2 | | 11 |
| 362 | 243 | 2 | | 12 |
| 363 | 243 | 2 | | 13 |
| 364 | 243 | 2 | | 14 |
| 365 | 248 | 2 | List | 0 |
| 366 | 248 | 1 | 6 | 1 |
| 367 | 249 | 1 | 0 | 10 |
| 368 | 251 | 3 | 1131 | 6 |
| 369 | 252 | 3 | 1132 | 6 |
| 370 | 254 | 3 | 1134 | 6 |
| 371 | 255 | 3 | 1135 | 6 |
| 372 | 256 | 2 | | 6 |
| 373 | 258 | 2 | 0 | 6 |
| 374 | 258 | 2 | −1 | 8 |
| 375 | 259 | 1 | 7 | 6 |
| 376 | 259 | 1 | 5 | 3 |
| 377 | 259 | 1 | 2 | 10 |
| 378 | 259 | 2 | 1 | 7 |
| 379 | 259 | 2 | 3 | 8 |
| 380 | 260 | 1 | 0 | 0 |
| 381 | 260 | 1 | 1 | 1 |
| 382 | 260 | 1 | 4 | 2 |
| 383 | 261 | 1 | 0 | 0 |
| 384 | 261 | 1 | 1 | 1 |
| 385 | 262 | 1 | 0 | 0 |
| 386 | 262 | 1 | 1 | 1 |
| 387 | 263 | 1 | 0 | 4 |
| 388 | 263 | 1 | 4 | 16 |
| 389 | 263 | 1 | 1 | 12 |
| 390 | 266 | 1 | 2 | 5 |
| 391 | 266 | 1 | 0 | 7 |

TABLE 31A

TransferConditions (e.g., Process[0][1][0][4]) dataset columns

| CI | Dataset Element |
|---|---|
| 0 | TransferID |
| 1 | FromCI |
| 2 | OperatorCode |
| 3 | SoureCode |
| 4 | ConditionValue |
| 5 | ConditionDSI |
| 6 | ConditionNDSI |
| 7 | ConditionCI |

TABLE 31B

| Transfer Conditions (e.g., Process[0][1][0][4]) dataset element values | | | | | | | | |
|---|---|---|---|---|---|---|---|---|
| RI/CI | 0 | 1 | 2 | 3 | 4 | 5 | 6 | 7 |
| 0 | 7 | 13 | 1 | 1 | | −1 | −1 | 10 |
| 1 | 8 | 2 | 1 | 1 | | 2 | 10 | 3 |
| 2 | 9 | 0 | 1 | 1 | | 2 | 10 | 3 |
| 3 | 10 | 3 | 1 | 1 | | 2 | 10 | 7 |
| 4 | 11 | 2 | 1 | 1 | | 2 | 10 | 0 |
| 5 | 11 | 3 | 1 | 1 | | 2 | 10 | 1 |
| 6 | 11 | 4 | 2 | 2 | 13 | 0 | 0 | 0 |
| 7 | 31 | 0 | 1 | 1 | | 2 | 0 | 6 |
| 8 | 33 | 2 | 1 | 1 | | 2 | 10 | 7 |
| 9 | 34 | 2 | 1 | 1 | | 2 | 10 | 7 |
| 10 | 35 | 3 | 1 | 1 | | 2 | 10 | 10 |
| 11 | 35 | 2 | 1 | 2 | 8 | 0 | 0 | 0 |
| 12 | 38 | 0 | 1 | 1 | | −1 | −1 | 10 |
| 13 | 42 | 0 | 1 | 1 | | −1 | −1 | 10 |
| 14 | 48 | 2 | 1 | 2 | 1 | 0 | 0 | 0 |
| 15 | 52 | 8 | 2 | 2 | 3 | 0 | 0 | 0 |
| 16 | 52 | 8 | 1 | 4 | | 0 | 0 | 0 |
| 17 | 56 | 0 | 1 | 5 | | 2 | 13 | 0 |
| 18 | 58 | 6 | 2 | 2 | 0 | 0 | 0 | 0 |
| 19 | 58 | 9 | 2 | 2 | 0 | 0 | 0 | 0 |
| 20 | 60 | 0 | 1 | 3 | | 0 | 0 | 0 |
| 21 | 61 | 0 | 1 | 3 | | 0 | 0 | 0 |
| 22 | 72 | 8 | 2 | 2 | 3 | 0 | 0 | 0 |
| 23 | 85 | 0 | 1 | 1 | | 2 | 10 | 3 |
| 24 | 89 | 1 | 1 | 1 | | 2 | 10 | 10 |
| 25 | 89 | 4 | 1 | 2 | 1 | 0 | 0 | 0 |
| 26 | 121 | 0 | 1 | 1 | | 2 | 10 | 4 |
| 27 | 122 | 0 | 1 | 1 | | 2 | 10 | 3 |
| 28 | 123 | 8 | 2 | 2 | 3 | 0 | 0 | 0 |
| 29 | 123 | 8 | 1 | 4 | | 0 | 0 | 0 |
| 30 | 125 | 0 | 1 | 1 | | 2 | 10 | 10 |
| 31 | 127 | 0 | 1 | 1 | | 2 | 10 | 5 |
| 32 | 129 | 6 | 2 | 2 | | 0 | 0 | 0 |
| 33 | 130 | 2 | 1 | 4 | | 0 | 0 | 0 |
| 34 | 130 | 1 | 1 | 2 | 3 | 0 | 0 | 0 |
| 35 | 131 | 1 | 2 | 2 | 3 | 0 | 0 | 0 |
| 36 | 131 | 2 | 1 | 4 | | 0 | 0 | 0 |
| 37 | 135 | 8 | 2 | 2 | 3 | 0 | 0 | 0 |
| 38 | 140 | 0 | 1 | 1 | | 2 | 0 | 6 |
| 39 | 141 | 0 | 1 | 1 | | 2 | 0 | 6 |
| 40 | 142 | 0 | 1 | 1 | | 2 | 0 | 6 |
| 41 | 143 | 0 | 1 | 1 | | 2 | 0 | 6 |
| 42 | 144 | 0 | 1 | 1 | | 2 | 0 | 6 |
| 43 | 145 | 0 | 1 | 1 | | 2 | 0 | 8 |
| 44 | 146 | 0 | 2 | 2 | 0 | 0 | 0 | 0 |
| 45 | 147 | 7 | 1 | 2 | 2 | 0 | 0 | 0 |
| 46 | 147 | 1 | 1 | 4 | | 0 | 0 | 0 |
| 47 | 148 | 7 | 1 | 2 | 3 | 0 | 0 | 0 |
| 48 | 148 | 1 | 1 | 4 | 0 | 0 | 0 | 0 |
| 49 | 149 | 0 | 1 | 1 | | −1 | −1 | 10 |
| 50 | 149 | 2 | 1 | 1 | | 2 | 10 | 7 |
| 51 | 150 | 0 | 1 | 1 | | 2 | 10 | 17 |
| 52 | 151 | 0 | 1 | 1 | | −1 | −1 | 10 |
| 53 | 153 | 6 | 2 | 3 | 0 | 0 | 0 | 0 |
| 54 | 153 | 1 | 1 | 4 | | 0 | 0 | 0 |
| 55 | 153 | 7 | 2 | 2 | 2 | 0 | 0 | 0 |
| 56 | 153 | 7 | 2 | 2 | 3 | 0 | 0 | 0 |
| 57 | 154 | 1 | 1 | 4 | | 0 | 0 | 0 |
| 58 | 155 | 2 | 1 | 5 | | 2 | 11 | 6 |
| 59 | 156 | 1 | 1 | 4 | | 0 | 0 | 0 |
| 60 | 156 | 7 | 1 | 2 | 2 | 0 | 0 | 0 |
| 61 | 157 | 7 | 1 | 2 | 3 | 0 | 0 | 0 |
| 62 | 157 | 16 | 1 | 2 | 0 | 0 | 0 | 0 |
| 63 | 159 | 1 | 1 | 4 | | 0 | 0 | 0 |
| 64 | 159 | 7 | 1 | 2 | 2 | 0 | 0 | 0 |
| 65 | 160 | 1 | 1 | 4 | | 0 | 0 | 0 |
| 66 | 160 | 7 | 2 | 2 | 2 | 0 | 0 | 0 |
| 67 | 160 | 7 | 2 | 2 | 3 | 0 | 0 | 0 |
| 68 | 161 | 1 | 1 | 4 | | 0 | 0 | 0 |
| 69 | 161 | 7 | 2 | 2 | 2 | 0 | 0 | 0 |
| 70 | 161 | 7 | 2 | 2 | 3 | 0 | 0 | 0 |
| 71 | 162 | 1 | 1 | 4 | | 0 | 0 | 0 |
| 72 | 162 | 7 | 1 | 2 | 2 | 0 | 0 | 0 |
| 73 | 163 | 0 | 1 | 1 | | 2 | 0 | 6 |
| 74 | 198 | 9 | 1 | 2 | 1 | 0 | 0 | 0 |
| 75 | 198 | 1 | 1 | 4 | | 0 | 0 | 0 |
| 76 | 199 | 9 | 1 | 2 | 2 | 0 | 0 | 0 |
| 77 | 199 | 1 | 1 | 4 | | 0 | 0 | 0 |
| 78 | 200 | 1 | 1 | 4 | | 0 | 0 | 0 |
| 79 | 200 | 7 | 1 | 2 | 3 | 0 | 0 | 0 |
| 80 | 201 | 7 | 1 | 2 | 3 | 0 | 0 | 0 |
| 81 | 202 | 7 | 1 | 2 | 3 | 0 | 0 | 0 |
| 82 | 203 | 1 | 1 | 4 | | 0 | 0 | 0 |
| 83 | 203 | 7 | 1 | 2 | 3 | 0 | 0 | 0 |
| 84 | 203 | 10 | 2 | 2 | | 0 | 0 | 0 |
| 85 | 204 | 1 | 1 | 4 | | 0 | 0 | 0 |
| 86 | 204 | 7 | 1 | 2 | 3 | 0 | 0 | 0 |
| 87 | 204 | 10 | 2 | 2 | | 0 | 0 | 0 |
| 88 | 205 | 1 | 1 | 4 | | 0 | 0 | 0 |
| 89 | 205 | 7 | 1 | 2 | 3 | 0 | 0 | 0 |
| 90 | 205 | 10 | 1 | 2 | | 0 | 0 | 0 |
| 91 | 206 | 1 | 1 | 4 | | 0 | 0 | 0 |
| 92 | 206 | 7 | 1 | 2 | 3 | 0 | 0 | 0 |
| 93 | 206 | 10 | 1 | 2 | | 0 | 0 | 0 |
| 94 | 207 | 1 | 1 | 1 | | 2 | 10 | 3 |
| 95 | 209 | 0 | 1 | 6 | | 2 | 13 | 3 |
| 96 | 210 | 1 | 1 | 6 | | 2 | 14 | 4 |
| 97 | 210 | 4 | 1 | 2 | 12 | 0 | 0 | 0 |
| 98 | 211 | 0 | 1 | 6 | | 2 | 19 | 15 |
| 99 | 212 | 0 | 1 | 1 | | 2 | 10 | 10 |
| 100 | 213 | 0 | 1 | 1 | | 2 | 10 | 10 |
| 101 | 214 | 7 | 1 | 2 | 3 | 0 | 0 | 0 |
| 102 | 214 | 1 | 1 | 4 | | 0 | 0 | 0 |
| 103 | 219 | 7 | 1 | 2 | 2 | 0 | 0 | 0 |
| 104 | 220 | 14 | 2 | 2 | 0 | 0 | 0 | 0 |
| 105 | 220 | 2 | 1 | 4 | | 0 | 0 | 0 |
| 106 | 223 | 0 | 1 | 1 | | −1 | −1 | 10 |
| 107 | 224 | 0 | 1 | 1 | | −1 | −1 | 10 |
| 108 | 227 | 3 | 1 | 1 | | 2 | 10 | 10 |
| 109 | 228 | 8 | 1 | 1 | | 2 | 10 | 10 |
| 110 | 229 | 0 | 1 | 2 | 4 | 0 | 0 | 0 |
| 111 | 235 | 1 | 1 | 2 | 3 | 0 | 0 | 0 |
| 112 | 235 | 8 | 1 | 2 | 0 | 0 | 0 | 0 |
| 113 | 236 | 1 | 1 | 2 | 3 | 0 | 0 | 0 |
| 114 | 236 | 8 | 1 | 2 | 0 | 0 | 0 | 0 |
| 115 | 237 | 1 | 1 | 4 | | 0 | 0 | 0 |
| 116 | 237 | 6 | 1 | 2 | 0 | 0 | 0 | 0 |
| 117 | 238 | 6 | 1 | 2 | 0 | 0 | 0 | 0 |
| 118 | 239 | 6 | 1 | 2 | 0 | 0 | 0 | 0 |
| 119 | 241 | 2 | 1 | 1 | | 2 | 10 | 0 |
| 120 | 241 | 3 | 1 | 1 | | 2 | 10 | 1 |
| 121 | 241 | 4 | 1 | 2 | 13 | 0 | 0 | 0 |
| 122 | 242 | 0 | 1 | 1 | | 2 | 10 | 17 |
| 123 | 246 | 0 | 1 | 1 | | 2 | 0 | 6 |
| 124 | 247 | 0 | 1 | 1 | | 2 | 0 | 6 |
| 125 | 249 | 1 | 1 | 4 | | 0 | 0 | 0 |
| 126 | 250 | 1 | 1 | 4 | | 0 | 0 | 0 |
| 127 | 252 | 1 | 1 | 4 | | 0 | 0 | 0 |
| 128 | 253 | 6 | 2 | 2 | 0 | 0 | 0 | 0 |
| 129 | 254 | 1 | 1 | 4 | | 0 | 0 | 0 |
| 130 | 257 | 17 | 1 | 1 | | 2 | 10 | 8 |
| 131 | 257 | 6 | 2 | 2 | 0 | 0 | 0 | 0 |
| 132 | 259 | 1 | 1 | 2 | 1 | 0 | 0 | 0 |
| 133 | 259 | 9 | 1 | 1 | | 2 | 10 | 10 |
| 134 | 260 | 0 | 1 | 1 | | 2 | 10 | 4 |
| 135 | 261 | 3 | 1 | 1 | | 2 | 10 | 10 |
| 136 | 261 | 2 | 1 | 2 | 9 | 0 | 0 | 0 |
| 137 | 262 | 3 | 1 | 2 | 0 | 0 | 0 | 0 |
| 138 | 262 | 2 | 1 | 2 | 9 | 0 | 0 | 0 |
| 139 | 263 | 0 | 1 | 1 | | −1 | −1 | 10 |
| 140 | 264 | 6 | 1 | 5 | | 2 | 12 | 7 |
| 141 | 266 | 1 | 1 | 1 | | 2 | 10 | 10 |
| 142 | 266 | 4 | 1 | 2 | 15 | 0 | 0 | 0 |

TABLE 32A

TransferFormulas (e.g., Process[0][1][0][5]) dataset columns

| CI | Dataset Element |
|---|---|
| 0 | ColumnID |
| 1 | OperatorCode |
| 2 | SourceCode |
| 3 | Value |

TABLE 32B

TransferFormulas (e.g., Process[0][1][0][5]) dataset element values

| RI/CI | 0 | 1 | 2 | 3 |
|---|---|---|---|---|
| 0 | 26 | 1 | 2 | ASC, |
| 1 | 38 | 3 | 2 | 1 |
| 2 | 100 | 1 | 2 | [ |
| 3 | 100 | 1 | 1 | 2 |
| 4 | 100 | 1 | 2 | ].[ |
| 5 | 100 | 1 | 1 | 3 |
| 6 | 100 | 1 | 2 | ] AS [ |
| 7 | 100 | 1 | 3 | |
| 8 | 100 | 1 | 1 | 3 |
| 9 | 100 | 1 | 2 | ], |
| 10 | 101 | 1 | 2 | LEFT JOIN [ |
| 11 | 101 | 1 | 1 | 2 |
| 12 | 101 | 1 | 2 | ] AS [ |
| 13 | 101 | 1 | 1 | 0 |
| 14 | 101 | 1 | 2 | ] ON |
| 15 | 102 | 1 | 2 | [ |
| 16 | 102 | 1 | 1 | 0 |
| 17 | 102 | 1 | 2 | ].[ |
| 18 | 102 | 1 | 1 | 2 |
| 19 | 102 | 1 | 2 | ]=[ |
| 20 | 102 | 1 | 1 | 1 |
| 21 | 102 | 1 | 2 | ].[ |
| 22 | 102 | 1 | 1 | 3 |
| 23 | 102 | 1 | 2 | ] AND |
| 24 | 103 | 1 | 2 | AND |
| 25 | 103 | 1 | 2 | [ |
| 26 | 103 | 1 | 1 | 3 |
| 27 | 103 | 1 | 2 | ].[ |
| 28 | 103 | 1 | 1 | 5 |
| 29 | 103 | 1 | 2 | ] |
| 30 | 103 | 1 | 2 | = |
| 31 | 103 | 1 | 2 | ' |
| 32 | 103 | 1 | 1 | 2 |
| 33 | 103 | 1 | 2 | ' |
| 34 | 104 | 1 | 2 | [ |
| 35 | 104 | 1 | 1 | 2 |
| 36 | 104 | 1 | 2 | ].[ |
| 37 | 104 | 1 | 1 | 3 |
| 38 | 104 | 1 | 2 | ] |
| 39 | 105 | 1 | 1 | 4 |
| 40 | 105 | 1 | 1 | 0 |
| 41 | 105 | 2 | 2 | 1 |
| 42 | 105 | 1 | 1 | 5 |
| 43 | 105 | 1 | 1 | 1 |
| 44 | 105 | 1 | 1 | 2 |
| 45 | 105 | 1 | 1 | 3 |
| 46 | 105 | 2 | 2 | 1 |
| 47 | 106 | 1 | 2 | <td id= |
| 48 | 106 | 1 | 3 | |
| 49 | 106 | 1 | 2 | align= |
| 50 | 106 | 1 | 1 | 5 |
| 51 | 106 | 1 | 2 | style='width: |
| 52 | 106 | 1 | 1 | 3 |
| 53 | 106 | 1 | 2 | px;height: |
| 54 | 106 | 1 | 1 | 4 |
| 55 | 106 | 1 | 2 | px' |
| 56 | 107 | 1 | 2 | <tr> |
| 57 | 107 | 1 | 1 | 1 |
| 58 | 107 | 1 | 2 | </tr> |
| 59 | 108 | 1 | 2 | <table border=1px> |
| 60 | 108 | 1 | 1 | 1 |
| 61 | 108 | 1 | 2 | </table> |
| 62 | 144 | 1 | 2 | [ |
| 63 | 144 | 1 | 1 | 15 |
| 64 | 144 | 1 | 2 | ] AS [0] |
| 65 | 145 | 1 | 1 | 4 |
| 66 | 145 | 1 | 2 | ) |
| 67 | 146 | 1 | 2 | [0].[EntityID]= |
| 68 | 146 | 1 | 1 | 10 |
| 69 | 146 | 1 | 2 | AND [0].[Deleted]= |
| 70 | 146 | 1 | 1 | 16 |
| 71 | 146 | 1 | 2 | AND [0].[OwnerID] IN ( |
| 72 | 170 | 1 | 2 | <tr> |
| 73 | 170 | 1 | 2 | <td id= |
| 74 | 170 | 1 | 3 | |
| 75 | 170 | 1 | 2 | align= |
| 76 | 170 | 1 | 2 | Left |
| 77 | 170 | 1 | 2 | onclick="CallMethod(6, |
| 78 | 170 | 1 | 1 | 0 |
| 79 | 170 | 1 | 2 | ,")" |
| 80 | 170 | 1 | 2 | style='width: |
| 81 | 170 | 1 | 2 | 480 |
| 82 | 170 | 1 | 2 | px;height: |
| 83 | 170 | 1 | 2 | 20 |
| 84 | 170 | 1 | 2 | px; |
| 85 | 170 | 1 | 2 | '> |
| 86 | 170 | 1 | 1 | 1 |
| 87 | 170 | 1 | 2 | </td> |
| 88 | 170 | 1 | 2 | </tr> |
| 89 | 270 | 2 | 2 | 4 |
| 90 | 285 | 5 | 2 | |
| 91 | 285 | 5 | 1 | 1 |
| 92 | 287 | 1 | 2 | AND [0].RecordID IN ( |
| 93 | 287 | 1 | 1 | 6 |
| 94 | 287 | 1 | 2 | ) |
| 95 | 291 | 1 | 2 | ><input id=Input |
| 96 | 291 | 1 | 3 | |
| 97 | 291 | 1 | 2 | type='Text' value=' |
| 98 | 291 | 1 | 1 | 2 |
| 99 | 291 | 1 | 2 | ' size=35 onChange= |
| 100 | 291 | 1 | 1 | "CallMethod(15, |
| 101 | 291 | 1 | 2 | ,document.getElementById('Input |
| 102 | 291 | 1 | 3 | |
| 103 | 291 | 1 | 2 | ').value)"/></td> |
| 104 | 292 | 1 | 2 | onclick="CallMethod(5, |
| 105 | 292 | 1 | 3 | |
| 106 | 292 | 1 | 2 | ,")"> |
| 107 | 292 | 1 | 1 | 2 |
| 108 | 292 | 1 | 2 | </td> |
| 109 | 297 | 1 | 2 | INSERT INTO |
| 110 | 297 | 1 | 1 | 15 |
| 111 | 297 | 1 | 2 | ([CreateDate], [EntityID], [OwnerID] |
| 112 | 298 | 1 | 2 | ) SELECT GETDATE( ), |
| 113 | 298 | 1 | 1 | 10 |
| 114 | 298 | 1 | 2 | ,1, |
| 115 | 305 | 1 | 2 | , [ |
| 116 | 305 | 1 | 1 | 3 |
| 117 | 305 | 1 | 2 | ] = |
| 118 | 308 | 1 | 3 | |
| 119 | 310 | 1 | 2 | , [ |
| 120 | 310 | 1 | 1 | 3 |
| 121 | 310 | 1 | 2 | ] |
| 122 | 318 | 1 | 1 | 11 |
| 123 | 318 | 1 | 2 | [ |
| 124 | 318 | 1 | 1 | 12 |
| 125 | 318 | 1 | 2 | ] |
| 126 | 357 | 1 | 2 | ISNULL(RTRIM([ |
| 127 | 357 | 1 | 1 | 2 |
| 128 | 357 | 1 | 1 | 12 |
| 129 | 357 | 1 | 2 | ].[ |
| 130 | 357 | 1 | 1 | 3 |
| 131 | 357 | 1 | 2 | ]),") |
| 132 | 358 | 1 | 2 | ELSE '' END AS [ |
| 133 | 358 | 1 | 3 | |
| 134 | 358 | 1 | 1 | 3 |

TABLE 32B-continued

TransferFormulas (e.g., Process[0][1][0][5]) dataset element values

| RI/CI | 0 | 1 | 2 | 3 |
|---|---|---|---|---|
| 135 | 358 | 1 | 2 | ], |
| 136 | 359 | 1 | 2 | WHEN |
| 137 | 359 | 1 | 1 | 0 |
| 138 | 359 | 1 | 2 | THEN' |
| 139 | 359 | 1 | 1 | 1 |
| 140 | 359 | 1 | 2 | '' |
| 141 | 360 | 1 | 2 | AS [ |
| 142 | 360 | 1 | 3 | |
| 143 | 360 | 1 | 1 | 3 |
| 144 | 360 | 1 | 2 | ], |
| 145 | 361 | 1 | 2 | + '\|\|' + CASE [0].[ |
| 146 | 361 | 1 | 1 | 3 |
| 147 | 361 | 1 | 2 | ] |
| 148 | 362 | 4 | 2 | 1 |
| 149 | 363 | 4 | 2 | 3 |
| 150 | 365 | 1 | 2 | ' |
| 151 | 365 | 1 | 1 | 10 |
| 152 | 365 | 1 | 2 | ', |
| 153 | 366 | 1 | 2 | ' |
| 154 | 366 | 1 | 1 | 11 |
| 155 | 366 | 1 | 2 | ', |
| 156 | 367 | 1 | 2 | ' |
| 157 | 367 | 1 | 1 | 11 |
| 158 | 367 | 1 | 2 | ' |
| 159 | 368 | 1 | 2 | ' |
| 160 | 368 | 1 | 1 | 10 |
| 161 | 368 | 1 | 2 | ' |
| 162 | 965 | 1 | 2 | DESC, |
| 163 | 967 | 1 | 2 | + '\|\|' + ISNULL(RTRIM([ |
| 164 | 967 | 1 | 1 | 6 |
| 165 | 967 | 1 | 2 | ].[ |
| 166 | 967 | 1 | 2 | RecordID |
| 167 | 967 | 1 | 2 | ]),0) + '\|\|' + ISNULL([ |
| 168 | 967 | 1 | 1 | 6 |
| 169 | 967 | 1 | 2 | ].[ |
| 170 | 967 | 1 | 2 | Name |
| 171 | 967 | 1 | 2 | ],'') AS [ |
| 172 | 967 | 1 | 3 | |
| 173 | 967 | 1 | 1 | 3 |
| 174 | 967 | 1 | 2 | ], |
| 175 | 969 | 1 | 2 | ' |
| 176 | 969 | 1 | 1 | 11 |
| 177 | 969 | 1 | 2 | ', |
| 178 | 970 | 1 | 2 | ' |
| 179 | 970 | 1 | 1 | 11 |
| 180 | 970 | 1 | 2 | ' |
| 181 | 971 | 1 | 2 | NULL, |
| 182 | 972 | 1 | 2 | NULL |
| 183 | 1004 | 4 | 2 | 2 |
| 184 | 1006 | 1 | 2 | SELECT RTRIM ([GUID]) + '\|\|' + RTRIM([RecordID]) + '\|\|' + [Name] |
| 185 | 1007 | 1 | 2 | FROM [ |
| 186 | 1007 | 1 | 1 | 15 |
| 187 | 1007 | 1 | 2 | ] |
| 188 | 1008 | 1 | 2 | WHERE [RecordID] = |
| 189 | 1008 | 1 | 1 | 6 |
| 190 | 1008 | 1 | 2 | |
| 191 | 1011 | 4 | 2 | 1 |
| 192 | 1012 | 4 | 2 | 2 |
| 193 | 1016 | 1 | 2 | onfocus="CallMethod(56, |
| 194 | 1016 | 1 | 1 | 14 |
| 195 | 1016 | 1 | 2 | ,")" |
| 196 | 1070 | 1 | 2 | + '\|\|' + ISNULL(RTRIM([0].[GUID]),'') + '\|\|' + ISNULL([0].[Name],'') AS [0RecordID], |
| 197 | 1071 | 4 | 2 | 2 |
| 198 | 1072 | 4 | 2 | 3 |
| 199 | 1074 | 4 | 2 | 1 |
| 200 | 1123 | 1 | 2 | |
| 201 | 1123 | 1 | 1 | 1 |
| 202 | 1131 | 1 | 2 | <td id= |
| 203 | 1131 | 1 | 3 | |
| 204 | 1131 | 1 | 2 | align= |
| 205 | 1131 | 1 | 2 | Left |
| 206 | 1131 | 1 | 2 | onclick="CallMethod(6, |
| 207 | 1131 | 1 | 1 | 10 |
| 208 | 1131 | 1 | 2 | ,")" |
| 209 | 1131 | 1 | 2 | style='width: |
| 210 | 1131 | 1 | 2 | 240 |
| 211 | 1131 | 1 | 2 | px;height: |
| 212 | 1131 | 1 | 2 | 20 |
| 213 | 1131 | 1 | 2 | px; |
| 214 | 1131 | 1 | 2 | '> |
| 215 | 1132 | 1 | 1 | 10 |
| 216 | 1132 | 1 | 2 | </td> |
| 217 | 1134 | 1 | 2 | </tr> |
| 218 | 1135 | 1 | 2 | <tr> |

TABLE 33A

DatasetColumns (e.g., Process[0][1][0][6]) dataset columns

| CI | Dataset Element |
|---|---|
| 0 | DSI |
| 1 | NDSI |
| 2 | CI |
| 3 | DefaultValue |

TABLE 33B

DatasetColumns (e.g., Process[0][1][0][6]) dataset element values

| RI/CI | 0 | 1 | 2 | 3 |
|---|---|---|---|---|
| 0 | -1 | -1 | 0 | 0 |
| 1 | -1 | -1 | 1 | 0 |
| 2 | -1 | -1 | 2 | |
| 3 | -1 | -1 | 3 | 0 |
| 4 | -1 | -1 | 4 | |
| 5 | -1 | -1 | 5 | 0 |
| 6 | -1 | -1 | 6 | |
| 7 | -1 | -1 | 7 | 0 |
| 8 | -1 | -1 | 8 | |
| 9 | -1 | -1 | 9 | 0 |
| 10 | -1 | -1 | 10 | |
| 11 | -1 | -1 | 11 | |
| 12 | -1 | -1 | 12 | |
| 13 | -1 | -1 | 13 | 0 |
| 14 | -1 | -1 | 14 | 0 |
| 15 | -1 | 0 | 0 | 0 |
| 16 | -1 | 0 | 1 | 0 |
| 17 | -1 | 0 | 2 | |
| 18 | 1 | 7 | 0 | 0 |
| 19 | 1 | 7 | 1 | |
| 20 | 1 | 7 | 2 | 0 |
| 21 | 1 | 7 | 3 | 0 |
| 22 | 1 | 7 | 4 | 0 |
| 23 | 1 | 7 | 5 | 0 |
| 24 | 1 | 7 | 6 | 0 |
| 25 | 1 | 8 | 0 | 0 |
| 26 | 1 | 8 | 1 | |
| 27 | 1 | 8 | 2 | 0 |
| 28 | 1 | 8 | 3 | 0 |
| 29 | 1 | 8 | 4 | 0 |
| 30 | 1 | 8 | 5 | 0 |
| 31 | 1 | 8 | 6 | 0 |
| 32 | 1 | 8 | 7 | 0 |
| 33 | 2 | 0 | 0 | 0 |
| 34 | 2 | 0 | 1 | |
| 35 | 2 | 0 | 2 | 0 |
| 36 | 2 | 0 | 3 | |

TABLE 33B-continued

DatasetColumns (e.g., Process[0][1][0][6]) dataset element values

| RI/CI | 0 | 1 | 2 | 3 |
|---|---|---|---|---|
| 37 | 2 | 0 | 4 | |
| 38 | 2 | 0 | 5 | 0 |
| 39 | 2 | 0 | 6 | 0 |
| 40 | 2 | 0 | 7 | 0 |
| 41 | 2 | 0 | 8 | 0 |
| 42 | 2 | 1 | 0 | 0 |
| 43 | 2 | 1 | 1 | |
| 44 | 2 | 1 | 2 | |
| 45 | 2 | 1 | 3 | 0 |
| 46 | 2 | 1 | 4 | |
| 47 | 2 | 1 | 5 | |
| 48 | 2 | 1 | 6 | 0 |
| 49 | 2 | 1 | 7 | 0 |
| 50 | 2 | 1 | 8 | 0 |
| 51 | 2 | 2 | 0 | 0 |
| 52 | 2 | 2 | 1 | 0 |
| 53 | 2 | 2 | 2 | |
| 54 | 2 | 2 | 3 | 0 |
| 55 | 2 | 2 | 4 | 0 |
| 56 | 2 | 3 | 0 | 0 |
| 57 | 2 | 3 | 1 | |
| 58 | 2 | 3 | 2 | 0 |
| 59 | 2 | 3 | 3 | 0 |
| 60 | 2 | 4 | 0 | 0 |
| 61 | 2 | 4 | 1 | |
| 62 | 2 | 4 | 2 | 0 |
| 63 | 2 | 4 | 3 | 0 |
| 64 | 2 | 4 | 4 | 0 |
| 65 | 2 | 5 | 0 | 0 |
| 66 | 2 | 5 | 1 | |
| 67 | 2 | 5 | 2 | 0 |
| 68 | 2 | 5 | 3 | 0 |
| 69 | 2 | 5 | 4 | 0 |
| 70 | 2 | 5 | 5 | |
| 71 | 2 | 5 | 6 | 0 |
| 72 | 2 | 5 | 7 | 0 |
| 73 | 2 | 5 | 8 | 0 |
| 74 | 2 | 5 | 9 | 0 |
| 75 | 2 | 5 | 10 | 0 |
| 76 | 2 | 5 | 11 | 0 |
| 77 | 2 | 5 | 12 | 0 |
| 78 | 2 | 5 | 13 | 0 |
| 79 | 2 | 5 | 14 | 0 |
| 80 | 2 | 6 | 0 | 0 |
| 81 | 2 | 6 | 1 | 0 |
| 82 | 2 | 6 | 2 | 0 |
| 83 | 2 | 6 | 3 | 0 |
| 84 | 2 | 6 | 4 | |
| 85 | 2 | 6 | 5 | 0 |
| 86 | 2 | 6 | 6 | 0 |
| 87 | 2 | 7 | 0 | 0 |
| 88 | 2 | 7 | 1 | 0 |
| 89 | 2 | 7 | 2 | |
| 90 | 2 | 8 | 0 | 0 |
| 91 | 2 | 8 | 1 | 0 |
| 92 | 2 | 8 | 2 | |
| 93 | 2 | 8 | 3 | |
| 94 | 2 | 9 | 0 | 0 |
| 95 | 2 | 9 | 1 | 0 |
| 96 | 2 | 9 | 2 | |
| 97 | 2 | 9 | 3 | |
| 98 | 2 | 9 | 4 | |
| 99 | 2 | 9 | 5 | |
| 100 | 2 | 9 | 6 | |
| 101 | 2 | 9 | 7 | |
| 102 | 2 | 9 | 8 | |
| 103 | 2 | 9 | 9 | |
| 104 | 2 | 10 | 0 | 0 |
| 105 | 2 | 10 | 1 | 0 |
| 106 | 2 | 10 | 2 | 0 |
| 107 | 2 | 10 | 3 | 0 |
| 108 | 2 | 10 | 4 | 0 |
| 109 | 2 | 10 | 5 | 0 |
| 110 | 2 | 10 | 6 | |
| 111 | 2 | 10 | 7 | 0 |
| 112 | 2 | 10 | 8 | 0 |
| 113 | 2 | 10 | 9 | 0 |
| 114 | 2 | 10 | 10 | 0 |
| 115 | 2 | 10 | 11 | |
| 116 | 2 | 10 | 12 | |
| 117 | 2 | 10 | 13 | |
| 118 | 2 | 10 | 14 | |
| 119 | 2 | 10 | 15 | |
| 120 | 2 | 10 | 16 | 0 |
| 121 | 2 | 10 | 17 | 0 |
| 122 | 2 | 10 | 18 | |
| 123 | 2 | 11 | 0 | 0 |
| 124 | 2 | 11 | 1 | |
| 125 | 2 | 11 | 2 | 0 |
| 126 | 2 | 11 | 3 | |
| 127 | 2 | 11 | 4 | 0 |
| 128 | 2 | 11 | 5 | 0 |
| 129 | 2 | 11 | 6 | 0 |
| 130 | 2 | 11 | 7 | 0 |
| 131 | 2 | 11 | 8 | 0 |
| 132 | 2 | 11 | 9 | |
| 133 | 2 | 11 | 10 | |
| 134 | 2 | 11 | 11 | 0 |
| 135 | 2 | 11 | 12 | |
| 136 | 2 | 11 | 13 | |
| 137 | 2 | 11 | 14 | |
| 138 | 2 | 11 | 15 | 0 |
| 139 | 2 | 11 | 16 | 0 |
| 140 | 2 | 11 | 17 | 0 |
| 141 | 2 | 12 | 0 | 0 |
| 142 | 2 | 12 | 1 | 0 |
| 143 | 2 | 12 | 2 | |
| 144 | 2 | 12 | 3 | 0 |
| 145 | 2 | 12 | 4 | |
| 146 | 2 | 12 | 5 | |
| 147 | 2 | 12 | 6 | 0 |
| 148 | 2 | 12 | 7 | 0 |
| 149 | 2 | 12 | 8 | 0 |
| 150 | 2 | 12 | 9 | 0 |
| 151 | 2 | 13 | 0 | 0 |
| 152 | 2 | 13 | 1 | 0 |
| 153 | 2 | 13 | 2 | |
| 154 | 2 | 13 | 3 | 0 |
| 155 | 2 | 13 | 4 | 0 |
| 156 | 2 | 14 | 0 | 0 |
| 157 | 2 | 14 | 1 | 0 |
| 158 | 2 | 14 | 2 | |
| 159 | 2 | 14 | 3 | |
| 160 | 2 | 14 | 4 | 0 |
| 161 | 2 | 14 | 5 | 0 |
| 162 | 2 | 15 | 0 | 0 |
| 163 | 2 | 15 | 1 | |
| 164 | 2 | 16 | 0 | 0 |
| 165 | 2 | 16 | 1 | |
| 166 | 2 | 16 | 2 | 0 |
| 167 | 2 | 16 | 3 | 0 |
| 168 | 2 | 16 | 4 | 0 |
| 169 | 2 | 16 | 5 | 0 |
| 170 | 2 | 17 | 0 | |
| 171 | 2 | 17 | 1 | |
| 172 | 2 | 18 | 0 | 0 |
| 173 | 2 | 18 | 1 | |
| 174 | 2 | 18 | 2 | 0 |
| 175 | 2 | 19 | 0 | 0 |
| 176 | 2 | 19 | 1 | 0 |
| 177 | 2 | 19 | 2 | |
| 178 | 2 | 19 | 3 | 0 |
| 179 | 2 | 19 | 4 | 0 |
| 180 | 2 | 19 | 5 | |
| 181 | 2 | 19 | 6 | 0 |
| 182 | 2 | 19 | 7 | 0 |
| 183 | 2 | 19 | 8 | 0 |
| 184 | 2 | 19 | 9 | 0 |
| 185 | 2 | 19 | 10 | |
| 186 | 2 | 19 | 11 | 0 |
| 187 | 2 | 19 | 12 | 0 |
| 188 | 2 | 19 | 13 | 0 |

TABLE 33B-continued

DatasetColumns (e.g., Process[0][1][0][6]) dataset element values

| RI/CI | 0 | 1 | 2 | 3 |
|---|---|---|---|---|
| 189 | 2 | 19 | 14 | 0 |
| 190 | 2 | 19 | 15 | 0 |
| 191 | 2 | 19 | 16 | 0 |
| 192 | 2 | 20 | 0 | |
| 193 | 2 | 20 | 1 | |
| 194 | 2 | 20 | 2 | |
| 195 | 2 | 20 | 3 | |
| 196 | 2 | 20 | 4 | |
| 197 | 2 | 20 | 5 | |
| 198 | 2 | 21 | 0 | 0 |
| 199 | 2 | 21 | 1 | |
| 200 | 2 | 21 | 2 | 0 |
| 201 | 2 | 21 | 3 | 0 |
| 202 | 2 | 21 | 4 | 0 |
| 203 | 2 | 21 | 5 | 0 |
| 204 | 2 | 21 | 6 | 0 |
| 205 | 2 | 21 | 7 | 0 |
| 206 | 2 | 21 | 8 | 0 |
| 207 | 2 | 21 | 9 | 0 |

TABLE 34A program-defined Menus (e.g., Process[0][1][0][7]) dataset columns

| CI | Dataset Element |
|---|---|
| 0 | MenuID |
| 1 | Name |
| 2 | ParentMenuID |
| 3 | KeyCode |
| 4 | MethodID |
| 5 | ModeID |
| 6 | DisplayCode |

TABLE 34B program-defined Menus (e.g., Process[0][1][0][7]) dataset element values

| RI/CI | 0 | 1 | 2 | 3 | 4 | 5 | 6 |
|---|---|---|---|---|---|---|---|
| 0 | 1 | Menu | 0 | 0 | 3 | 1 | 3 |
| 1 | 9 | Cut | 3 | 88 | 21 | 9 | 2 |
| 2 | 10 | Copy | 3 | 67 | 21 | 10 | 2 |
| 3 | 11 | Paste | 3 | 86 | 21 | 11 | 2 |
| 4 | 12 | About | 7 | 0 | 4 | 8 | 2 |
| 5 | 8 | Exit | 2 | 0 | 20 | 0 | 0 |
| 6 | 2 | File | 1 | 0 | 3 | 1 | 3 |
| 7 | 3 | Edit | 1 | 0 | 3 | 1 | 3 |
| 8 | 4 | Cards | 1 | 0 | 3 | 2 | 3 |
| 9 | 5 | Daily | 1 | 0 | 3 | 2 | 3 |
| 10 | 6 | Windows | 1 | 0 | 3 | 12 | 3 |
| 11 | 7 | Help | 1 | 0 | 3 | 1 | 3 |

TABLE 35A program-defined Commands (e.g., Process[0][1][0][8]) dataset columns

| CI | Dataset Element |
|---|---|
| 0 | CommandID |
| 1 | Name |
| 2 | ParentMethodID |
| 3 | ParentModeID |
| 4 | KeyCode |
| 5 | MethodID |
| 6 | ModeID |
| 7 | DisplayCode |

TABLE 35B program-defined Commands (e.g., Process[0][1][0][8]) dataset element values

| RI/CI | 0 | 1 | 2 | 3 | 4 | 5 | 6 | 7 |
|---|---|---|---|---|---|---|---|---|
| 0 | 13 | Select | 3 | 1 | 13 | 6 | 1 | 3 |
| 1 | 12 | Close | 3 | 1 | 27 | 17 | 1 | 3 |
| 2 | 2 | Select | 3 | 2 | 13 | 6 | 3 | 1 |
| 3 | 1 | Close | 3 | 2 | 27 | 17 | 2 | 3 |
| 4 | 5 | New | 3 | 3 | 114 | 4 | 7 | 1 |
| 5 | 4 | Detail | 3 | 3 | 13 | 4 | 6 | 1 |
| 6 | 3 | Close | 3 | 3 | 27 | 17 | 3 | 1 |
| 7 | 23 | Select | 3 | 4 | 13 | 6 | 4 | 2 |
| 8 | 22 | Close | 3 | 4 | 27 | 17 | 4 | 2 |
| 9 | 15 | Select | 3 | 12 | 13 | 6 | 12 | 3 |
| 10 | 14 | Close | 3 | 12 | 27 | 17 | 12 | 3 |
| 11 | 24 | New | 3 | 13 | 114 | 4 | 7 | 1 |
| 12 | 19 | Select | 3 | 13 | 13 | 6 | 13 | 1 |
| 13 | 18 | Close | 3 | 13 | 27 | 17 | 13 | 1 |
| 14 | 11 | Select | 3 | 14 | 13 | 6 | 14 | 2 |
| 15 | 10 | Close | 3 | 14 | 27 | 17 | 14 | 2 |
| 16 | 21 | Select | 3 | 15 | 13 | 6 | 15 | 2 |
| 17 | 20 | Close | 3 | 15 | 27 | 17 | 15 | 2 |
| 18 | 26 | Select | 3 | 16 | 13 | 6 | 4 | 2 |
| 19 | 25 | Close | 3 | 16 | 27 | 17 | 4 | 2 |
| 20 | 7 | New | 4 | 6 | 114 | 4 | 7 | 1 |
| 21 | 17 | Delete | 4 | 6 | 115 | 19 | 6 | 1 |
| 22 | 16 | Save | 4 | 6 | 121 | 18 | 5 | 1 |
| 23 | 6 | Close | 4 | 6 | 27 | 17 | 6 | 1 |
| 24 | 9 | Save | 4 | 7 | 121 | 18 | 7 | 1 |
| 25 | 8 | Close | 4 | 7 | 27 | 17 | 7 | 1 |

In this example, the SPTPResponse has the nested program-defined Application dataset element values shown in Tables 36A-44B. In this example, the appConditions dataset in Table 42B does not contain any rows.

TABLE 36A appSessions (e.g., Process[0][2][0][0]) dataset columns

| CI | Dataset Element |
|---|---|
| 0 | DomainID |
| 1 | DomainName |
| 2 | ApplicationID |
| 3 | ApplicationName |
| 4 | OwnerIDs |
| 5 | SessionID |
| 6 | ActiveWindowIndex |
| 7 | NextWindowIndex |

TABLE 36B appSession (e.g., Process[0][2][0][0]) dataset element values

| RI/CI | 0 | 1 | 2 | 3 | 4 | 5 | 6 | 7 |
|---|---|---|---|---|---|---|---|---|
| 0 | 1 | X10DATA.COM | 1 | Platform Manager | 1 | 0 | −1 | 0 |

TABLE 37A appEntities (e.g., Process[0][2][0][1]) dataset columns

| CI | Dataset Element |
|---|---|
| 0 | EntityID |
| 1 | PluralName |
| 2 | Name |
| 3 | MenuID |
| 4 | TableName |
| 5 | ListViewID |
| 6 | DetailViewID |

TABLE 37A-continued appEntities (e.g., Process[0][2][0][1]) dataset columns

| CI | Dataset Element |
|---|---|
| 7 | FilterID |
| 8 | ParentEntityID |

TABLE 37B appEntities (e.g., Process[0][2][0][1]) dataset element values

| RI/CI | 0 | 1 | 2 | 3 | 4 | 5 | 6 | 7 | 8 |
|---|---|---|---|---|---|---|---|---|---|
| 0 | 24 | App Entities | App Entity | 0 | Relations | 110 | 186 | 4 | 20 |
| 1 | 25 | Attribute Values | Attribute Value | 0 | ListValues | 111 | 187 | 4 | 15 |
| 2 | 15 | Attributes | Attribute | 0 | Attributes | 101 | 177 | 4 | 12 |
| 3 | 5 | Dataset Columns | Dataset Column | 0 | Fields | 93 | 168 | 4 | 7 |
| 4 | 4 | Fields | Field | 0 | Fields | 92 | 167 | 4 | 6 |
| 5 | 28 | Filter Conditions | Filter Condition | 0 | Conditions | 114 | 190 | 4 | 9 |
| 6 | 9 | Filters | Filter | 0 | Views | 96 | 172 | 4 | 24 |
| 7 | 13 | Method Steps | Method Step | 0 | ProcedureSteps | 100 | 176 | 4 | 23 |
| 8 | 32 | Relation Fields | Relation Field | 0 | Relations | 117 | 193 | 4 | 31 |
| 9 | 31 | Relations | Relation | 0 | Relations | 116 | 192 | 4 | 8 |
| 10 | 29 | Transfer Columns | Transfer Column | 0 | Columns | 115 | 191 | 4 | 10 |
| 11 | 17 | Transfer Conditions | Transfer Condition | 0 | Conditions | 103 | 179 | 4 | 10 |
| 12 | 18 | Transfer Formulas | Transfer Formula | 0 | Conditions | 104 | 180 | 4 | 29 |
| 13 | 27 | View Columns | View Column | 0 | Columns | 113 | 189 | 4 | 8 |
| 14 | 16 | View Conditions | View Condition | 0 | Conditions | 102 | 178 | 4 | 27 |
| 15 | 8 | Views | View | 0 | Views | 95 | 171 | 4 | 24 |
| 16 | 20 | Applications | Application | 4 | Applications | 106 | 182 | 4 | 0 |
| 17 | 21 | Commands | Command | 4 | Commands | 107 | 183 | 4 | 0 |
| 18 | 7 | Datasets | Dataset | 4 | Tables | 94 | 170 | 4 | 0 |
| 19 | 11 | Domains | Domain | 4 | Domains | 98 | 174 | 4 | 0 |
| 20 | 12 | Entities | Entity | 4 | Entities | 99 | 175 | 4 | 6 |
| 21 | 19 | Keys | Key | 4 | Keys | 105 | 181 | 4 | 0 |
| 22 | 1 | Menus | Menu | 4 | Menus | 90 | 165 | 4 | 0 |
| 23 | 33 | Messages | Message | 4 | Messages | 118 | 194 | 4 | 0 |
| 24 | 23 | Methods | Method | 4 | Procedures | 109 | 185 | 4 | 0 |
| 25 | 26 | Modes | Mode | 4 | Modes | 112 | 188 | 4 | 0 |
| 26 | 2 | Phrases | Phrase | 4 | Phrases | 91 | 166 | 4 | 0 |
| 27 | 22 | Stored Procedures | Stored Procedure | 4 | Procedures | 108 | 184 | 4 | 0 |
| 28 | 6 | Tables | Table | 4 | Tables | 62 | 169 | 4 | 0 |
| 29 | 10 | Transfers | Transfer | 4 | Views | 97 | 173 | 4 | 0 |

TABLE 38A appKeyAttributes (e.g., Process[0][2][0][2]) dataset columns

| CI | Dataset Element |
|---|---|
| 0 | AttributeID |
| 1 | EntityID |
| 2 | FieldName |
| 3 | FieldTypeCode |
| 4 | KeyCode |

TABLE 38B appKeyAttributes (e.g., Process[0][2][0][2]) dataset element values

| RI/CI | 0 | 1 | 2 | 3 | 4 |
|---|---|---|---|---|---|
| 0 | 9 | 6 | RecordID | 7 | 1 |
| 1 | 678 | 7 | RecordID | 7 | 1 |
| 2 | 1185 | 6 | GUID | 3 | 12 |
| 3 | 1186 | 7 | GUID | 3 | 12 |
| 4 | 1 | 6 | SortOrder | 6 | 2 |
| 5 | 679 | 7 | SortOrder | 6 | 2 |
| 6 | 2 | 6 | Code | 5 | 13 |
| 7 | 680 | 7 | Code | 5 | 13 |
| 8 | 3 | 6 | Name | 5 | 14 |
| 9 | 681 | 7 | Name | 5 | 14 |
| 10 | 10 | 6 | OwnerID | 8 | 4 |
| 11 | 692 | 7 | OwnerID | 8 | 4 |
| 12 | 7 | 6 | ParentID | 3 | 15 |
| 13 | 693 | 7 | ParentID | 3 | 15 |
| 14 | 11 | 6 | CreateUserID | 3 | 6 |
| 15 | 695 | 7 | CreateUserID | 3 | 6 |
| 16 | 12 | 6 | UpdateUserID | 3 | 7 |
| 17 | 696 | 7 | UpdateUserID | 3 | 7 |
| 18 | 13 | 6 | DeleteUserID | 3 | 8 |
| 19 | 685 | 7 | DeleteUserID | 3 | 8 |
| 20 | 14 | 6 | CreateDate | 2 | 9 |
| 21 | 17 | 6 | CreateDate | 2 | 9 |
| 22 | 686 | 7 | CreateDate | 2 | 9 |

TABLE 38B-continued appKeyAttributes (e.g., Process[0][2][0][2]) dataset element values

| RI/CI | 0 | 1 | 2 | 3 | 4 |
|---|---|---|---|---|---|
| 23 | 687 | 7 | CreateDate | 2 | 9 |
| 24 | 15 | 6 | UpdateDate | 2 | 10 |
| 25 | 18 | 6 | UpdateDate | 2 | 10 |
| 26 | 688 | 7 | UpdateDate | 2 | 10 |
| 27 | 689 | 7 | UpdateDate | 2 | 10 |
| 28 | 16 | 6 | DeleteDate | 2 | 11 |
| 29 | 19 | 6 | DeleteDate | 2 | 11 |
| 30 | 684 | 7 | DeleteDate | 2 | 11 |
| 31 | 690 | 7 | DeleteDate | 2 | 11 |
| 32 | 640 | 4 | RecordID | 7 | 1 |
| 33 | 659 | 5 | RecordID | 7 | 1 |
| 34 | 1183 | 4 | GUID | 3 | 12 |
| 35 | 1184 | 5 | GUID | 3 | 12 |
| 36 | 641 | 4 | SortOrder | 6 | 2 |
| 37 | 660 | 5 | SortOrder | 6 | 2 |
| 38 | 642 | 4 | Code | 5 | 13 |
| 39 | 661 | 5 | Code | 5 | 13 |
| 40 | 643 | 4 | Name | 5 | 14 |
| 41 | 662 | 5 | Name | 5 | 14 |
| 42 | 654 | 4 | OwnerID | 8 | 4 |
| 43 | 673 | 5 | OwnerID | 8 | 4 |
| 44 | 655 | 4 | ParentID | 3 | 15 |
| 45 | 674 | 5 | ParentID | 3 | 15 |
| 46 | 657 | 4 | CreateUserID | 3 | 6 |
| 47 | 676 | 5 | CreateUserID | 3 | 6 |
| 48 | 658 | 4 | UpdateUserID | 3 | 7 |
| 49 | 677 | 5 | UpdateUserID | 3 | 7 |
| 50 | 647 | 4 | DeleteUserID | 3 | 8 |
| 51 | 666 | 5 | DeleteUserID | 3 | 8 |
| 52 | 648 | 4 | CreateDate | 2 | 9 |
| 53 | 649 | 4 | CreateDate | 2 | 9 |
| 54 | 667 | 5 | CreateDate | 2 | 9 |
| 55 | 668 | 5 | CreateDate | 2 | 9 |
| 56 | 650 | 4 | UpdateDate | 2 | 10 |
| 57 | 651 | 4 | UpdateDate | 2 | 10 |
| 58 | 669 | 5 | UpdateDate | 2 | 10 |
| 59 | 670 | 5 | UpdateDate | 2 | 10 |
| 60 | 646 | 4 | DeleteDate | 2 | 11 |
| 61 | 652 | 4 | DeleteDate | 2 | 11 |
| 62 | 665 | 5 | DeleteDate | 2 | 11 |
| 63 | 671 | 5 | DeleteDate | 2 | 11 |
| 64 | 773 | 12 | RecordID | 7 | 1 |
| 65 | 1191 | 12 | GUID | 3 | 12 |
| 66 | 774 | 12 | SortOrder | 6 | 2 |
| 67 | 775 | 12 | Code | 5 | 13 |
| 68 | 776 | 12 | Name | 5 | 14 |
| 69 | 787 | 12 | OwnerID | 8 | 4 |
| 70 | 788 | 12 | ParentID | 3 | 15 |
| 71 | 790 | 12 | CreateUserID | 3 | 6 |
| 72 | 791 | 12 | UpdateUserID | 3 | 7 |
| 73 | 780 | 12 | DeleteUserID | 3 | 8 |
| 74 | 781 | 12 | CreateDate | 2 | 9 |
| 75 | 782 | 12 | CreateDate | 2 | 9 |
| 76 | 783 | 12 | UpdateDate | 2 | 10 |
| 77 | 784 | 12 | UpdateDate | 2 | 10 |
| 78 | 779 | 12 | DeleteDate | 2 | 11 |
| 79 | 785 | 12 | DeleteDate | 2 | 11 |
| 80 | 811 | 15 | RecordID | 7 | 1 |
| 81 | 1193 | 15 | GUID | 3 | 12 |
| 82 | 812 | 15 | SortOrder | 6 | 2 |
| 83 | 813 | 15 | Code | 5 | 13 |
| 84 | 814 | 15 | Name | 5 | 14 |
| 85 | 825 | 15 | OwnerID | 8 | 4 |
| 86 | 826 | 15 | ParentID | 3 | 15 |
| 87 | 828 | 15 | CreateUserID | 3 | 6 |
| 88 | 829 | 15 | UpdateUserID | 3 | 7 |
| 89 | 818 | 15 | DeleteUserID | 3 | 8 |
| 90 | 819 | 15 | CreateDate | 2 | 9 |
| 91 | 820 | 15 | CreateDate | 2 | 9 |
| 92 | 821 | 15 | UpdateDate | 2 | 10 |
| 93 | 822 | 15 | UpdateDate | 2 | 10 |
| 94 | 817 | 15 | DeleteDate | 2 | 11 |
| 95 | 823 | 15 | DeleteDate | 2 | 11 |
| 96 | 1001 | 25 | RecordID | 7 | 1 |
| 97 | 1203 | 25 | GUID | 3 | 12 |
| 98 | 1211 | 34 | GUID | 3 | 12 |
| 99 | 1002 | 25 | SortOrder | 6 | 2 |
| 100 | 1003 | 25 | Code | 5 | 13 |
| 101 | 1004 | 25 | Name | 5 | 14 |
| 102 | 1015 | 25 | OwnerID | 8 | 4 |
| 103 | 1016 | 25 | ParentID | 3 | 15 |
| 104 | 1018 | 25 | CreateUserID | 3 | 6 |
| 105 | 1019 | 25 | UpdateUserID | 3 | 7 |
| 106 | 1008 | 25 | DeleteUserID | 3 | 8 |
| 107 | 1009 | 25 | CreateDate | 2 | 9 |
| 108 | 1010 | 25 | CreateDate | 2 | 9 |
| 109 | 1011 | 25 | UpdateDate | 2 | 10 |
| 110 | 1012 | 25 | UpdateDate | 2 | 10 |
| 111 | 1007 | 25 | DeleteDate | 2 | 11 |
| 112 | 1013 | 25 | DeleteDate | 2 | 11 |
| 113 | 944 | 22 | RecordID | 7 | 1 |
| 114 | 963 | 23 | RecordID | 7 | 1 |
| 115 | 1200 | 22 | GUID | 3 | 12 |
| 116 | 1201 | 23 | GUID | 3 | 12 |
| 117 | 964 | 23 | SortOrder | 6 | 2 |
| 118 | 946 | 22 | Code | 5 | 13 |
| 119 | 965 | 23 | Code | 5 | 13 |
| 120 | 947 | 22 | Name | 5 | 14 |
| 121 | 966 | 23 | Name | 5 | 14 |
| 122 | 958 | 22 | OwnerID | 8 | 4 |
| 123 | 977 | 23 | OwnerID | 8 | 4 |
| 124 | 978 | 23 | ParentID | 3 | 15 |
| 125 | 961 | 22 | CreateUserID | 3 | 6 |
| 126 | 980 | 23 | CreateUserID | 3 | 6 |
| 127 | 962 | 22 | UpdateUserID | 3 | 7 |
| 128 | 981 | 23 | UpdateUserID | 3 | 7 |
| 129 | 951 | 22 | DeleteUserID | 3 | 8 |
| 130 | 970 | 23 | DeleteUserID | 3 | 8 |
| 131 | 952 | 22 | CreateDate | 2 | 9 |
| 132 | 953 | 22 | CreateDate | 2 | 9 |
| 133 | 971 | 23 | CreateDate | 2 | 9 |
| 134 | 972 | 23 | CreateDate | 2 | 9 |
| 135 | 954 | 22 | UpdateDate | 2 | 10 |
| 136 | 955 | 22 | UpdateDate | 2 | 10 |
| 137 | 973 | 23 | UpdateDate | 2 | 10 |
| 138 | 974 | 23 | UpdateDate | 2 | 10 |
| 139 | 950 | 22 | DeleteDate | 2 | 11 |
| 140 | 956 | 22 | DeleteDate | 2 | 11 |
| 141 | 969 | 23 | DeleteDate | 2 | 11 |
| 142 | 975 | 23 | DeleteDate | 2 | 11 |
| 143 | 792 | 13 | RecordID | 7 | 1 |
| 144 | 1192 | 13 | GUID | 3 | 12 |
| 145 | 793 | 13 | SortOrder | 6 | 2 |
| 146 | 794 | 13 | Code | 5 | 13 |
| 147 | 806 | 13 | OwnerID | 8 | 4 |
| 148 | 807 | 13 | ParentID | 3 | 15 |
| 149 | 809 | 13 | CreateUserID | 3 | 6 |
| 150 | 810 | 13 | UpdateUserID | 3 | 7 |
| 151 | 799 | 13 | DeleteUserID | 3 | 8 |
| 152 | 800 | 13 | CreateDate | 2 | 9 |
| 153 | 801 | 13 | CreateDate | 2 | 9 |
| 154 | 802 | 13 | UpdateDate | 2 | 10 |
| 155 | 803 | 13 | UpdateDate | 2 | 10 |
| 156 | 798 | 13 | DeleteDate | 2 | 11 |
| 157 | 804 | 13 | DeleteDate | 2 | 11 |
| 158 | 1020 | 26 | RecordID | 7 | 1 |
| 159 | 1204 | 26 | GUID | 3 | 12 |
| 160 | 1021 | 26 | SortOrder | 6 | 2 |
| 161 | 1022 | 26 | Code | 5 | 13 |
| 162 | 1023 | 26 | Name | 5 | 14 |
| 163 | 1034 | 26 | OwnerID | 8 | 4 |
| 164 | 1035 | 26 | ParentID | 3 | 15 |
| 165 | 1037 | 26 | CreateUserID | 3 | 6 |
| 166 | 1038 | 26 | UpdateUserID | 3 | 7 |
| 167 | 1027 | 26 | DeleteUserID | 3 | 8 |
| 168 | 1028 | 26 | CreateDate | 2 | 9 |
| 169 | 1029 | 26 | CreateDate | 2 | 9 |
| 170 | 1030 | 26 | UpdateDate | 2 | 10 |
| 171 | 1031 | 26 | UpdateDate | 2 | 10 |
| 172 | 1026 | 26 | DeleteDate | 2 | 11 |
| 173 | 1032 | 26 | DeleteDate | 2 | 11 |
| 174 | 602 | 1 | RecordID | 7 | 1 |

TABLE 38B-continued appKeyAttributes (e.g., Process[0][2][0][2]) dataset element values

| RI/CI | 0 | 1 | 2 | 3 | 4 |
|---|---|---|---|---|---|
| 175 | 1181 | 1 | GUID | 3 | 12 |
| 176 | 603 | 1 | SortOrder | 6 | 2 |
| 177 | 604 | 1 | Code | 5 | 13 |
| 178 | 605 | 1 | Name | 5 | 14 |
| 179 | 616 | 1 | OwnerID | 8 | 4 |
| 180 | 617 | 1 | ParentID | 3 | 15 |
| 181 | 619 | 1 | CreateUserID | 3 | 6 |
| 182 | 620 | 1 | UpdateUserID | 3 | 7 |
| 183 | 609 | 1 | DeleteUserID | 3 | 8 |
| 184 | 610 | 1 | CreateDate | 2 | 9 |
| 185 | 611 | 1 | CreateDate | 2 | 9 |
| 186 | 612 | 1 | UpdateDate | 2 | 10 |
| 187 | 613 | 1 | UpdateDate | 2 | 10 |
| 188 | 608 | 1 | DeleteDate | 2 | 11 |
| 189 | 614 | 1 | DeleteDate | 2 | 11 |
| 190 | 887 | 19 | RecordID | 7 | 1 |
| 191 | 1197 | 19 | GUID | 3 | 12 |
| 192 | 888 | 19 | SortOrder | 6 | 2 |
| 193 | 889 | 19 | Code | 5 | 13 |
| 194 | 890 | 19 | Name | 5 | 14 |
| 195 | 901 | 19 | OwnerID | 8 | 4 |
| 196 | 902 | 19 | ParentID | 3 | 15 |
| 197 | 904 | 19 | CreateUserID | 3 | 6 |
| 198 | 905 | 19 | UpdateUserID | 3 | 7 |
| 199 | 894 | 19 | DeleteUserID | 3 | 8 |
| 200 | 895 | 19 | CreateDate | 2 | 9 |
| 201 | 896 | 19 | CreateDate | 2 | 9 |
| 202 | 897 | 19 | UpdateDate | 2 | 10 |
| 203 | 898 | 19 | UpdateDate | 2 | 10 |
| 204 | 893 | 19 | DeleteDate | 2 | 11 |
| 205 | 899 | 19 | DeleteDate | 2 | 11 |
| 206 | 925 | 21 | RecordID | 7 | 1 |
| 207 | 1199 | 21 | GUID | 3 | 12 |
| 208 | 926 | 21 | SortOrder | 6 | 2 |
| 209 | 927 | 21 | Code | 5 | 13 |
| 210 | 928 | 21 | Name | 5 | 14 |
| 211 | 939 | 21 | OwnerID | 8 | 4 |
| 212 | 940 | 21 | ParentID | 3 | 15 |
| 213 | 942 | 21 | CreateUserID | 3 | 6 |
| 214 | 943 | 21 | UpdateUserID | 3 | 7 |
| 215 | 932 | 21 | DeleteUserID | 3 | 8 |
| 216 | 933 | 21 | CreateDate | 2 | 9 |
| 217 | 934 | 21 | CreateDate | 2 | 9 |
| 218 | 935 | 21 | UpdateDate | 2 | 10 |
| 219 | 936 | 21 | UpdateDate | 2 | 10 |
| 220 | 931 | 21 | DeleteDate | 2 | 11 |
| 221 | 937 | 21 | DeleteDate | 2 | 11 |
| 222 | 621 | 2 | RecordID | 7 | 1 |
| 223 | 1182 | 2 | GUID | 3 | 12 |
| 224 | 622 | 2 | SortOrder | 6 | 2 |
| 225 | 623 | 2 | Code | 5 | 13 |
| 226 | 624 | 2 | Name | 5 | 14 |
| 227 | 635 | 2 | OwnerID | 8 | 4 |
| 228 | 636 | 2 | ParentID | 3 | 15 |
| 229 | 638 | 2 | CreateUserID | 3 | 6 |
| 230 | 639 | 2 | UpdateUserID | 3 | 7 |
| 231 | 628 | 2 | DeleteUserID | 3 | 8 |
| 232 | 629 | 2 | CreateDate | 2 | 9 |
| 233 | 630 | 2 | CreateDate | 2 | 9 |
| 234 | 631 | 2 | UpdateDate | 2 | 10 |
| 235 | 632 | 2 | UpdateDate | 2 | 10 |
| 236 | 627 | 2 | DeleteDate | 2 | 11 |
| 237 | 633 | 2 | DeleteDate | 2 | 11 |
| 238 | 906 | 20 | RecordID | 7 | 1 |
| 239 | 1198 | 20 | GUID | 3 | 12 |
| 240 | 907 | 20 | SortOrder | 6 | 2 |
| 241 | 908 | 20 | Code | 5 | 13 |
| 242 | 909 | 20 | Name | 5 | 14 |
| 243 | 920 | 20 | OwnerID | 8 | 4 |
| 244 | 921 | 20 | ParentID | 3 | 15 |
| 245 | 923 | 20 | CreateUserID | 3 | 6 |
| 246 | 924 | 20 | UpdateUserID | 3 | 7 |
| 247 | 913 | 20 | DeleteUserID | 3 | 8 |
| 248 | 914 | 20 | CreateDate | 2 | 9 |
| 249 | 915 | 20 | CreateDate | 2 | 9 |
| 250 | 916 | 20 | UpdateDate | 2 | 10 |
| 251 | 917 | 20 | UpdateDate | 2 | 10 |
| 252 | 912 | 20 | DeleteDate | 2 | 11 |
| 253 | 918 | 20 | DeleteDate | 2 | 11 |
| 254 | 754 | 11 | RecordID | 7 | 1 |
| 255 | 1190 | 11 | GUID | 3 | 12 |
| 256 | 755 | 11 | SortOrder | 6 | 2 |
| 257 | 756 | 11 | Code | 5 | 13 |
| 258 | 757 | 11 | Name | 5 | 14 |
| 259 | 768 | 11 | OwnerID | 8 | 4 |
| 260 | 769 | 11 | ParentID | 3 | 15 |
| 261 | 771 | 11 | CreateUserID | 3 | 6 |
| 262 | 772 | 11 | UpdateUserID | 3 | 7 |
| 263 | 761 | 11 | DeleteUserID | 3 | 8 |
| 264 | 762 | 11 | CreateDate | 2 | 9 |
| 265 | 763 | 11 | CreateDate | 2 | 9 |
| 266 | 764 | 11 | UpdateDate | 2 | 10 |
| 267 | 765 | 11 | UpdateDate | 2 | 10 |
| 268 | 760 | 11 | DeleteDate | 2 | 11 |
| 269 | 766 | 11 | DeleteDate | 2 | 11 |
| 270 | 697 | 8 | RecordID | 7 | 1 |
| 271 | 716 | 9 | RecordID | 7 | 1 |
| 272 | 735 | 10 | RecordID | 7 | 1 |
| 273 | 1187 | 8 | GUID | 3 | 12 |
| 274 | 1188 | 9 | GUID | 3 | 12 |
| 275 | 1189 | 10 | GUID | 3 | 12 |
| 276 | 698 | 8 | SortOrder | 6 | 2 |
| 277 | 717 | 9 | SortOrder | 6 | 2 |
| 278 | 736 | 10 | SortOrder | 6 | 2 |
| 279 | 699 | 8 | Code | 5 | 13 |
| 280 | 718 | 9 | Code | 5 | 13 |
| 281 | 737 | 10 | Code | 5 | 13 |
| 282 | 700 | 8 | Name | 5 | 14 |
| 283 | 719 | 9 | Name | 5 | 14 |
| 284 | 738 | 10 | Name | 5 | 14 |
| 285 | 711 | 8 | OwnerID | 8 | 4 |
| 286 | 730 | 9 | OwnerID | 8 | 4 |
| 287 | 749 | 10 | OwnerID | 8 | 4 |
| 288 | 712 | 8 | ParentID | 3 | 15 |
| 289 | 731 | 9 | ParentID | 3 | 15 |
| 290 | 750 | 10 | ParentID | 3 | 15 |
| 291 | 714 | 8 | CreateUserID | 3 | 6 |
| 292 | 733 | 9 | CreateUserID | 3 | 6 |
| 293 | 752 | 10 | CreateUserID | 3 | 6 |
| 294 | 715 | 8 | UpdateUserID | 3 | 7 |
| 295 | 734 | 9 | UpdateUserID | 3 | 7 |
| 296 | 753 | 10 | UpdateUserID | 3 | 7 |
| 297 | 704 | 8 | DeleteUserID | 3 | 8 |
| 298 | 723 | 9 | DeleteUserID | 3 | 8 |
| 299 | 742 | 10 | DeleteUserID | 3 | 8 |
| 300 | 705 | 8 | CreateDate | 2 | 9 |
| 301 | 706 | 8 | CreateDate | 2 | 9 |
| 302 | 724 | 9 | CreateDate | 2 | 9 |
| 303 | 725 | 9 | CreateDate | 2 | 9 |
| 304 | 743 | 10 | CreateDate | 2 | 9 |
| 305 | 744 | 10 | CreateDate | 2 | 9 |
| 306 | 707 | 8 | UpdateDate | 2 | 10 |
| 307 | 708 | 8 | UpdateDate | 2 | 10 |
| 308 | 726 | 9 | UpdateDate | 2 | 10 |
| 309 | 727 | 9 | UpdateDate | 2 | 10 |
| 310 | 745 | 10 | UpdateDate | 2 | 10 |
| 311 | 746 | 10 | UpdateDate | 2 | 10 |
| 312 | 703 | 8 | DeleteDate | 2 | 11 |
| 313 | 709 | 8 | DeleteDate | 2 | 11 |
| 314 | 722 | 9 | DeleteDate | 2 | 11 |
| 315 | 728 | 9 | DeleteDate | 2 | 11 |
| 316 | 741 | 10 | DeleteDate | 2 | 11 |
| 317 | 747 | 10 | DeleteDate | 2 | 11 |
| 318 | 1039 | 27 | RecordID | 7 | 1 |
| 319 | 1058 | 28 | RecordID | 7 | 1 |
| 320 | 1077 | 29 | RecordID | 7 | 1 |
| 321 | 1205 | 27 | GUID | 3 | 12 |
| 322 | 1207 | 29 | GUID | 3 | 12 |
| 323 | 1040 | 27 | SortOrder | 6 | 2 |
| 324 | 1059 | 28 | SortOrder | 6 | 2 |
| 325 | 1078 | 29 | SortOrder | 6 | 2 |
| 326 | 1041 | 27 | Code | 5 | 13 |

TABLE 38B-continued appKeyAttributes (e.g., Process[0][2][0][2]) dataset element values

| RI/CI | 0 | 1 | 2 | 3 | 4 |
|---|---|---|---|---|---|
| 327 | 1060 | 28 | Code | 5 | 13 |
| 328 | 1079 | 29 | Code | 5 | 13 |
| 329 | 1053 | 27 | OwnerID | 8 | 4 |
| 330 | 1072 | 28 | OwnerID | 8 | 4 |
| 331 | 1091 | 29 | OwnerID | 8 | 4 |
| 332 | 1054 | 27 | ParentID | 3 | 15 |
| 333 | 1073 | 28 | ParentID | 3 | 15 |
| 334 | 1092 | 29 | ParentID | 3 | 15 |
| 335 | 1056 | 27 | CreateUserID | 3 | 6 |
| 336 | 1075 | 28 | CreateUserID | 3 | 6 |
| 337 | 1094 | 29 | CreateUserID | 3 | 6 |
| 338 | 1057 | 27 | UpdateUserID | 3 | 7 |
| 339 | 1076 | 28 | UpdateUserID | 3 | 7 |
| 340 | 1095 | 29 | UpdateUserID | 3 | 7 |
| 341 | 1046 | 27 | DeleteUserID | 3 | 8 |
| 342 | 1065 | 28 | DeleteUserID | 3 | 8 |
| 343 | 1084 | 29 | DeleteUserID | 3 | 8 |
| 344 | 1047 | 27 | CreateDate | 2 | 9 |
| 345 | 1048 | 27 | CreateDate | 2 | 9 |
| 346 | 1066 | 28 | CreateDate | 2 | 9 |
| 347 | 1067 | 28 | CreateDate | 2 | 9 |
| 348 | 1085 | 29 | CreateDate | 2 | 9 |
| 349 | 1086 | 29 | CreateDate | 2 | 9 |
| 350 | 1049 | 27 | UpdateDate | 2 | 10 |
| 351 | 1050 | 27 | UpdateDate | 2 | 10 |
| 352 | 1068 | 28 | UpdateDate | 2 | 10 |
| 353 | 1069 | 28 | UpdateDate | 2 | 10 |
| 354 | 1087 | 29 | UpdateDate | 2 | 10 |
| 355 | 1088 | 29 | UpdateDate | 2 | 10 |
| 356 | 1045 | 27 | DeleteDate | 2 | 11 |
| 357 | 1051 | 27 | DeleteDate | 2 | 11 |
| 358 | 1064 | 28 | DeleteDate | 2 | 11 |
| 359 | 1070 | 28 | DeleteDate | 2 | 11 |
| 360 | 1083 | 29 | DeleteDate | 2 | 11 |
| 361 | 1089 | 29 | DeleteDate | 2 | 11 |
| 362 | 830 | 16 | RecordID | 7 | 1 |
| 363 | 849 | 17 | RecordID | 7 | 1 |
| 364 | 868 | 18 | RecordID | 7 | 1 |
| 365 | 1194 | 16 | GUID | 3 | 12 |
| 366 | 1195 | 17 | GUID | 3 | 12 |
| 367 | 1196 | 18 | GUID | 3 | 12 |
| 368 | 1206 | 28 | GUID | 3 | 12 |
| 369 | 831 | 16 | SortOrder | 6 | 2 |
| 370 | 850 | 17 | SortOrder | 6 | 2 |
| 371 | 869 | 18 | SortOrder | 6 | 2 |
| 372 | 832 | 16 | Code | 5 | 13 |
| 373 | 851 | 17 | Code | 5 | 13 |
| 374 | 870 | 18 | Code | 5 | 13 |
| 375 | 844 | 16 | OwnerID | 8 | 4 |
| 376 | 863 | 17 | OwnerID | 8 | 4 |
| 377 | 882 | 18 | OwnerID | 8 | 4 |
| 378 | 845 | 16 | ParentID | 3 | 15 |
| 379 | 864 | 17 | ParentID | 3 | 15 |
| 380 | 883 | 18 | ParentID | 3 | 15 |
| 381 | 847 | 16 | CreateUserID | 3 | 6 |
| 382 | 866 | 17 | CreateUserID | 3 | 6 |
| 383 | 885 | 18 | CreateUserID | 3 | 6 |
| 384 | 848 | 16 | UpdateUserID | 3 | 7 |
| 385 | 867 | 17 | UpdateUserID | 3 | 7 |
| 386 | 886 | 18 | UpdateUserID | 3 | 7 |
| 387 | 837 | 16 | DeleteUserID | 3 | 8 |
| 388 | 856 | 17 | DeleteUserID | 3 | 8 |
| 389 | 875 | 18 | DeleteUserID | 3 | 8 |
| 390 | 838 | 16 | CreateDate | 2 | 9 |
| 391 | 839 | 16 | CreateDate | 2 | 9 |
| 392 | 857 | 17 | CreateDate | 2 | 9 |
| 393 | 858 | 17 | CreateDate | 2 | 9 |
| 394 | 876 | 18 | CreateDate | 2 | 9 |
| 395 | 877 | 18 | CreateDate | 2 | 9 |
| 396 | 840 | 16 | UpdateDate | 2 | 10 |
| 397 | 841 | 16 | UpdateDate | 2 | 10 |
| 398 | 859 | 17 | UpdateDate | 2 | 10 |
| 399 | 860 | 17 | UpdateDate | 2 | 10 |
| 400 | 878 | 18 | UpdateDate | 2 | 10 |
| 401 | 879 | 18 | UpdateDate | 2 | 10 |
| 402 | 836 | 16 | DeleteDate | 2 | 11 |
| 403 | 842 | 16 | DeleteDate | 2 | 11 |
| 404 | 855 | 17 | DeleteDate | 2 | 11 |
| 405 | 861 | 17 | DeleteDate | 2 | 11 |
| 406 | 874 | 18 | DeleteDate | 2 | 11 |
| 407 | 880 | 18 | DeleteDate | 2 | 11 |
| 408 | 982 | 24 | RecordID | 7 | 1 |
| 409 | 1096 | 31 | RecordID | 7 | 1 |
| 410 | 1115 | 32 | RecordID | 7 | 1 |
| 411 | 1202 | 24 | GUID | 3 | 12 |
| 412 | 1208 | 31 | GUID | 3 | 12 |
| 413 | 1209 | 32 | GUID | 3 | 12 |
| 414 | 1097 | 31 | SortOrder | 6 | 2 |
| 415 | 1116 | 32 | SortOrder | 6 | 2 |
| 416 | 984 | 24 | Code | 5 | 13 |
| 417 | 1098 | 31 | Code | 5 | 13 |
| 418 | 1117 | 32 | Code | 5 | 13 |
| 419 | 996 | 24 | OwnerID | 8 | 4 |
| 420 | 1110 | 31 | OwnerID | 8 | 4 |
| 421 | 1129 | 32 | OwnerID | 8 | 4 |
| 422 | 48 | 32 | ParentID | 3 | 15 |
| 423 | 997 | 24 | ParentID | 3 | 15 |
| 424 | 1111 | 31 | ParentID | 3 | 15 |
| 425 | 999 | 24 | CreateUserID | 3 | 6 |
| 426 | 1113 | 31 | CreateUserID | 3 | 6 |
| 427 | 1132 | 32 | CreateUserID | 3 | 6 |
| 428 | 1000 | 24 | UpdateUserID | 3 | 7 |
| 429 | 1114 | 31 | UpdateUserID | 3 | 7 |
| 430 | 1133 | 32 | UpdateUserID | 3 | 7 |
| 431 | 989 | 24 | DeleteUserID | 3 | 8 |
| 432 | 1103 | 31 | DeleteUserID | 3 | 8 |
| 433 | 1122 | 32 | DeleteUserID | 3 | 8 |
| 434 | 990 | 24 | CreateDate | 2 | 9 |
| 435 | 991 | 24 | CreateDate | 2 | 9 |
| 436 | 1104 | 31 | CreateDate | 2 | 9 |
| 437 | 1105 | 31 | CreateDate | 2 | 9 |
| 438 | 1123 | 32 | CreateDate | 2 | 9 |
| 439 | 1124 | 32 | CreateDate | 2 | 9 |
| 440 | 992 | 24 | UpdateDate | 2 | 10 |
| 441 | 993 | 24 | UpdateDate | 2 | 10 |
| 442 | 1106 | 31 | UpdateDate | 2 | 10 |
| 443 | 1107 | 31 | UpdateDate | 2 | 10 |
| 444 | 1125 | 32 | UpdateDate | 2 | 10 |
| 445 | 1126 | 32 | UpdateDate | 2 | 10 |
| 446 | 988 | 24 | DeleteDate | 2 | 11 |
| 447 | 994 | 24 | DeleteDate | 2 | 11 |
| 448 | 1102 | 31 | DeleteDate | 2 | 11 |
| 449 | 1108 | 31 | DeleteDate | 2 | 11 |
| 450 | 1121 | 32 | DeleteDate | 2 | 11 |
| 451 | 1127 | 32 | DeleteDate | 2 | 11 |
| 452 | 1134 | 33 | RecordID | 7 | 1 |
| 453 | 1210 | 33 | GUID | 3 | 12 |
| 454 | 1135 | 33 | SortOrder | 6 | 2 |
| 455 | 1136 | 33 | Code | 5 | 13 |
| 456 | 1137 | 33 | Name | 5 | 14 |
| 457 | 1148 | 33 | OwnerID | 8 | 4 |
| 458 | 1149 | 33 | ParentID | 3 | 15 |
| 459 | 1151 | 33 | CreateUserID | 3 | 6 |
| 460 | 1152 | 33 | UpdateUserID | 3 | 7 |
| 461 | 1141 | 33 | DeleteUserID | 3 | 8 |
| 462 | 1142 | 33 | CreateDate | 2 | 9 |
| 463 | 1143 | 33 | CreateDate | 2 | 9 |
| 464 | 1144 | 33 | UpdateDate | 2 | 10 |
| 465 | 1145 | 33 | UpdateDate | 2 | 10 |
| 466 | 1140 | 33 | DeleteDate | 2 | 11 |
| 467 | 1146 | 33 | DeleteDate | 2 | 11 |

TABLE 39A appListValues (e.g., Process[0][2][0][3]) dataset columns

| CI | Dataset Element |
|---|---|
| 0 | Code |
| 1 | Name |
| 2 | EntityID |
| 3 | AttributeID |

TABLE 39B appListValues (e.g., Process[0][2][0][3]) dataset element values

| RI/CI | 0 | 1 | 2 | 3 |
|---|---|---|---|---|
| 0 | 1 | Text Box | 815 | 15 |
| 1 | 2 | List Box | 815 | 15 |
| 2 | 3 | Entity Box | 815 | 15 |
| 3 | 4 | Date Box | 815 | 15 |
| 4 | 5 | Time Box | 815 | 15 |
| 5 | 6 | Note Box | 815 | 15 |
| 6 | 7 | Owner Box | 815 | 15 |
| 7 | 8 | Number Box | 815 | 15 |
| 8 | 9 | Check Box | 815 | 15 |
| 9 | 1 | Column | 1081 | 29 |
| 10 | 2 | Constant | 1081 | 29 |
| 11 | 3 | Formula | 1081 | 29 |
| 12 | 4 | Parent Index | 1081 | 29 |
| 13 | 5 | Row Index | 1081 | 29 |
| 14 | 1 | Enabled | 5 | 6 |
| 15 | 2 | Disabled | 5 | 6 |
| 16 | 3 | Hidden | 5 | 6 |
| 17 | 1 | Column | 872 | 18 |
| 18 | 2 | Constant | 872 | 18 |
| 19 | 3 | Current Row | 872 | 18 |
| 20 | 1 | Enabled | 1044 | 27 |
| 21 | 2 | Disabled | 1044 | 27 |
| 22 | 3 | Hidden | 1044 | 27 |
| 23 | 1 | List | 701 | 8 |
| 24 | 2 | Detail | 701 | 8 |
| 25 | 3 | Page | 701 | 8 |
| 26 | 1 | = | 30 | 16 |
| 27 | 1 | = | 30 | 16 |
| 28 | 2 | Append | 30 | 16 |
| 29 | 2 | Trim | 30 | 16 |
| 30 | 3 | + | 30 | 16 |
| 31 | 1 | Enabled | 816 | 15 |
| 32 | 2 | Disabled | 816 | 15 |
| 33 | 3 | Hidden | 816 | 15 |
| 34 | 1 | Equals | 1224 | 28 |
| 35 | 2 | Not Equal | 1224 | 28 |
| 36 | 1 | Storage | 4 | 6 |
| 37 | 2 | User Interface | 4 | 6 |
| 38 | 3 | Process | 4 | 6 |
| 39 | 4 | Utility | 4 | 6 |
| 40 | 1 | Normal | 1024 | 26 |
| 41 | 2 | Modal | 1024 | 26 |
| 42 | 3 | Menu | 1024 | 26 |
| 43 | 1 | = | 1160 | 17 |
| 44 | 2 | Not Equal | 1160 | 17 |
| 45 | 1 | Column | 853 | 17 |
| 46 | 2 | Constant | 853 | 17 |
| 47 | 3 | To Row Index | 853 | 17 |
| 48 | 4 | Parent From Row Index | 853 | 17 |
| 49 | 5 | Parent From Row Column | 853 | 17 |
| 50 | 6 | Parent To Row Column | 853 | 17 |
| 51 | 0 | None | 1156 | 13 |
| 52 | 1 | = | 1156 | 13 |
| 53 | 2 | Not Equal | 1156 | 13 |
| 54 | 3 | Contains | 1156 | 13 |
| 55 | 1 | Attribute | 1043 | 27 |
| 56 | 2 | Constant | 1043 | 27 |
| 57 | 3 | Formula | 1043 | 27 |
| 58 | 1 | Bound | 777 | 12 |
| 59 | 2 | Unbound | 777 | 12 |
| 60 | 1 | Append | 1157 | 18 |
| 61 | 2 | Trim | 1157 | 18 |
| 62 | 3 | + | 1157 | 18 |
| 63 | 4 | Parse | 1157 | 18 |
| 64 | 5 | Insert Prefix | 1157 | 18 |
| 65 | 1 | Column | 1062 | 28 |
| 66 | 2 | Constant | 1062 | 28 |
| 67 | 1 | Fixed | 1158 | 13 |
| 68 | 2 | Variable | 1158 | 13 |
| 69 | 1 | Call Method | 796 | 13 |
| 70 | 2 | Transfer Data | 796 | 13 |
| 71 | 3 | Clear Data | 796 | 13 |
| 72 | 4 | Send/Receive | 796 | 13 |
| 73 | 1 | Error | 1138 | 33 |
| 74 | 2 | Warning | 1138 | 33 |
| 75 | 3 | Info | 1138 | 33 |
| 76 | 0 | None | 1153 | 4 |
| 77 | 1 | RecordID | 1153 | 4 |
| 78 | 12 | GUID | 1153 | 4 |
| 79 | 13 | Code | 1153 | 4 |
| 80 | 14 | Name | 1153 | 4 |
| 81 | 2 | SortOrder | 1153 | 4 |
| 82 | 3 | EntityID | 1153 | 4 |
| 83 | 4 | OwnerID | 1153 | 4 |
| 84 | 5 | Deleted | 1153 | 4 |
| 85 | 6 | CreateUserID | 1153 | 4 |
| 86 | 7 | UpdateUserID | 1153 | 4 |
| 87 | 8 | DeleteUserID | 1153 | 4 |
| 88 | 9 | CreateDate | 1153 | 4 |
| 89 | 10 | UpdateDate | 1153 | 4 |
| 90 | 11 | DeleteDate | 1153 | 4 |
| 91 | 15 | ParentID | 1153 | 4 |
| 92 | 1 | Entity | 625 | 2 |
| 93 | 2 | Attribute | 625 | 2 |
| 94 | 3 | Attribute Value | 625 | 2 |
| 95 | 4 | View | 625 | 2 |
| 96 | 5 | Command | 625 | 2 |
| 97 | 6 | Menu | 625 | 2 |
| 98 | 7 | Application | 625 | 2 |
| 99 | 8 | Message | 625 | 2 |
| 100 | 0 | None | 967 | 23 |
| 101 | 1 | Booting | 967 | 23 |
| 102 | 2 | Screen Size Change | 967 | 23 |
| 103 | 3 | Message | 967 | 23 |
| 104 | 1 | Byte | 644 | 4 |
| 105 | 2 | DateTime | 644 | 4 |
| 106 | 3 | GUID | 644 | 4 |
| 107 | 4 | Memo | 644 | 4 |
| 108 | 5 | Text | 644 | 4 |
| 109 | 6 | Single | 644 | 4 |
| 110 | 7 | Counter | 644 | 4 |
| 111 | 8 | Integer | 644 | 4 |
| 112 | 1 | Text | 663 | 5 |
| 113 | 2 | Number | 663 | 5 |
| 114 | 0 | None | 1161 | 27 |
| 115 | 1 | Ascending | 1161 | 27 |
| 116 | 2 | Descending | 1161 | 27 |
| 117 | 1 | Single Row | 682 | 7 |
| 118 | 2 | Multi Row | 682 | 7 |
| 119 | 1 | Record ID | 27 | 21 |
| 120 | 2 | Code | 27 | 21 |
| 121 | 3 | Name | 27 | 21 |
| 122 | 1 | Append | 739 | 10 |
| 123 | 2 | Update | 739 | 10 |
| 124 | 3 | Delete | 739 | 10 |
| 125 | 4 | Extract | 739 | 10 |
| 126 | 5 | Insert | 739 | 10 |
| 127 | 6 | Cross Update | 739 | 10 |
| 128 | 7 | Restore | 739 | 10 |

TABLE 40A appViews (e.g., Process[0][2][0][4]) dataset columns

| CI | Dataset Element |
|---|---|
| 0 | ViewID |
| 1 | Name |
| 2 | TypeCode |
| 3 | EntityID |
| 4 | FilterDeleted |

TABLE 40B appViews (e.g., Process[0][2][0][4]) dataset element values

| RI/CI | 0 | 1 | 2 | 3 | 4 |
|---|---|---|---|---|---|
| 0 | 90 | Summary | 8 | 1 | 0 |
| 1 | 165 | Detail | 8 | 1 | 0 |
| 2 | 102 | Summary | 8 | 16 | 0 |
| 3 | 178 | Detail | 8 | 16 | 0 |
| 4 | 100 | Summary | 8 | 13 | 0 |
| 5 | 176 | Detail | 8 | 13 | 0 |
| 6 | 115 | Summary | 8 | 29 | 0 |
| 7 | 191 | Detail | 8 | 29 | 0 |
| 8 | 109 | Summary | 8 | 23 | 0 |
| 9 | 185 | Detail | 8 | 23 | 0 |
| 10 | 107 | Summary | 8 | 21 | 0 |
| 11 | 183 | Detail | 8 | 21 | 0 |
| 12 | 96 | Summary | 8 | 9 | 0 |
| 13 | 172 | Detail | 8 | 9 | 0 |
| 14 | 116 | Summary | 8 | 31 | 0 |
| 15 | 192 | Detail | 8 | 31 | 0 |
| 16 | 111 | Summary | 8 | 25 | 0 |
| 17 | 187 | Detail | 8 | 25 | 0 |
| 18 | 119 | Summary | 8 | 34 | 0 |
| 19 | 195 | Detail | 8 | 34 | 0 |
| 20 | 108 | Summary | 8 | 22 | 0 |
| 21 | 184 | Detail | 8 | 22 | 0 |
| 22 | 112 | Summary | 8 | 26 | 0 |
| 23 | 188 | Detail | 8 | 26 | 0 |
| 24 | 99 | Summary | 8 | 12 | 0 |
| 25 | 175 | Detail | 8 | 12 | 0 |
| 26 | 113 | Summary | 8 | 27 | 0 |
| 27 | 189 | Detail | 8 | 27 | 0 |
| 28 | 92 | Summary | 8 | 4 | 0 |
| 29 | 167 | Detail | 8 | 4 | 0 |
| 30 | 98 | Summary | 8 | 11 | 0 |
| 31 | 174 | Detail | 8 | 11 | 0 |
| 32 | 91 | Summary | 8 | 2 | 0 |
| 33 | 166 | Detail | 8 | 2 | 0 |
| 34 | 93 | Summary | 8 | 5 | 0 |
| 35 | 168 | Detail | 8 | 5 | 0 |
| 36 | 104 | Summary | 8 | 18 | 0 |
| 37 | 180 | Detail | 8 | 18 | 0 |

TABLE 40B-continued appViews (e.g., Process[0][2][0][4]) dataset element values

| RI/CI | 0 | 1 | 2 | 3 | 4 |
|---|---|---|---|---|---|
| 38 | 114 | Summary | 8 | 28 | 0 |
| 39 | 190 | Detail | 8 | 28 | 0 |
| 40 | 117 | Summary | 8 | 32 | 0 |
| 41 | 193 | Detail | 8 | 32 | 0 |
| 42 | 118 | Summary | 8 | 33 | 0 |
| 43 | 194 | Detail | 8 | 33 | 0 |
| 44 | 4 | All | 9 | 0 | 0 |
| 45 | 196 | Detail | 8 | 35 | 0 |
| 46 | 197 | Detail | 8 | 36 | 0 |
| 47 | 5 | Deleted | 9 | 0 | 1 |
| 48 | 62 | Summary | 8 | 6 | 0 |
| 49 | 169 | Detail | 8 | 6 | 0 |
| 50 | 105 | Summary | 8 | 19 | 0 |
| 51 | 181 | Detail | 8 | 19 | 0 |
| 52 | 95 | Summary | 8 | 8 | 0 |
| 53 | 171 | Detail | 8 | 8 | 0 |
| 54 | 94 | Summary | 8 | 7 | 0 |
| 55 | 170 | Detail | 8 | 7 | 0 |
| 56 | 106 | Summary | 8 | 20 | 0 |
| 57 | 182 | Detail | 8 | 20 | 0 |
| 58 | 103 | Summary | 8 | 17 | 0 |
| 59 | 179 | Detail | 8 | 17 | 0 |
| 60 | 110 | Summary | 8 | 24 | 0 |
| 61 | 186 | Detail | 8 | 24 | 0 |
| 62 | 101 | Summary | 8 | 15 | 0 |
| 63 | 177 | Detail | 8 | 15 | 0 |
| 64 | 97 | Summary | 8 | 10 | 0 |
| 65 | 173 | Detail | 8 | 10 | 0 |

TABLE 41A appColumns (e.g., Process[0][2][0][5]) dataset columns

| CI | Dataset Element |
|---|---|
| 0 | ColumnID |
| 1 | Name |
| 2 | ViewID |
| 3 | PageID |
| 4 | RelationID |
| 5 | FieldName |
| 6 | FieldTypeCode |
| 7 | FieldLength |
| 8 | AttributeID |
| 9 | AttributeTypeCode |
| 10 | AttributeStatusCode |
| 11 | SortCode |
| 12 | ParentEntityID |
| 13 | EntityID |

TABLE 41B appColumns (e.g., Process[0][2][0][5]) dataset element values

| RI/CI | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | 795 | Procedure | 169 | 0 | 0 | ProcedureID | 3 | 0 | 36 | 3 | 1 | 0 | 22 | 6 |
| 1 | 797 | Name | 169 | 0 | 0 | Name | 5 | 100 | 3 | 1 | 1 | 1 | 0 | 6 |
| 2 | 798 | Type | 169 | 0 | 0 | TypeCode | 1 | 0 | 4 | 2 | 1 | 0 | 0 | 6 |
| 3 | 799 | Status | 169 | 0 | 0 | StatusCode | 1 | 0 | 5 | 2 | 1 | 0 | 0 | 6 |
| 4 | 802 | Notes | 169 | 0 | 0 | Remarks | 4 | 0 | 8 | 6 | 1 | 0 | 0 | 6 |
| 5 | 1092 | Sequence | 187 | 0 | 0 | SortOrder | 6 | 0 | 1002 | 1 | 2 | 1 | 0 | 25 |
| 6 | 872 | Code | 187 | 0 | 0 | Code | 5 | 25 | 1003 | 1 | 1 | 0 | 0 | 25 |
| 7 | 873 | Name | 187 | 0 | 0 | Name | 5 | 100 | 1004 | 1 | 1 | 1 | 0 | 25 |
| 8 | 876 | Phrase | 187 | 0 | 0 | PhraseID | 3 | 0 | 1014 | 3 | 1 | 0 | 2 | 25 |
| 9 | 877 | Attribute | 187 | 0 | 0 | ParentID | 3 | 0 | 1016 | 3 | 1 | 0 | 15 | 25 |
| 10 | 878 | Notes | 187 | 0 | 0 | Remarks | 4 | 0 | 1017 | 6 | 1 | 0 | 0 | 25 |
| 11 | 239 | Name | 106 | 0 | 0 | Name | 5 | 100 | 909 | 1 | 1 | 1 | 0 | 20 |
| 12 | 242 | Name | 109 | 0 | 0 | Name | 5 | 100 | 966 | 1 | 1 | 1 | 0 | 23 |
| 13 | 1095 | Sequence | 100 | 0 | 0 | SortOrder | 6 | 0 | 793 | 1 | 2 | 1 | 0 | 13 |
| 14 | 260 | Name | 100 | 0 | 43 | Name | 5 | 100 | 966 | 1 | 1 | 0 | 0 | 23 |

TABLE 41B-continued

| | | appColumns (e.g., Process[0][2][0][5]) dataset element values | | | | | | | | | | | |
|---|---|---|---|---|---|---|---|---|---|---|---|---|---|
| RI/CI | 0 | 1 | 2 | 3 | 4 | 5 | 6 | 7 | 8 | 9 | 10 | 11 | 12 | 13 |
| 15 | 946 | Key | 167 | 0 | 0 | KeyCode | 1 | 0 | 1153 | 2 | 1 | 0 | 0 | 4 |
| 16 | 945 | Length | 167 | 0 | 0 | Length | 1 | 0 | 35 | 8 | 1 | 0 | 0 | 4 |
| 17 | 1085 | Sequence | 167 | 0 | 0 | SortOrder | 6 | 0 | 641 | 1 | 2 | 1 | 0 | 4 |
| 18 | 948 | Name | 167 | 0 | 0 | Name | 5 | 100 | 643 | 1 | 1 | 1 | 0 | 4 |
| 19 | 949 | Type | 167 | 0 | 0 | TypeCode | 1 | 0 | 644 | 2 | 1 | 0 | 0 | 4 |
| 20 | 952 | Table | 167 | 0 | 0 | ParentID | 3 | 0 | 655 | 3 | 1 | 0 | 6 | 4 |
| 21 | 953 | Notes | 167 | 0 | 0 | Remarks | 4 | 0 | 656 | 6 | 1 | 0 | 0 | 4 |
| 22 | 232 | Name | 99 | 0 | 0 | Name | 5 | 100 | 776 | 1 | 1 | 1 | 0 | 12 |
| 23 | 256 | Name | 99 | 0 | 39 | Name | 5 | 100 | 3 | 1 | 1 | 0 | 0 | 6 |
| 24 | 541 | Operator | 180 | 0 | 0 | OperatorCode | 1 | 0 | 1157 | 2 | 1 | 0 | 0 | 18 |
| 25 | 1111 | Sequence | 180 | 0 | 0 | SortOrder | 6 | 0 | 869 | 1 | 2 | 1 | 0 | 18 |
| 26 | 544 | Type | 180 | 0 | 0 | TypeCode | 1 | 0 | 872 | 2 | 1 | 0 | 0 | 18 |
| 27 | 547 | Transfer Column | 180 | 0 | 0 | ParentID | 3 | 0 | 883 | 3 | 1 | 0 | 29 | 18 |
| 28 | 548 | Notes | 180 | 0 | 0 | Remarks | 4 | 0 | 884 | 6 | 1 | 0 | 0 | 18 |
| 29 | 1086 | Sequence | 168 | 0 | 0 | SortOrder | 6 | 0 | 660 | 1 | 2 | 1 | 0 | 5 |
| 30 | 427 | Name | 168 | 0 | 0 | Name | 5 | 100 | 662 | 1 | 1 | 1 | 0 | 5 |
| 31 | 428 | Type | 168 | 0 | 0 | TypeCode | 1 | 0 | 663 | 2 | 1 | 0 | 0 | 5 |
| 32 | 431 | Dataset | 168 | 0 | 0 | ParentID | 3 | 0 | 674 | 3 | 1 | 0 | 7 | 5 |
| 33 | 432 | Notes | 168 | 0 | 0 | Remarks | 4 | 0 | 675 | 6 | 1 | 0 | 0 | 5 |
| 34 | 1174 | Default Value | 168 | 0 | 0 | DefaultValue | 5 | 2 | 1228 | 1 | 1 | 1 | 0 | 5 |
| 35 | 234 | Name | 101 | 0 | 0 | Name | 5 | 100 | 814 | 1 | 1 | 1 | 0 | 15 |
| 36 | 253 | Name | 101 | 0 | 36 | Name | 5 | 100 | 776 | 1 | 1 | 0 | 0 | 12 |
| 37 | 229 | Name | 96 | 0 | 0 | Name | 5 | 100 | 719 | 1 | 1 | 1 | 0 | 9 |
| 38 | 258 | Name | 96 | 0 | 41 | Name | 5 | 100 | 909 | 1 | 1 | 0 | 0 | 20 |
| 39 | 1104 | Sequence | 191 | 0 | 0 | SortOrder | 6 | 0 | 1078 | 1 | 2 | 1 | 0 | 29 |
| 40 | 653 | Type | 191 | 0 | 0 | TypeCode | 1 | 0 | 1081 | 2 | 1 | 0 | 0 | 29 |
| 41 | 656 | Transfer | 191 | 0 | 0 | ParentID | 3 | 0 | 1092 | 3 | 1 | 0 | 10 | 29 |
| 42 | 657 | Notes | 191 | 0 | 0 | Remarks | 4 | 0 | 1093 | 6 | 1 | 0 | 0 | 29 |
| 43 | 1181 | Source Column | 191 | 0 | 0 | FromObjectID | 3 | 0 | 1225 | 3 | 1 | 1 | 5 | 29 |
| 44 | 1182 | Source Value | 191 | 0 | 0 | SourceValue | 4 | 0 | 1227 | 1 | 1 | 1 | 0 | 29 |
| 45 | 1183 | To Column | 191 | 0 | 0 | ToObjectID | 3 | 0 | 1226 | 3 | 1 | 1 | 5 | 29 |
| 46 | 910 | Name | 182 | 0 | 0 | Name | 5 | 100 | 909 | 1 | 1 | 1 | 0 | 20 |
| 47 | 913 | Phrase | 182 | 0 | 0 | PhraseID | 3 | 0 | 919 | 3 | 1 | 0 | 2 | 20 |
| 48 | 915 | Notes | 182 | 0 | 0 | Remarks | 4 | 0 | 922 | 6 | 1 | 0 | 0 | 20 |
| 49 | 228 | Name | 95 | 0 | 0 | Name | 5 | 100 | 700 | 1 | 1 | 1 | 0 | 8 |
| 50 | 371 | Child Field | 193 | 0 | 0 | ChildID | 3 | 0 | 50 | 3 | 1 | 0 | 4 | 32 |
| 51 | 1118 | Sequence | 193 | 0 | 0 | SortOrder | 6 | 0 | 1116 | 1 | 2 | 1 | 0 | 32 |
| 52 | 369 | Relation | 193 | 0 | 0 | ParentID | 3 | 0 | 48 | 3 | 1 | 0 | 31 | 32 |
| 53 | 377 | Parent Field | 193 | 0 | 0 | ParentObjectID | 3 | 0 | 1130 | 3 | 1 | 0 | 4 | 32 |
| 54 | 378 | Notes | 193 | 0 | 0 | Remarks | 4 | 0 | 1131 | 6 | 1 | 0 | 0 | 32 |
| 55 | 1197 | Code | 118 | 0 | 0 | Code | 5 | 25 | 1136 | 1 | 1 | 1 | 0 | 33 |
| 56 | 251 | Name | 118 | 0 | 0 | Name | 5 | 100 | 1137 | 1 | 1 | 1 | 0 | 33 |
| 57 | 1109 | Sequence | 178 | 0 | 0 | SortOrder | 6 | 0 | 831 | 1 | 2 | 1 | 0 | 16 |
| 58 | 674 | View Column | 178 | 0 | 0 | ParentID | 3 | 0 | 845 | 3 | 1 | 0 | 27 | 16 |
| 59 | 675 | Notes | 178 | 0 | 0 | Remarks | 4 | 0 | 846 | 6 | 1 | 0 | 0 | 16 |
| 60 | 690 | Display Attribute | 178 | 0 | 0 | SourceObjectID | 3 | 0 | 29 | 3 | 1 | 0 | 15 | 16 |
| 61 | 691 | Operator | 178 | 0 | 0 | OperatorCode | 1 | 0 | 30 | 2 | 1 | 0 | 0 | 16 |
| 62 | 693 | Value | 178 | 0 | 0 | Value | 5 | 100 | 32 | 1 | 1 | 0 | 0 | 16 |
| 63 | 230 | Name | 97 | 0 | 0 | Name | 5 | 100 | 738 | 1 | 1 | 1 | 0 | 10 |
| 64 | 445 | Name | 185 | 0 | 0 | Name | 5 | 100 | 966 | 1 | 1 | 1 | 0 | 23 |
| 65 | 446 | Type | 185 | 0 | 0 | TypeCode | 1 | 0 | 967 | 2 | 1 | 0 | 0 | 23 |
| 66 | 450 | Notes | 185 | 0 | 0 | Remarks | 4 | 0 | 979 | 6 | 1 | 0 | 0 | 23 |
| 67 | 1083 | Sequence | 92 | 0 | 0 | SortOrder | 6 | 0 | 641 | 1 | 2 | 1 | 0 | 4 |
| 68 | 225 | Name | 92 | 0 | 0 | Name | 5 | 100 | 643 | 1 | 1 | 1 | 0 | 4 |
| 69 | 257 | Name | 92 | 0 | 40 | Name | 5 | 100 | 3 | 1 | 1 | 0 | 0 | 6 |
| 70 | 1112 | Sequence | 190 | 0 | 0 | SortOrder | 6 | 0 | 1059 | 1 | 2 | 1 | 0 | 28 |
| 71 | 413 | Filter | 190 | 0 | 0 | ParentID | 3 | 0 | 1073 | 3 | 1 | 0 | 9 | 28 |
| 72 | 414 | Notes | 190 | 0 | 0 | Remarks | 4 | 0 | 1074 | 6 | 1 | 0 | 0 | 28 |
| 73 | 775 | Object Source | 176 | 0 | 0 | ActionSourceCode | 1 | 0 | 1158 | 2 | 1 | 0 | 0 | 13 |
| 74 | 774 | Operator | 176 | 0 | 0 | ConditionOperatorCode | 1 | 0 | 1156 | 2 | 1 | 0 | 0 | 13 |
| 75 | 1078 | Action Method | 176 | 0 | 0 | ActionObjectID | 3 | 0 | 1214 | 3 | 1 | 0 | 23 | 13 |
| 76 | 1079 | Action Transfer | 176 | 0 | 0 | ActionObjectID | 3 | 0 | 1215 | 3 | 1 | 0 | 10 | 13 |
| 77 | 1080 | Action Dataset | 176 | 0 | 0 | ActionObjectID | 3 | 0 | 1216 | 3 | 1 | 0 | 7 | 13 |
| 78 | 1081 | Condition Column | 176 | 0 | 0 | ConditionObjectID | 3 | 0 | 1217 | 3 | 1 | 0 | 5 | 13 |

TABLE 41B-continued appColumns (e.g., Process[0][2][0][5]) dataset element values

| RI/CI | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 79 | 1082 | Condition Value | 176 | 0 | 0 | ConditionValue | 5 | 50 | 1218 | 1 | 1 | 0 | 0 | 13 |
| 80 | 1096 | Sequence | 176 | 0 | 0 | SortOrder | 6 | 0 | 793 | 1 | 2 | 1 | 0 | 13 |
| 81 | 778 | Type | 176 | 0 | 0 | TypeCode | 1 | 0 | 796 | 2 | 1 | 0 | 0 | 13 |
| 82 | 781 | Method | 176 | 0 | 0 | ParentID | 3 | 0 | 807 | 3 | 1 | 0 | 23 | 13 |
| 83 | 782 | Notes | 176 | 0 | 0 | Remarks | 4 | 0 | 808 | 6 | 1 | 0 | 0 | 13 |
| 84 | 794 | Else Condition | 176 | 0 | 0 | ElseCondition | 1 | 0 | 1159 | 9 | 1 | 0 | 0 | 13 |
| 85 | 231 | Name | 98 | 0 | 0 | Name | 5 | 100 | 757 | 1 | 1 | 1 | 0 | 11 |
| 86 | 1 | Name | 1 | 0 | 0 | Name | 5 | 100 | 3 | 1 | 1 | 1 | 0 | 6 |
| 87 | 2 | Type | 1 | 0 | 0 | TypeCode | 1 | 0 | 4 | 2 | 1 | 0 | 0 | 6 |
| 88 | 1196 | Code | 194 | 0 | 0 | Code | 5 | 25 | 1136 | 1 | 1 | 0 | 0 | 33 |
| 89 | 391 | Name | 194 | 0 | 0 | Name | 5 | 100 | 1137 | 1 | 1 | 1 | 0 | 33 |
| 90 | 392 | Type | 194 | 0 | 0 | TypeCode | 1 | 0 | 1138 | 2 | 1 | 0 | 0 | 33 |
| 91 | 394 | Phrase | 194 | 0 | 0 | PhraseID | 3 | 0 | 1147 | 3 | 1 | 0 | 2 | 33 |
| 92 | 396 | Notes | 194 | 0 | 0 | Remarks | 4 | 0 | 1150 | 6 | 1 | 0 | 0 | 33 |
| 93 | 5 | Name | 3 | 0 | 0 | Name | 5 | 100 | 3 | 1 | 1 | 1 | 0 | 6 |
| 94 | 220 | Name | 62 | 0 | 0 | Name | 5 | 100 | 3 | 1 | 1 | 1 | 0 | 6 |
| 95 | 1114 | Sequence | 116 | 0 | 0 | SortOrder | 6 | 0 | 1097 | 1 | 2 | 1 | 0 | 31 |
| 96 | 261 | Name | 116 | 0 | 44 | Name | 5 | 100 | 700 | 1 | 1 | 0 | 0 | 8 |
| 97 | 3 | Name | 2 | 0 | 0 | Name | 5 | 100 | 3 | 1 | 1 | 1 | 0 | 6 |
| 98 | 4 | Notes | 2 | 0 | 0 | Remarks | 4 | 0 | 8 | 6 | 1 | 0 | 0 | 6 |
| 99 | 890 | PluralName | 166 | 0 | 0 | PluralName | 5 | 100 | 41 | 1 | 1 | 0 | 0 | 2 |
| 100 | 892 | Name | 166 | 0 | 0 | Name | 5 | 100 | 624 | 1 | 1 | 1 | 0 | 2 |
| 101 | 897 | Notes | 166 | 0 | 0 | Remarks | 4 | 0 | 637 | 6 | 1 | 0 | 0 | 2 |
| 102 | 1108 | Sequence | 114 | 0 | 0 | SortOrder | 6 | 0 | 1059 | 1 | 2 | 1 | 0 | 28 |
| 103 | 259 | Name | 114 | 0 | 42 | Name | 5 | 100 | 719 | 1 | 1 | 0 | 0 | 9 |
| 104 | 240 | Name | 107 | 0 | 0 | Name | 5 | 100 | 928 | 1 | 1 | 1 | 0 | 21 |
| 105 | 753 | Parent Relation | 192 | 0 | 0 | ParentObjectID | 3 | 0 | 45 | 3 | 1 | 0 | 31 | 31 |
| 106 | 755 | Table | 192 | 0 | 0 | ChildID | 3 | 0 | 47 | 3 | 1 | 0 | 6 | 31 |
| 107 | 1117 | Sequence | 192 | 0 | 0 | SortOrder | 6 | 0 | 1097 | 1 | 2 | 1 | 0 | 31 |
| 108 | 761 | View | 192 | 0 | 0 | ParentID | 3 | 0 | 1111 | 3 | 1 | 0 | 8 | 31 |
| 109 | 762 | Notes | 192 | 0 | 0 | Remarks | 4 | 0 | 1112 | 6 | 1 | 0 | 0 | 31 |
| 110 | 245 | Name | 112 | 0 | 0 | Name | 5 | 100 | 1023 | 1 | 1 | 1 | 0 | 26 |
| 111 | 634 | Name | 181 | 0 | 0 | Name | 5 | 100 | 890 | 1 | 1 | 1 | 0 | 19 |
| 112 | 639 | Notes | 181 | 0 | 0 | Remarks | 4 | 0 | 903 | 6 | 1 | 0 | 0 | 19 |
| 113 | 223 | Name | 90 | 0 | 0 | Name | 5 | 100 | 605 | 1 | 1 | 1 | 0 | 1 |
| 114 | 1107 | Sequence | 104 | 0 | 0 | SortOrder | 6 | 0 | 869 | 1 | 2 | 1 | 0 | 18 |
| 115 | 1084 | Sequence | 93 | 0 | 0 | SortOrder | 6 | 0 | 660 | 1 | 2 | 1 | 0 | 5 |
| 116 | 226 | Name | 93 | 0 | 0 | Name | 5 | 100 | 662 | 1 | 1 | 1 | 0 | 5 |
| 117 | 255 | Name | 93 | 0 | 38 | Name | 5 | 100 | 681 | 1 | 1 | 0 | 0 | 7 |
| 118 | 1103 | Sequence | 189 | 0 | 0 | SortOrder | 6 | 0 | 1040 | 1 | 2 | 1 | 0 | 27 |
| 119 | 1191 | Type | 189 | 0 | 0 | TypeCode | 1 | 0 | 1043 | 2 | 1 | 0 | 0 | 27 |
| 120 | 1192 | Status | 189 | 0 | 0 | StatusCode | 1 | 0 | 1044 | 2 | 1 | 0 | 0 | 27 |
| 121 | 1190 | Source Attribute | 189 | 0 | 0 | FromObjectID | 3 | 0 | 1220 | 3 | 1 | 0 | 15 | 27 |
| 122 | 1194 | Relation | 189 | 0 | 0 | RelationID | 3 | 0 | 1222 | 3 | 1 | 0 | 31 | 27 |
| 123 | 601 | View | 189 | 0 | 0 | ParentID | 3 | 0 | 1054 | 3 | 1 | 0 | 8 | 27 |
| 124 | 602 | Notes | 189 | 0 | 0 | Remarks | 4 | 0 | 1055 | 6 | 1 | 0 | 0 | 27 |
| 125 | 614 | Sortation | 189 | 0 | 0 | SortCode | 1 | 0 | 1161 | 2 | 1 | 0 | 0 | 27 |
| 126 | 1091 | Sequence | 111 | 0 | 0 | SortOrder | 6 | 0 | 1002 | 1 | 2 | 1 | 0 | 25 |
| 127 | 244 | Name | 111 | 0 | 0 | Name | 5 | 100 | 1004 | 1 | 1 | 1 | 0 | 25 |
| 128 | 254 | Name | 111 | 0 | 37 | Name | 5 | 100 | 814 | 1 | 1 | 0 | 0 | 15 |
| 129 | 715 | Name | 175 | 0 | 0 | Name | 5 | 100 | 776 | 1 | 1 | 1 | 0 | 12 |
| 130 | 1169 | Type | 175 | 0 | 0 | TypeCode | 1 | 0 | 777 | 2 | 1 | 0 | 0 | 12 |
| 131 | 719 | Table | 175 | 0 | 0 | ParentID | 3 | 0 | 788 | 3 | 1 | 0 | 6 | 12 |
| 132 | 713 | Menu | 175 | 0 | 0 | MenuID | 3 | 0 | 34 | 3 | 1 | 0 | 1 | 12 |
| 133 | 1167 | Parent Entity | 175 | 0 | 0 | ParentEntityID | 3 | 0 | 1219 | 3 | 1 | 0 | 12 | 12 |
| 134 | 718 | Phrase | 175 | 0 | 0 | PhraseID | 3 | 0 | 786 | 3 | 1 | 0 | 2 | 12 |
| 135 | 720 | Notes | 175 | 0 | 0 | Remarks | 4 | 0 | 789 | 6 | 1 | 0 | 0 | 12 |
| 136 | 486 | Name | 173 | 0 | 0 | Name | 5 | 100 | 738 | 1 | 1 | 1 | 0 | 10 |
| 137 | 487 | Type | 173 | 0 | 0 | TypeCode | 1 | 0 | 739 | 2 | 1 | 0 | 0 | 10 |
| 138 | 1178 | Dataset Column | 173 | 0 | 0 | SubObjectID | 3 | 0 | 1240 | 3 | 1 | 1 | 5 | 10 |
| 139 | 491 | Notes | 173 | 0 | 0 | Remarks | 4 | 0 | 751 | 6 | 1 | 0 | 0 | 10 |
| 140 | 1179 | From Dataset | 173 | 0 | 0 | FromObjectID | 3 | 0 | 1237 | 3 | 1 | 1 | 7 | 10 |
| 141 | 1180 | To Dataset | 173 | 0 | 0 | ToObjectID | 3 | 0 | 1238 | 3 | 1 | 1 | 7 | 10 |
| 142 | 466 | Key | 183 | 0 | 0 | KeyID | 3 | 0 | 27 | 3 | 1 | 0 | 19 | 21 |
| 143 | 462 | Method | 183 | 0 | 0 | MethodID | 3 | 0 | 23 | 3 | 1 | 0 | 23 | 21 |
| 144 | 463 | Mode | 183 | 0 | 0 | ModeID | 3 | 0 | 24 | 3 | 1 | 0 | 26 | 21 |
| 145 | 464 | Parent Method | 183 | 0 | 0 | ParentMethodID | 3 | 0 | 25 | 3 | 1 | 0 | 23 | 21 |
| 146 | 465 | Parent Mode | 183 | 0 | 0 | ParentModeID | 3 | 0 | 26 | 3 | 1 | 0 | 26 | 21 |
| 147 | 468 | Name | 183 | 0 | 0 | Name | 5 | 100 | 928 | 1 | 1 | 1 | 0 | 21 |

TABLE 41B-continued

| | | appColumns (e.g., Process[0][2][0][5]) dataset element values | | | | | | | | | | | |
|---|---|---|---|---|---|---|---|---|---|---|---|---|---|
| RI/CI | 0 | 1 | 2 | 3 | 4 | 5 | 6 | 7 | 8 | 9 | 10 | 11 | 12 | 13 |
| 148 | 471 | Phrase | 183 | 0 | 0 | PhraseID | 3 | 0 | 938 | 3 | 1 | 0 | 2 | 21 |
| 149 | 473 | Notes | 183 | 0 | 0 | Remarks | 4 | 0 | 941 | 6 | 1 | 0 | 0 | 21 |
| 150 | 224 | Name | 91 | 0 | 0 | Name | 5 | 100 | 624 | 1 | 1 | 1 | 0 | 2 |
| 151 | 928 | Name | 172 | 0 | 0 | Name | 5 | 100 | 719 | 1 | 1 | 1 | 0 | 9 |
| 152 | 932 | Application | 172 | 0 | 0 | ParentID | 3 | 0 | 731 | 3 | 1 | 0 | 24 | 9 |
| 153 | 933 | Notes | 172 | 0 | 0 | Remarks | 4 | 0 | 732 | 6 | 1 | 0 | 0 | 9 |
| 154 | 1175 | Filter Deleted | 172 | 0 | 0 | FilterDeleted | 1 | 0 | 1239 | 9 | 1 | 1 | 0 | 9 |
| 155 | 694 | Guest Application | 174 | 0 | 0 | BootApplicationID | 3 | 0 | 40 | 3 | 1 | 0 | 20 | 11 |
| 156 | 696 | Name | 174 | 0 | 0 | Name | 5 | 100 | 757 | 1 | 1 | 1 | 0 | 11 |
| 157 | 701 | Notes | 174 | 0 | 0 | Remarks | 4 | 0 | 770 | 6 | 1 | 0 | 0 | 11 |
| 158 | 1102 | Sequence | 115 | 0 | 0 | SortOrder | 6 | 0 | 1078 | 1 | 2 | 1 | 0 | 29 |
| 159 | 264 | Name | 115 | 0 | 47 | Name | 5 | 100 | 738 | 1 | 1 | 0 | 0 | 10 |
| 160 | 227 | Name | 94 | 0 | 0 | Name | 5 | 100 | 681 | 1 | 1 | 1 | 0 | 7 |
| 161 | 522 | Entity | 186 | 0 | 0 | ChildID | 3 | 0 | 20 | 3 | 1 | 0 | 12 | 24 |
| 162 | 528 | Application | 186 | 0 | 0 | ParentID | 3 | 0 | 997 | 3 | 1 | 0 | 20 | 24 |
| 163 | 1171 | Detail View | 186 | 0 | 0 | DetailViewID | 3 | 0 | 1232 | 3 | 1 | 1 | 8 | 24 |
| 164 | 529 | Notes | 186 | 0 | 0 | Remarks | 4 | 0 | 998 | 6 | 1 | 0 | 0 | 24 |
| 165 | 1172 | List Filter | 186 | 0 | 0 | FilterID | 3 | 0 | 1233 | 3 | 1 | 1 | 8 | 24 |
| 166 | 1173 | List View | 186 | 0 | 0 | ListViewID | 3 | 0 | 1231 | 3 | 1 | 1 | 8 | 24 |
| 167 | 855 | Name | 188 | 0 | 0 | Name | 5 | 100 | 1023 | 1 | 1 | 1 | 0 | 26 |
| 168 | 856 | Type | 188 | 0 | 0 | TypeCode | 1 | 0 | 1024 | 2 | 1 | 0 | 0 | 26 |
| 169 | 860 | Notes | 188 | 0 | 0 | Remarks | 4 | 0 | 1036 | 6 | 1 | 0 | 0 | 26 |
| 170 | 833 | Source Entity | 171 | 0 | 0 | FromObjectID | 3 | 0 | 42 | 3 | 1 | 0 | 12 | 8 |
| 171 | 836 | Name | 171 | 0 | 0 | Name | 5 | 100 | 700 | 1 | 1 | 1 | 0 | 8 |
| 172 | 1195 | Type | 171 | 0 | 0 | TypeCode | 1 | 0 | 701 | 2 | 1 | 0 | 0 | 8 |
| 173 | 839 | Phrase | 171 | 0 | 0 | PhraseID | 3 | 0 | 710 | 3 | 1 | 0 | 2 | 8 |
| 174 | 840 | Application | 171 | 0 | 0 | ParentID | 3 | 0 | 712 | 3 | 1 | 0 | 24 | 8 |
| 175 | 841 | Notes | 171 | 0 | 0 | Remarks | 4 | 0 | 713 | 6 | 1 | 0 | 0 | 8 |
| 176 | 238 | Name | 105 | 0 | 0 | Name | 5 | 100 | 890 | 1 | 1 | 1 | 0 | 19 |
| 177 | 1106 | Sequence | 103 | 0 | 0 | SortOrder | 6 | 0 | 850 | 1 | 2 | 1 | 0 | 17 |
| 178 | 265 | Name | 103 | 0 | 48 | Name | 5 | 100 | 738 | 1 | 1 | 0 | 0 | 10 |
| 179 | 1101 | Sequence | 113 | 0 | 0 | SortOrder | 6 | 0 | 1040 | 1 | 2 | 1 | 0 | 27 |
| 180 | 268 | Name | 113 | 0 | 51 | Name | 5 | 100 | 700 | 1 | 1 | 0 | 0 | 8 |
| 181 | 1193 | Name | 113 | 0 | 73 | Name | 5 | 100 | 814 | 1 | 1 | 0 | 0 | 15 |
| 182 | 241 | Name | 108 | 0 | 0 | Name | 5 | 100 | 947 | 1 | 1 | 1 | 0 | 22 |
| 183 | 252 | Name | 110 | 0 | 35 | Name | 5 | 100 | 909 | 1 | 1 | 1 | 0 | 20 |
| 184 | 1189 | Name | 110 | 0 | 71 | Name | 5 | 100 | 776 | 1 | 1 | 1 | 0 | 12 |
| 185 | 1105 | Sequence | 102 | 0 | 0 | SortOrder | 6 | 0 | 831 | 1 | 2 | 1 | 0 | 16 |
| 186 | 733 | Key | 165 | 0 | 0 | KeyID | 3 | 0 | 38 | 3 | 1 | 0 | 19 | 1 |
| 187 | 734 | Method | 165 | 0 | 0 | MethodID | 3 | 0 | 39 | 3 | 1 | 0 | 23 | 1 |
| 188 | 732 | Mode | 165 | 0 | 0 | ModeID | 3 | 0 | 37 | 3 | 1 | 0 | 26 | 1 |
| 189 | 736 | Name | 165 | 0 | 0 | Name | 5 | 100 | 605 | 1 | 1 | 1 | 0 | 1 |
| 190 | 739 | Phrase | 165 | 0 | 0 | PhraseID | 3 | 0 | 615 | 3 | 1 | 0 | 2 | 1 |
| 191 | 741 | Notes | 165 | 0 | 0 | Remarks | 4 | 0 | 618 | 6 | 1 | 0 | 0 | 1 |
| 192 | 503 | Field | 177 | 0 | 0 | FieldID | 3 | 0 | 33 | 3 | 1 | 0 | 4 | 15 |
| 193 | 505 | Name | 177 | 0 | 0 | Name | 5 | 100 | 814 | 1 | 1 | 1 | 0 | 15 |
| 194 | 506 | Type | 177 | 0 | 0 | TypeCode | 1 | 0 | 815 | 2 | 1 | 0 | 0 | 15 |
| 195 | 507 | Status | 177 | 0 | 0 | StatusCode | 1 | 0 | 816 | 2 | 1 | 0 | 0 | 15 |
| 196 | 508 | Phrase | 177 | 0 | 0 | PhraseID | 3 | 0 | 824 | 3 | 1 | 0 | 2 | 15 |
| 197 | 509 | Entity | 177 | 0 | 0 | ParentID | 3 | 0 | 826 | 3 | 1 | 0 | 12 | 15 |
| 198 | 510 | Notes | 177 | 0 | 0 | Remarks | 4 | 0 | 827 | 6 | 1 | 0 | 0 | 15 |
| 199 | 1170 | Parent Entity | 177 | 0 | 0 | ParentEntityID | 3 | 0 | 1221 | 3 | 1 | 0 | 12 | 15 |
| 200 | 1115 | Sequence | 117 | 0 | 0 | SortOrder | 6 | 0 | 1116 | 1 | 2 | 1 | 0 | 32 |
| 201 | 579 | Name | 170 | 0 | 0 | Name | 5 | 100 | 681 | 1 | 1 | 1 | 0 | 7 |
| 202 | 580 | Type | 170 | 0 | 0 | TypeCode | 1 | 0 | 682 | 2 | 1 | 0 | 0 | 7 |
| 203 | 1187 | Stored Procedure | 170 | 0 | 0 | ProcedureID | 3 | 0 | 1241 | 3 | 1 | 0 | 22 | 7 |
| 204 | 584 | Notes | 170 | 0 | 0 | Remarks | 4 | 0 | 694 | 6 | 1 | 0 | 0 | 7 |
| 205 | 616 | Name | 184 | 0 | 0 | Name | 5 | 100 | 947 | 1 | 1 | 1 | 0 | 22 |
| 206 | 621 | Notes | 184 | 0 | 0 | Remarks | 4 | 0 | 960 | 6 | 1 | 0 | 0 | 22 |
| 207 | 1177 | SQL Statement | 184 | 0 | 0 | Statement | 4 | 0 | 1230 | 6 | 1 | 0 | 0 | 22 |
| 208 | 1110 | Sequence | 179 | 0 | 0 | SortOrder | 6 | 0 | 850 | 1 | 2 | 1 | 0 | 17 |
| 209 | 816 | Type | 179 | 0 | 0 | TypeCode | 1 | 0 | 853 | 2 | 1 | 0 | 0 | 17 |
| 210 | 819 | Transfer | 179 | 0 | 0 | ParentID | 3 | 0 | 864 | 3 | 1 | 0 | 10 | 17 |
| 211 | 820 | Notes | 179 | 0 | 0 | Remarks | 4 | 0 | 865 | 6 | 1 | 0 | 0 | 17 |
| 212 | 1184 | Condition Column | 179 | 0 | 0 | SourceObjectID | 3 | 0 | 1235 | 3 | 1 | 1 | 5 | 17 |
| 213 | 1185 | Condition Value | 179 | 0 | 0 | Value | 5 | 100 | 1236 | 1 | 1 | 1 | 0 | 17 |

TABLE 41B-continued appColumns (e.g., Process[0][2][0][5]) dataset element values

| RI/CI | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 214 | 1186 | From Column | 179 | 0 | 0 | FromObjectID | 3 | 0 | 1234 | 3 | 1 | 1 | 5 | 17 |
| 215 | 832 | Operator | 179 | 0 | 0 | OperatorCode | 1 | 0 | 1160 | 2 | 1 | 0 | 0 | 17 |

TABLE 42A appConditions (e.g., Process[0][2][0][6]) dataset columns

| CI | Dataset Element |
|---|---|
| 0 | ColumnID |
| 1 | OperatorCode |
| 2 | ConjunctionCode |
| 3 | SegmentCode |
| 4 | Value |
| 5 | DisplayAttributeID |
| 6 | ViewID |

TABLE 42B appConditions (e.g., Process[0][2][0][6]) dataset element values

| RI/CI | 0 | 1 | 2 | 3 | 4 | 5 | 6 |
|---|---|---|---|---|---|---|---|

TABLE 43A appRelations (e.g., Process[0][2][0][7]) dataset columns

| CI | Dataset Element |
|---|---|
| 0 | RelationID |
| 1 | ViewID |
| 2 | TableName |

TABLE 43B appRelations (e.g., Process[0][2][0][7]) dataset element values

| RI/CI | 0 | 1 | 2 |
|---|---|---|---|
| 0 | 40 | 92 | Tables |
| 1 | 38 | 93 | Tables |
| 2 | 50 | 95 | Applications |
| 3 | 41 | 96 | Applications |
| 4 | 39 | 99 | Tables |
| 5 | 43 | 100 | Procedures |
| 6 | 36 | 101 | Entities |
| 7 | 52 | 102 | Columns |
| 8 | 48 | 103 | Views |
| 9 | 49 | 104 | Columns |
| 10 | 35 | 110 | Applications |
| 11 | 71 | 110 | Entities |
| 12 | 37 | 111 | Attributes |
| 13 | 51 | 113 | Views |
| 14 | 73 | 113 | Attributes |
| 15 | 42 | 114 | Views |
| 16 | 47 | 115 | Views |
| 17 | 44 | 116 | Views |
| 18 | 45 | 117 | Relations |

TABLE 44A appRelationFields (e.g., Process[0][2][0][8]) dataset columns

| CI | Dataset Element |
|---|---|
| 0 | RelationID |
| 1 | ParentRelationID |
| 2 | FieldName |
| 3 | ParentFieldName |

TABLE 44B appRelationFields (e.g., Process[0][2][0][8]) dataset element values

| RI/CI | 0 | 1 | 2 | 3 |
|---|---|---|---|---|
| 0 | 35 | 0 | GUID | ParentID |
| 1 | 36 | 0 | GUID | ParentID |
| 2 | 37 | 0 | GUID | ParentID |
| 3 | 38 | 0 | GUID | ParentID |
| 4 | 39 | 0 | GUID | ParentID |
| 5 | 40 | 0 | GUID | ParentID |
| 6 | 41 | 0 | GUID | ParentID |
| 7 | 42 | 0 | GUID | ParentID |
| 8 | 43 | 0 | GUID | ParentID |
| 9 | 44 | 0 | GUID | ParentID |
| 10 | 45 | 0 | GUID | ParentID |
| 11 | 47 | 0 | GUID | ParentID |
| 12 | 48 | 0 | GUID | ParentID |
| 13 | 49 | 0 | GUID | ParentID |
| 14 | 50 | 0 | GUID | ParentID |
| 15 | 51 | 0 | GUID | ParentID |
| 16 | 52 | 0 | GUID | ParentID |
| 17 | 71 | 0 | GUID | ChildID |
| 18 | 73 | 0 | GUID | FromObjectID |

The resource handler returns control to the Send/Receive command. The Send/Receive command creates the Process dataset from the SPTPResponse and returns control to the ProcessRequest command. The ProcessRequest command then invokes the ProcessEvent command by calling ProcessEvent(1,0," "), i.e., passing parameters 1, 0, and " " to subroutine ProcessEvent( ). In turn, the ProcessEvent command invokes the CallMethod command by calling CallMethod(1,0," "). The CallMethod command updates the SPTPRequest dataset element values from its parameters. After being updated by the CallMethod command, the SPTPRequest contains the following updated values for column indices 10 and 12:

TABLE 45

Updated SPTPRequest dataset element values

| RI | CI | Dataset Element | Value |
|---|---|---|---|
| 0 | 10 | RecordID | 0 |
| 0 | 12 | Value | |

The CallMethod command invokes the TransferData command by calling TransferData(6,−1,−1,−1,−1,−1,−1,−1). The TransferData command appends a row to the process-generated Application nested dataset referenced as Process[0][2][0][10] from constant values. The appended row is shown in Table 46:

TABLE 46

Process[0][2][0][10] dataset element values

| RI | CI | Dataset Element | Value |
|---|---|---|---|
| 0 | 0 | process-generated | 2 |
| 0 | 1 | process-generated | 0 |
| 0 | 2 | process-generated | 1 |
| 0 | 3 | process-generated | 0 |
| 0 | 4 | process-generated | 0 |
| 0 | 5 | process-generated | 0 |
| 0 | 6 | process-generated | |
| 0 | 7 | process-generated | 0 |
| 0 | 8 | process-generated | 0 |
| 0 | 9 | process-generated | 0 |

The CallMethod command calls CallMethod(46) which sequentially invokes the ClearData command by calling ClearData(11), ClearData(12), ClearData(13), ClearData(14), ClearData(15) and ClearData(16) to remove the rows from process-generated Application nested datasets referenced as Process[0][2][0][11], Process[0][2][0][12], Process[0][2][0][13], Process[0][2][0][14], Process[0][2][0][15], and Process[0][2][0][16], respectively.

The CallMethod command then calls TransferData(68, −1,−1,−1,−1,−1,−1,−1), and the TransferData command updates the SPTPRequest dataset elements from the Application nested dataset referenced as Process[0][2][0][10]) as shown in Table 47:

TABLE 47

Updated SPTPRequest dataset element values

| RI | CI | Dataset Element | Value |
|---|---|---|---|
| 0 | 9 | ObjectID | 2 |

The CallMethod command then calls CallMethod(2). The CallMethod command calls TransferData(11,−1,−1,−1,−1,−1,−1,−1), and the TransferData command appends rows to the process-generated Application nested dataset referenced as Process[0][2][0][16] from condition-matching rows in the "Commands" Program nested dataset (i.e., Process[0][1][0][8]). In this case, no rows matched the conditions.

Below Marks the Start of Sample Process 1

The CallMethod command then calls CallMethod(23). The CallMethod command calls TransferData(12,−1,−1,−1,−1,−1,−1,−1), and the TransferData command appends a row to the process-generated Application nested dataset referenced as Process[0][2][0][9] from a single row in the "appSession" Application nested dataset (i.e., Process[0][2][0][0]) as shown in Table 48:

TABLE 48

Appended Process[0][2][0][9] dataset element values

| RI | CI | Dataset Element | Value |
|---|---|---|---|
| 0 | 0 | process-generated | 0 |
| 0 | 1 | process-generated | −1 |

The TransferData command then calls TransferData(32, 2,0,0,2,9,0). The TransferData command updates the appended row in the Application nested dataset referenced as Process[0][2][0][9] from the single-row in the Application nested dataset referenced as Process[0][2][0][10], as shown in Table 49:

TABLE 49

Updated Process[0][2][0][9] dataset element values

| RI | CI | Dataset Element | Value |
|---|---|---|---|
| 0 | 2 | process-generated | [ ] |

The TransferData command then calls TransferData(15, 2,0,0,2,9,0). The TransferData command copies the Application nested dataset referenced as Process[0][2][0][10] into a data element of the appended row in the Application nested dataset referenced as Process[0][2][0][9], as shown in Table 50:

TABLE 50

Updated Process[0][2][0][9] dataset element values

| RI | CI | Dataset Element | Value |
|---|---|---|---|
| 0 | 3 | process-generated | Process[0][2][0][10] dataset |

The TransferData command then calls TransferData(16, 2,0,0,2,9,0). The TransferData command copies the Application nested dataset referenced as Process[0][2][0][11] into a data element of the appended row in the Application nested dataset referenced as Process[0][2][0][9], as shown in Table 51:

TABLE 51

Updated Process[0][2][0][9] dataset element values

| RI | CI | Dataset Element | Value |
|---|---|---|---|
| 0 | 4 | process-generated | Process[0][2][0][11] dataset |

The TransferData command then calls TransferData(17, 2,0,0,2,9,0). The TransferData command copies the Application nested dataset referenced as Process[0][2][0][12] into a data element of the appended row in the Application nested dataset referenced as Process[0][2][0][9] as shown in Table 52:

TABLE 52

Updated Process[0][2][0][9] dataset element values

| RI | CI | Dataset Element | Value |
|---|---|---|---|
| 0 | 5 | process-generated | Process[0][2][0][12] dataset |

The TransferData command then calls TransferData(244, 2,0,0,2,9,0). The TransferData command copies the Application nested dataset referenced as Process[0][2][0][13] into a data element of the appended row in the Application nested dataset referenced as Process[0][2][0][9], as shown in Table 53:

TABLE 53

| Updated Process[0][2][0][9] dataset element values | | | |
|---|---|---|---|
| RI | CI | Dataset Element | Value |
| 0 | 8 | process-generated | Process[0][2][0][13] dataset |

The TransferData command then calls TransferData(245, 2,0,0,2,9,0). The TransferData command copies the Application nested dataset referenced as Process[0][2][0][14] into a data element of the appended row in the Application nested dataset referenced as Process[0][2][0][9], as shown in Table 54:

TABLE 54

| Updated Process[0][2][0][9] dataset element values | | | |
|---|---|---|---|
| RI | CI | Dataset Element | Value |
| 0 | 9 | process-generated | Process[0][2][0][14] dataset |

The TransferData command then calls TransferData(18, 2,0,0,2,9,0). The TransferData command copies the Application nested dataset referenced as Process[0][2][0][15] into a data element of the appended row in the Application nested dataset referenced as Process[0][2][0][9], as shown in Table 55:

TABLE 55

| Updated Process[0][2][0][9] dataset element values | | | |
|---|---|---|---|
| RI | CI | Dataset Element | Value |
| 0 | 6 | process-generated | Process[0][2][0][15] dataset |

The TransferData command then calls TransferData(19, 2,0,0,2,9,0). The TransferData command copies the Application nested dataset referenced as Process[0][2][0][16] into a data element of the appended row in the Application nested dataset referenced as Process[0][2][0][9], as shown in Table 56:

TABLE 56

| Updated Process[0][2][0][9] dataset element values | | | |
|---|---|---|---|
| RI | CI | Dataset Element | Value |
| 0 | 7 | process-generated | Process[0][2][0][16] dataset |

The CallMethod command calls TransferData(14,−1,−1, −1,−1,−1,−1,−1), and the TransferData command updates the single row in the "appSession" Application nested dataset (i.e., Process[0][2][0][0]) from constant (formula) values as shown in Table 57:

TABLE 57

| Updated Process[0][2][0][0] dataset element values | | | |
|---|---|---|---|
| RI | CI | Dataset Element | Value |
| 0 | 6 | process-generated | 0 |
| 0 | 7 | process-generated | 1 |
| 0 | 8 | process-generated | −1 |

Below Marks the Start of Sample Process 2

The CallMethod command calls CallMethod(7). The CallMethod command sequentially calls ClearData(17), ClearData(18), and ClearData(19) to remove the rows from process-generated Application nested datasets referenced as Process[0][2][0][17], Process[0][2][0][18], and Process[0][2][0][19], respectively.

The CallMethod command calls CallMethod(8). The CallMethod command calls TransferData(20,−1,−1,−1,−1, −1,−1,−1), and the TransferData command appends a row to the process-generated Application nested dataset referenced as Process[0][2][0][17] from constant values, as shown in Table 58:

TABLE 58

| Appended Process[0][2][0][17] dataset element values | | | |
|---|---|---|---|
| RI | CI | Dataset Element | Value |
| 0 | 0 | process-generated | Application Bar |

The TransferData command calls TransferData(71,2,10, 0,2,17,0), and the TransferData command appends a row to the process-generated Application nested dataset referenced as Process[0][2][0][18] from constant and parameter values, as shown in Table 59:

TABLE 59

| Appended Process[0][2][0][18] dataset element values | | | |
|---|---|---|---|
| RI | CI | Dataset Element | Value |
| 0 | 0 | process-generated | 0 |
| 0 | 1 | process-generated | |
| 0 | 2 | process-generated | 0 |

The TransferData command calls TransferData(22,2,10, 0,2,18,0), and the TransferData command appends a row to the process-generated Application nested dataset referenced as Process[0][2][0][19] from the single row in the "appSession" Application nested dataset (i.e., Process[0][2][0][0]) and constant and parameter values, as shown in Table 60:

TABLE 60

| Appended Process[0][2][0][19] dataset element values | | | |
|---|---|---|---|
| RI | CI | Dataset Element | Value |
| 0 | 0 | process-generated | 0 |
| 0 | 1 | process-generated | 1 |
| 0 | 2 | process-generated | X10DATA.COM |
| 0 | 3 | process-generated | 240 |
| 0 | 4 | process-generated | 20 |
| 0 | 5 | process-generated | left |
| 0 | 6 | process-generated | 60 |
| 0 | 7 | process-generated | 0 |
| 0 | 8 | process-generated | 0 |
| 0 | 9 | process-generated | 0 |
| 0 | 10 | process-generated | |
| 0 | 11 | process-generated | 0 |
| 0 | 12 | process-generated | 0 |

The TransferData command calls TransferData(83,2,10, 0,2,18,0), and the TransferData command appends a row to the process-generated Application nested dataset referenced as Process[0][2][0][19] from the single row in the "appSession" Application nested dataset (i.e., Process[0][2][0][0]) and constant and parameter values, as shown in Table 61:

TABLE 61

Appended Process[0][2][0][19] dataset element values

| RI | CI | Dataset Element | Value |
|---|---|---|---|
| 1 | 0 | process-generated | 0 |
| 1 | 1 | process-generated | 1 |
| 1 | 2 | process-generated | Platform Manager |
| 1 | 3 | process-generated | 240 |
| 1 | 4 | process-generated | 20 |
| 1 | 5 | process-generated | Right |
| 1 | 6 | process-generated | 0 |
| 1 | 7 | process-generated | 0 |
| 1 | 8 | process-generated | 0 |
| 1 | 9 | process-generated | 0 |
| 1 | 10 | process-generated | |
| 1 | 11 | process-generated | 0 |
| 1 | 12 | process-generated | 0 |

The CallMethod command calls CallMethod(9). The CallMethod command calls TransferData(24,−1,−1,−1,−1,−1,−1,−1), and the TransferData command appends a row to the process-generated Application nested dataset referenced as Process[0][2][0][17] from constant values, as shown in Table 62:

TABLE 62

Appended Process[0][2][0][17] dataset element values

| RI | CI | Dataset Element | Value |
|---|---|---|---|
| 1 | 0 | process-generated | Menu Bar |

The TransferData command calls TransferData(73,2,10,0,2,17,1), and the TransferData command appends a row to the process-generated Application nested dataset referenced as Process[0][2][0][18] from constant and parameter values, as shown in Table 63:

TABLE 63

Appended Process[0][2][0][18] dataset element values

| RI | CI | Dataset Element | Value |
|---|---|---|---|
| 1 | 0 | process-generated | 1 |
| 1 | 1 | process-generated | |
| 1 | 2 | process-generated | 0 |

The TransferData command calls TransferData(48,2,10,0,2,18,1), and the TransferData command appends rows to the process-generated Application nested dataset referenced as Process[0][2][0][19] from condition-matching rows in the "Menus" Program nested dataset (i.e., Process[0][1][0][7]) and constant and parameter values, as shown in Table 64:

TABLE 64

Appended Process[0][2][0][19] dataset element values

| RI | CI | Dataset Element | Value |
|---|---|---|---|
| 2 | 0 | process-generated | 1 |
| 2 | 1 | process-generated | 0 |
| 2 | 2 | process-generated | File |
| 2 | 3 | process-generated | 76 |
| 2 | 4 | process-generated | 20 |
| 2 | 5 | process-generated | center |
| 2 | 6 | process-generated | 3 |
| 2 | 7 | process-generated | 1 |
| 2 | 8 | process-generated | 3 |
| 2 | 9 | process-generated | 0 |

TABLE 64-continued

Appended Process[0][2][0][19] dataset element values

| RI | CI | Dataset Element | Value |
|---|---|---|---|
| 2 | 10 | process-generated | |
| 2 | 11 | process-generated | 2 |
| 2 | 12 | process-generated | 0 |
| 3 | 0 | process-generated | 1 |
| 3 | 1 | process-generated | 0 |
| 3 | 2 | process-generated | Edit |
| 3 | 3 | process-generated | 76 |
| 3 | 4 | process-generated | 20 |
| 3 | 5 | process-generated | center |
| 3 | 6 | process-generated | 3 |
| 3 | 7 | process-generated | 1 |
| 3 | 8 | process-generated | 3 |
| 3 | 9 | process-generated | 0 |
| 3 | 10 | process-generated | |
| 3 | 11 | process-generated | 3 |
| 3 | 12 | process-generated | 0 |
| 4 | 0 | process-generated | 1 |
| 4 | 1 | process-generated | 0 |
| 4 | 2 | process-generated | Cards |
| 4 | 3 | process-generated | 76 |
| 4 | 4 | process-generated | 20 |
| 4 | 5 | process-generated | center |
| 4 | 6 | process-generated | 3 |
| 4 | 7 | process-generated | 2 |
| 4 | 8 | process-generated | 3 |
| 4 | 9 | process-generated | 0 |
| 4 | 10 | process-generated | |
| 4 | 11 | process-generated | 4 |
| 4 | 12 | process-generated | 0 |
| 5 | 0 | process-generated | 1 |
| 5 | 1 | process-generated | 0 |
| 5 | 2 | process-generated | Daily |
| 5 | 3 | process-generated | 76 |
| 5 | 4 | process-generated | 20 |
| 5 | 5 | process-generated | center |
| 5 | 6 | process-generated | 3 |
| 5 | 7 | process-generated | 2 |
| 5 | 8 | process-generated | 3 |
| 5 | 9 | process-generated | 0 |
| 5 | 10 | process-generated | |
| 5 | 11 | process-generated | 4 |
| 5 | 12 | process-generated | 0 |
| 6 | 0 | process-generated | 1 |
| 6 | 1 | process-generated | 0 |
| 6 | 2 | process-generated | Windows |
| 6 | 3 | process-generated | 76 |
| 6 | 4 | process-generated | 20 |
| 6 | 5 | process-generated | center |
| 6 | 6 | process-generated | 3 |
| 6 | 7 | process-generated | 12 |
| 6 | 8 | process-generated | 3 |
| 6 | 9 | process-generated | 0 |
| 6 | 10 | process-generated | |
| 6 | 11 | process-generated | 6 |
| 6 | 12 | process-generated | 0 |
| 7 | 0 | process-generated | 1 |
| 7 | 1 | process-generated | 0 |
| 7 | 2 | process-generated | Help |
| 7 | 3 | process-generated | 76 |
| 7 | 4 | process-generated | 20 |
| 7 | 5 | process-generated | center |
| 7 | 6 | process-generated | 3 |
| 7 | 7 | process-generated | 1 |
| 7 | 8 | process-generated | 3 |
| 7 | 9 | process-generated | 0 |
| 7 | 10 | process-generated | |
| 7 | 11 | process-generated | 7 |
| 7 | 12 | process-generated | 0 |

Above Marks the End of Sample Process 2

The CallMethod command calls CallMethod(10). The CallMethod command calls TransferData(26,−1,−1,−1,−1,−1,−1,−1), and the TransferData command appends a row to the process-generated Application nested dataset referenced as Process[0][2][0][17] from constant values, as shown in Table 65:

TABLE 65

Appended Process[0][2][0][17] dataset element values

| RI | CI | Dataset Element | Value |
|---|---|---|---|
| 2 | 0 | process-generated | Window Bar |

The TransferData command calls TransferData(74,2,10, 0,2,17,2), and the TransferData command appends a row to the process-generated Application nested dataset referenced as Process[0][2][0][18] from constant and parameter values, as shown in Table 66:

TABLE 66

Appended Process[0][2][0][18] dataset element values

| RI | CI | Dataset Element | Value |
|---|---|---|---|
| 2 | 0 | process-generated | 2 |
| 2 | 1 | process-generated | |
| 2 | 2 | process-generated | 0 |

The TransferData command calls TransferData(84,2,10, 0,2,18,2), and the TransferData command appends a row to the process-generated Application nested dataset referenced as Process[0][2][0][19] from the single row in the Application nested dataset referenced as Process[0][2][0][10] and constant and parameter values, as shown in Table 67:

TABLE 67

Appended Process[0][2][0][19] dataset element values

| RI | CI | Dataset Element | Value |
|---|---|---|---|
| 9 | 0 | process-generated | 2 |
| 9 | 1 | process-generated | 1 |
| 9 | 2 | process-generated | |
| 9 | 3 | process-generated | 240 |
| 9 | 4 | process-generated | 20 |
| 9 | 5 | process-generated | right |
| 9 | 6 | process-generated | 3 |
| 9 | 7 | process-generated | 15 |
| 9 | 8 | process-generated | 2 |
| 9 | 9 | process-generated | 0 |
| 9 | 10 | process-generated | |
| 9 | 11 | process-generated | 0 |
| 9 | 12 | process-generated | 0 |

The TransferData command calls TransferData(229,2,10, 0,2,19,9), and the TransferData command updates the last appended row in the process-generated Application nested dataset referenced as Process[0][2][0][19] from the condition-matching single row in the Application nested dataset referenced as Process[0][2][0][10]. In this case, the row did not match the condition.

The TransferData command calls TransferData(86,2,10, 0,2,17,2), and the TransferData command appends a row to the process-generated Application nested dataset referenced as Process[0][2][0][18] from constant and parameter values, as shown in Table 68:

TABLE 68

Appended Process[0][2][0][18] dataset element values

| RI | CI | Dataset Element | Value |
|---|---|---|---|
| 3 | 0 | process-generated | 2 |
| 3 | 1 | process-generated | |
| 3 | 2 | process-generated | 0 |

The TransferData command calls TransferData(87,2,10, 0,2,18,3), and the TransferData command appends a row to the process-generated Application nested dataset referenced as Process[0][2][0][19] from the single row in the Application nested dataset referenced as Process[0][2][0][10] and constant and parameter values, as shown in Table 69:

TABLE 69

Appended Process[0][2][0][19] dataset element values

| RI | CI | Dataset Element | Value |
|---|---|---|---|
| 10 | 0 | process-generated | 2 |
| 10 | 1 | process-generated | 1 |
| 10 | 2 | process-generated | |
| 10 | 3 | process-generated | 240 |
| 10 | 4 | process-generated | 20 |
| 10 | 5 | process-generated | Right |
| 10 | 6 | process-generated | 3 |
| 10 | 7 | process-generated | 15 |
| 10 | 8 | process-generated | 2 |
| 10 | 9 | process-generated | 0 |
| 10 | 10 | process-generated | |
| 10 | 11 | process-generated | 0 |
| 10 | 12 | process-generated | 0 |

The TransferData command calls TransferData(235,2,10, 0,2,19,10), and the TransferData command updates the last appended row in the process-generated Application nested dataset referenced as Process[0][2][0][19] from the condition-matching single row in the Application nested dataset referenced as Process[0][2][0][10]. In this case, the row did not match the condition.

The TransferData command then calls TransferData(88, 2,10,0,2,18,3), and the TransferData command appends a row to the process-generated Application nested dataset referenced as Process[0][2][0][19] from the single row in the Application nested dataset referenced as Process[0][2][0] [10] and constant and parameter values, as shown in Table 70:

TABLE 70

Appended Process[0][2][0][19] dataset element values

| RI | CI | Dataset Element | Value |
|---|---|---|---|
| 11 | 0 | process-generated | 3 |
| 11 | 1 | process-generated | 1 |
| 11 | 2 | process-generated | |
| 11 | 3 | process-generated | 240 |
| 11 | 4 | process-generated | 20 |
| 11 | 5 | process-generated | Left |
| 11 | 6 | process-generated | 3 |
| 11 | 7 | process-generated | 12 |
| 11 | 8 | process-generated | 2 |

TABLE 70-continued

Appended Process[0][2][0][19] dataset element values

| RI | CI | Dataset Element | Value |
|---|---|---|---|
| 11 | 9 | process-generated | 0 |
| 11 | 10 | process-generated |  |
| 11 | 11 | process-generated | 0 |
| 11 | 12 | process-generated | 0 |

The TransferData command calls TransferData(236,2,10, 0,2,19,11), and the TransferData command updates the last appended row in the process-generated Application nested dataset referenced as Process[0][2][0][19] from the condition-matching single row in the Application nested dataset referenced as Process[0][2][0][10]. In this case, the row did not match the condition.

Above Marks the End of Sample Process 1

The CallMethod command calls CallMethod(13). The CallMethod command calls TransferData(30,−1,−1,−1,−1, −1,−1,−1), and the TransferData command appends a row to the process-generated Application nested dataset referenced as Process[0][2][0][17] from constant values, as shown in Table 71:

TABLE 71

Appended Process[0][2][0][17] dataset element values

| RI | CI | Dataset Element | Value |
|---|---|---|---|
| 3 | 0 | process-generated | Command Bar |

The TransferData command calls TransferData(75,2,10, 0,2,17,3), and the TransferData command appends a row to the process-generated Application nested dataset referenced as Process[0][2][0][18] from constant and parameter values, as shown in Table 72:

TABLE 72

Appended Process[0][2][0][18] dataset element values

| RI | CI | Dataset Element | Value |
|---|---|---|---|
| 4 | 0 | process-generated | 3 |
| 4 | 1 | process-generated |  |
| 4 | 2 | process-generated | 0 |

The TransferData command calls TransferData(50,2,10, 0,2,18,4), and the TransferData command appends rows to the process-generated Application nested dataset referenced as Process[0][2][0][19] from condition-matching rows in the "Commands" Program nested dataset (i.e., Process[0][1][0][8]) and constant and parameter values. In this case, no rows matched the conditions.

The CallMethod command calls CallMethod(14). The CallMethod command calls TransferData(60,−1,−1,−1,−1, −1,−1,−1), and the TransferData command updates the rows in the process-generated Application nested dataset referenced as Process[0][2][0][18] from condition-matching rows in the Application nested dataset referenced as Process [0][2][0][19] and constant values, as shown in Table 73:

TABLE 73

Updated Process[0][2][0][18] dataset element values

| RI | CI | Dataset Element | Value |
|---|---|---|---|
| 0 | 1 | process-generated | <td id=0 align=left style='width:240px;height:20px' onclick="CallMethod(5,0,'')">X10DATA.COM</td><td id=1 align=right style='width:240px;height:20px' onclick="CallMethod(5,1,'')">Platform Manager</td> |
| 1 | 1 | process-generated | <td id=2 align=center style='width:76px;height:20px' onclick="CallMethod(5,2,'')">File</td><td id=3 align=center style='width:76px;height:20px' onclick="CallMethod(5,3,'')">Edit</td><td id=4 align=center style='width:76px;height:20px' onclick="CallMethod(5,4,'')">Cards</td><td id=5 align=center style='width:76px;height:20px' onclick="CallMethod(5,5,'')">Daily</td><td id=6 align=center style='width:76px;height:20px' onclick="CallMethod(5,6,'')">Windows</td><td id=7 align=center style='width:76px;height:20px' onclick="CallMethod(5,7,'')">Help</td> |
| 2 | 1 | process-generated | <td id=8 align=left style='width:240px;height:20px' onclick="CallMethod(5,8,'')"></td><td id=9 align=right style='width:240px;height:20px' onclick="CallMethod(5,9,'')"></td> |
| 3 | 1 | process-generated | <td id=10 align=left style='width:240px;height:20px' onclick="CallMethod(5,10,'')"></td><td id=11 align=right style='width:240px;height:20px' onclick="CallMethod(5,11,'')"></td> |

The CallMethod command calls TransferData(61,−1,−1, −1,−1,−1,−1,−1), and the TransferData command updates the rows in the process-generated Application nested dataset referenced as Process[0][2][0][17] from condition-matching rows in the Application nested dataset referenced as Process[0][2][0][18] and constant values, as shown in Table 74:

TABLE 74

Updated Process[0][2][0][17] dataset element values

| RI | CI | Dataset Element | Value |
|---|---|---|---|
| 0 | 1 | process-generated | <tr><td id=0 align=left style='width:240px;height:20px' onclick="CallMethod(5,0,'')">X10DATA.COM</td><td id=1 align=right style='width:240px;height:20px' onclick="CallMethod(5,1,'')">Platform Manager</td></tr> |
| 1 | 1 | process-generated | <tr><td id=2 align=center style='width:76px;height:20px' onclick="CallMethod(5,2,'')">File</td><td id=3 align=center style='width:76px;height:20px' onclick="CallMethod(5,3,'')">Edit</td><td id=4 align=center style='width:76px;height:20px' onclick="CallMethod(5,4,'')">Cards</td><td id=5 align=center style='width:76px;height:20px' onclick="CallMethod(5,5,'')">Daily</td><td id=6 align=center style='width:76px;height:20px' onclick="CallMethod(5,6,'')">Windows</td><td id=7 align=center style='width:76px;height:20px' onclick="CallMethod(5,7,'')">Help</td></tr> |
| 2 | 1 | process-generated | <tr><td id=8 align=left style='width:240px;height:20px' onclick="CallMethod(5,8,'')"></td><td id=9 align=right style='width:240px;height:20px' onclick="CallMethod(5,9,'')"></td></tr><tr><td id=10 align=left style='width:240px;height:20px' onclick="CallMethod(5,10,'')"></td><td id=11 align=right style='width:240px;height:20px' onclick="CallMethod(5,11,'')"></td></tr> |
| 3 | 1 | process-generated | <tr></tr> |

The CallMethod command calls TransferData(69,−1,−1, −1,−1,−1,−1,−1), and the TransferData command updates the single row in the SPTPRequest dataset from constant values, as shown in Table 75:

TABLE 75

Updated SPTPRequest dataset element values

| RI | CI | Dataset Element | Value |
|---|---|---|---|
| 0 | 0 | RequestType | 3 |
| 0 | 1 | RemoteConnectType | 0 |
| 0 | 3 | ResourceConnectType | 3 |
| 0 | 4 | ResourceConnection | DynamicHTML |
| 0 | 5 | StatementType | 2 |

The CallMethod command calls TransferData(53,−1,−1,−1,−1,−1,−1,−1), and the TransferData command updates the single row in the SPTPRequest dataset from the rows in the Application nested dataset referenced as Process[0][2][0][17] and constant values, as shown in Table 76:

TABLE 76

Updated SPTPRequest dataset element values

| RI | CI | Dataset Element | Value |
|---|---|---|---|
| 0 | 6 | RequestType | <table border=1px><tr><td id=0 align=left style='width:240px;height:20px' onclick="CallMethod(5,0,'')">X10DATA.COM</td><td id=1 align=right style='width:240px;height:20px' onclick="CallMethod(5,1,'')">Platform Manager</td></tr></table> <table border=1px><tr> <td id=2 align=center style='width:76px;height:20px' onclick="CallMethod(5,2,'')">File</td> |

TABLE 76-continued

Updated SPTPRequest dataset element values

| RI | CI | Dataset Element | Value |
|---|---|---|---|

```
<td id=3 align=center style='width:76px;height:20px'
onclick="CallMethod(5,3,'')">Edit</td>
<td id=4 align=center style='width:76px;height:20px'
onclick="CallMethod(5,4,'')">Cards</td>
<td id=5 align=center style='width:76px;height:20px'
onclick="CallMethod(5,5,'')">Daily</td>
<td id=6 align=center style='width:76px;height:20px'
onclick="CallMethod(5,6,'')">Windows</td>
<td id=7 align=center style='width:76px;height:20px'
onclick="CallMethod(5,7,'')">Help</td></tr></table>
<table border=1px><tr>
<td id=8 align=left style='width:240px;height:20px'
onclick="CallMethod(5,8,'')"></td>
<td id=9 align=right style='width:240px;height:20px'
onclick="CallMethod(5,9,'')"></td></tr>
<tr>
<td id=10 align=left style='width:240px;height:20px'
onclick="CallMethod(5,10,'')"></td>
<td id=11 align=right style='width:240px;height:20px'
onclick="CallMethod(5,11,'')"></td></tr></table>
<table border=1px><tr></tr></table>
```

The CallMethod command invokes the Send/Receive command by calling Send/Receive( ). The Send/Receive command invokes the resource handler of the agent. The resource handler invokes the HTML DOM layout engine resource to incorporate the statement included in the SPTPRequest which renders the first display shown in FIG. 4A.

If a user clicks the "Cards" element on the display illustrated in FIG. 4A, the user event handler of the agent will invoke CallMethod(5,4," "). The CallMethod command will then update the SPTPRequest dataset elements from its parameters for those elements shown in Table 77:

TABLE 77

Updated SPTPRequest dataset element values

| RI | CI | Dataset Element | Value |
|---|---|---|---|
| 0 | 10 | RecordID | 4 |
| 0 | 12 | Value | |

The CallMethod command then invokes the TransferData command by calling TransferData(7,−1,−1,−1,−1,−1,−1,−1). The TransferData command updates the single row in the Application nested dataset referenced as Process[0][2][0][10] from the condition-matching row in the Application nested dataset referenced as Process[0][2][0][19] as shown in Table 78:

TABLE 78

Updated Process[0][2][0][10] dataset element values

| RI | CI | Dataset Element | Value |
|---|---|---|---|
| 0 | 0 | process-generated | 3 |
| 0 | 1 | process-generated | 2 |
| 0 | 2 | process-generated | 3 |
| 0 | 3 | process-generated | 0 |
| 0 | 5 | process-generated | 0 |
| 0 | 6 | process-generated | |
| 0 | 7 | process-generated | 4 |
| 0 | 8 | process-generated | 0 |
| 0 | 9 | process-generated | |
| 0 | 10 | process-generated | 0 |
| 0 | 17 | process-generated | 0 |

The CallMethod command calls CallMethod(46) which sequentially invokes the ClearData command by calling ClearData(11), ClearData(12), ClearData(13), ClearData(14), ClearData(15), and ClearData(16) to remove the rows from process-generated Application nested datasets referenced as Process[0][2][0][11], Process[0][2][0][12], Process[0][2][0][13], Process[0][2][0][14], Process[0][2][0][15], and Process[0][2][0][16], respectively.

The CallMethod command then calls TransferData(68, −1,−1,−1,−1,−1,−1,−1), and the TransferData command updates the SPTPRequest dataset elements from the Application nested dataset referenced as Process[0][2][0][10], as shown in Table 79:

TABLE 79

Updated SPTPRequest dataset element values

| RI | CI | Dataset Element | Value |
|---|---|---|---|
| 0 | 9 | ObjectID | 3 |

The CallMethod command calls CallMethod(3) which calls TransferData(10,−1,−1,−1,−1,−1,−1,−1), and the TransferData command appends a row to the process-generated Application nested dataset referenced as Process[0][2][0][15] from condition-matching rows in the "appEntities" Application nested dataset (i.e., Process[0][2][0][1]), as shown in Table 80:

TABLE 80

Appended Process[0][2][0][15] dataset element values

| RI | CI | Dataset Element | Value |
|---|---|---|---|
| 0 | 0 | process-generated | 20 |
| 0 | 1 | process-generated | Applications |
| 1 | 0 | process-generated | 21 |
| 1 | 1 | process-generated | Commands |
| 2 | 0 | process-generated | 7 |
| 2 | 1 | process-generated | Datasets |
| 3 | 0 | process-generated | 11 |
| 3 | 1 | process-generated | Domains |
| 4 | 0 | process-generated | 12 |
| 4 | 1 | process-generated | Entities |
| 5 | 0 | process-generated | 19 |
| 5 | 1 | process-generated | Keys |
| 6 | 0 | process-generated | 1 |
| 6 | 1 | process-generated | Menus |
| 7 | 0 | process-generated | 33 |
| 7 | 1 | process-generated | Messages |
| 8 | 0 | process-generated | 23 |
| 8 | 1 | process-generated | Methods |
| 9 | 0 | process-generated | 26 |
| 9 | 1 | process-generated | Modes |
| 10 | 0 | process-generated | 2 |
| 10 | 1 | process-generated | Phrases |
| 11 | 0 | process-generated | 22 |
| 11 | 1 | process-generated | Stored Procedures |
| 12 | 0 | process-generated | 6 |
| 12 | 1 | process-generated | Tables |
| 13 | 0 | process-generated | 10 |
| 13 | 1 | process-generated | Transfers |

The CallMethod command calls TransferData(11,−1,−1,−1,−1,−1,−1,−1), and the TransferData command appends rows to the process-generated Application nested dataset referenced as Process[0][2][0][16] from condition-matching rows in the "Commands" Program nested dataset (i.e., Process[0][1][0][8]), as shown in Table 81:

TABLE 81

Appended Process[0][2][0][16] dataset element values

| RI | CI | Dataset Element | Value |
|---|---|---|---|
| 0 | 0 | process-generated | 1 |
| 0 | 1 | process-generated | Close |
| 0 | 2 | process-generated | 27 |
| 0 | 3 | process-generated | 17 |
| 0 | 4 | process-generated | 2 |
| 0 | 5 | process-generated | 3 |

The process defined in Sample Process 2 is repeated with dataset element values appended and updated as shown in the tables within those sections.

The CallMethod command calls CallMethod(11). The CallMethod command calls TransferData(28,−1,−1,−1,−1,−1,−1,−1), and the TransferData command appends a row to the process-generated Application nested dataset referenced as Process[0][2][0][17] from constant values, as shown in Table 82:

TABLE 82

Appended Process[0][2][0][17] dataset element values

| RI | CI | Dataset Element | Value |
|---|---|---|---|
| 2 | 0 | process-generated | List |

The TransferData command calls TransferData(79,2,10,0,2,17,2), and the TransferData command updates the last appended row in the process-generated Application nested dataset referenced as Process[0][2][0][17] from condition-matching rows in the Application nested dataset referenced as Process[0][2][0][15] and constant values, as shown in Table 83:

TABLE 83

Updated Process[0][2][0][17] dataset element values

| RI | CI | Dataset Element | Value |
|---|---|---|---|
| 2 | 1 | process-generated | <tr><td id=0 align=left onclick="CallMethod(6,20,'')" style='width:480px;height:20px;'>Applications</td></tr> <tr><td id=1 align=left onclick="CallMethod(6,21,'')" style='width:480px;height:20px;'>Commands</td></tr> <tr><td id=2 align=left onclick="CallMethod(6,7,'')" style='width:480px;height:20px;'>Datasets</td></tr> <tr><td id=3 align=left onclick="CallMethod(6,11,'')" style='width:480px;height:20px;'>Domains</td></tr> <tr><td id=4 align=left onclick="CallMethod(6,12,'')" style='width:480px;height:20px;'>Entities</td></tr> <tr><td id=5 align=left onclick="CallMethod(6,19,'')" style='width:480px;height:20px;'>Keys</td></tr> <tr><td id=6 align=left onclick="CallMethod(6,1,'')" style='width:480px;height:20px;'>Menus</td></tr><tr> <td id=7 align=left onclick="CallMethod(6,33,'')" style='width:480px;height:20px;'>Messages</td></tr> <tr><td id=8 align=left onclick="CallMethod(6,23,'')" style='width:480px;height:20px;'>Methods</td></tr> <tr><td id=9 align=left onclick="CallMethod(6,26,'')" style='width:480px;height:20px;'>Modes</td></tr> <tr><td id=10 align=left onclick="CallMethod(6,2,'')" style='width:480px;height:20px;'>Phrases</td></tr> <tr><td id=11 align=left onclick="CallMethod(6,22,'')" style='width:480px;height:20px;'>Stored Procedures</td></tr> <tr><td id=12 align=left onclick="CallMethod(6,6,'')" style='width:480px;height:20px;'>Tables</td></tr> <tr><td id=13 align=left onclick="CallMethod(6,10,'')" style='width:480px;height:20px;'>Transfers</td></tr> |

Below Marks the Start of Sample Process 3

The CallMethod command calls CallMethod(13). The CallMethod command calls TransferData(30,−1,−1,−1,−1,−1,−1,−1), and the TransferData command appends a row to the process-generated Application nested dataset referenced as Process[0][2][0][17] from constant values, as shown in Table 84:

TABLE 84

Appended Process[0][2][0][17] dataset element values

| RI | CI | Dataset Element | Value |
|----|----|-----------------|-------|
| 3  | 0  | process-generated | Command Bar |

The TransferData command calls TransferData(75,2,10, 0,2,17,3), and the TransferData command appends a row to the process-generated Application nested dataset referenced as Process[0][2][0][18] from constant and parameter values, as shown in Table 85.

TABLE 85

Appended Process[0][2][0][18] dataset element values

| RI | CI | Dataset Element | Value |
|----|----|-----------------|-------|
| 3  | 0  | process-generated | 3 |
| 3  | 1  | process-generated |   |
| 3  | 2  | process-generated | 0 |

The TransferData command calls TransferData(50,2,10, 0,2,18,4), and the TransferData command appends rows to the process-generated Application nested dataset referenced as Process[0][2][0][19] from condition-matching rows in the "Commands" Program nested dataset (i.e., Process[0][1][0][8]) and constant and parameter values, as shown in Table 86:

TABLE 86

Appended Process[0][2][0][19] dataset element values

| RI | CI | Dataset Element | Value |
|----|----|-----------------|-------|
| 8  | 0  | process-generated | 2 |
| 8  | 1  | process-generated | 0 |
| 8  | 2  | process-generated | Close |
| 8  | 3  | process-generated | 76 |
| 8  | 4  | process-generated | 20 |
| 8  | 5  | process-generated | center |
| 8  | 6  | process-generated | 17 |
| 8  | 7  | process-generated | 2 |
| 8  | 8  | process-generated | 3 |
| 8  | 9  | process-generated | 0 |
| 8  | 10 | process-generated |   |
| 8  | 11 | process-generated | 0 |
| 8  | 12 | process-generated | 0 |
| 8  | 13 | process-generated | 8 |
| 8  | 14 | process-generated | 0 |
| 8  | 15 | process-generated | 0 |
| 8  | 16 | process-generated | 1 |

Below Marks the Start of Sample Process 4

The TransferData command calls TransferData(136,2,16, 0,2,19,8), and the TransferData command updates the last appended row in the Application nested dataset referenced as Process[0][2][0][19] from the condition-matching single row in the Application nested dataset referenced as Process [0][2][0][10]. In this case, the row did not match the condition.

The TransferData command calls TransferData(222,2,16, 0,2,19,8), and the TransferData command updates the last appended row in the Application nested dataset referenced as Process[0][2][0][19] from the condition-matching single row in the Application nested dataset referenced as Process [0][2][0][10]. In this case, the row did not match the condition.

The CallMethod command calls CallMethod(14). The CallMethod command calls TransferData(60,−1,−1,−1,−1,−1,−1,−1), and the TransferData command updates the rows in the process-generated Application nested dataset referenced as Process[0][2][0][18] from condition-matching rows in the Application nested dataset referenced as Process [0][2][0][19] and constant values, as shown in Table 87:

TABLE 87

Updated Process[0][2][0][18] dataset element values

| RI | CI | Dataset Element | Value |
|----|----|-----------------|-------|
| 0 | 1 | process-generated | <td id=0 align=left style='width:240px;height:20px' onclick="CallMethod(5,0,'')">X10DATA.COM</td> <td id=1 align=right style='width:240px;height:20px' onclick="CallMethod(5,1,'')">Platform Manager</td> |
| 1 | 1 | process-generated | <td id=2 align=center style='width:76px;height:20px' onclick="CallMethod(5,2,'')">File</td> <td id=3 align=center style='width:76px;height:20px' onclick="CallMethod(5,3,'')">Edit</td> <td id=4 align=center style='width:76px;height:20px' onclick="CallMethod(5,4,'')">Cards</td> <td id=5 align=center style='width:76px;height:20px' onclick="CallMethod(5,5,'')">Daily</td> <td id=6 align=center style='width:76px;height:20px' onclick="CallMethod(5,6,'')">Windows</td><td id=7 align=center style='width:76px;height:20px' onclick="CallMethod(5,7,'')">Help</td> |
| 2 | 1 | process-generated | <td id=8 align=center style='width:76px;height:20px' onclick="CallMethod(5,8,'')">Close</td> |

The CallMethod command calls TransferData(61,−1,−1, −1,−1,−1,−1,−1), and the TransferData command updates the rows in the process-generated Application nested dataset referenced as Process[0][2][0][17] from condition-matching rows in the Application nested dataset referenced as Process [0][2][0][18] and constant values, as shown in Table 88:

TABLE 88

Updated Process[0][2][0][17] dataset element values

| RI | CI | Dataset Element | Value |
|---|---|---|---|
| 0 | 1 | process-generated | <tr><td id=0 align=left style='width:240px;height:20px' onclick="CallMethod(5,0,'')">X10DATA.COM</td><td id=1 align=right style='width:240px;height:20px' onclick="CallMethod(5,1,'')">Platform Manager</td></tr> |
| 1 | 1 | process-generated | <tr><td id=2 align=center style='width:76px;height:20px' onclick="CallMethod(5,2,'')">File</td><td id=3 align=center style='width:76px;height:20px' onclick="CallMethod(5,3,'')">Edit</td><td id=4 align=center style='width:76px;height:20px' onclick="CallMethod(5,4,'')">Cards</td><td id=5 align=center style='width:76px;height:20px' onclick="CallMethod(5,5,'')">Daily</td><td id=6 align=center style='width:76px;height:20px' onclick="CallMethod(5,6,'')">Windows</td><td id=7 align=center style='width:76px;height:20px' onclick="CallMethod(5,7,'')">Help</td></tr> |
| 3 | 1 | process-generated | <tr><td id=8 align=center style='width:76px;height:20px' onclick="CallMethod(5,8,'')">Close</td></tr> |

The CallMethod command calls TransferData(69,−1,−1, −1,−1,−1,−1,−1), and the TransferData command updates the single row in the SPTPRequest dataset from constant values, as shown in Table 75.

The CallMethod command calls TransferData(53,−1,−1, −1,−1,−1,−1,−1), and the TransferData command updates the single row in the SPTPRequest dataset from the rows in the Application nested dataset referenced as Process[0][2] [0][17] and constant values, as shown in Table 89:

TABLE 89

Updated SPTPRequest dataset element values

| RI | CI | Dataset Element | Value |
|---|---|---|---|
| 0 | 6 | RequestType | <table border=1px><br><tr><br><td id=0 align=left style='width:240px;height:20px' onclick="CallMethod(5,0,'')">X10DATA.COM</td><br><td id=1 align=right style='width:240px;height:20px' onclick="CallMethod(5,1,'')">Platform Manager</td></tr><br></table><br><table border=1px><br><tr><br><td id=2 align=center style='width:76px;height:20px' onclick="CallMethod(5,2,'')">File</td><br><td id=3 align=center style='width:76px;height:20px' onclick="CallMethod(5,3,'')">Edit</td><br><td id=4 align=center style='width:76px;height:20px' onclick="CallMethod(5,4,'')">Cards</td><br><td id=5 align=center style='width:76px;height:20px' onclick="CallMethod(5,5,'')">Daily</td><br><td id=6 align=center style='width:76px;height:20px' onclick="CallMethod(5,6,'')">Windows</td><br><td id=7 align=center style='width:76px;height:20px' onclick="CallMethod(5,7,'')">Help</td></tr></table><br><table border=1px><tr><td id=0 align=left onclick="CallMethod(6,20,'')" style='width:480px;height:20px;'>Applications</td></tr><br><tr><td id=1 align=left onclick="CallMethod(6,21,'')" style='width:480px;height:20px;'>Commands</td></tr><br><tr><td id=2 align=left onclick="CallMethod(6,7,'')" style='width:480px;height:20px;'>Datasets</td></tr><br><tr><td id=3 align=left onclick="CallMethod(6,11,'')" style='width:480px;height:20px;'>Domains</td></tr> |

TABLE 89-continued

Updated SPTPRequest dataset element values

RI  CI  Dataset Element  Value

```
<tr><td id=4 align=left onclick="CallMethod(6,12,'')"
style='width:480px;height:20px;'>Entities</td></tr>
<tr><td id=5 align=left onclick="CallMethod(6,19,'')"
style='width:480px;height:20px;'>Keys</td></tr>
<tr><td id=6 align=left onclick="CallMethod(6,1,'')"
style='width:480px;height:20px;'>Menus</td></tr>
<tr><td id=7 align=left onclick="CallMethod(6,33,'')"
style='width:480px;height:20px;'>Messages</td></tr>
<tr><td id=8 align=left onclick="CallMethod(6,23,'')"
style='width:480px;height:20px;'>Methods</td></tr>
<tr><td id=9 align=left onclick="CallMethod(6,26,'')"
style='width:480px;height:20px;'>Modes</td></tr>
<tr><td id=10 align=left onclick="CallMethod(6,2,'')"
style='width:480px;height:20px;'>Phrases</td></tr>
<tr><td id=11 align=left onclick="CallMethod(6,22,'')"
style='width:480px;height:20px;'>Stored
Procedures</td></tr>
<tr><td id=12 align=left onclick="CallMethod(6,6,'')"
style='width:480px;height:20px;'>Tables</td></tr>
<tr><td id=13 align=left onclick="CallMethod(6,10,'')"
style='width:480px;height:20px;'>Transfers</td></tr>
</table>
<table border=1px><tr><td id=8 align=center
style='width:76px;height:20px'
onclick="CallMethod(5,8,'')">Close</td></tr>
</table>
```

The CallMethod command invokes the Send/Receive command by calling Send/Receive( ). The Send/Receive command invokes the resource handler of the agent. The resource handler invokes the HTML DOM layout engine resource to incorporate the statement included in the SPTPRequest which renders the second display shown in FIG. 4B.

Above Marks the End of Sample Processes 3 and 4.

If a user clicks the "Entities" element on the display in FIG. 4B, the user event handler of the agent will invoke CallMethod(6,12," "). The CallMethod command will then update the SPTPRequest dataset elements from its parameters for those elements shown in Table 90:

TABLE 90

Updated SPTPRequest dataset element values

| RI | CI | Dataset Element | Value |
|---|---|---|---|
| 0 | 10 | RecordID | 12 |
| 0 | 12 | Value | |

The CallMethod command then invokes the TransferData command by calling TransferData(38,−1,−1,−1,−1,−1,−1). The TransferData command calls TransferData(38,2,1,20,2,10,0). The TransferData command updates the single row in the Application nested dataset referenced as Process[0][2][0][10] from the condition-matching row in the Application nested dataset referenced as Process[0] [2] [0] [4], as shown in Tables 91:

TABLE 91

Updated Process[0][2][0][10] dataset element values

| RI | CI | Dataset Element | Value |
|---|---|---|---|
| 0 | 0 | process-generated | 3 |
| 0 | 1 | process-generated | 3 |

TABLE 91-continued

Updated Process[0][2][0][10] dataset element values

| RI | CI | Dataset Element | Value |
|---|---|---|---|
| 0 | 2 | process-generated | 1 |
| 0 | 3 | process-generated | 99 |
| 0 | 4 | process-generated | 4 |
| 0 | 5 | process-generated | 0 |
| 0 | 6 | process-generated | |
| 0 | 7 | process-generated | 4 |
| 0 | 8 | process-generated | 0 |
| 0 | 9 | process-generated | 0 |
| 0 | 10 | process-generated | 12 |
| 0 | 11 | process-generated | Entities |
| 0 | 12 | process-generated | |
| 0 | 13 | process-generated | Summary |
| 0 | 14 | process-generated | |
| 0 | 15 | process-generated | Entities |
| 0 | 16 | process-generated | 0 |
| 0 | 17 | process-generated | 0 |
| 0 | 18 | process-generated | |

The CallMethod command calls CallMethod(46) which sequentially invokes the ClearData command by calling ClearData(11), ClearData(12), ClearData(13), ClearData(14), ClearData(15), and ClearData(16) to remove the rows from process-generated Application nested datasets referenced as Process[0][2][0][11], Process[0][2][0][12], Process[0][2][0][13], Process[0][2][0][14], Process[0][2][0][15], and Process[0][2][0][16], respectively.

The CallMethod command then calls TransferData(68, −1,−1,−1,−1,−1,−1), and the TransferData command updates the SPTPRequest dataset elements from the Application nested dataset referenced as Process[0][2][0][10], as shown in Table 92:

TABLE 92

Updated SPTPRequest dataset element values

| RI | CI | Dataset Element | Value |
|----|----|-----------------|-------|
| 0  | 9  | ObjectID        | 3     |

The CallMethod command then calls CallMethod(3). The CallMethod command calls TransferData(213,−1,−1,−1,−1,−1,−1), and the TransferData command updates the single row in the process-generated Application nested dataset referenced as Process[0][2][0][10] from the condition-matching row in the "appEntities" Application nested dataset referenced as Process[0][2][0][1], as shown in Table 93:

TABLE 93

Updated Process[0][2][0][10] dataset element values

| RI | CI | Dataset Element   | Value    |
|----|----|-------------------|----------|
| 0  | 4  | process-generated | 4        |
| 0  | 11 | process-generated | Entities |
| 0  | 15 | process-generated | Entities |

The CallMethod command calls TransferData(10,−1,−1,−1,−1,−1,−1), and the TransferData command updates the single row in the process-generated Application nested dataset referenced as Process[0][2][0][10] from condition-matching rows in the "appViews" Application nested dataset referenced as Process[0][2][0][4], as shown in Table 94:

TABLE 94

Updated Process[0][2][0][10] dataset element values

| RI | CI | Dataset Element   | Value |
|----|----|-------------------|-------|
| 0  | 12 | process-generated | All   |

The CallMethod command calls TransferData(9,−1,−1,−1,−1,−1,−1), and the TransferData command appends rows in the process-generated Application nested dataset referenced as Process[0][2][0][12] from condition-matching rows in the "appConditions" Application nested dataset referenced as Process[0][2][0][6]. In this case, no rows matched the conditions.

The CallMethod command calls TransferData(260,−1,−1,−1,−1,−1,−1), and the TransferData command appends rows in the process-generated Application nested dataset referenced as Process[0][2][0][12] from condition-matching rows in the "appConditions" Application nested dataset referenced as Process[0][2][0][6]. In this case, no rows matched the conditions.

The CallMethod command calls CallMethod(47). The CallMethod command calls TransferData(89,−1,−1,−1,−1,−1,−1), and the TransferData command appends a row in the process-generated Application nested dataset referenced as Process[0][2][0][11] from the condition-matching row in the "appKeyAttributes" Application nested dataset referenced as Process[0][2][0][2], as shown in Table 95:

TABLE 95

Appended Process[0][2][0][11] dataset element values

| RI | CI | Dataset Element   | Value    |
|----|----|-------------------|----------|
| 0  | 3  | process-generated | RecordID |
| 0  | 8  | process-generated | 3        |

The CallMethod command calls TransferData(8,−1,−1,−1,−1,−1,−1), and the TransferData command appends rows in the process-generated Application nested dataset referenced as Process[0][2][0][11] from condition-matching rows in the "appColumns" Application nested dataset referenced as Process[0][2][0][5], as shown in Table 96:

TABLE 96

Appended Process[0][2][0][11] dataset element values

| RI | CI | Dataset Element   | Value     |
|----|----|-------------------|-----------|
| 1  | 0  | process-generated | 232       |
| 1  | 1  | process-generated | Name      |
| 1  | 2  | process-generated | 0         |
| 1  | 3  | process-generated | Name      |
| 1  | 4  | process-generated | 5         |
| 1  | 5  | process-generated | 100       |
| 1  | 6  | process-generated | 776       |
| 1  | 7  | process-generated | 1         |
| 1  | 8  | process-generated | 1         |
| 1  | 9  | process-generated | 1         |
| 1  | 10 | process-generated |           |
| 1  | 11 | process-generated | 0         |
| 1  | 12 | process-generated |           |
| 1  | 13 | process-generated |           |
| 1  | 14 | process-generated | 0         |
| 1  | 15 | process-generated | Undefined |
| 1  | 16 | process-generated | 0         |
| 1  | 17 | process-generated | 12        |
| 2  | 0  | process-generated | 256       |
| 2  | 1  | process-generated | Name      |
| 2  | 2  | process-generated | 39        |
| 2  | 3  | process-generated | Name      |
| 2  | 4  | process-generated | 5         |
| 2  | 5  | process-generated | 100       |
| 2  | 6  | process-generated | 3         |
| 2  | 7  | process-generated | 1         |
| 2  | 8  | process-generated | 1         |
| 2  | 9  | process-generated | 0         |
| 2  | 10 | process-generated |           |
| 2  | 11 | process-generated | 0         |
| 2  | 12 | process-generated |           |
| 2  | 13 | process-generated |           |
| 2  | 14 | process-generated | 0         |
| 2  | 15 | process-generated | Undefined |
| 2  | 16 | process-generated | 0         |
| 2  | 17 | process-generated | 6         |

The CallMethod command calls TransferData(257,−1,−1,−1,−1,−1,−1), and the TransferData command removes condition-matching rows in the process-generated Application nested dataset referenced as Process[0][2][0][11]. In this case, no rows matched the conditions.

The CallMethod command calls TransferData(207,−1,−1,−1,−1,−1,−1), and the TransferData command appends rows in the process-generated Application nested dataset referenced as Process[0][2][0][13] from condition-matching rows in the "appRelations" Application nested dataset referenced as Process[0][2][0][7], as shown in Table 97:

TABLE 97

Appended Process[0][2][0][13] dataset element values

| RI | CI | Dataset Element | Value |
|---|---|---|---|
| 0 | 0 | process-generated | 39 |
| 0 | 1 | process-generated | 99 |
| 0 | 2 | process-generated | Tables |
| 0 | 3 | process-generated | 0 |
| 0 | 4 | process-generated | 0 |

The CallMethod command calls TransferData(208,−1, −1,−1,−1,−1,−1), and the TransferData command appends rows in the process-generated Application nested dataset referenced as Process[0][2][0][14] from condition-matching rows in the "appRelationFields" Application nested dataset referenced as Process[0][2][0][8], as shown in Table 98:

TABLE 98

Appended Process[0][2][0][14] dataset element values

| RI | CI | Dataset Element | Value |
|---|---|---|---|
| 0 | 0 | process-generated | 39 |
| 0 | 1 | process-generated | 0 |
| 0 | 2 | process-generated | GUID |
| 0 | 3 | process-generated | ParentID |
| 0 | 4 | process-generated | 0 |
| 0 | 5 | process-generated | 0 |

The CallMethod command calls CallMethod(16) which calls ClearData(20). The ClearData command removes the single row from the process-generated Application nested datasets referenced as Process[0][2][0][20]. In this case, no row pre-existed.

The CallMethod command then calls TransferData(81, −1,−1,−1,−1,−1,−1), and the TransferData command appends a row to the process-generated Application nested dataset referenced as Process[0][2][0][20] from the SPT-PRequest dataset, as shown in Table 99:

TABLE 99

Appended Process[0][2][0][20] dataset element values

| RI | CI | Dataset Element | Value |
|---|---|---|---|
| 0 | 0 | process-generated | SELECT |
| 0 | 1 | process-generated | FROM |
| 0 | 2 | process-generated | WHERE |
| 0 | 3 | process-generated | ORDER BY |

The CallMethod command then calls TransferData(54, −1,−1,−1,−1,−1,−1), and the TransferData command updates the single row in the process-generated Application nested dataset referenced as Process[0][2][0][20] from the condition-matching rows in the Application nested dataset referenced as Process[0][2][0][11], as shown in Table 100:

TABLE 100

Appended Process[0][2][0][20] dataset element values

| RI | CI | Dataset Element | Value |
|---|---|---|---|
| 0 | 0 | process-generated | SELECT [0].[RecordID] AS [0RecordID], [0].[Name] AS [1Name], [39].[Name] AS [2Name], |

The CallMethod command then calls TransferData(76, −1,−1,−1,−1,−1,−1), and the TransferData command updates the single row in the process-generated Application nested dataset referenced as Process[0][2][0][20] from the single row in the Application nested dataset referenced as Process[0][2][0][10], as shown in Table 101:

TABLE 101

Appended Process[0][2][0][20] dataset element values

| RI | CI | Dataset Element | Value |
|---|---|---|---|
| 0 | 1 | process-generated | FROM [Entities] AS [0] |

The CallMethod command then calls TransferData(55, −1,−1,−1,−1,−1,−1), and the TransferData command updates the single row in the process-generated Application nested dataset referenced as Process[0][2][0][20] from the condition-matching rows in the Application nested dataset referenced as Process[0][2][0][13], as shown in Table 102:

TABLE 102

Appended Process[0][2][0][20] dataset element values

| RI | CI | Dataset Element | Value |
|---|---|---|---|
| 0 | 1 | process-generated | FROM [Entities] AS [0] LEFT JOIN [Tables] AS [39] ON |

The TransferData command calls TransferData(56,2,13, 0,2,20,0), and the TransferData command updates the single row in the process-generated Application nested dataset referenced as Process[0][2][0][20] from the condition-matching rows in the Application nested dataset referenced as Process[0][2][0][14] as shown in Table 103:

TABLE 103

Appended Process[0][2][0][20] dataset element values

| RI | CI | Dataset Element | Value |
|---|---|---|---|
| 0 | 1 | process-generated | FROM [Entities] AS [0] LEFT JOIN [Tables] AS [39] ON [39].[GUID] = [0].[ParentID] AND |

The TransferData command calls TransferData(120,2,13, 0,2,20,0), and the TransferData command updates the single row in the process-generated Application nested dataset referenced as Process[0][2][0][20] to trim the element value, as shown in Table 104:

TABLE 104

Appended Process[0][2][0][20] dataset element values

| RI | CI | Dataset Element | Value |
|---|---|---|---|
| 0 | 1 | process-generated | FROM [Entities] AS [0] LEFT JOIN [Tables] AS [39] ON [39].[GUID] = [0].[ParentID] |

The TransferData command calls TransferData(77,−1, −1,−1,−1,−1,−1), and the TransferData command updates the single row in the process-generated Application nested dataset referenced as Process[0][2][0][20] from the single row in the Application nested dataset referenced as Process [0][2][0][10], as shown in Table 105:

TABLE 105

| | | Appended Process[0][2][0][20] dataset element values | |
|---|---|---|---|
| RI | CI | Dataset Element | Value |
| 0 | 2 | process-generated | WHERE [0].[EntityID] = 12 AND [0].[Deleted] = 0 AND [0].[OwnerID] IN ( |

The TransferData command calls TransferData(78,−1,−1,−1,−1,−1,−1), and the TransferData command updates the single row in the process-generated Application nested dataset referenced as Process[0][2][0][20] from the single row in the Application nested dataset referenced as Process[0][2][0][0], as shown in Table 106:

TABLE 106

| | | Appended Process[0][2][0][20] dataset element values | |
|---|---|---|---|
| RI | CI | Dataset Element | Value |
| 0 | 2 | process-generated | WHERE [0].[EntityID] = 12 AND [0].[Deleted] = 0 AND [0].[OwnerID] IN (1) |

The CallMethod command calls TransferData(129,−1,−1,−1,−1,−1,−1), and the TransferData command updates the single row in the process-generated Application nested dataset referenced as Process[0][2][0][20] from the condition-matching single row in the Application nested dataset referenced as Process[0][2][0][10]. In this case, the row did not match the conditions.

The CallMethod command calls TransferData(57,−1,−1,−1,−1,−1,−1), and the TransferData command updates the single row in the process-generated Application nested dataset referenced as Process[0][2][0][20] from condition-matching rows in the Application nested dataset referenced as Process[0][2][0][12]. In this case, the row did not match the conditions.

The CallMethod command calls TransferData(58,−1,−1,−1,−1,−1,−1), and the TransferData command updates the single row in the process-generated Application nested dataset referenced as Process[0][2][0][20] from the condition-matching rows in the Application nested dataset referenced as Process[0][2][0][11], as shown in Table 107:

TABLE 107

| | | Appended Process[0][2][0][20] dataset element values | |
|---|---|---|---|
| RI | CI | Dataset Element | Value |
| 0 | 3 | process-generated | ORDER BY [0].[Name] |

The TransferData command calls TransferData(198,2,11,1,2,20,0), and the TransferData command updates the single row in the process-generated Application nested dataset referenced as Process[0][2][0][20] from the condition-matching, current row in the Application nested dataset referenced as Process[0][2][0][11], as shown in Table 108:

TABLE 108

| | | Appended Process[0][2][0][20] dataset element values | |
|---|---|---|---|
| RI | CI | Dataset Element | Value |
| 0 | 3 | process-generated | ORDER BY [0].[Name]ASC, |

The TransferData command calls TransferData(199,2,11,1,2,20,0), and the TransferData command updates the single row in the process-generated Application nested dataset referenced as Process[0][2][0][20] from the condition-matching, current row in the Application nested dataset referenced as Process[0][2][0][11]. In this case, the current row does not match the conditions.

The CallMethod command calls TransferData(70,−1,−1,−1,−1,−1,−1,−1), and the TransferData command updates the single row in the SPTPRequest dataset from constant values as shown in Table 109:

TABLE 109

| | | Updated SPTPRequest dataset element values | |
|---|---|---|---|
| RI | CI | Dataset Element | Value |
| 0 | 0 | RequestType | 3 |
| 0 | 1 | RemoteConnectType | 1 |
| 0 | 2 | RemoteConnection | http://www.appcase.mobi/x10DATAMWS/Service1.svc/basic |
| 0 | 3 | ResourceConnectType | 4 |
| 0 | 4 | ResourceConnection | Data Source = ADCMAIN\SQL2005; Initial Catalog = x10DATA-MDB; Persist Security Info = True; User ID = sa; Password = demo |
| 0 | 5 | StatementType | 1 |
| 0 | 6 | Statement | |

The CallMethod command calls TransferData(59,−1,−1,−1,−1,−1,−1,−1), and the TransferData command updates the single row in the SPTPRequest dataset from the single row in the Application nested dataset referenced as Process[0] [2] [0] [20], as shown in Table 110:

TABLE 110

| | | Updated SPTPRequest dataset element values | |
|---|---|---|---|
| RI | CI | Dataset Element | Value |
| 0 | 6 | Statement | SELECT [0].[RecordID] AS [0RecordID], [0].[Name] AS [1Name], [39].[Name] AS [2Name] FROM [Entities] AS [0] LEFT JOIN [Tables] AS [39] ON [39].[GUID] = [0].[ParentID] WHERE [0].[EntityID] = 12 AND [0].[Deleted] = 0 AND [0].[OwnerID] IN (1) ORDER BY [0].[Name] ASC |

The CallMethod command invokes the Send/Receive command by calling Send/Receive( ). The Send/Receive command invokes the resource handler of the agent. The resource handler forwards the SPTPRequest to the remote agent identified in the SPTPRequest as SOAP-based web service "appCase.mobi". The remote agent invokes the remote resource identified in the SPTPRequest as SQL Server "ADCMAIN\SQL2005" and database "x10DATA-MDB". The remote resource executes the statement contained in the SPTPRequest and returns the execution results to the remote agent. The remote agent creates an SPTPResponse dataset that includes the execution results as a structured dataset, and returns the SPTPResponse to the resource handler.

The resource handler returns control to the Send/Receive command. The Send/Receive command copies the Data dataset within SPTPResponse[0][3] to Process[0][3] and returns control to the CallMethod command.

The CallMethod command calls TransferData(37,−1,−1,−1,−1,−1,−1), and the TransferData command copies the Process[0][3] dataset to the process-generated Application nested dataset referenced as Process[0][2][0][15], as shown in Table 111:

TABLE 111

Copied Process[0][2][0][15] dataset element values

| RI | CI | Dataset Element | Value |
|---|---|---|---|
| 0 | 0 | process-generated | 24 |
| 0 | 1 | process-generated | App Entity |
| 0 | 2 | process-generated | Relations |
| 1 | 0 | process-generated | 20 |
| 1 | 1 | process-generated | Application |
| 1 | 2 | process-generated | Applications |
| 2 | 0 | process-generated | 15 |
| 2 | 1 | process-generated | Attribute |
| 2 | 2 | process-generated | Attributes |
| 3 | 0 | process-generated | 25 |
| 3 | 1 | process-generated | Attribute Value |
| 3 | 2 | process-generated | ListValues |
| 4 | 0 | process-generated | 21 |
| 4 | 1 | process-generated | Command |
| 4 | 2 | process-generated | Commands |
| 5 | 0 | process-generated | 7 |
| 5 | 1 | process-generated | Dataset |
| 5 | 2 | process-generated | Tables |
| 6 | 0 | process-generated | 5 |
| 6 | 1 | process-generated | Dataset Column |
| 6 | 2 | process-generated | Fields |
| 7 | 0 | process-generated | 34 |
| 7 | 1 | process-generated | Dataset Column Value |
| 7 | 2 | process-generated | ListValues |
| 8 | 0 | process-generated | 11 |
| 8 | 1 | process-generated | Domain |
| 8 | 2 | process-generated | Domains |
| 9 | 0 | process-generated | 12 |
| 9 | 1 | process-generated | Entity |
| 9 | 2 | process-generated | Entities |
| 10 | 0 | process-generated | 4 |
| 10 | 1 | process-generated | Field |
| 10 | 2 | process-generated | Fields |
| 11 | 0 | process-generated | 9 |
| 11 | 1 | process-generated | Filter |
| 11 | 2 | process-generated | Views |
| 12 | 0 | process-generated | 28 |
| 12 | 1 | process-generated | Filter Condition |
| 12 | 2 | process-generated | Conditions |
| 13 | 0 | process-generated | 19 |
| 13 | 1 | process-generated | Key |
| 13 | 2 | process-generated | Keys |
| 14 | 0 | process-generated | 1 |
| 14 | 1 | process-generated | Menu |
| 14 | 2 | process-generated | Menus |
| 15 | 0 | process-generated | 33 |
| 15 | 1 | process-generated | Message |
| 15 | 2 | process-generated | Messages |
| 16 | 0 | process-generated | 23 |
| 16 | 1 | process-generated | Method |
| 16 | 2 | process-generated | Procedures |
| 17 | 0 | process-generated | 13 |
| 17 | 1 | process-generated | Method Step |
| 17 | 2 | process-generated | ProcedureSteps |
| 18 | 0 | process-generated | 26 |
| 18 | 1 | process-generated | Mode |
| 18 | 2 | process-generated | Modes |
| 19 | 0 | process-generated | 35 |
| 19 | 1 | process-generated | Owner |
| 19 | 2 | process-generated | Owners |
| 20 | 0 | process-generated | 2 |
| 20 | 1 | process-generated | Phrase |
| 20 | 2 | process-generated | Phrases |
| 21 | 0 | process-generated | 31 |
| 21 | 1 | process-generated | Relation |
| 21 | 2 | process-generated | Relations |
| 22 | 0 | process-generated | 32 |
| 22 | 1 | process-generated | Relation Field |
| 22 | 2 | process-generated | RelationFields |
| 23 | 0 | process-generated | 22 |
| 23 | 1 | process-generated | Stored Procedure |
| 23 | 2 | process-generated | Procedures |
| 24 | 0 | process-generated | 6 |
| 24 | 1 | process-generated | Table |
| 24 | 2 | process-generated | Tables |
| 25 | 0 | process-generated | 10 |
| 25 | 1 | process-generated | Transfer |
| 25 | 2 | process-generated | Views |
| 26 | 0 | process-generated | 29 |
| 26 | 1 | process-generated | Transfer Column |
| 26 | 2 | process-generated | Columns |
| 27 | 0 | process-generated | 17 |
| 27 | 1 | process-generated | Transfer Condition |
| 27 | 2 | process-generated | Conditions |
| 28 | 0 | process-generated | 18 |
| 28 | 1 | process-generated | Transfer Formula |
| 28 | 2 | process-generated | Conditions |
| 29 | 0 | process-generated | 8 |
| 29 | 1 | process-generated | View |
| 29 | 2 | process-generated | Views |
| 30 | 0 | process-generated | 27 |
| 30 | 1 | process-generated | View Column |
| 30 | 2 | process-generated | Columns |
| 31 | 0 | process-generated | 16 |
| 31 | 1 | process-generated | View Condition |
| 31 | 2 | process-generated | Conditions |

The CallMethod command calls TransferData(11,−1,−1,−1,−1,−1,−1,−1), and the TransferData command appends rows to the process-generated Application nested dataset referenced as Process[0][2][0][16] from condition-matching rows in the "Commands" Program nested dataset (i.e., Process[0][1][0][8]), as shown in Table 112:

TABLE 112

Appended Process[0][2][0][16] dataset element values

| RI | CI | Dataset Element | Value |
|---|---|---|---|
| 0 | 0 | process-generated | 5 |
| 0 | 1 | process-generated | New |
| 0 | 2 | process-generated | 114 |
| 0 | 3 | process-generated | 4 |
| 0 | 4 | process-generated | 7 |
| 0 | 5 | process-generated | 1 |
| 1 | 0 | process-generated | 3 |
| 1 | 1 | process-generated | Close |
| 1 | 2 | process-generated | 27 |
| 1 | 3 | process-generated | 17 |
| 1 | 4 | process-generated | 3 |
| 1 | 5 | process-generated | 1 |

The process defined in Sample Process 1 is executed with dataset element values appended and updated as shown in the tables within those sections. Data element values may vary slightly.

The CallMethod command calls CallMethod(11). The CallMethod command calls TransferData(256,−1,−1,−1,−1,−1,−1), and the TransferData command updates the single row in the SPTPRequest dataset to reset the "Statement" element value to an empty string as shown in Table 113:

TABLE 113

| \multicolumn{4}{c}{Updated SPTPRequest dataset element values} |
|---|---|---|---|
| RI | CI | Dataset Element | Value |
| 0 | 6 | Statement | |

The CallMethod command calls TransferData(255,−1,−1,−1,−1,−1,−1), and the TransferData command updates the single row in the SPTPRequest dataset from constant values as shown in Table 114:

TABLE 114

| \multicolumn{4}{c}{Updated SPTPRequest dataset element values} |
|---|---|---|---|
| RI | CI | Dataset Element | Value |
| 0 | 6 | Statement | \<tr\> |

The TransferData command calls TransferData(249,2,15, 0,−1,−1,0), and the TransferData command updates the single row in the SPTPRequest dataset from the first row in the process-generated Application nested dataset referenced as Process[0][2][0][15], as shown in Table 115:

TABLE 115

| \multicolumn{4}{c}{Updated SPTPRequest dataset element values} |
|---|---|---|---|
| RI | CI | Dataset Element | Value |
| 0 | 10 | RecordID | 24 |

The TransferData command calls TransferData(250,2,15, 0,−1,−1,0), and the TransferData command cross updates the rows in the process-generated Application nested dataset referenced as Process[0][2][0][11] from the current row in the process-generated Application nested dataset referenced as Process[0][2][0][15]. The element value in the RI in Process[0][2][0][11] is set to the element value in the CI in Process[0][2][0][15] where the CI matches the RI, as shown in Table 116:

TABLE 116

| \multicolumn{4}{c}{Updated Process[0][2][0][11] dataset element values} |
|---|---|---|---|
| RI | CI | Dataset Element | Value |
| 0 | 10 | process-generated | 24 |
| 1 | 10 | process-generated | App Entity |
| 2 | 10 | process-generated | Relations |

The TransferData command calls TransferData(253,2,15, 0,−1,−1,0), and the TransferData command calls TransferData(251,2,11,1,−1,−1,0) which updates the Statement element value in the SPTPRequest dataset from the RecordID element value and constant values, as shown in Table 117:

TABLE 117

| \multicolumn{4}{c}{Updated SPTPRequest dataset element values} |
|---|---|---|---|
| RI | CI | Dataset Element | Value |
| 0 | 6 | Statement | \<tr\><br>\<td id=0 align=left<br>onclick="CallMethod(6,24,'')"<br>style='width:240px;height:20px;'\> |

The TransferData command calls TransferData(252,2,11, 1,−1,−1,0), and the TransferData command updates the single row in the SPTPRequest dataset from the first condition-matching row in the Application nested dataset referenced as Process[0][2][0][11], as shown in Table 118:

TABLE 118

| \multicolumn{4}{c}{Updated SPTPRequest dataset element values} |
|---|---|---|---|
| RI | CI | Dataset Element | Value |
| 0 | 6 | Statement | \<tr\><br>\<td id=0 align=left<br>onclick="CallMethod(6,24,'')"<br>style='width:240px;height:20px;'\><br>App Entity\</td\> |

The process discussed above with respect to Table 97 is repeated for all remaining condition-matching rows in the Process[0][2][0][11] dataset. When the last row in Process[0][2][0][11] dataset is processed, the element value in the single row in the SPTPRequest dataset is updated, as shown in Table 119:

TABLE 119

| \multicolumn{4}{c}{Updated SPTPRequest dataset element values} |
|---|---|---|---|
| RI | CI | Dataset Element | Value |
| 0 | 6 | Statement | \<tr\><br>\<td id=0 align=left<br>onclick="CallMethod(6,24,'')"<br>style='width:240px;height:20px;'\><br>App Entity\</td\><br>\<td id=0 align=left<br>onclick="CallMethod(6,24,'')"<br>style='width:240px;height:20px;'\><br>Relations\</td\> |

The TransferData command calls TransferData(254,2,15, 0,−1,−1,0), and the TransferData command updates the single row in the SPTPRequest dataset from constant values, as shown in Table 120:

TABLE 120

| \multicolumn{4}{c}{Updated SPTPRequest dataset element values} |
|---|---|---|---|
| RI | CI | Dataset Element | Value |
| 0 | 6 | Statement | \<tr\><br>\<td id=0 align=left<br>onclick="CallMethod(6,24,'')"<br>style='width:240px;height:20px;'\><br>App Entity\</td\><br>\<td id=0 align=left<br>onclick="CallMethod(6,24,'')"<br>style='width:240px;height:20px;'\><br>Relations\</td\><br>\</tr\> |

The process in the preceding seven paragraphs is repeated for all remaining rows in the Process[0][2][0][15] dataset. When the last row in Process[0][2][0][15] dataset is processed, the element value in the single row in the SPTPRequest dataset is updated, as shown in Table 121:

TABLE 121

| | | Updated SPTPRequest dataset element values | |
|---|---|---|---|
| RI | CI | Dataset Element | Value |
| 0 | 6 | Statement | `<tr><td id=0 align=left onclick="CallMethod(6,24,'')" style='width:240px;height:20px;'>App Entity</td>`<br>`<td id=0 align=left onclick="CallMethod(6,24,'')" style='width:240px;height:20px;'>Relations</td></tr>`<br>`<tr><td id=0 align=left onclick="CallMethod(6,20,'')" style='width:240px;height:20px;'>Application</td>`<br>`<td id=0 align=left onclick="CallMethod(6,20,'')" style='width:240px;height:20px;'>Applications</td></tr>`<br>`<tr><td id=0 align=left onclick="CallMethod(6,15,'')" style='width:240px;height:20px;'>Attribute</td><td id=0 align=left onclick="CallMethod(6,15,'')" style='width:240px;height:20px;'>Attributes</td></tr>`<br>`<tr><td id=0 align=left onclick="CallMethod(6,25,'')" style='width:240px;height:20px;'>Attribute Value</td>`<br>`<td id=0 align=left onclick="CallMethod(6,25,'')" style='width:240px;height:20px;'>ListValues</td></tr>`<br>`<tr><td id=0 align=left onclick="CallMethod(6,21,'')" style='width:240px;height:20px;'>Command</td>`<br>`<td id=0 align=left onclick="CallMethod(6,21,'')" style='width:240px;height:20px;'>Commands</td></tr>`<br>`<tr><td id=0 align=left onclick="CallMethod(6,7,'')" style='width:240px;height:20px;'>Dataset</td>`<br>`<td id=0 align=left onclick="CallMethod(6,7,'')" style='width:240px;height:20px;'>Tables</td></tr`<br>`><tr><td id=0 align=left onclick="CallMethod(6,5,'')" style='width:240px;height:20px;'>Dataset Column</td>`<br>`<td id=0 align=left onclick="CallMethod(6,5,'')" style='width:240px;height:20px;'>Fields</td></tr>`<br>`<tr><td id=0 align=left onclick="CallMethod(6,34,'')" style='width:240px;height:20px;'>Dataset Column Value</td>`<br>`<td id=0 align=left onclick="CallMethod(6,34,'')" style='width:240px;height:20px;'>ListValues</td></tr>`<br>`<tr><td id=0 align=left onclick="CallMethod(6,11,'')" style='width:240px;height:20px;'>Domain</td>`<br>`<td id=0 align=left onclick="CallMethod(6,11,'')" style='width:240px;height:20px;'>Domains</td></tr>`<br>`<tr><td id=0 align=left onclick="CallMethod(6,12,'')" style='width:240px;height:20px;'>Entity</td>`<br>`<td id=0 align=left onclick="CallMethod(6,12,'')" style='width:240px;height:20px;'>Entities</td></tr>`<br>`<tr><td id=0 align=left onclick="CallMethod(6,4,'')" style='width:240px;height:20px;'>Field</td>`<br>`<td id=0 align=left onclick="CallMethod(6,4,'')" style='width:240px;height:20px;'>Fields</td></tr>`<br>`<tr><td id=0 align=left onclick="CallMethod(6,9,'')" style='width:240px;height:20px;'>Filter</td>`<br>`<td id=0 align=left onclick="CallMethod(6,9,'')" style='width:240px;height:20px;'>Views</td></tr>`<br>`<tr><td id=0 align=left onclick="CallMethod(6,28,'')" style='width:240px;height:20px;'>Filter Condition</td>`<br>`<td id=0 align=left onclick="CallMethod(6,28,'')" style='width:240px;height:20px;'>Conditions</td></tr>`<br>`<tr><td id=0 align=left onclick="CallMethod(6,19,'')" style='width:240px;height:20px;'>Key</td>`<br>`<td id=0 align=left onclick="CallMethod(6,19,'')" style='width:240px;height:20px;'>Keys</td></tr>`<br>`<tr><td id=0 align=left onclick="CallMethod(6,1,'')" style='width:240px;height:20px;'>Menu</td><td id=0 align=left onclick="CallMethod(6,1,'')" style='width:240px;height:20px;'>Menus</td></tr>`<br>`<tr><td id=0 align=left onclick="CallMethod(6,33,'')" style='width:240px;height:20px;'>Message</td>`<br>`<td id=0 align=left onclick="CallMethod(6,33,'')" style='width:240px;height:20px;'>Messages</td></tr>`<br>`<tr><td id=0 align=left onclick="CallMethod(6,23,'')" style='width:240px;height:20px;'>Method</td>`<br>`<td id=0 align=left onclick="CallMethod(6,23,'')" style='width:240px;height:20px;'>Procedures</td></tr>`<br>`<tr><td id=0 align=left onclick="CallMethod(6,13,'')" style='width:240px;height:20px;'>Method Step</td>`<br>`<td id=0 align=left onclick="CallMethod(6,13,'')" style='width:240px;height:20px;'>ProcedureSteps</td></tr>`<br>`<tr><td id=0 align=left onclick="CallMethod(6,26,'')" style='width:240px;height:20px;'>Mode</td>`<br>`<td id=0 align=left onclick="CallMethod(6,26,'')" style='width:240px;height:20px;'>Modes</td></tr>` |

TABLE 121-continued

Updated SPTPRequest dataset element values

| RI | CI | Dataset Element | Value |
|---|---|---|---|

```
<tr><td id=0 align=left onclick="CallMethod(6,35,'')"
style='width:240px;height:20px;'>Owner</td>
<td id=0 align=left onclick="CallMethod(6,35,'')"
style='width:240px;height:20px;'>Owners</td></tr>
<tr><td id=0 align=left onclick="CallMethod(6,2,'')"
style='width:240px;height:20px;'>Phrase</td>
<td id=0 align=left onclick="CallMethod(6,2,'')"
style='width:240px;height:20px;'>Phrases</td></tr>
<tr><td id=0 align=left onclick="CallMethod(6,31,'')"
style='width:240px;height:20px;'>Relation</td>
<td id=0 align=left onclick="CallMethod(6,31,'')"
style='width:240px;height:20px;'>Relations</td></tr>
<tr><td id=0 align=left onclick="CallMethod(6,32,'')"
style='width:240px;height:20px;'>Relation Field</td>
<td id=0 align=left onclick="CallMethod(6,32,'')"
style='width:240px;height:20px;'>Relations</td></tr>
<tr><td id=0 align=left onclick="CallMethod(6,22,'')"
style='width:240px;height:20px;'>Stored Procedure</td>
<td id=0 align=left onclick="CallMethod(6,22,'')"
style='width:240px;height:20px;'>Procedures</td></tr>
<tr><td id=0 align=left onclick="CallMethod(6,6,'')"
style='width:240px;height:20px;'>Table</td>
<td id=0 align=left onclick="CallMethod(6,6,'')"
style='width:240px;height:20px;'>Tables</td></tr>
<tr><td id=0 align=left onclick="CallMethod(6,10,'')"
style='width:240px;height:20px;'>Transfer</td>
<td id=0 align=left onclick="CallMethod(6,10,'')"
style='width:240px;height:20px;'>Views</td></tr>
<tr><td id=0 align=left onclick="CallMethod(6,29,'')"
style='width:240px;height:20px;'>Transfer Column</td>
<td id=0 align=left onclick="CallMethod(6,29,'')"
style='width:240px;height:20px;'>Columns</td></tr>
<tr><td id=0 align=left onclick="CallMethod(6,17,'')"
style='width:240px;height:20px;'>Transfer Condition</td>
<td id=0 align=left onclick="CallMethod(6,17,'')"
style='width:240px;height:20px;'>Conditions</td></tr>
<tr><td id=0 align=left onclick="CallMethod(6,18,'')"
style='width:240px;height:20px;'>Transfer Formula</td>
<td id=0 align=left onclick="CallMethod(6,18,'')"
style='width:240px;height:20px;'>Conditions</td></tr>
<tr><td id=0 align=left onclick="CallMethod(6,8,'')"
style='width:240px;height:20px;'>View</td>
<td id=0 align=left onclick="CallMethod(6,8,'')"
style='width:240px;height:20px;'>Views</td></tr>
<tr><td id=0 align=left onclick="CallMethod(6,27,'')"
style='width:240px;height:20px;'>View Column</td>
<td id=0 align=left onclick="CallMethod(6,27,'')"
style='width:240px;height:20px;'>Columns</td></tr>
<tr><td id=0 align=left onclick="CallMethod(6,16,'')"
style='width:240px;height:20px;'>View Condition</td>
<td id=0 align=left onclick="CallMethod(6,16,'')"
style='width:240px;height:20px;'>Conditions</td></tr>
```

The CallMethod command calls TransferData(248,−1,−1,−1,−1,−1,−1), and the TransferData command appends a row to the process-generated Application nested dataset referenced as Process[0][2][0][17] from the single row in the SPTPRequest dataset, as shown in Table 122:

TABLE 122

Appended Process[0][2][0][17] dataset element values

| RI | CI | Dataset Element | Value |
|---|---|---|---|
| 3 | 0 | process-generated | List |
| 3 | 1 | process-generated | [same content as Table 123] |

The CallMethod command calls CallMethod(13). The CallMethod command calls TransferData(30,−1,−1,−1,−1,−1,−1), and the TransferData command appends a row to the process-generated Application nested dataset referenced as Process[0][2][0][17] from constant values, as shown in Table 123:

TABLE 123

Appended Process[0][2][0][17] dataset element values

| RI | CI | Dataset Element | Value |
|---|---|---|---|
| 4 | 0 | process-generated | Command Bar |

The TransferData command calls TransferData(75,2,10,0,2,17,4), and the TransferData command appends a row to the process-generated Application nested dataset referenced as Process[0][2][0][18] from constant and parameter values, as shown in Table 124:

TABLE 124

Appended Process[0][2][0][18] dataset element values

| RI | CI | Dataset Element | Value |
|---|---|---|---|
| 4 | 0 | process-generated | 4 |
| 4 | 1 | process-generated |  |
| 4 | 2 | process-generated | 0 |

The TransferData command calls TransferData(50,2,10, 0,2,18,4), and the TransferData command appends rows to the process-generated Application nested dataset referenced as Process[0][2][0][19] from condition-matching rows in the "Commands" Program nested dataset (i.e., Process[0][1][0][8]) and constant and parameter values, as shown in Table 125:

TABLE 125

Appended Process[0][2][0][19] dataset element values

| RI | CI | Dataset Element | Value |
|---|---|---|---|
| 12 | 0 | process-generated | 4 |
| 12 | 1 | process-generated | 0 |
| 12 | 2 | process-generated | New |
| 12 | 3 | process-generated | 76 |
| 12 | 4 | process-generated | 20 |
| 12 | 5 | process-generated | Center |
| 12 | 6 | process-generated | 4 |
| 12 | 7 | process-generated | 7 |
| 12 | 8 | process-generated | 1 |
| 12 | 9 | process-generated | 99 |
| 12 | 10 | process-generated |  |
| 12 | 11 | process-generated | 0 |
| 12 | 12 | process-generated | 0 |
| 12 | 13 | process-generated | 12 |
| 12 | 14 | process-generated | 0 |
| 12 | 15 | process-generated | 12 |
| 12 | 16 | process-generated | 5 |
| 13 | 0 | process-generated | 4 |
| 13 | 1 | process-generated | 0 |
| 13 | 2 | process-generated | Close |
| 13 | 3 | process-generated | 76 |
| 13 | 4 | process-generated | 20 |
| 13 | 5 | process-generated | Center |
| 13 | 6 | process-generated | 17 |
| 13 | 7 | process-generated | 3 |
| 13 | 8 | process-generated | 1 |
| 13 | 9 | process-generated | 99 |
| 13 | 10 | process-generated |  |
| 13 | 11 | process-generated | 0 |
| 13 | 12 | process-generated | 0 |
| 13 | 13 | process-generated | 13 |
| 13 | 14 | process-generated | 0 |
| 13 | 15 | process-generated | 12 |
| 13 | 16 | process-generated | 3 |

The process defined in Sample Process 4 is executed with dataset element values appended and updated as shown in the tables within those sections. Specific dataset element values will vary in some cases. The completion of this process renders the display as shown in FIG. 4C.

If a user clicks the "New" element on the display in FIG. 4C, the user event handler of the agent will invoke CallMethod(5,12," "). The CallMethod command will then update the SPTPRequest dataset elements from its parameters for those elements shown in Table 126:

TABLE 126

Updated SPTPRequest dataset element values

| RI | CI | Dataset Element | Value |
|---|---|---|---|
| 0 | 10 | RecordID | 12 |
| 0 | 12 | Value |  |

The CallMethod command then invokes the TransferData command by calling TransferData(7,−1,−1,−1,−1,−1,−1,−1). The TransferData command updates the single row in the Application nested dataset referenced as Process[0][2][0][10] from the condition-matching row in the Application nested dataset referenced as Process[0][2][0][19], as shown in Tables 127:

TABLE 127

Updated Process[0][2][0][10] dataset element values

| RI | CI | Dataset Element | Value |
|---|---|---|---|
| 0 | 0 | process-generated | 4 |
| 0 | 1 | process-generated | 7 |
| 0 | 2 | process-generated | 1 |
| 0 | 3 | process-generated | 99 |
| 0 | 5 | process-generated | 5 |
| 0 | 6 | process-generated |  |
| 0 | 7 | process-generated | 0 |
| 0 | 8 | process-generated | 0 |
| 0 | 10 | process-generated | 12 |
| 0 | 17 | process-generated | 0 |

The CallMethod command calls CallMethod(46) which sequentially invokes the ClearData command by calling ClearData(11), ClearData(12), ClearData(13), ClearData(14), ClearData(15), and ClearData(16) to remove the rows from process-generated Application nested datasets referenced as Process[0][2][0][11], Process[0][2][0][12], Process[0][2][0][13], Process[0][2][0][14], Process[0][2][0][15], and Process[0][2][0][16], respectively.

The CallMethod command then calls TransferData(68,−1,−1,−1,−1,−1,−1), and the TransferData command updates the SPTPRequest dataset elements from the Application nested dataset referenced as Process[0][2][0][10], as shown in Table 128:

TABLE 128

Updated SPTPRequest dataset element values

| RI | CI | Dataset Element | Value |
|---|---|---|---|
| 0 | 9 | ObjectID | 4 |

The CallMethod command then calls CallMethod(4). The CallMethod command calls TransferData(240,−1,−1,−1,−1,−1,−1), and the TransferData command updates the single row in the process-generated Application nested dataset referenced as Process[0][2][0][10] from constant values, as shown in Table 129:

TABLE 129

Updated Process[0][2][0][10] dataset element values

| RI | CI | Dataset Element | Value |
|---|---|---|---|
| 0 | 3 | process-generated | 0 |
| 0 | 12 | process-generated |  |

The CallMethod command calls TransferData(212,−1,−1,−1,−1,−1,−1), and the TransferData command updates the single row in the process-generated Application nested dataset referenced as Process[0][2][0][10] from the condition-matching row in the "appEntities" Application nested dataset referenced as Process[0][2][0][1], as shown in Table 130:

TABLE 130

Updated Process[0][2][0][10] dataset element values

| RI | CI | Dataset Element | Value |
|---|---|---|---|
| 0 | 3 | process-generated | 175 |

The CallMethod command calls TransferData(125,−1,−1,−1,−1,−1,−1), and the TransferData command updates the single row in the process-generated Application nested dataset referenced as Process[0][2][0][10] from the condition-matching row in the "appEntities" Application nested dataset referenced as Process[0][2][0][1], as shown in Table 131:

TABLE 131

Updated Process[0][2][0][10] dataset element values

| RI | CI | Dataset Element | Value |
|---|---|---|---|
| 0 | 11 | process-generated | Entity |
| 0 | 15 | process-generated | Entities |

The CallMethod command calls TransferData(127,−1,−1,−1,−1,−1,−1), and the TransferData command updates the single row in the process-generated Application nested dataset referenced as Process[0][2][0][10] from the condition-matching row in the Application nested dataset referenced as Process[0][2][0][8], as shown in Table 132:

TABLE 132

Updated Process[0][2][0][10] dataset element values

| RI | CI | Dataset Element | Value |
|---|---|---|---|
| 0 | 11 | process-generated | New Entity |

The CallMethod command calls TransferData(122,−1,−1,−1,−1,−1,−1), and the TransferData command updates the single row in the process-generated Application nested dataset referenced as Process[0][2][0][10] from the condition-matching row in the "appViews" Application nested dataset referenced as Process[0][2][0][4], as shown in Table 133:

TABLE 133

Updated Process[0][2][0][10] dataset element values

| RI | CI | Dataset Element | Value |
|---|---|---|---|
| 0 | 13 | process-generated | Detail |

The CallMethod command calls CallMethod(62) which calls TransferData(8,−1,−1,−1,−1,−1,−1), and the TransferData command appends rows in the process-generated Application nested dataset referenced as Process[0][2][0][11] from condition-matching rows in the "appColumns" Application nested dataset referenced as Process[0][2][0][5], as shown in Table 134:

TABLE 134

Appended Process[0][2][0][11] dataset element values

| RI | CI | Dataset Element | Value |
|---|---|---|---|
| 0 | 0 | process-generated | 715 |
| 0 | 1 | process-generated | Name |
| 0 | 2 | process-generated | 0 |
| 0 | 3 | process-generated | Name |
| 0 | 4 | process-generated | 5 |
| 0 | 5 | process-generated | 100 |
| 0 | 6 | process-generated | 776 |
| 0 | 7 | process-generated | 1 |
| 0 | 8 | process-generated | 1 |
| 0 | 9 | process-generated | 1 |
| 0 | 10 | process-generated |  |
| 0 | 11 | process-generated | 0 |
| 0 | 12 | process-generated |  |
| 0 | 13 | process-generated |  |
| 0 | 14 | process-generated | 0 |
| 0 | 15 | process-generated | Undefined |
| 0 | 16 | process-generated | 0 |
| 0 | 17 | process-generated | 12 |
| 1 | 0 | process-generated | 1169 |
| 1 | 1 | process-generated | Type |
| 1 | 2 | process-generated | 0 |
| 1 | 3 | process-generated | TypeCode |
| 1 | 4 | process-generated | 1 |
| 1 | 5 | process-generated | 0 |
| 1 | 6 | process-generated | 777 |
| 1 | 7 | process-generated | 2 |
| 1 | 8 | process-generated | 1 |
| 1 | 9 | process-generated | 0 |
| 1 | 10 | process-generated |  |
| 1 | 11 | process-generated | 0 |
| 1 | 12 | process-generated |  |
| 1 | 13 | process-generated |  |
| 1 | 14 | process-generated | 0 |
| 1 | 15 | process-generated | Undefined |
| 1 | 16 | process-generated | 0 |
| 1 | 17 | process-generated | 12 |
| 2 | 0 | process-generated | 719 |
| 2 | 1 | process-generated | Table |
| 2 | 2 | process-generated | 0 |
| 2 | 3 | process-generated | ParentID |
| 2 | 4 | process-generated | 3 |
| 2 | 5 | process-generated | 0 |
| 2 | 6 | process-generated | 788 |
| 2 | 7 | process-generated | 3 |
| 2 | 8 | process-generated | 1 |
| 2 | 9 | process-generated | 0 |
| 2 | 10 | process-generated |  |
| 2 | 11 | process-generated | 0 |
| 2 | 12 | process-generated |  |
| 2 | 13 | process-generated |  |
| 2 | 14 | process-generated | 0 |
| 2 | 15 | process-generated | Undefined |
| 2 | 16 | process-generated | 0 |
| 2 | 17 | process-generated | 12 |

The CallMethod command calls TransferData(142,−1,−1,−1,−1,−1,−1), and the TransferData command copies the nested dataset within a data element in the single row Application dataset referenced as Process[0][2][0][9] to the Application nested dataset referenced as Process[0][2][0][12].

The CallMethod command calls TransferData(265,−1,−1,−1,−1,−1,−1), and the TransferData command removes rows in the Application dataset referenced as Process[0][2][0][11] for condition-matching rows in the Application nested dataset referenced as Process[0][2][0][12]. In this case, no rows existed in the Process[0][2][0][12] dataset.

The CallMethod command calls TransferData(259,−1,−1,−1,−1,−1,−1), and the TransferData command appends rows to the Application dataset referenced as Process[0][2][0][11] for condition-matching rows in the Application nested dataset referenced as Process[0][2][0][12]. In this case, no rows existed in the Process[0][2][0][12] dataset.

The CallMethod command calls TransferData(11,−1,−1,−1,−1,−1,−1,−1), and the TransferData command appends rows to the process-generated Application nested dataset referenced as Process[0][2][0][16] from condition-matching rows in the "Commands" Program nested dataset (i.e., Process[0][1][0][8]), as shown in Table 135:

TABLE 135

Appended Process[0][2][0][16] dataset element values

| RI | CI | Dataset Element | Value |
|----|----|-----------------|-------|
| 0 | 0 | process-generated | 9 |
| 0 | 1 | process-generated | Save |
| 0 | 2 | process-generated | 121 |
| 0 | 3 | process-generated | 18 |
| 0 | 4 | process-generated | 7 |
| 0 | 5 | process-generated | 1 |
| 1 | 0 | process-generated | 8 |
| 1 | 1 | process-generated | Close |
| 1 | 2 | process-generated | 27 |
| 1 | 3 | process-generated | 17 |
| 1 | 4 | process-generated | 7 |
| 1 | 5 | process-generated | 1 |

The process defined in Sample Process 1 is executed with dataset element values appended and updated as shown in the tables within those sections. Data element values may vary slightly.

The CallMethod command calls CallMethod(12). The CallMethod command calls TransferData(51,−1,−1,−1,−1,−1,−1), and the TransferData command appends a row to the process-generated Application nested dataset referenced as Process[0][2][0][17] from constant values, as shown in Table 136.

TABLE 136

Appended Process[0][2][0][17] dataset element values

| RI | CI | Dataset Element | Value |
|----|----|-----------------|-------|
| 3 | 0 | process-generated | Detail |

The TransferData command calls TransferData(72,2,10, 0,2,17,3), and the TransferData command appends a row to the process-generated Application nested dataset referenced as Process[0][2][0][18] from constant and parameter values, as shown in Table 137:

TABLE 137

Appended Process[0][2][0][18] dataset element values

| RI | CI | Dataset Element | Value |
|----|----|-----------------|-------|
| 4 | 0 | process-generated | 3 |
| 4 | 1 | process-generated |   |
| 4 | 2 | process-generated | 0 |

The TransferData command calls TransferData(52,2,11, 0,2,18,4), and the TransferData command appends rows to the process-generated Application nested dataset referenced as Process[0][2][0][19] from condition-matching rows in the Application nested dataset referenced as Process[0][2][0][11] and constant and parameter values, as shown in Table 138:

TABLE 138

Appended Process[0][2][0][19] dataset element values

| RI | CI | Dataset Element | Value |
|----|----|-----------------|-------|
| 12 | 0 | process-generated | 4 |
| 12 | 1 | process-generated | 1 |
| 12 | 2 | process-generated | Name |
| 12 | 3 | process-generated | 240 |
| 12 | 4 | process-generated | 20 |
| 12 | 5 | process-generated | left |
| 12 | 6 | process-generated | 0 |
| 12 | 7 | process-generated | 0 |
| 12 | 8 | process-generated | 0 |
| 12 | 9 | process-generated | 0 |
| 12 | 10 | process-generated |  |
| 12 | 11 | process-generated | 0 |
| 12 | 12 | process-generated | 0 |
| 12 | 13 | process-generated | 12 |
| 12 | 14 | process-generated | 0 |
| 12 | 15 | process-generated | 0 |
| 12 | 16 | process-generated | 0 |

The TransferData command calls TransferData(123,2,11, 0,2,18,4), and the TransferData command appends rows to the process-generated Application nested dataset referenced as Process[0][2][0][19] from condition-matching rows in the Application nested dataset referenced as Process[0][2][0][11] and constant and parameter values, as shown in Table 139:

TABLE 139

Appended Process[0][2][0][19] dataset element values

| RI | CI | Dataset Element | Value |
|----|----|-----------------|-------|
| 13 | 0 | process-generated | 4 |
| 13 | 1 | process-generated | 3 |
| 13 | 2 | process-generated |  |
| 13 | 3 | process-generated | 240 |
| 13 | 4 | process-generated | 20 |
| 13 | 5 | process-generated | left |
| 13 | 6 | process-generated | 0 |
| 13 | 7 | process-generated | 0 |
| 13 | 8 | process-generated | 0 |
| 13 | 9 | process-generated | 0 |
| 13 | 10 | process-generated |  |
| 13 | 11 | process-generated | 0 |
| 13 | 12 | process-generated | 0 |
| 13 | 13 | process-generated | 13 |
| 13 | 14 | process-generated | 0 |
| 13 | 15 | process-generated | 0 |
| 13 | 16 | process-generated | 0 |

The process in the preceding two paragraphs is repeated for all remaining condition-matching rows in the Process[0][2][0][11] dataset resulting in additional appended rows in the Process[0][2][0][19] dataset shown in Table 140:

TABLE 140

Appended Process[0][2][0][19] dataset element values

| RI | CI | Dataset Element | Value |
|----|----|-----------------|-------|
| 14 | 0 | process-generated | 5 |
| 14 | 1 | process-generated | 1 |
| 14 | 2 | process-generated | Type |
| 14 | 3 | process-generated | 240 |
| 14 | 4 | process-generated | 20 |
| 14 | 5 | process-generated | left |
| 14 | 6 | process-generated | 0 |
| 14 | 7 | process-generated | 0 |
| 14 | 8 | process-generated | 0 |
| 14 | 9 | process-generated | 0 |

TABLE 140-continued

Appended Process[0][2][0][19] dataset element values

| RI | CI | Dataset Element | Value |
|---|---|---|---|
| 14 | 10 | process-generated | |
| 14 | 11 | process-generated | 0 |
| 14 | 12 | process-generated | 0 |
| 14 | 13 | process-generated | 14 |
| 14 | 14 | process-generated | 0 |
| 14 | 15 | process-generated | 0 |
| 14 | 16 | process-generated | 0 |
| 15 | 0 | process-generated | 5 |
| 15 | 1 | process-generated | 1 |
| 15 | 2 | process-generated | |
| 15 | 3 | process-generated | 240 |
| 15 | 4 | process-generated | 20 |
| 15 | 5 | process-generated | left |
| 15 | 6 | process-generated | 3 |
| 15 | 7 | process-generated | 14 |
| 15 | 8 | process-generated | 2 |
| 15 | 9 | process-generated | 0 |
| 15 | 10 | process-generated | |
| 15 | 11 | process-generated | 777 |
| 15 | 12 | process-generated | 0 |
| 15 | 13 | process-generated | 15 |
| 15 | 14 | process-generated | 1169 |
| 15 | 15 | process-generated | 0 |
| 15 | 16 | process-generated | 0 |
| 16 | 0 | process-generated | 6 |
| 16 | 1 | process-generated | 1 |
| 16 | 2 | process-generated | Table |
| 16 | 3 | process-generated | 240 |
| 16 | 4 | process-generated | 20 |
| 16 | 5 | process-generated | left |
| 16 | 6 | process-generated | 4 |
| 16 | 7 | process-generated | 6 |
| 16 | 8 | process-generated | 1 |
| 16 | 9 | process-generated | 0 |
| 16 | 10 | process-generated | |
| 16 | 11 | process-generated | 0 |
| 16 | 12 | process-generated | 0 |
| 16 | 13 | process-generated | 16 |
| 16 | 14 | process-generated | 0 |
| 16 | 15 | process-generated | 6 |
| 16 | 16 | process-generated | 0 |
| 17 | 0 | process-generated | 6 |
| 17 | 1 | process-generated | 1 |
| 17 | 2 | process-generated | |
| 17 | 3 | process-generated | 240 |
| 17 | 4 | process-generated | 20 |
| 17 | 5 | process-generated | left |
| 17 | 6 | process-generated | 3 |
| 17 | 7 | process-generated | 13 |
| 17 | 8 | process-generated | 1 |
| 17 | 9 | process-generated | 62 |
| 17 | 10 | process-generated | |
| 17 | 11 | process-generated | 0 |
| 17 | 12 | process-generated | 0 |
| 17 | 13 | process-generated | 17 |
| 17 | 14 | process-generated | 719 |
| 17 | 15 | process-generated | 6 |
| 17 | 16 | process-generated | 0 |

The process defined in Sample Process 3 is executed with dataset element values appended and updated as shown in the Tables within those sections. Specific dataset element values will vary in some cases. The completion of this process renders the display as shown in FIG. 4D.

If a user inputs the text "Function" within the "Name" input element on the display as shown in FIG. 4E, and then causes the display element's OnChange event to execute, the user event handler of the agent will invoke CallMethod(15, 715,"Function"). The CallMethod command will then update the SPTPRequest dataset elements from its parameters for those elements shown in Table 141:

TABLE 141

Updated SPTPRequest dataset element values

| RI | CI | Dataset Element | Value |
|---|---|---|---|
| 0 | 10 | RecordID | 715 |
| 0 | 12 | Value | Function |

The CallMethod command then invokes the TransferData command by calling TransferData(223,−1,−1,−1,−1,−1,−1, −1). The TransferData command calls TransferData(47,2,11, 0,2,11,0) which updates the condition-matching row in the Application nested dataset referenced as Process[0][2][0] [11] from the single row in the SPTPRequest dataset, as shown in Table 142:

TABLE 142

Updated Process[0][2][0][11] dataset element values

| RI | CI | Dataset Element | Value |
|---|---|---|---|
| 0 | 10 | process-generated | Function |

The CallMethod command then calls TransferData(163, −1,−1,−1,−1,−1,−1), which calls TransferData(164,2,9,2,2, 9,2). The TransferData command copies the Application nested dataset referenced as Process[0][2][0][11] into a data element of the condition-matching row in the Application nested dataset referenced as Process[0][2][0][9], as shown in Table 143:

TABLE 143

Updated Process[0][2][0][9] dataset element values

| RI | CI | Dataset Element | Value |
|---|---|---|---|
| 2 | 4 | process-generated | Process[0][2][0][11] dataset |

The TransferData command then calls TransferData(221, 2,9,2,2,9,2). The TransferData command copies the Application nested dataset referenced as Process[0][2][0][10] into a data element of the appended row in the Application nested dataset referenced as Process[0][2][0][9], as shown in Table 144:

TABLE 144

Updated Process[0][2][0][9] dataset element values

| RI | CI | Dataset Element | Value |
|---|---|---|---|
| 2 | 3 | process-generated | Process[0][2][0][10] dataset |

If a user clicks the "Type" input element on the display, the user event handler of the agent will invoke CallMethod (5,15," "). The CallMethod command will then update the SPTPRequest dataset elements from its parameters for those elements shown in Table 145.

TABLE 145

Updated SPTPRequest dataset element values

| RI | CI | Dataset Element | Value |
|---|---|---|---|
| 0 | 10 | RecordID | 15 |
| 0 | 12 | Value | |

The process defined in Sample Process 3 is executed with dataset element values appended and updated as shown in the tables within those sections. Specific dataset element values will vary in some cases. The completion of this process renders the display as shown in FIG. 4F.

If a user clicks the "Bound" element on the display in FIG. 4F, the user event handler of the agent will invoke CallMethod(6,1," "). The CallMethod command will then update the SPTPRequest dataset elements from its parameters for those elements shown in Table 146:

TABLE 146

Updated SPTPRequest dataset element values

| RI | CI | Dataset Element | Value |
|---|---|---|---|
| 0 | 10 | RecordID | 1 |
| 0 | 12 | Value | |

The process defined in Sample Process 3 is executed with dataset element values appended and updated as shown in the tables within those sections. Specific dataset element values will vary in some cases. The completion of this process renders the display shown in FIG. 4G.

If a user clicks the "Table" input element on the display in FIG. 4G, the user event handler of the agent will invoke CallMethod(5,17," "). The CallMethod command will then update the SPTPRequest dataset elements from its parameters for those elements shown in Table 147:

TABLE 147

Updated SPTPRequest dataset element values

| RI | CI | Dataset Element | Value |
|---|---|---|---|
| 0 | 10 | RecordID | 17 |
| 0 | 12 | Value | |

The process defined in Sample Process 3 is executed with dataset element values appended and updated as shown in the tables within those sections. Specific dataset element values will vary in some cases. The completion of this process renders the display as shown in FIG. 4H.

If a user clicks the "Views" element on the display in FIG. 4H, the user event handler of the agent will invoke CallMethod(6,15," "). The CallMethod command will then update the SPTPRequest dataset elements from its parameters for those elements shown in Table 148:

TABLE 148

Updated SPTPRequest dataset element values

| RI | CI | Dataset Element | Value |
|---|---|---|---|
| 0 | 10 | RecordID | 15 |
| 0 | 12 | Value | |

The process defined in Sample Process 3 is executed with dataset element values appended and updated as shown in the tables within those sections. Specific dataset element values will vary in some cases. The completion of this process renders the display as shown in FIG. 4I.

If a user clicks the "Save" element on the display in FIG. 4I, the user event handler of the agent will invoke CallMethod(5,26," "). The CallMethod command will then update the SPTPRequest dataset elements from its parameters for those elements shown in Table 149:

TABLE 149

Updated SPTPRequest dataset element values

| RI | CI | Dataset Element | Value |
|---|---|---|---|
| 0 | 10 | RecordID | 26 |
| 0 | 12 | Value | |

The process defined in Sample Process 3 is executed with dataset element values appended and updated as shown in the tables within those sections. Specific dataset element values will vary in some cases. The completion of this process renders the display as shown in FIG. 4J.

If a user clicks the "Function" element on the display in FIG. 4J, the user event handler of the agent will invoke CallMethod(6,64," "). The CallMethod command will then update the SPTPRequest dataset elements from its parameters for those elements shown in Table 150:

TABLE 150

Updated SPTPRequest dataset element values

| RI | CI | Dataset Element | Value |
|---|---|---|---|
| 0 | 10 | RecordID | 64 |
| 0 | 12 | Value | |

The process defined in Sample Process 3 is executed with dataset element values appended and updated as shown in the tables within those sections. Specific dataset element values will vary in some cases. The completion of this process renders the display as shown in FIG. 4K.

If a user clicks the "Table" label element on the display in FIG. 4K, the user event handler of the agent will invoke CallMethod(5,16," "). The CallMethod command will then update the SPTPRequest dataset elements from its parameters for those elements shown in Table 151:

TABLE 151

Updated SPTPRequest dataset element values

| RI | CI | Dataset Element | Value |
|---|---|---|---|
| 0 | 10 | RecordID | 16 |
| 0 | 12 | Value | |

The process defined in Sample Process 3 is executed with dataset element values appended and updated as shown in the tables within those sections. Specific dataset element values will vary in some cases. The completion of this process renders the display as shown in FIG. 4L.

If a user clicks the "Detail" element on the display in FIG. 4L, the user event handler of the agent will invoke CallMethod(5,9," "). The CallMethod command will then update the SPTPRequest dataset elements from its parameters for those elements shown in Table 152.

TABLE 152

Updated SPTPRequest dataset element values

| RI | CI | Dataset Element | Value |
|---|---|---|---|
| 0 | 10 | RecordID | 9 |
| 0 | 12 | Value | |

The process defined in Sample Process 3 is executed with dataset element values appended and updated as shown in the tables within those sections. Specific dataset element values will vary in some cases. The completion of this process renders the display as shown in FIG. 4M.

If a user clicks the "Entities" element on the display in FIG. 4M, the user event handler of the agent will invoke CallMethod(6,6," "). The CallMethod command will then update the SPTPRequest dataset elements from its parameters for those elements shown in Table 153.

TABLE 153

Updated SPTPRequest dataset element values

| RI | CI | Dataset Element | Value |
|----|----|-----------------|-------|
| 0  | 10 | RecordID        | 6     |
| 0  | 12 | Value           |       |

The process defined in Sample Process 3 is executed with dataset element values appended and updated as shown in the tables within those sections. Specific dataset element values will vary in some cases. The completion of this process renders the display as shown in FIG. 4N.

Figure 4N:
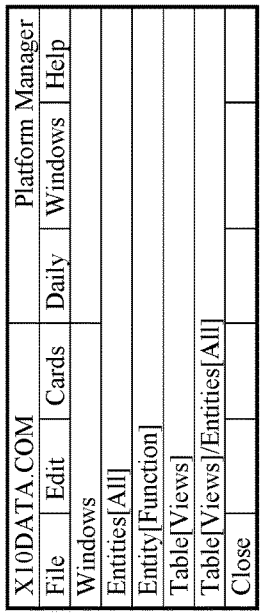
FIGS. 4A-4Q illustrate displays produced by an example processing of a sample utility, according to an embodiment.

If a user clicks the "X10DATA.COM" element on the display in FIG. 4N, the user event handler of the agent will invoke CallMethod(5,0," "). The CallMethod command will then update the SPTPRequest dataset elements from its parameters for those elements shown in Table 154.

TABLE 154

Updated SPTPRequest dataset element values

| RI | CI | Dataset Element | Value |
|----|----|-----------------|-------|
| 0  | 10 | RecordID        | 0     |
| 0  | 12 | Value           |       |

The process defined in Sample Process 3 is executed with dataset element values appended and updated as shown in the tables within those sections. Specific dataset element values will vary in some cases. The completion of this process renders the display as shown in FIG. 4O.

Figure 4P:
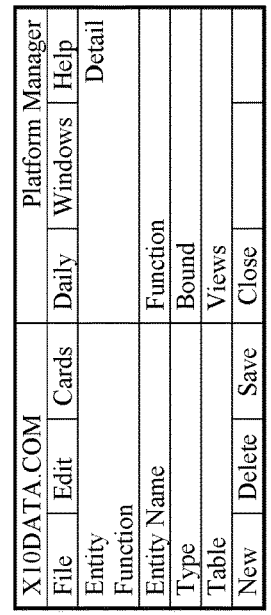
Figure 4O:
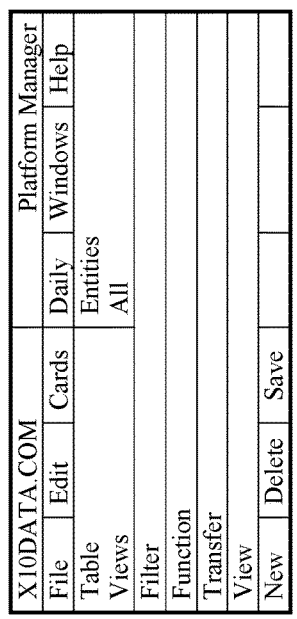

If a user clicks the "Windows" element on the display in FIG. 4O, the user event handler of the agent will invoke CallMethod(5,6," "). The CallMethod command will then update the SPTPRequest dataset elements from its parameters for those elements shown in Table 155.

TABLE 155

Updated SPTPRequest dataset element values

| RI | CI | Dataset Element | Value |
|----|----|-----------------|-------|
| 0  | 10 | RecordID        | 6     |
| 0  | 12 | Value           |       |

The process defined in Sample Process 3 is executed with dataset element values appended and updated as shown in the tables within those sections. Specific dataset element values will vary in some cases. The completion of this process renders the display as shown in FIG. 4P.

If a user clicks the "Entity[Function]" element on the display in FIG. 4P, the user event handler of the agent will invoke CallMethod(6,8," "). The CallMethod command will then update the SPTPRequest dataset elements from its parameters for those elements shown in Table 156.

TABLE 156

Updated SPTPRequest dataset element values

| RI | CI | Dataset Element | Value |
|----|----|-----------------|-------|
| 0  | 10 | RecordID        | 8     |
| 0  | 12 | Value           |       |

Figure 4Q:
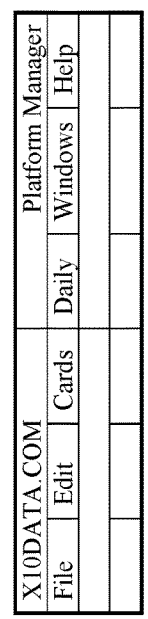

The process defined in Sample Process 3 is executed with dataset element values appended and updated as shown in the tables within those sections. Specific dataset element values will vary in some cases. The completion of this process renders the display as shown in FIG. 4Q.

7. Example Processing Device

FIG. 5 is a block diagram illustrating an example wired or wireless system 550 that may be used in connection with various embodiments described herein, including as the disclosed machine(s). For example the system 550 may be used as or in conjunction with one or more of the modules described herein, such as for executing the disclosed agent and/or metadata-driven command processor, and their respective components or modules. The system 550 can be a conventional personal computer, computer server, personal digital assistant, smart phone, tablet computer, navigation system, thermostat, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the main memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

8. Example Instructions Sets

Instruction Set 1, as discussed above, may be expressed as follows:

```
/* Instruction set 1: */
var SPTPRequest = [ ];
SPTPRequest[0] = new Array(15);
var SPTPResponse = [ ];
SPTPResponse[0] = new Array(4);
var Message = [ ];
Message[0] = new Array(4);
var Process = [ ];
Process[0] = new Array(4);
function ProcessRequest( ) {
try {
ProcessCode = 50000;
RequestType = SPTPRequest[0][0];
switch (RequestType) {
    case 0: //Load Booting Program and Application
        SPTPRequest[0][0] = 1; //Send Booting Program and
        Application
        SendReceive( );
        ProcessEvent(1, 0, " "); //Execute Booting Method
        break;
    case 2: //Send Program and Application(s)
        SPTPResponse = Process;
        break;
    }
} catch (err) { alert(1+ "-" + ProcessCode + ": " + err); }
}
```

Instruction Set 2, as discussed above, may be expressed as follows:

```
/* Instruction set 2: */
function ProcessEvent(EventType, RecordID, Value) {
try {
    var ProcessCode = 60000;
    Program = Process[0][1];
    if (Program == undefined) {
        if (EventType == 3) {//Message
            Message = Process[0][0];
            MessageCode = Message[0][0];
            Description = Message[0][2];
            SourceCode = Message[0][3];
```

```
        alert(SourceCode + "-" + MessageCode + ": " +
            Description);
    }
    return;
}
Methods = Process[0][1][0][0];
for (RI = 0; RI < Methods.length; RI++) {
    if (Methods[RI][2] == EventType) {
        MethodID = Methods[RI][0];
        CallMethod(MethodID, RecordID, Value);
        break;
    }
}
}
```

```
        if (EventType == 3) {//Message
            Message = Process[0][0];
            Message[0][0] = 0;
            Message[0][1] = 0;
            Message[0][2] = "";
            Message[0][3] = 0;
            Process[0][0] = Message;
        }
    } catch (err) { alert(1 + "-" + ProcessCode + ": " + err); }
}
```

Instruction Set 3, as discussed above, may be expressed as follows:

```
/* Instruction set 3: */
function CallMethod(MethodID, RecordID, Value) {
try {
    var ProcessCode = 10000;
    var ConditionMet = 0;
    if (RecordID != undefined) { SPTPRequest[0][10] = RecordID; }
    if (Value != undefined) { SPTPRequest[0][12] = Value; }
    MethodSteps = Process[0][1][0][1];
    for (var StepRI = 0; StepRI < MethodSteps.length; StepRI++) {
        if (MethodSteps[StepRI][0] == MethodID) {
            SkipCommand = 0;
            ConditionOperator = MethodSteps[StepRI][7];
            ElseCondition = MethodSteps[StepRI][3];
            if (ElseCondition == 0) { ConditionMet = 0; }
            else if (ConditionMet == 1) { SkipCommand = 1; }
            if (ConditionOperator != 0) {
                ConditionDSI = MethodSteps[StepRI][4];
                ConditionNDSI = MethodSteps[StepRI][5];
                ConditionCI = MethodSteps[StepRI][6];
                ConditionValue = MethodSteps[StepRI][8];
                if (ConditionDSI >= 0) {
                    SourceValue =
                        Process[0][ConditionDSI][0][ConditionNDSI][0][ConditionCI];
                } else {
                    SourceValue = SPTPRequest[0][ConditionCI];
                }
                switch (ConditionOperator) {
                    case 1: //=
                        if (SourceValue != ConditionValue) {
                            SkipCommand = 1;
                        }
                        break;
                    case 2: //<>
                        if (SourceValue == ConditionValue) {
                            SkipCommand = 1;
                        }
                        break;
                    case 3: //contains
                        if(ConditionValue.indexOf("" + SourceValue + "") < 0) {
                            SkipCommand = 1;
                        }
                        break;
                }
            }
            if (SkipCommand == 1) { continue; }
            ConditionMet = 1;
            CommandCode = MethodSteps[StepRI][1];
            ObjectID = MethodSteps[StepRI][2];
            if (ObjectID == 0) { ObjectID = SPTPRequest[0][9]; }
            switch (CommandCode) {
                case 1:
                    CallMethod(ObjectID);
                    break;
                case 2:
                    TransferData(ObjectID, -1, -1, -1, -1, -1, -1);
                    break;
                case 3:
                    ClearData(ObjectID);
                    break;
                case 4:
                    SendReceive( );
                    break;
            }
```

```
            }
        }
    }
    catch (err) {
        alert (1 + "-" + ProcessCode + ": (" +
        MethodID + "," + RecordID + ") " + err);
    }
}
```

Instruction Set 4, as discussed above, may be expressed as follows:

```
/* Instruction set 4: */
function TransferData(TransferID, ParentFromDSI, ParentFromNDSI,
ParentFromRI, ParentToDSI, ParentToNDSI, ParentToRI) {
try {
    var ProcessCode = 20000;
    var i = 0;
    Transfers = Process[0][1][0][2];
    TransferColumns = Process[0][1][0][3];
    TransferConditions = Process[0][1][0][4];
    TransferFormulas = Process[0][1][0][5];
DSColumns = Process[0][1][0][6];
for (var RI = 0; RI < Transfers.length; RI++) {
    if (Transfers[RI][0] == TransferID) {
        var TransferType = Transfers[RI][1];
        var FromDSI = Transfers[RI][2];
        var FromNDSI = Transfers[RI][3];
        var FromCI;
        var ToDSI = Transfers[RI][4];
        var ToNDSI = Transfers[RI][5];
        var ToCI = Transfers[RI][6];
        var FromDataset;
        var ToDataset;
        if (FromDSI >= 0) {
            FromDataset = Process[0][FromDSI][0][FromNDSI];
        } else if (FromNDSI >= 0) {
            FromDataset = Process[0][FromNDSI];
        } else {
            FromDataset = SPTPReguest;
        }
        if (ToDSI == 0) {
            ToDataset = Process[0][ToDSI][0][ToNDSI];
        } else if (ToNDSI >= 0) {
            ToDataset = Process[0][ToNDSI];
        } else {
            ToDataset = SPTPReguest;
        }
        if (FromDataset == undefined) {
            FromDataset = [ ];
            FromDataset[0] = new Array(0);
        } else {
            FromDataset = FromDataset.slice( );
        }
        if (ToDataset == undefined) {
            ToDataset = [ ];
        }
        var ToRows = 1;
        if (TransferType == 2 || TransferType == 5} {//update or nest
        ToRows = ToDataset.length;
}
switch (TransferType) {
    case 4: //copy
        Process[0][ToDSI][0][ToNDSI] = FromDataset.slice( );
        return;
}
var StartToRI = 0;
if (TransferType == 2 && ParentFromRI >= 0 &&
        ToDSI == ParentToDSI && ToNDSI == ParentToNDSI) {
    StartToRI = ParentToRI;
    ToRows = StartToRI + 1;
}
var StartFromRI = 0;
var FromRows = FromDataset.length;
if (TransferType == 2 && ParentFromRI >= 0 &&
        FromDSI == ParentFromDSI && FromNDSI ==
ParentFromNDSI) {
    StartFromRI = ParentFromRI;
    FromRows = StartFromRI + 1;
}
for (var ToRI = 0; ToRI < ToRows; ToRI++) {
    if (ParentToRI < 0 || (TransferType != 2
        && TransferType != 5) || ToRI == ParentToRI) {
    for (var FromRI = StartFromRI; FromRI < FromRows; FromRI++) {
        if (TransferType == 2 && FromDSI == ToDSI &&
            FromNDSI == ToNDSI) { ToRI = FromRI; }
        CriteriaMet = true;
        for (ConditionsRI = 0;
            ConditionsRI < TransferConditions.length;
            ConditionsRI++) {
        if (TransferConditions [ConditionsRI][0] == TransferID) {
            FromCI = TransferConditions[ConditionsRI][1];
            FromValue = FromDataset[FromRI][FromCI];
            OperatorCode = TransferConditions[ConditionsRI][2];
            SourceCode = TransferConditions[ConditionsRI][3];
            switch (SourceCode) {
                case 1: //Column
                    ConditionDSI=TransferConditions[ConditionsRI][5];
                    ConditionNDSI=TransferConditions[ConditionsRI][6];
                    ConditionCI=TransferConditions[ConditionsRI][7];
                    if (ConditionDSI >= 0) {
                        SourceValue =
Process[0][ConditionDSI][0][ConditionNDSI][0][ConditionCI];
                    } else {
                        SourceValue = SPTPRequest[0][ConditionCI];
                    }
                    break;
                case 2: //constant
                    SourceValue = TransferConditions[ConditionsRI][4];
                    break;
                case 3: //to row index
                    SourceValue = ToRI;
                    break;
                case 4: //parent from row index
                    FromValue = FromRI;
                    SourceValue = ParentFromRI;
                    break;
                case 5: //parent from row Column
                    ConditionDSI=TransferConditions[ConditionsRI][5];
                    ConditionNDSI=TransferConditions[ConditionsRI][6];
                    ConditionCI=TransferConditions[ConditionsRI][7];
                    SourceValue =
Process[0][ConditionDSI][0][ConditionNDSI][ParentFromRI]
[ConditionCI];
                    break;
                case 6: //parent to row Column
                    ConditionDSI=TransferConditions[ConditionsRI][5];
                    ConditionNDSI=TransferConditions[ConditionsRI][6];
                    ConditionCI=TransferConditions[ConditionsRI][7];
                    SourceValue =
Process[0][ConditionDSI][0][ConditionNDSI][ParentToRI][ConditionCI];
                    break;
            }
            switch (OperatorCode) {
                case 1: //=
                    if (FromValue != SourceValue) {
                        CriteriaMet = false;
                    }
                    break;
                case 2: //< >
                    if (FromValue == SourceValue) {
                        CriteriaMet = false;
```

```
        }
        break;
      case 3: //contains
        if (SourceValue.indexOf(" "+FromValue+" ")<0) {
          CriteriaMet = false;
        }
        break;
      }
    }
  }
  if (CriteriaMet == true) {
    switch (TransferType) {
      case 1: //append
        ToRI = ToDataset.length;
        var ToDSColumns = [ ];
        for (i = 0; i < DSColumns.length; i++) {
          if (DSColumns[i][0] ==
              ToDSI && DSColumns[i][1] == ToNDSI) {
            ToDSColumns.push(DSColumns[i]);
          }
        }
        ToDataset[ToRI]=new Array(ToDSColumns.length-1);
        for (var ColumnRI = 0;
             ColumnRI < ToDSColumns.length;
             ColumnRI++) {
          ToCI = ToDSColumns[ColumnRI][2];
          Value = ToDSColumns[ColumnRI][3];
          ToDataset[ToRI][ToCI] = Value;
        }
        break;
      case 3: //delete
        Process[0][FromDSI][0][FromNDSI].splice([FromRI],1);
        return;
      case 5: //nest
        var NestDataset = [ ];
        for (i = 0; i < FromDataset.length; i++) {
          NestDataset.push(FromDataset[i].slice( ));
        }
        ToDataset[ToRI][ToCI]= NestDataset;
        return;
      case 6: //cross update
        for (FromCI = 0;
             FromCI < FromDataset[0].length;
             FromCI++) {
          ToDataset[FromCI][ToCI] =
            FromDataset[FromRI][FromCI];
        }
        ToDataset = ToDataset.slice( );
        return;
      case 7: //restore
        var RestoreDataset = [ ];
        for (i = 0;
             i < FromDataset[FromRI][ToCI].length;
             i++) {
          RestoreDataset.push (
            FromDataset[FromRI][ToCI][i].slice( )
          );
        }
        Process[0][ToDSI][0][ToNDSI] = RestoreDataset;
        return;
    }
  }
  for (ColumnRI = 0;
       ColumnRI < TransferColumns.length;
       ColumnRI++ }
    if (TransferColumns[ColumnRI][0] == TransferID) {
      SourceCode = TransferColumns[ColumnRI][1];
      ToCI = TransferColumns[ColumnRI][3];
  switch (SourceCode) }
    case 1: //column
      FromCI = TransferColumns[ColumnRI][2];
      FromValue = FromDataset[FromRI][FromCI];
      break;
    case 2: //constant
      FromValue = TransferColumns[ColumnRI][2];
      break;
    case 3: //formula
      ColumnID = TransferColumns[ColumnRI][2];
      FromValue = "";
      if (TransferType == 2) }
        FromValue = ToDataset[ToRI][ToCI];
      }
      for (var formulaRI = 0;
           formulaRI < TransferFormulas.length;
           formulaRI++) {
        if (TransferFormulas[formulaRI][0]
            == ColumnID) {
          SourceCode=TransferFormulas[formulaRI][2];
          OperatorCode=TransferFormulas[formulaRI][1];
          switch (SourceCode) {
            case 1: //Column
              FromCI=TransferFormulas[formulaRI][3];
              SourceValue=FromDataset[FromRI][FromCI];
              break;
            case 2: //constant
              SourceValue =
                TransferFormulas[formulaRI][3];
              break;
            case 3: //row index
              SourceValue = FromRI;
              break;
          }
          switch (OperatorCode) {
            case 1: //append
              FromValue = FromValue + SourceValue;
              break;
            case 2: //trim
              FromValue =
  FromValue.substr(0, FromValue.length-parseInt(SourceValue));
              break;
            case 3: //+
              var FromNumber=new Number(FromValue);
              var SourceNumber=
                new Number(SourceValue);
              FromValue = FromNumber + SourceNumber;
              break;
            case 4: //Parse
              var StartPosition = 0;
              var EndPosition = -2;
              for (var Occurence = 1;
                   Occurence<= parseInt(SourceValue);
                   Occurence++) {
                StartPosition = EndPosition + 2;
                EndPosition =
  FromValue.indexOf("||", StartPosition);
              }
              if (EndPosition < 0) }
                EndPosition = FromValue.length;
              }
              FromValue =
  FromValue.substr(StartPosition, EndPosition - StartPosition);
              break;
            case 5: //insert prefix
              FromValue = SourceValue + FromValue;
              break;
          }
        }
      }
      break;
    case 4: //parent index
      FromValue = ParentToRI;
      break;
            case 5: //row index
              FromValue = ToRI;
              break;
          }
          ToDataset[ToRI][ToCI] = FromValue;
        }
      }
      if (ToDSI >= 0) {
        Process[0][ToDSI][0][ToNDSI] = ToDataset.slice( );
      } else {
        SPTPReguest = ToDataset.slice( );
      }
      for (var TransferRI = 0;
           TransferRI < Transfers.length;
           TransferRI++) {
        if (Transfers[TransferRI][7] == TransferID) {
          TransferData(Transfers[TransferRI][0],
```

```
            FromDSI, FromNDSI, FromRI, ToDSI, ToNDSI,
              ToRI);
            }
          }
        }
      }
    }
  }
  break;
            }
          }
          if (ToDSI>=0) { Process[0][ToDSI][0][ToNDSI]=
ToDataset.slice( ); }
          else { SPTPReguest = ToDataset.slice( ); }
        } catch (err) {
          alert(1 + "-" + ProcessCode + ": (" + TransferID + "," +
ParentToRI + ") " + err);
        }
      }
```

Instruction Set 5, as discussed above, may be expressed as follows:

```
/* Instruction set 5: */
function ClearData(NDSI) {
    try {
        var ProcessCode = 30000;
        App = Process[0][2];
        if (App[0][NDSI] == undefined) { return; }
        App[0][NDSI].length = 0;
        Process[0][2] = App.slice( );
    } catch (err) { alert(1 + "-" + ProcessCode + ": " + err); }
}
```

Instruction Set 6, as discussed above, may be expressed as follows:

```
/* Instruction set 6: */
function SendReceive( ) {
try {
    var ProcessCode = 40000;
    RequestType = parseInt(SPTPRequest[0][0]);
    RemoteConnectType = parseInt(SPTPRequest[0][1]);
    RemoteConnection = SPTPRequest[0][2];
    ResourceConnectType = parseInt(SPTPRequest[0][3]);
    ResourceConnection = SPTPRequest[0][4];
    Statement = SPTPRequest[0][6];
    if (RemoteConnectType == 0) { //Execute via Resource
        ConnectType = ResourceConnectType;
        Connectstring = ResourceConnection;
        SendString = Statement;
    }
    if (RemoteConnectType == 1) { //Send SPTPRequest to Remote
agent
        ConnectType = RemoteConnectType;
        Connectstring = RemoteConnection;
        SendString =
        "<s:Envelope
xmlns:s='http://schemas.xmlsoap.org/soap/envelope/'>"+
            "<s:Body>" +
                "<ReceiveSendMonitor xmlns='http://tempuri.org/'>"
+
                    "<request>" + JSON.stringify(SPTPRequest) +
                    "</request>" +
                "</ReceiveSendMonitor>" +
            "</s:Body>" +
        "</s:Envelope>";
    }
    if (RemoteConnectType > 1) { //Execute via Remote Resource
        ConnectType = RemoteConnectType;
        Connectstring = RemoteConnection;
        SendString = Statement;
    }
    ResourceHandler(ConnectType, Connectstring, SendString);
```

```
    Message = JSON.parse(SPTPResponse[0][0]);
    Program = JSON.parse(SPTPResponse[0][1]);
    App = JSON.parse(SPTPResponse[0][2]);
    Data = JSON.parse(SPTPResponse[0][3]);
    Process[0][0] = Message;
    MessageType = 0;
    if (Message.length > 0) {
        MessageType = Message[0][1];
    }
    if (MessageType == 1) {//error
        ProcessEvent(3, 0, ""); //message
        return;
    }
    Process[0][3] = Data;
    if (RequestType == 1) { //Send Booting Program and Application
        Process[0][1] = Program;
        Process[0][2] = App;
    }
    if (RequestType == 2) { //Send Loaded Program and Application(s)
        Process[0][1] = Program;
        Process[0][2] = App;
    }
    if (RequestType == 6) { //Send Additional Application
        Process[0][2] = App;
    }
    if (MessageType > 1) {
        ProcessEvent(3, 0, ""); //message
    }
} catch(err) { alert(1+"-"+ProcessCode+": "+err); }
}
```

Instruction Set 7, as discussed above, may be expressed as follows:

```
/* Instruction set 7: */
<!DOCTYPE html PUBLIC "-//W3C//DTD XHTML 1.0
Transitional//EN"
"http://www.w3.org/TR/xhtml1/DTD/xhtml1-transitional.dtd">
<html>
<head><title>x10DATA Smart Client</title></head>
<body id='bodyID' onload="javascript:Booter( );">
<div id='DynamicHTML'></div>
<script type="text/javascript" src="scripts/x10DATA_MCP.js"></script>
<script type="text/javascript"
src="scripts/CSJSRequestObject.js"></script>
<script>
function Booter( ) {
    RequestType = 0;
    DomainType = Request.QueryString("domaintype").toString( );
    DomainIdentifier = Request.QueryString("domain").toString( );
    ScreenWidth = Request.QueryString("width").toString( );
    ScreenHeight = Request.QueryString("height").toString( );
    RemoteConnectType = 1;
    RemoteConnection =
"http://www.appcase.mobi/x10DATAMWS/Service1.svc/basic";
    ResourceConnectType = 0;
    ResourceConnection = "";
    StatementType = 0;
    Statement = "";
    ObjectID = 0;
    RecordID = "";
    RecordIDs = "";
    Value = "";
    SPTPRequest[0][0] = RequestType;
    SPTPRequest[0][1] = RemoteConnectType;
    SPTPRequest[0][2] = RemoteConnection;
    SPTPRequest[0][3] = ResourceConnectType;
    SPTPRequest[0][4] = ResourceConnection;
    SPTPRequest[0][5] = StatementType;
    SPTPRequest[0][6] = Statement;
    SPTPRequest[0][7] = DomainType;
    SPTPRequest[0][8] = DomainIdentifier;
    SPTPRequest[0][9] = ObjectID;
    SPTPRequest[0][10] = RecordID;
    SPTPRequest[0][11] = RecordIDs;
    SPTPRequest[0][12] = Value;
    SPTPRequest[0][13] = ScreenWidth;
```

-continued

```
    SPTPRequest[0][14] = ScreenHeight;
    ProcessRequest( );
}
function ResourceHandler(ConnectType, ConnectString, Statement) {
try {
ProcessCode = 20000;
SPTPResponse[0][0] = '[ ]';
SPTPResponse[0][1] = '[ ]';
SPTPResponse[0][2] = '[ ]';
SPTPResponse[0][3] = '[ ]';
switch (ConnectType) {
    case 1: //SPTP
        ProcessCode = 21010;
        ConnectObject = new XMLHttpRequest( );
        ConnectObject.open('POST', ConnectString, false);
        ConnectObject.setRequestHeader("Content-type",
        "text/xml; charset=utf-8");
        ConnectObject.setRequestHeader("SOAPAction",
        "http://tempuri.org/IService1/ReceiveSendMonitor");
        ConnectObject.send(Statement);
        Response = ConnectObject.responseXML.text;
        if (Response == undefined) {
            Response =
            ConnectObject.responseXML.childNodes[0].textContent;
            if (Response == undefined) {
                Response = "";
            }
        }
        SPTPResponse = JSON.parse(Response);
        break;
    case 3: //HTML DOM
        ProcessCode = 21030;
        ConnectObject = document.getElementById(ConnectString);
        ConnectObject.innerHTML = Statement;
        break;
}
} catch (err) { ErrorHandler(ProcessCode, err.message); }
}
function ErrorHandler(ErrorCode, Description) {
    Message[0][0] = ErrorCode;
    Message[0][1] = 1; //Error
    Message[0][2] = Description;
    Message[0][3] = 2; //Agent
    SPTPResponse[0][0] = JSON.stringify(Message);
}
</script>
</body></html>
```

What is claimed is:

1. A method for generating a portable information view, the method comprising the steps of, using an at least one hardware processor:

from a first metadata-driven command processor on a first machine, sending a first request dataset to a first resource, wherein the first request dataset represents a two-dimensional structure having one or more rows and a plurality of columns, and wherein each of the one or more rows comprises a statement representing a query, wherein the query identifies one or more classes of objects, in response to the first request dataset, by the first resource:

generating a first response dataset, wherein the first response dataset represents a two-dimensional structure having one or more rows and a plurality of columns, and wherein each of the one or more rows comprises a nested dataset, wherein the nested dataset comprises information retrieved from one or more data stores, wherein the information retrieved is related to the one or more objects of the one or more classes of objects identified in a query within the first request dataset; and returning the first response dataset; and by the first metadata-driven command processor:

receiving the first response dataset;

deriving an application dataset from the first response dataset;

processing the application dataset on the first machine in response to a machine event to generate a second request dataset, wherein the second request dataset represents a two-dimensional structure having one or more rows and a plurality of columns, and wherein each of the one or more rows comprises a statement representing a query, wherein the query identifies one or more classes of objects, wherein the identification of the one or more classes of objects comprises values derived from the application dataset; and sending the second request dataset to a second resource, wherein the second resource is the same as or different than the first resource;

in response to the second request dataset, by the second resource:

generating a second response dataset, wherein the second response dataset represents a two-dimensional structure having one or more rows and a plurality of columns, and wherein each of the one or more rows comprises a nested dataset, wherein each nested dataset comprises information retrieved from one or more data stores, wherein the information retrieved is related to the one or more objects of the one or more classes of objects identified in a query within the second request dataset; and returning the second response dataset; and by the first metadata-driven command processor:

receiving the second response dataset;

deriving an information dataset from the second response dataset;

processing the information dataset on the first machine to generate a view dataset, wherein the view dataset represents a two-dimensional structure having one or more rows and a plurality of columns, and wherein each of the one or more rows comprises one or more values derived from the information dataset and one or more values derived from the application dataset; and sending the view dataset to a third resource; and in response to the view dataset, by the third resource:

processing the view dataset to output a document to a machine display or printed material, wherein the document comprises readable values positioned based on formatting values, wherein the readable values and formatting values are derived from values within the view dataset.

2. A system for generating a portable information view, the system comprising:

an at least one hardware processor configured for:

from a first metadata-driven command processor on a first machine, sending a first request dataset to a first resource, wherein the first request dataset represents a two-dimensional structure having one or more rows and a plurality of columns, and wherein each of the one or more rows comprises a statement representing a query, wherein the query identifies one or more classes of objects, in response to the first request dataset, by the first resource:

generating a first response dataset, wherein the first response dataset represents a two-dimensional structure having one or more rows and a plurality of columns, and wherein each of the one or more rows comprises a nested dataset, wherein the nested dataset comprises information retrieved from one or more data stores, wherein the information retrieved is related to the one or more objects of the one or more classes of objects identified in a query within the first request dataset; and returning the first response dataset; and by the first metadata-driven command processor:
receiving the first response dataset;
deriving an application dataset from the first response dataset;
processing the application dataset on the first machine in response to a machine event to generate a second request dataset, wherein the second request dataset represents a two-dimensional structure having one or more rows and a plurality of columns, and wherein each of the one or more rows comprises a statement representing a query, wherein the query identifies one or more classes of objects, wherein the identification of the one or more classes of objects comprises values derived from the application dataset; and
sending the second request dataset to a second resource, wherein the second resource is the same as or different than the first resource;

in response to the second request dataset, by the second resource:
generating a second response dataset, wherein the second response dataset represents a two-dimensional structure having one or more rows and a plurality of columns, and wherein each of the one or more rows comprises a nested dataset, wherein each nested dataset comprises information retrieved from one or more data stores, wherein the information retrieved is related to the one or more objects of the one or more classes of objects identified in a query within the second request dataset; and
returning the second response dataset; and by the first metadata-driven command processor:
receiving the second response dataset;
deriving an information dataset from the second response dataset;
processing the information dataset on the first machine to generate a view dataset, wherein the view dataset represents a two-dimensional structure having one or more rows and a plurality of columns, and wherein each of the one or more rows comprises one or more values derived from the information dataset and one or more values derived from the application dataset; and
sending the view dataset to a third resource; and in response to the view dataset, by the third resource:
processing the view dataset to output a document to a machine display or printed material, wherein the document comprises readable values positioned based on formatting values, wherein the readable values and formatting values are derived from values within the view dataset.

3. A non-transient computer readable medium containing program instructions for causing an at least one computing device to perform a method of generating a portable information view using an at least one hardware processor, the method comprising the steps of:

from a first metadata-driven command processor on a first machine, sending a first request dataset to a first resource, wherein the first request dataset represents a two-dimensional structure having one or more rows and a plurality of columns, and wherein each of the one or more rows comprises a statement representing a query, wherein the query identifies one or more classes of objects, in response to the first request dataset, by the first resource:
generating a first response dataset, wherein the first response dataset represents a two-dimensional structure having one or more rows and a plurality of columns, and wherein each of the one or more rows comprises a nested dataset, wherein the nested dataset comprises information retrieved from one or more data stores, wherein the information retrieved is related to the one or more objects of the one or more classes of objects identified in a query within the first request dataset; and
returning the first response dataset; and by the first metadata-driven command processor:
receiving the first response dataset;
deriving an application dataset from the first response dataset;
processing the application dataset on the first machine in response to a machine event to generate a second request dataset, wherein the second request dataset represents a two-dimensional structure having one or more rows and a plurality of columns, and wherein each of the one or more rows comprises a statement representing a query, wherein the query identifies one or more classes of objects, wherein the identification of the one or more classes of objects comprises values derived from the application dataset; and
sending the second request dataset to a second resource, wherein the second resource is the same as or different than the first resource;

in response to the second request dataset, by the second resource:
generating a second response dataset, wherein the second response dataset represents a two-dimensional structure having one or more rows and a plurality of columns, and wherein each of the one or more rows comprises a nested dataset, wherein each nested dataset comprises information retrieved from one or more data stores, wherein the information retrieved is related to the one or more objects of the one or more classes of objects identified in a query within the second request dataset; and
returning the second response dataset; and by the first metadata-driven command processor:
receiving the second response dataset;
deriving an information dataset from the second response dataset;
processing the information dataset on the first machine to generate a view dataset, wherein the view dataset represents a two-dimensional structure having one or more rows and a plurality of columns, and wherein each of the one or more rows comprises one or more values derived from the information dataset and one or more values derived from the application dataset; and
sending the view dataset to a third resource; and in response to the view dataset, by the third resource:
  processing the view dataset to output a document to a machine display or printed material, wherein the document comprises readable values positioned based on formatting values, wherein the readable values and formatting values are derived from values within the view dataset.

\* \* \* \* \*